United States Patent [19]

Ohtake

[11] Patent Number: 5,781,348
[45] Date of Patent: Jul. 14, 1998

[54] ZOOM LENS SYSTEM

[75] Inventor: Motoyuki Ohtake, Tokyo, Japan

[73] Assignee: Nikon Corporation, Tokyo, Japan

[21] Appl. No.: 692,747

[22] Filed: Aug. 6, 1996

[30] Foreign Application Priority Data

Sep. 26, 1995 [JP] Japan ................ 7-271855
Sep. 28, 1995 [JP] Japan ................ 7-274736

[51] Int. Cl.$^6$ .............. G02B 15/14; G02B 27/64
[52] U.S. Cl. .............. 359/676; 359/557; 359/683
[58] Field of Search ................ 359/676, 677, 359/683, 813, 557, 554

[56] References Cited

U.S. PATENT DOCUMENTS

| 5,069,537 | 12/1991 | Kitagishi | 359/557 |
| 5,585,966 | 12/1996 | Suzuki | 359/557 |

FOREIGN PATENT DOCUMENTS

| 41-8558 | 5/1966 | Japan. |
| 1-116619 | 5/1989 | Japan. |
| 6-95037 | 4/1994 | Japan. |
| 6-95039 | 4/1994 | Japan. |
| 6-265788 | 9/1994 | Japan. |
| 7-27979 | 1/1995 | Japan. |

*Primary Examiner*—Georgia Y Epps
*Assistant Examiner*—Jordan M. Schwartz
*Attorney, Agent, or Firm*—Oliff & Berridge, PLC

[57] ABSTRACT

A compact zoom lens system that moves during zooming from a maximum wide-angle state to a maximum telephoto state also can shift an image to compensate for vibrations (shaking). The zoom lens system comprises first through fifth lens groups. During zooming at least the first lens group and the fifth lens group move toward the object side so that a distance between the first lens group and the second lens group increases; a distance between the second lens group and the third lens group decreases; a distance between the third lens group and the fourth lens group increases; and a distance between the fourth lens group and the fifth lens group decreases. At least one of the lens elements that comprise the fourth lens group is a shift lens group that shifts the image by moving in a direction substantially perpendicular to the optical axis. The zoom lens system also satisfies several conditions.

15 Claims, 94 Drawing Sheets

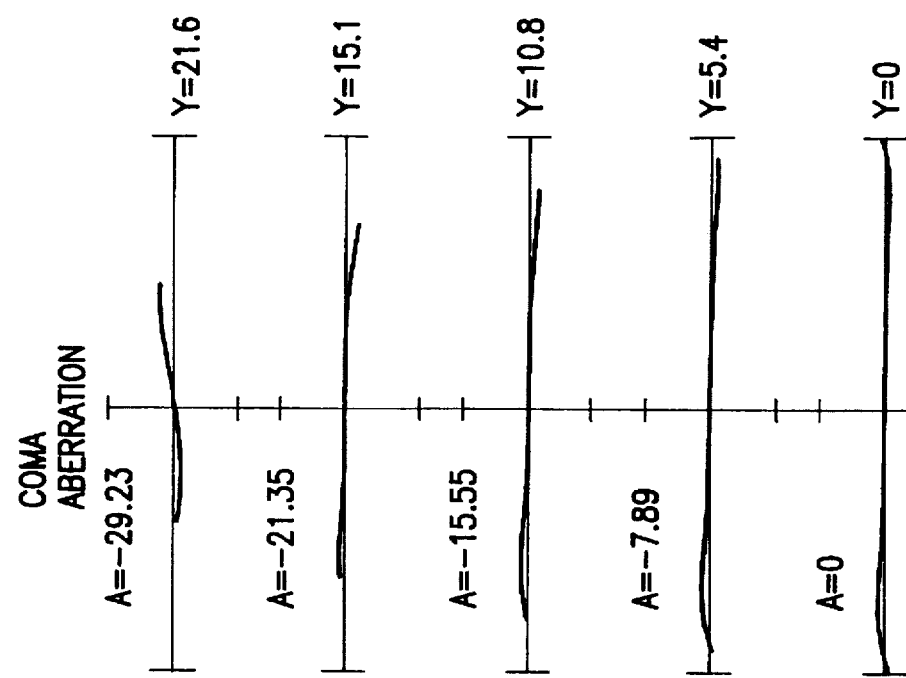
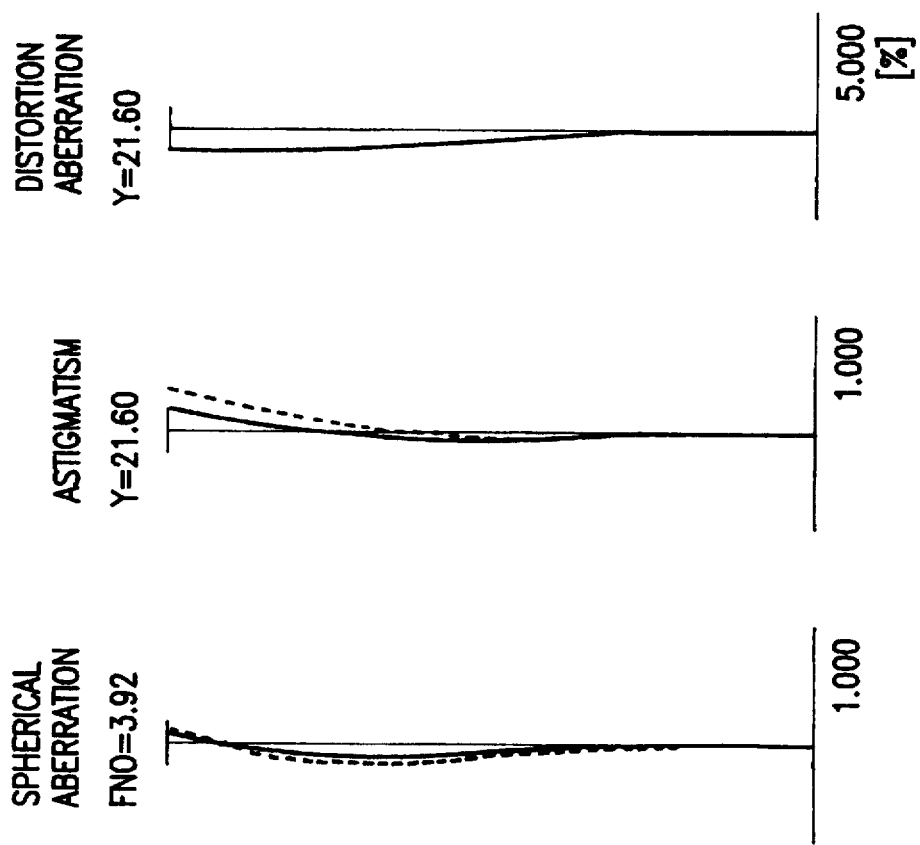
FIG.3a  FIG.3b  FIG.3c  FIG.3d

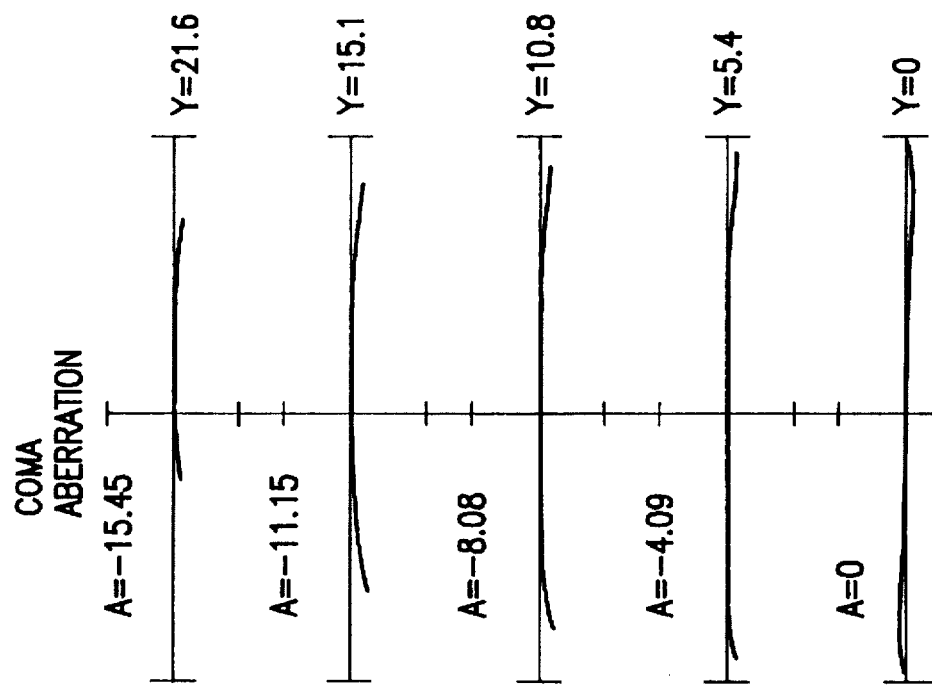
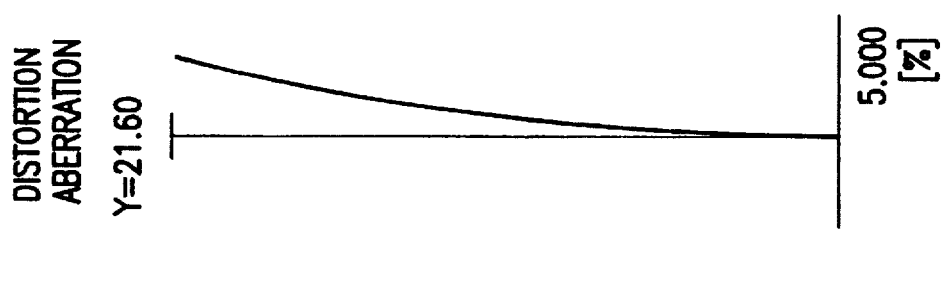
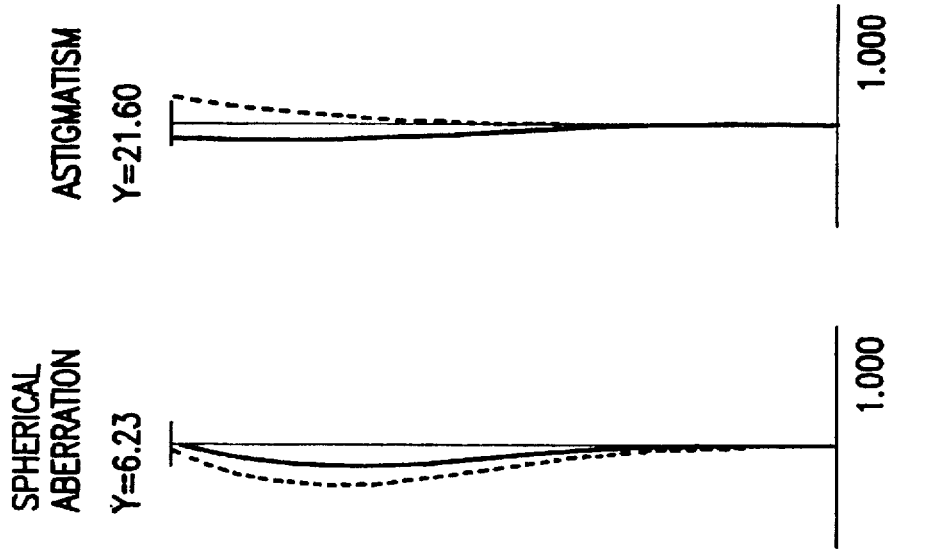

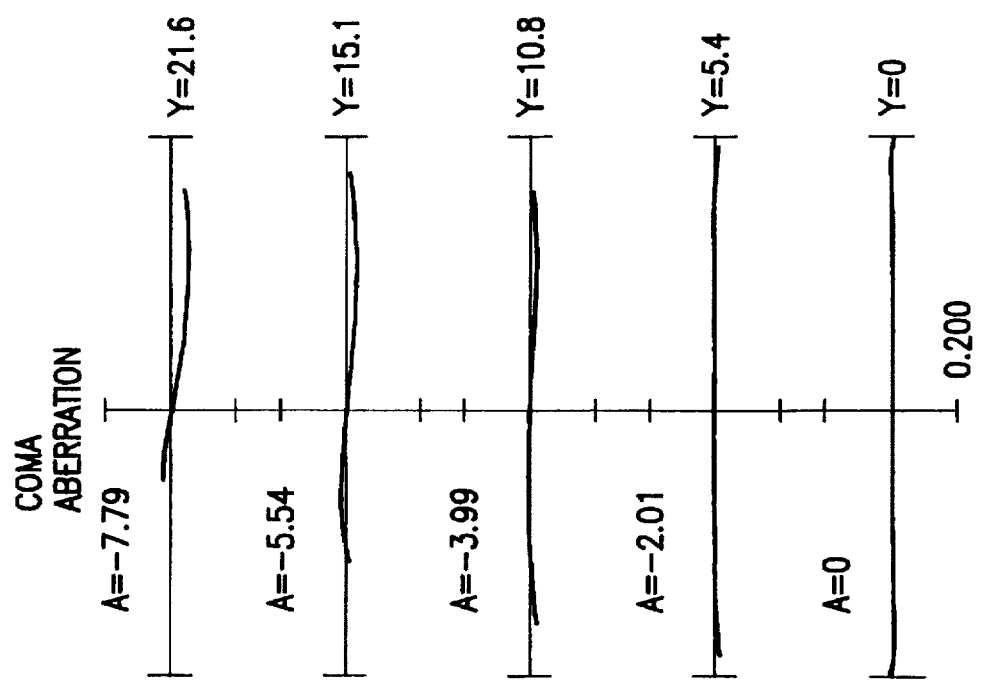
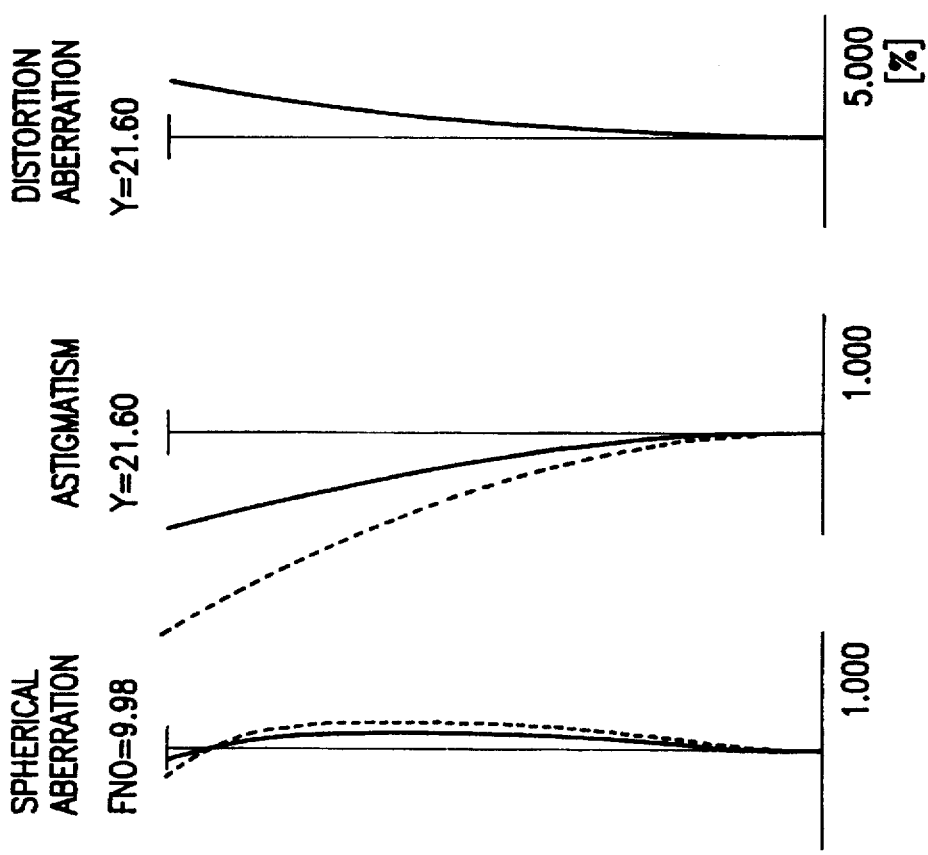

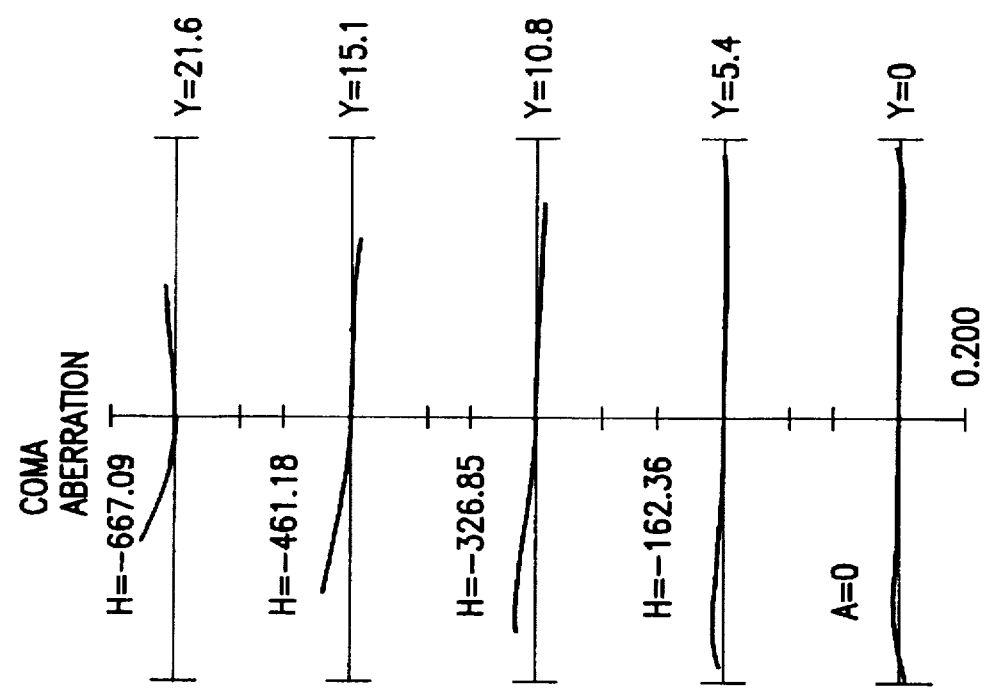
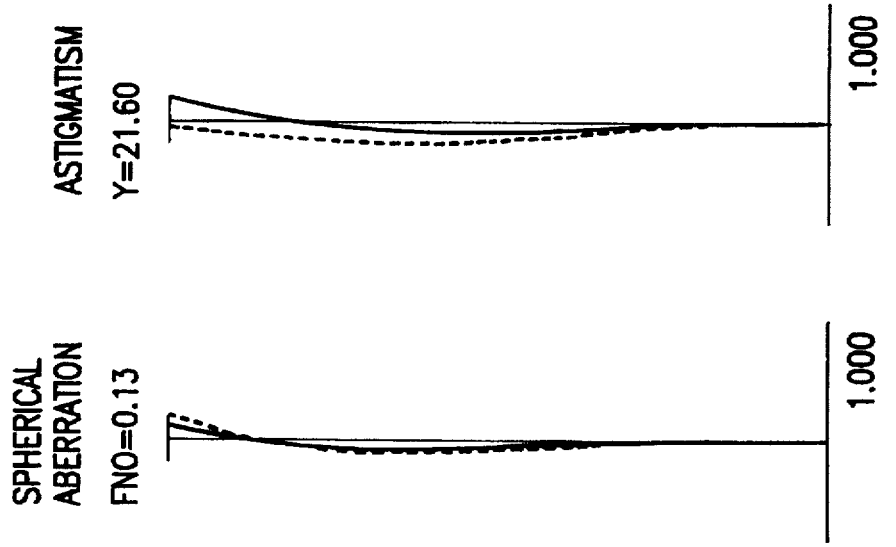

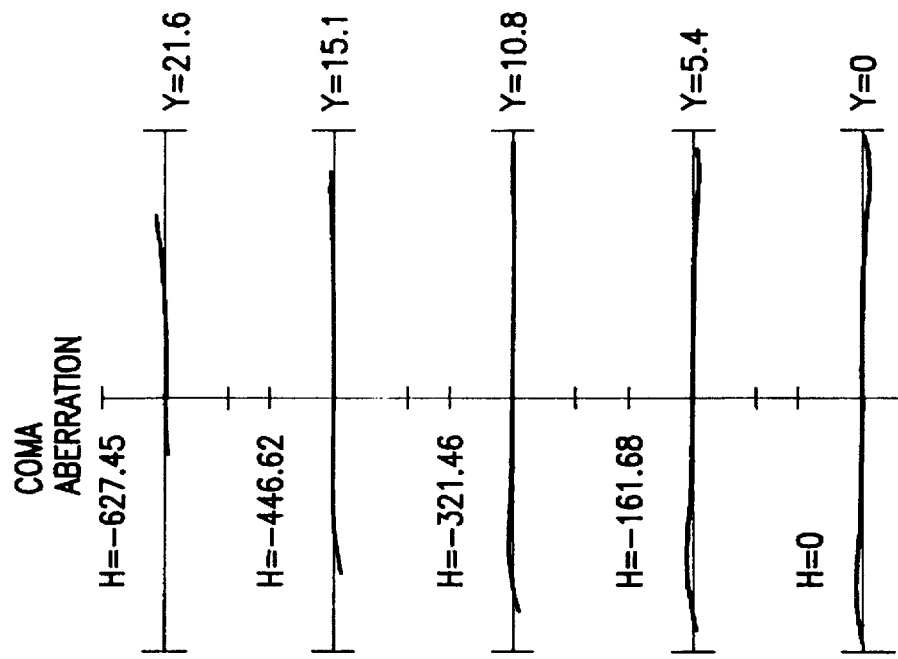
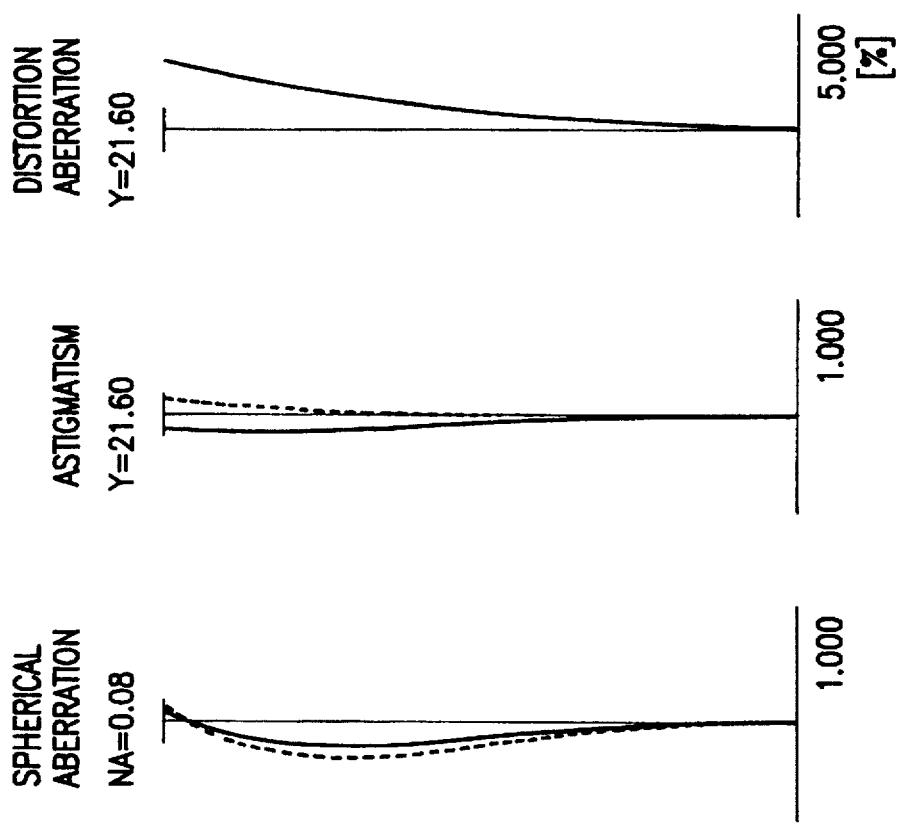
FIG.7a FIG.7b FIG.7c FIG.7d

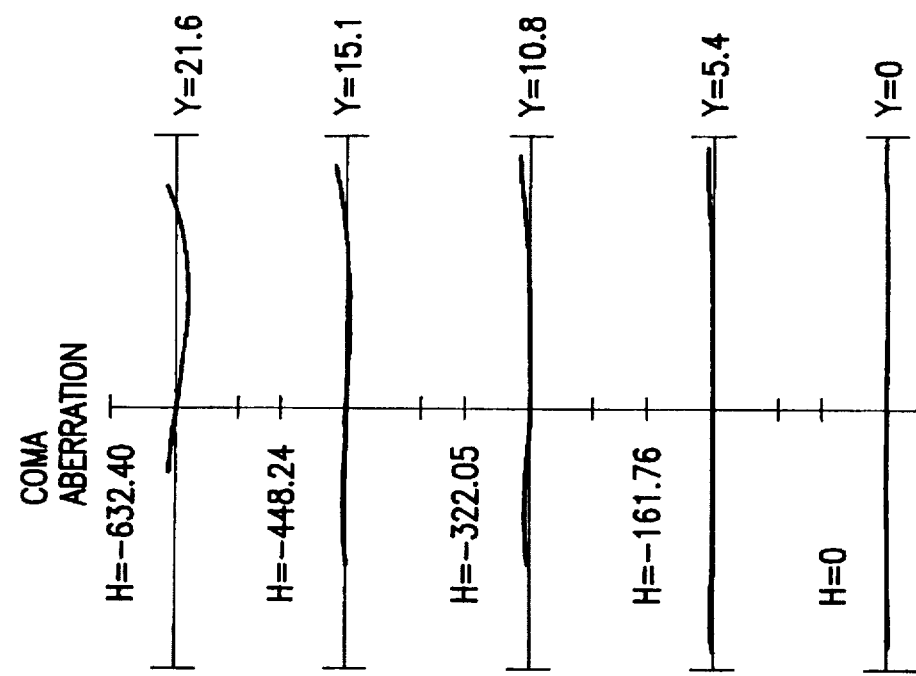

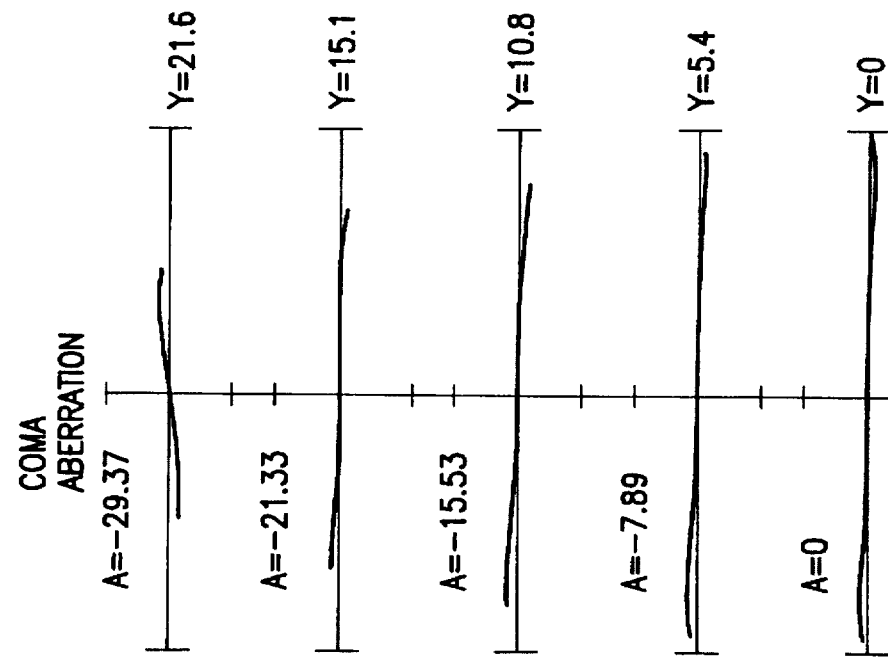
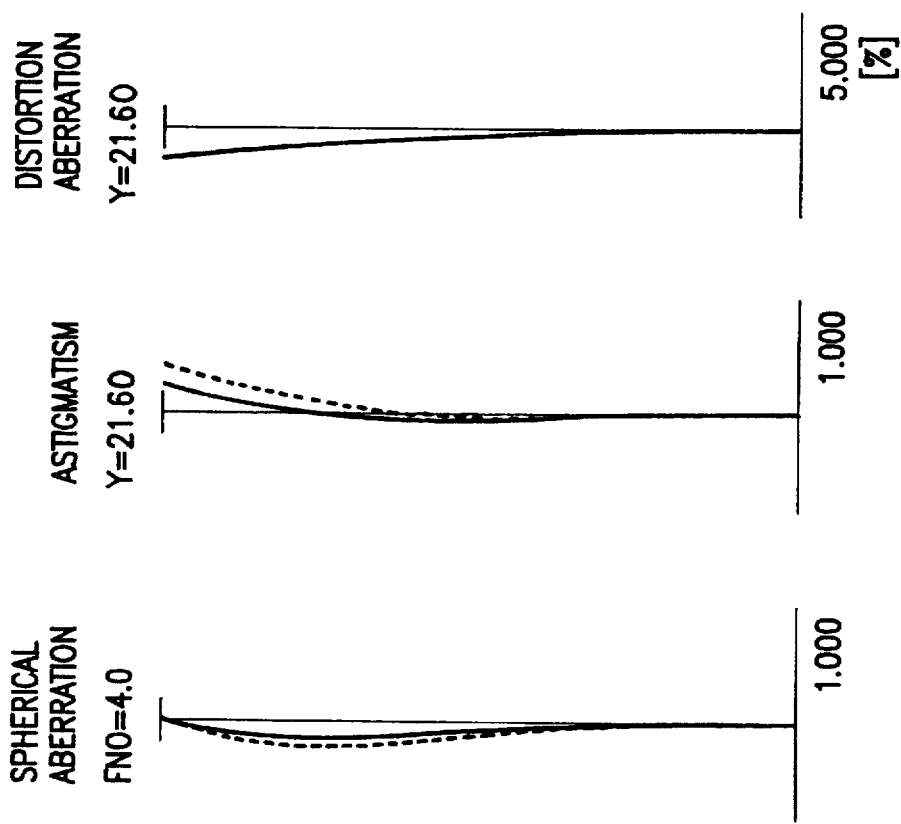

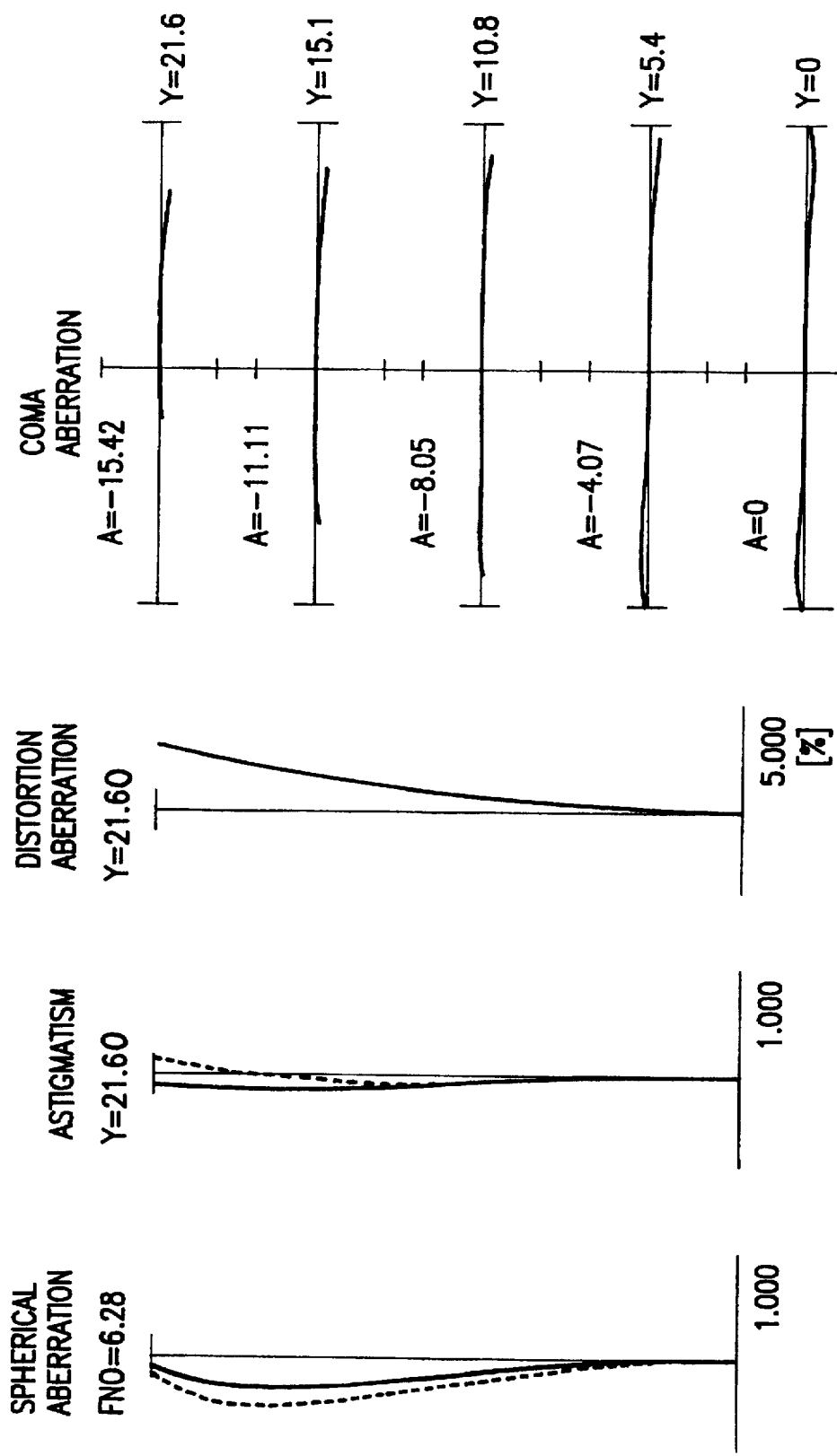

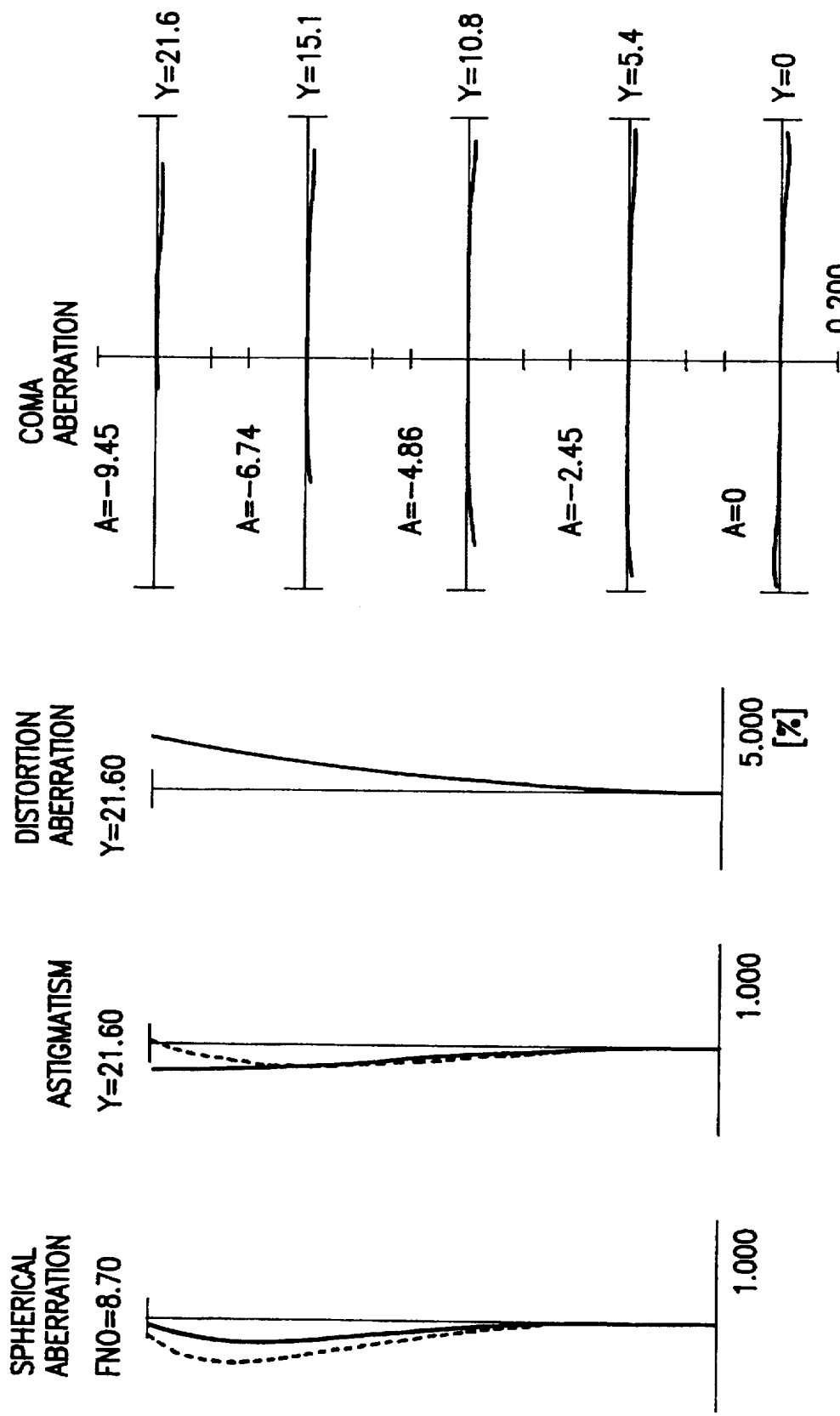

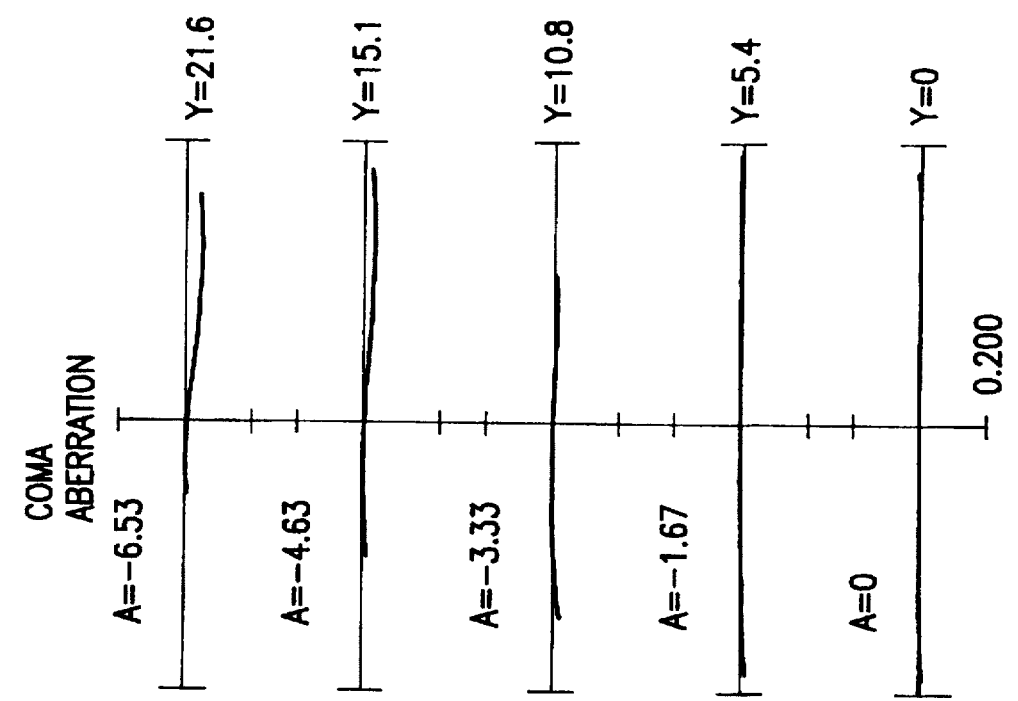
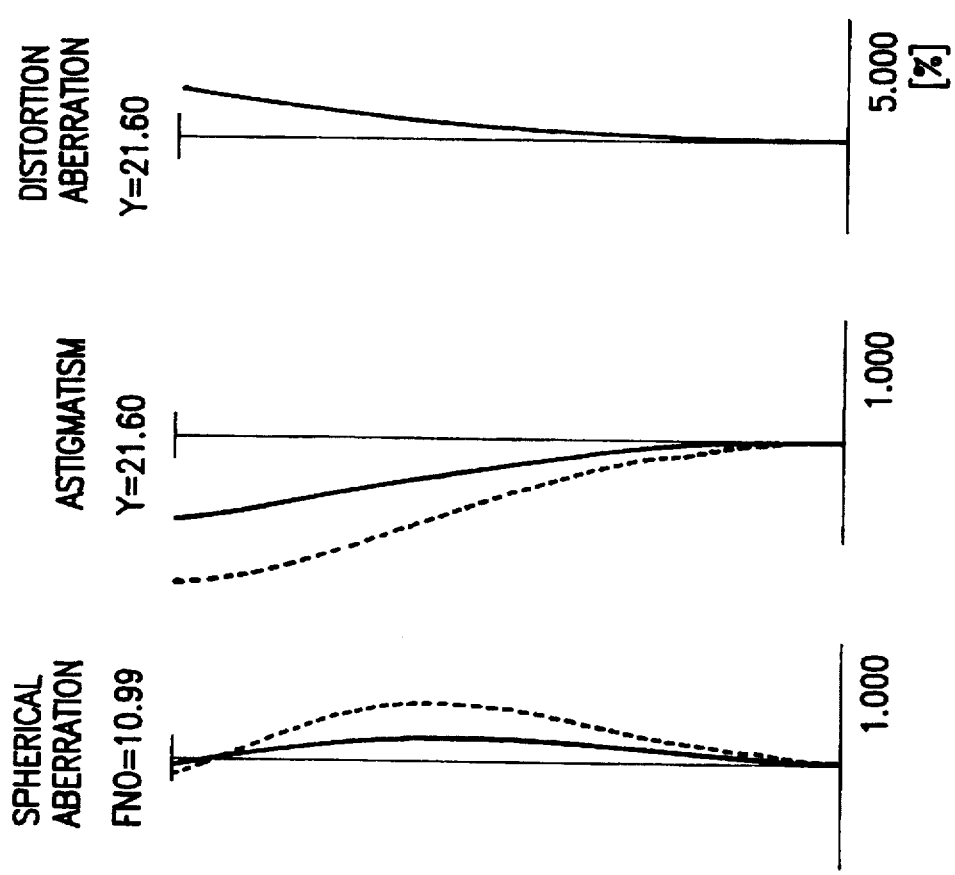
FIG.16d
FIG.16c
FIG.16b
FIG.16a

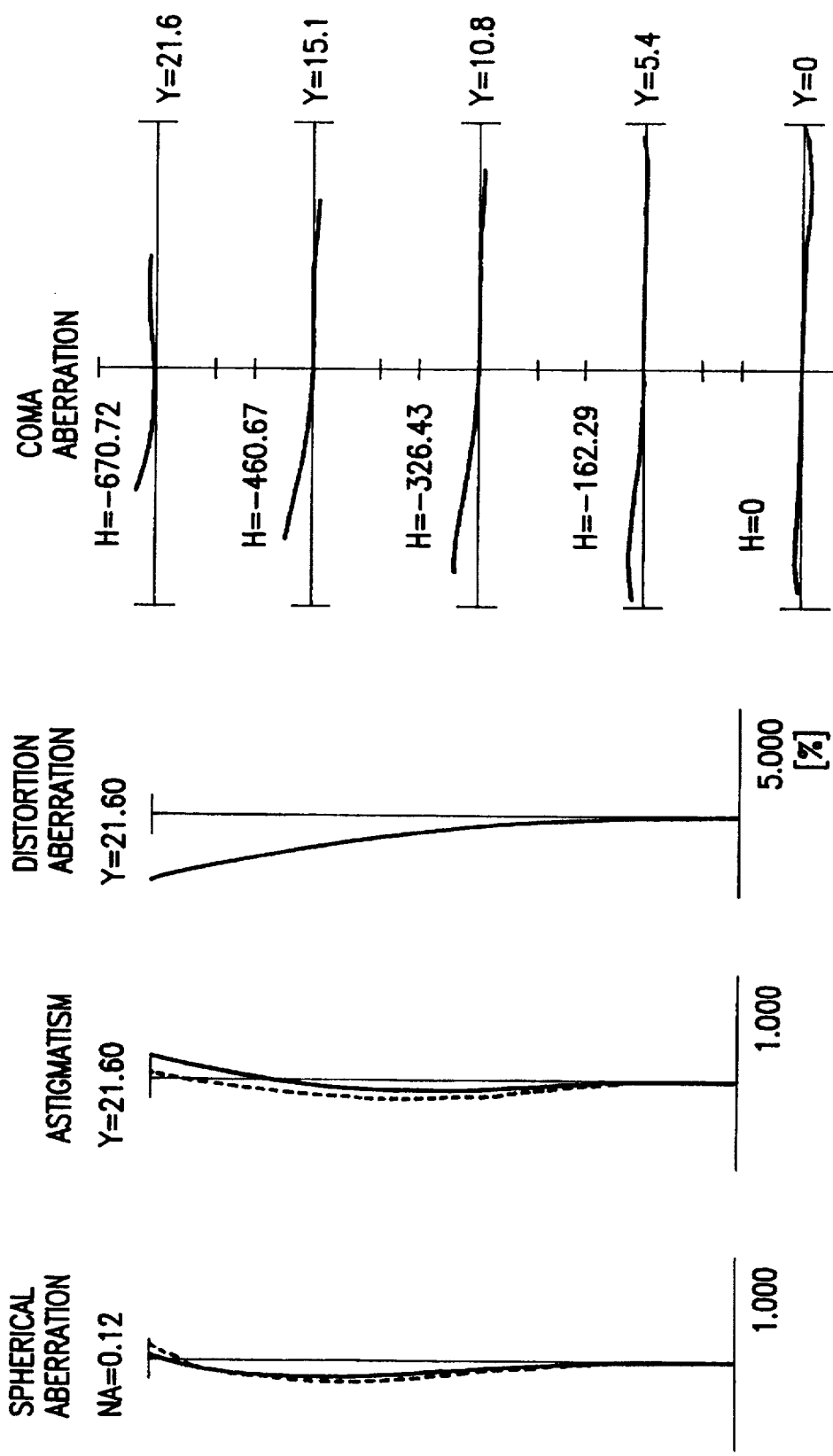

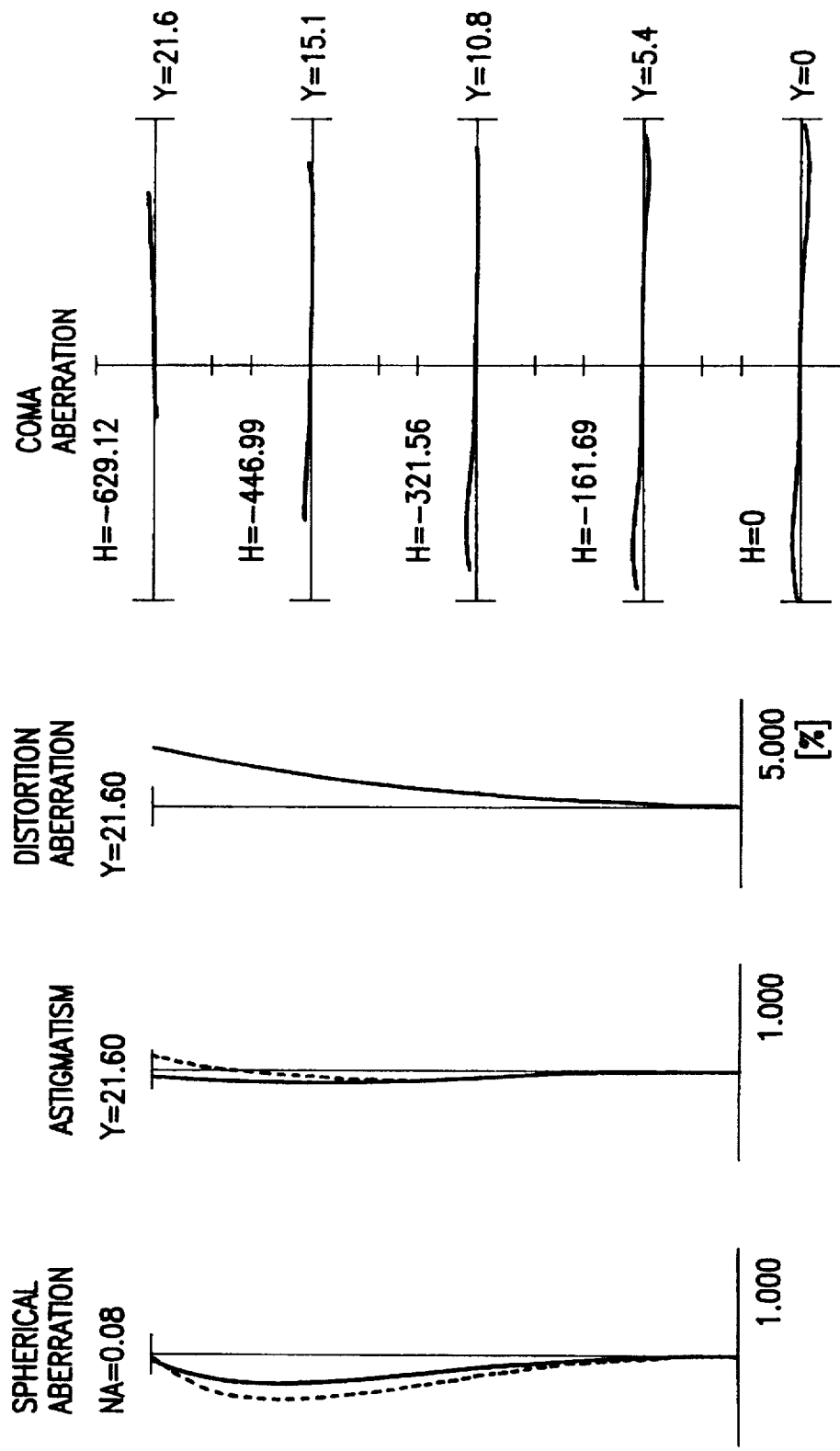

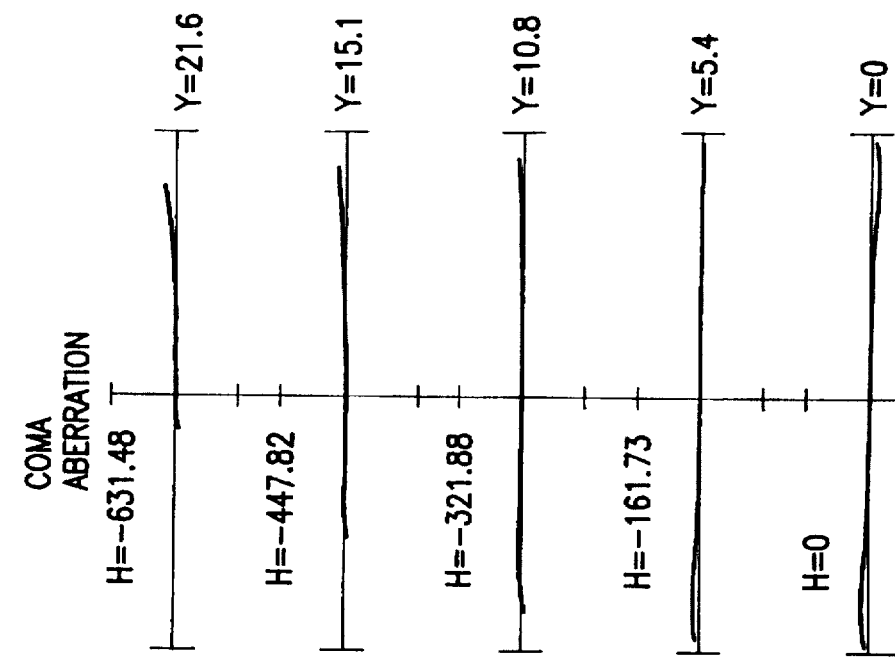
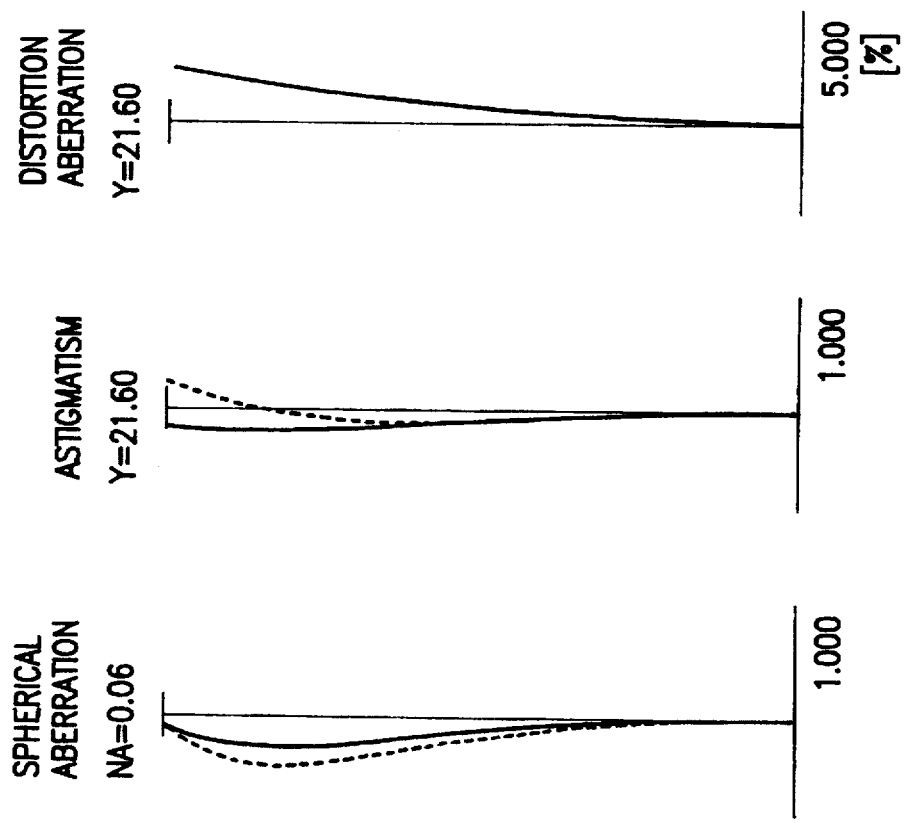

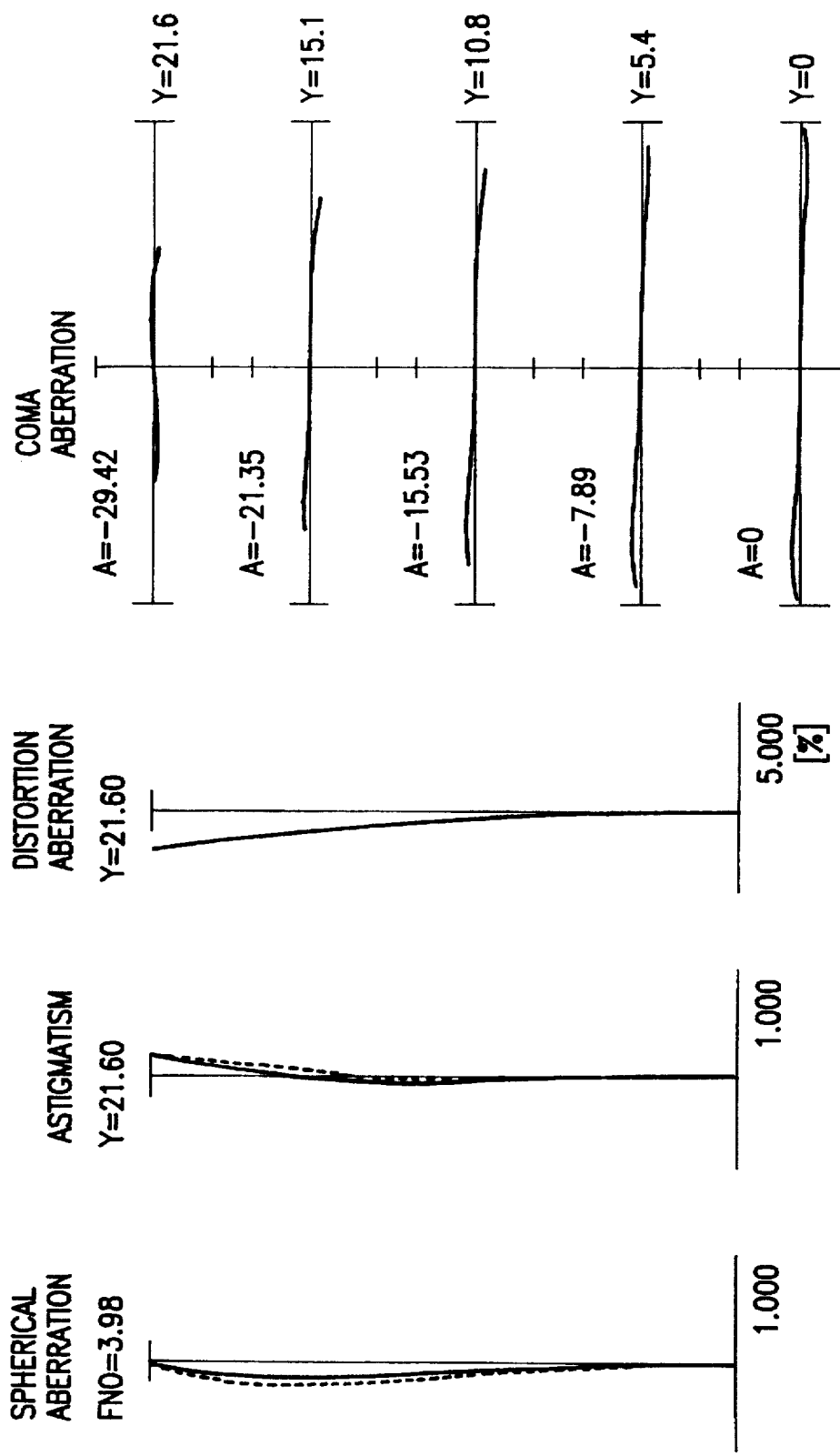

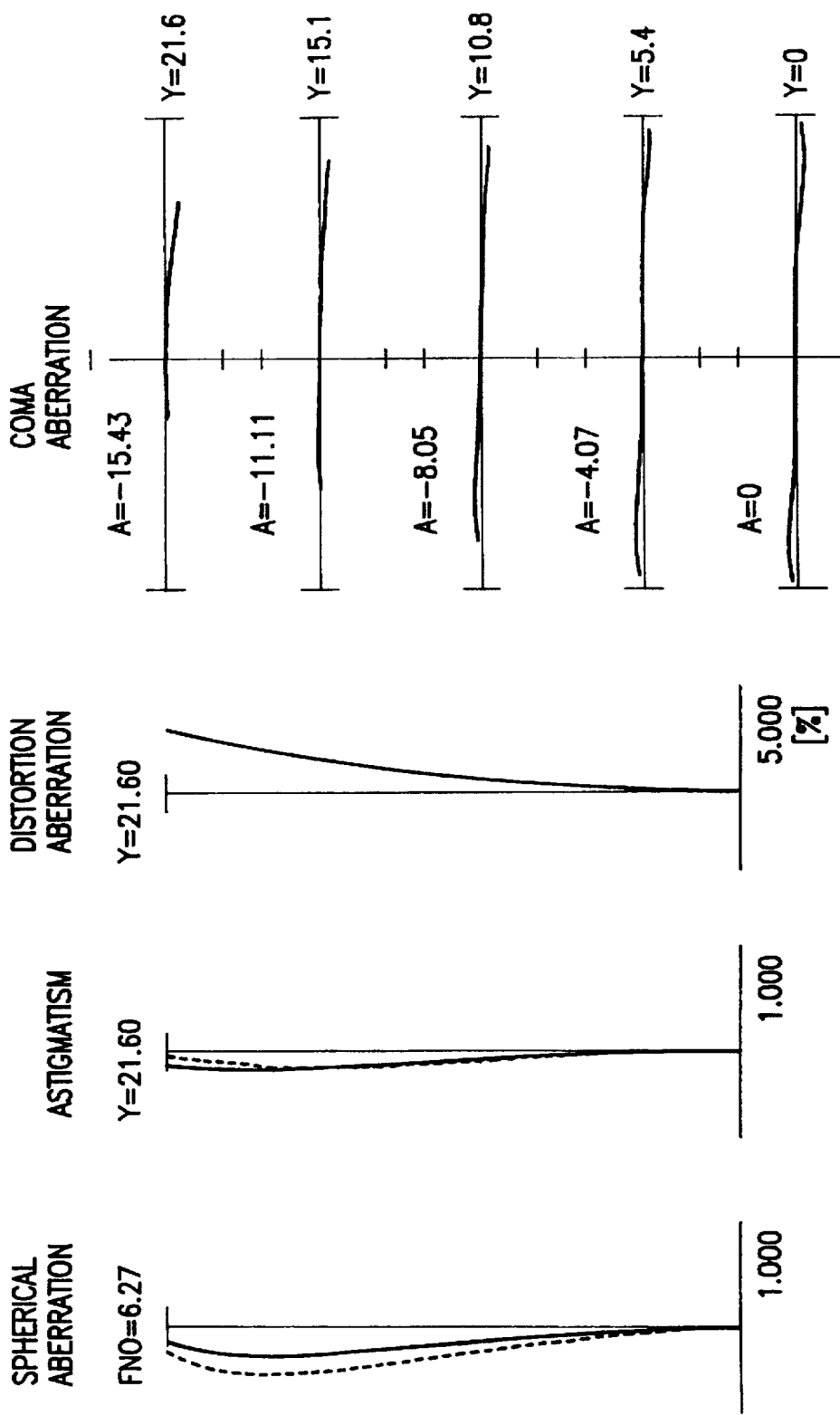

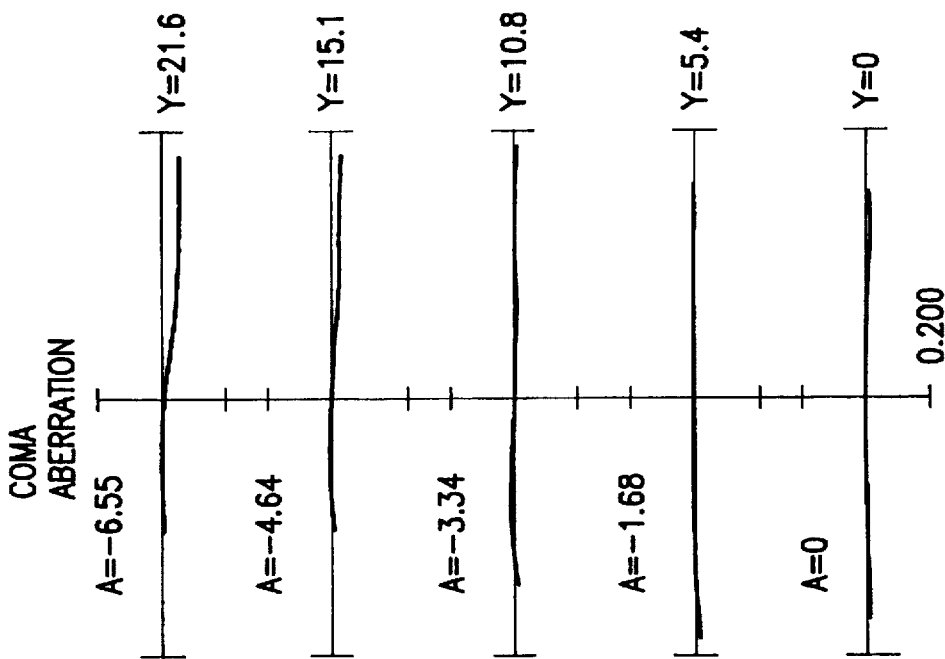
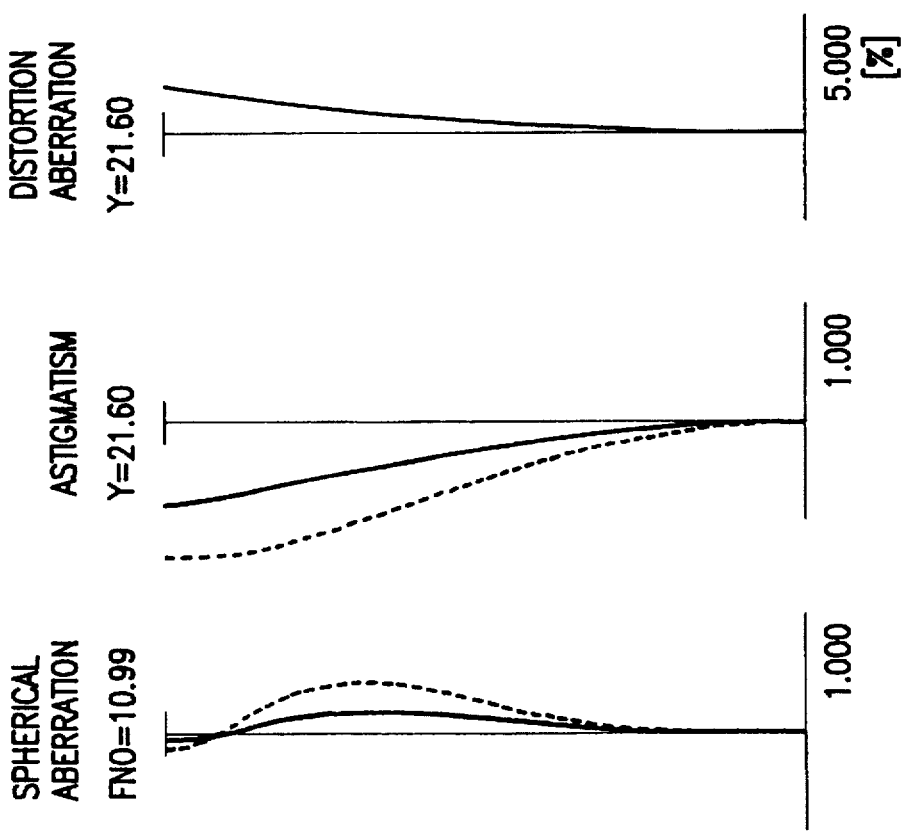

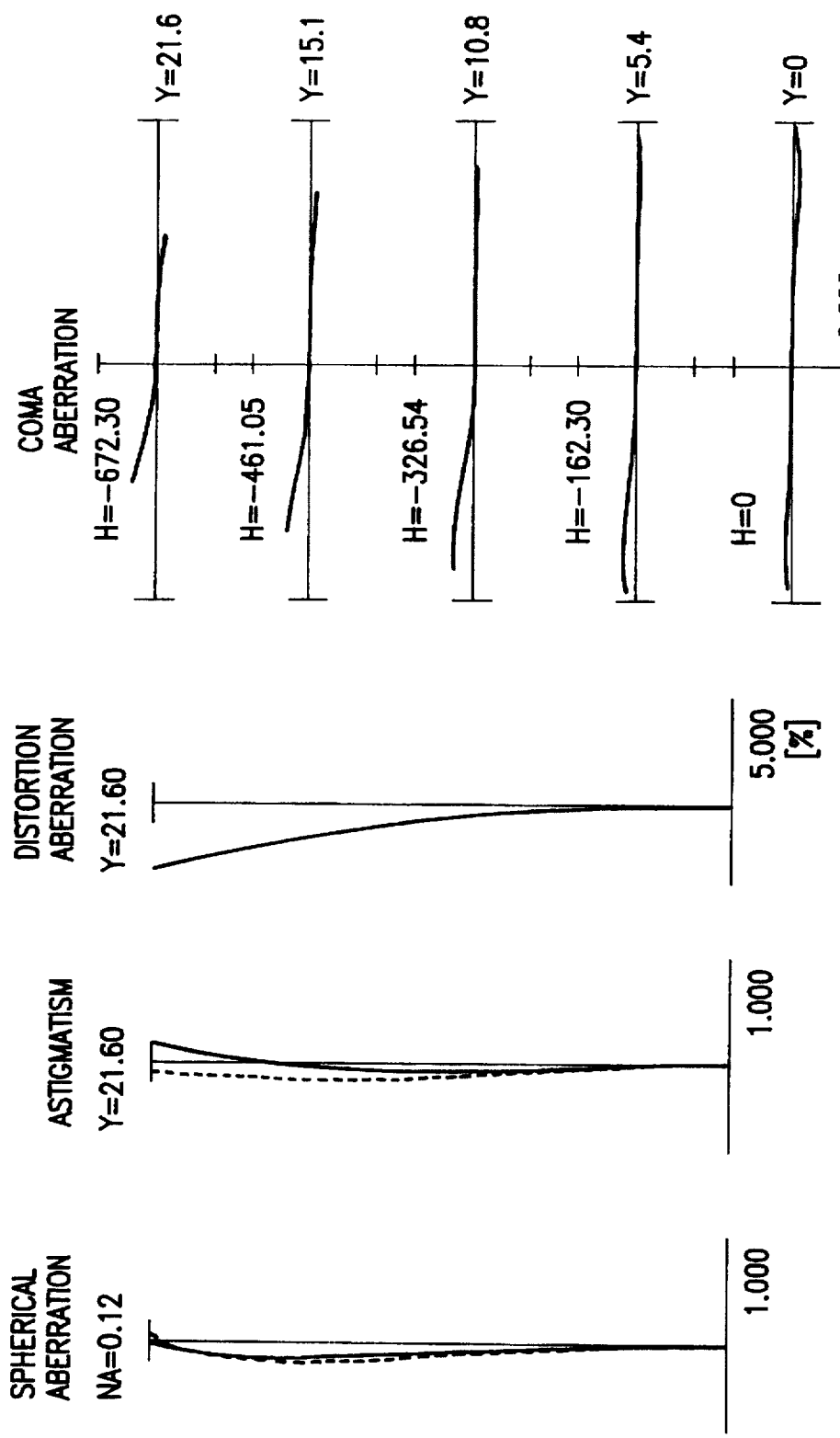

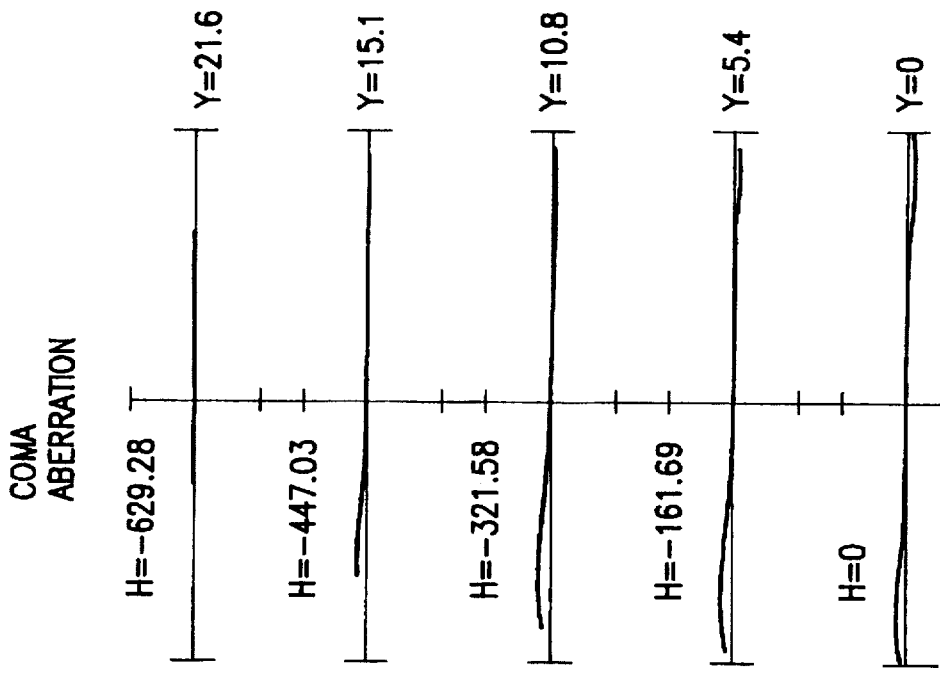
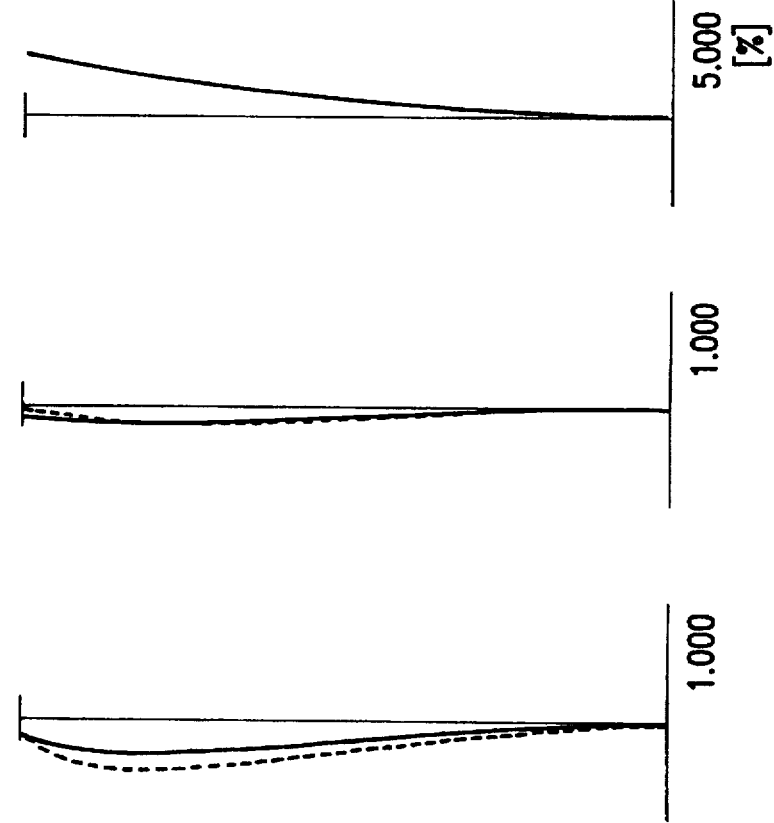

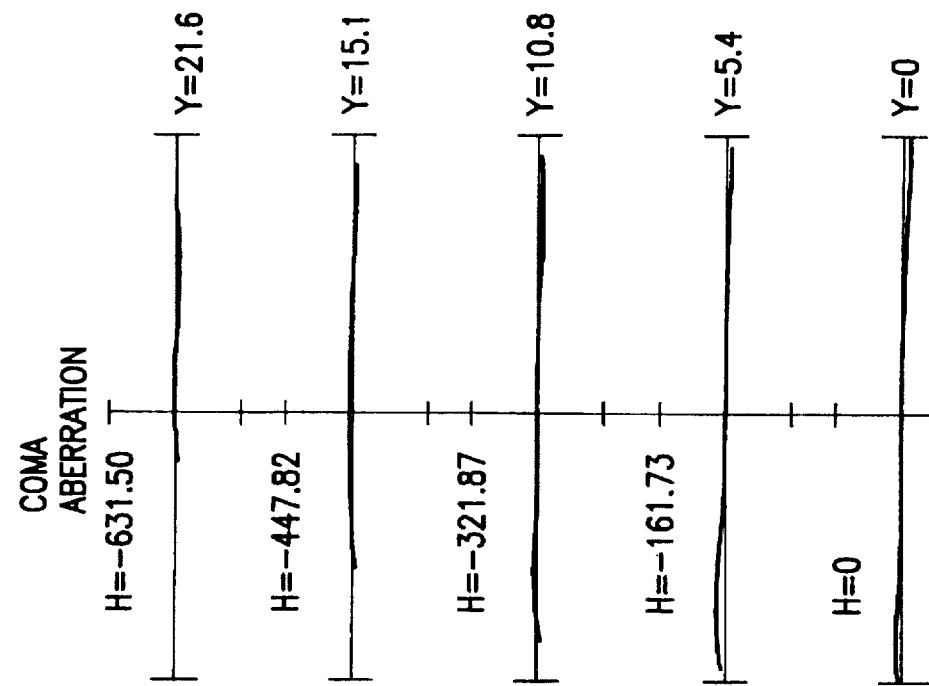
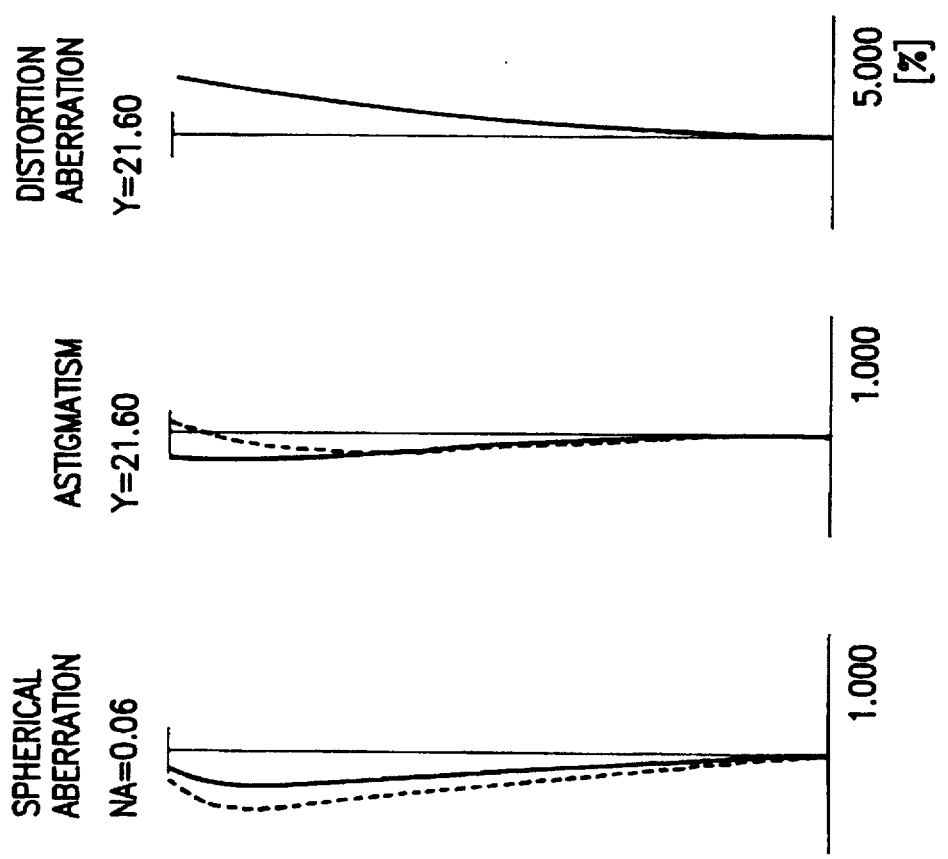

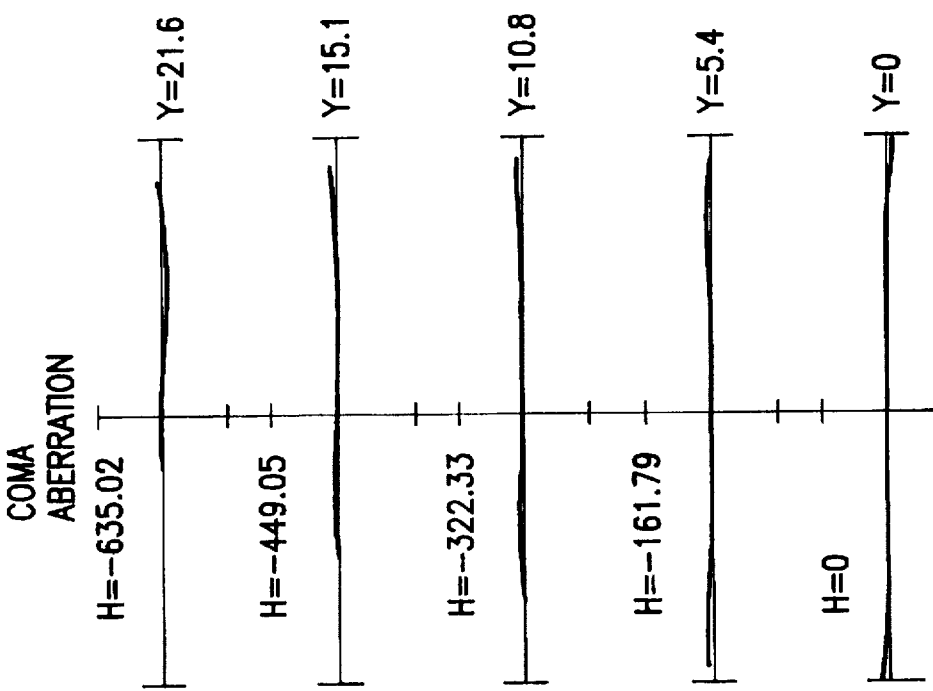
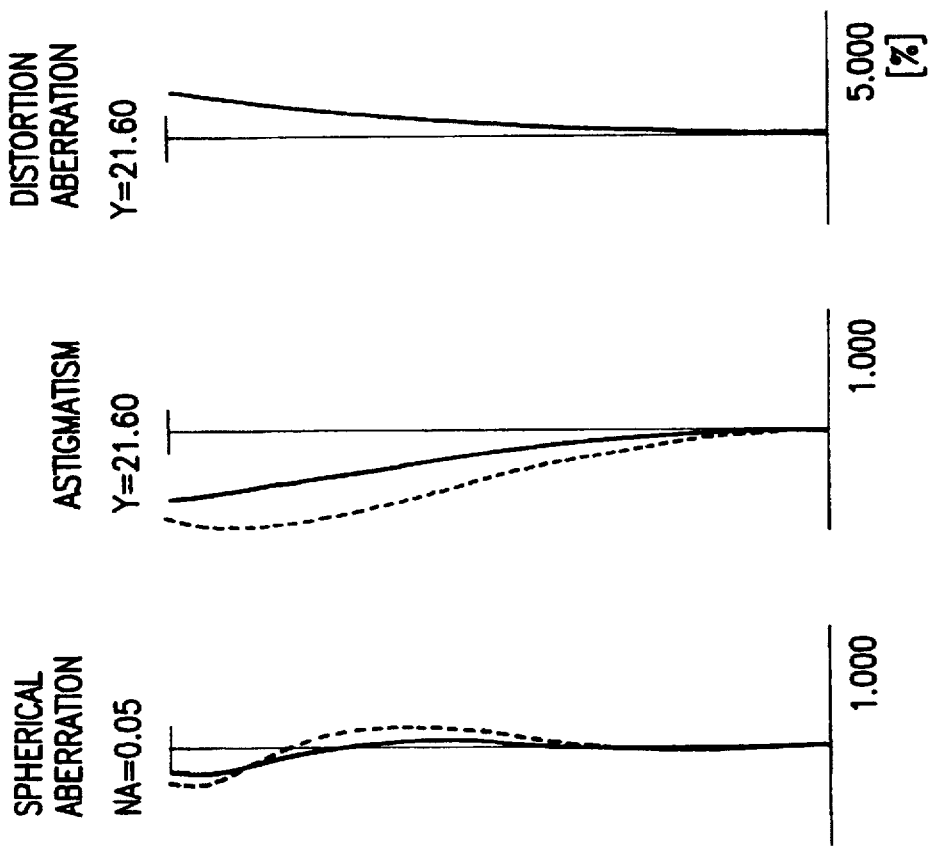
FIG.33d
FIG.33c
FIG.33b
FIG.33a

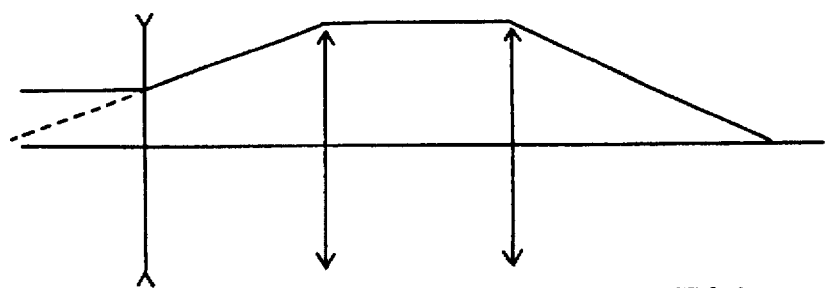
FIG. 38a
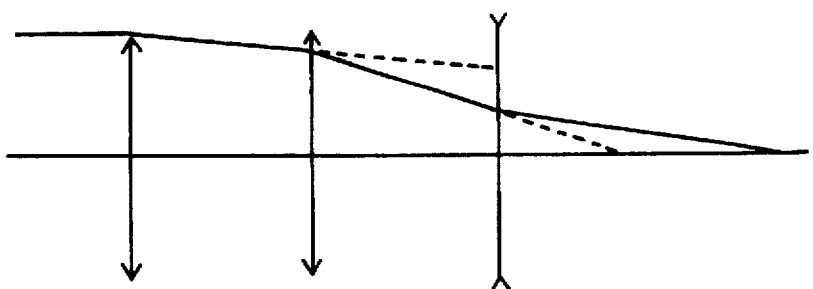
FIG. 38b
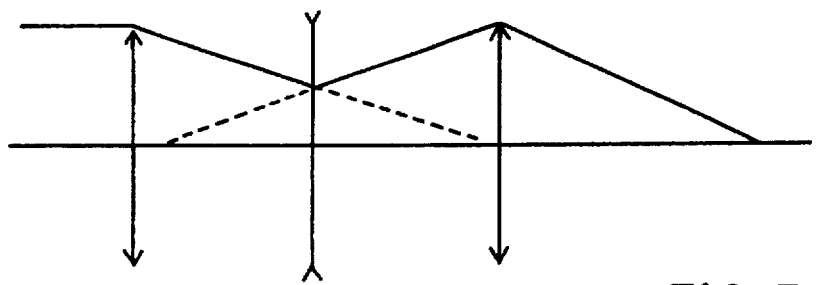
FIG. 38c

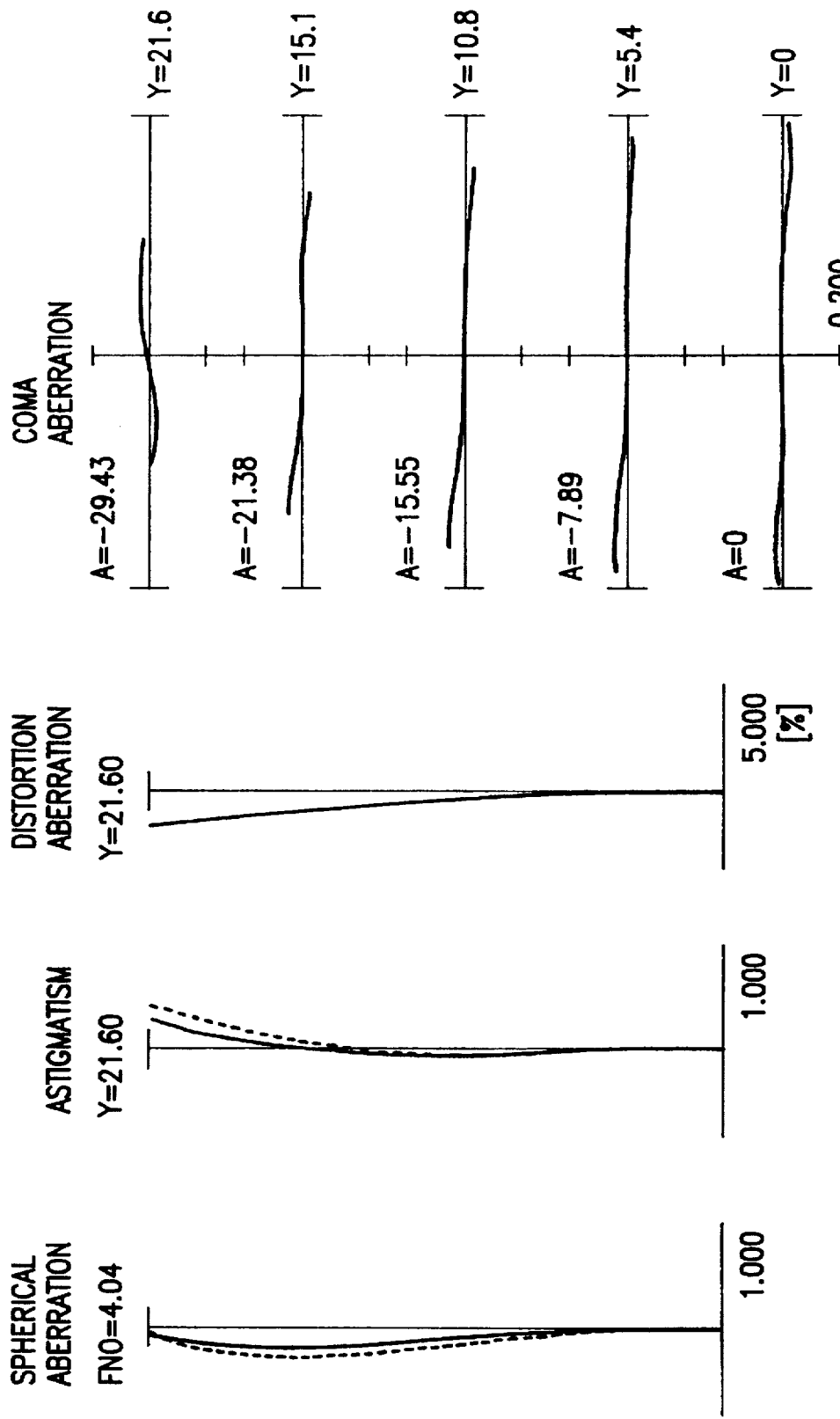

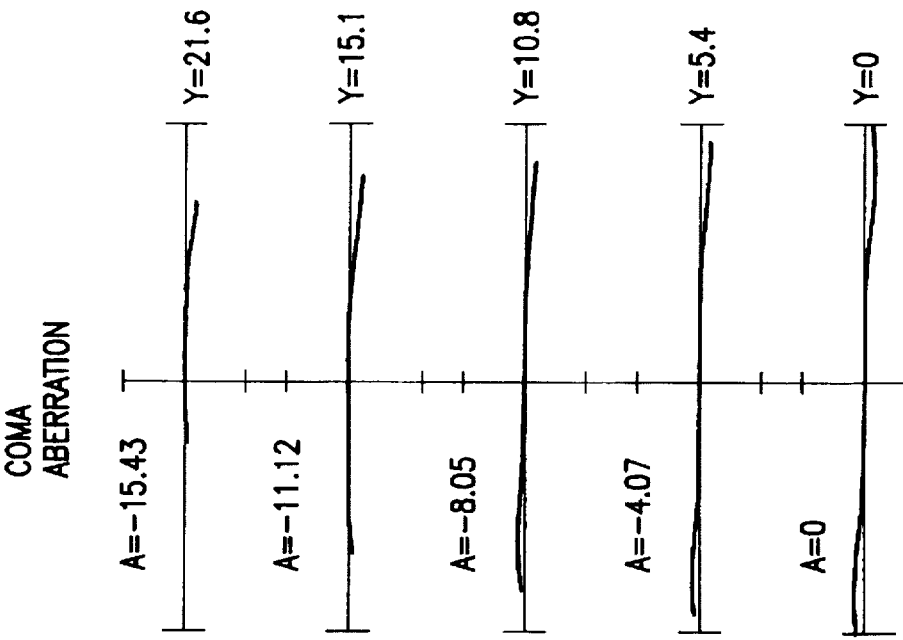
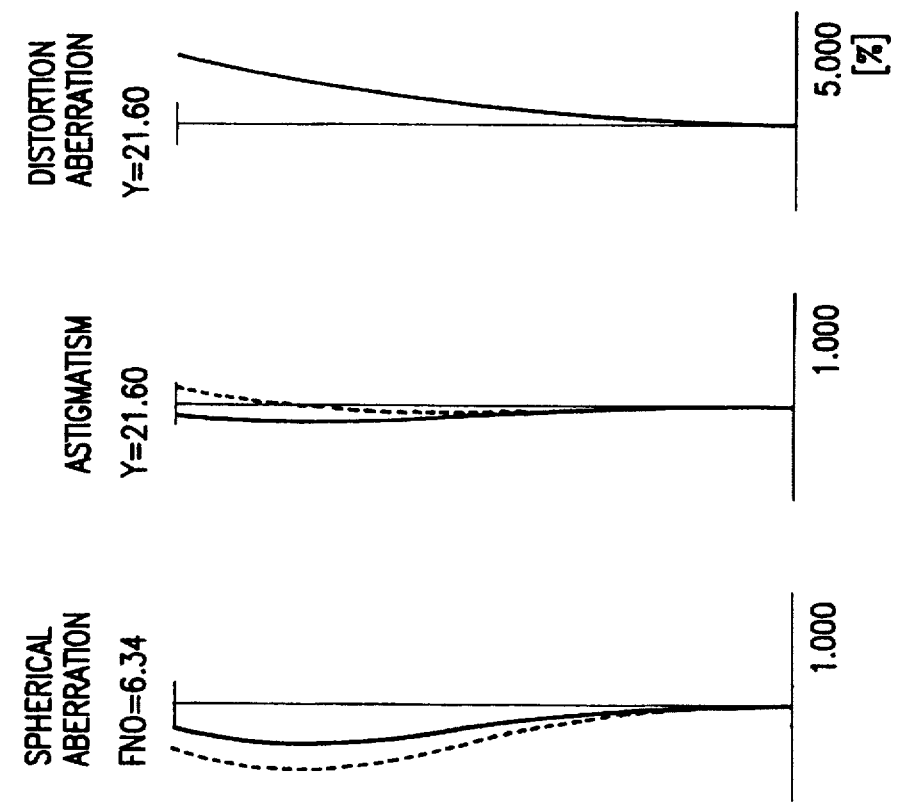

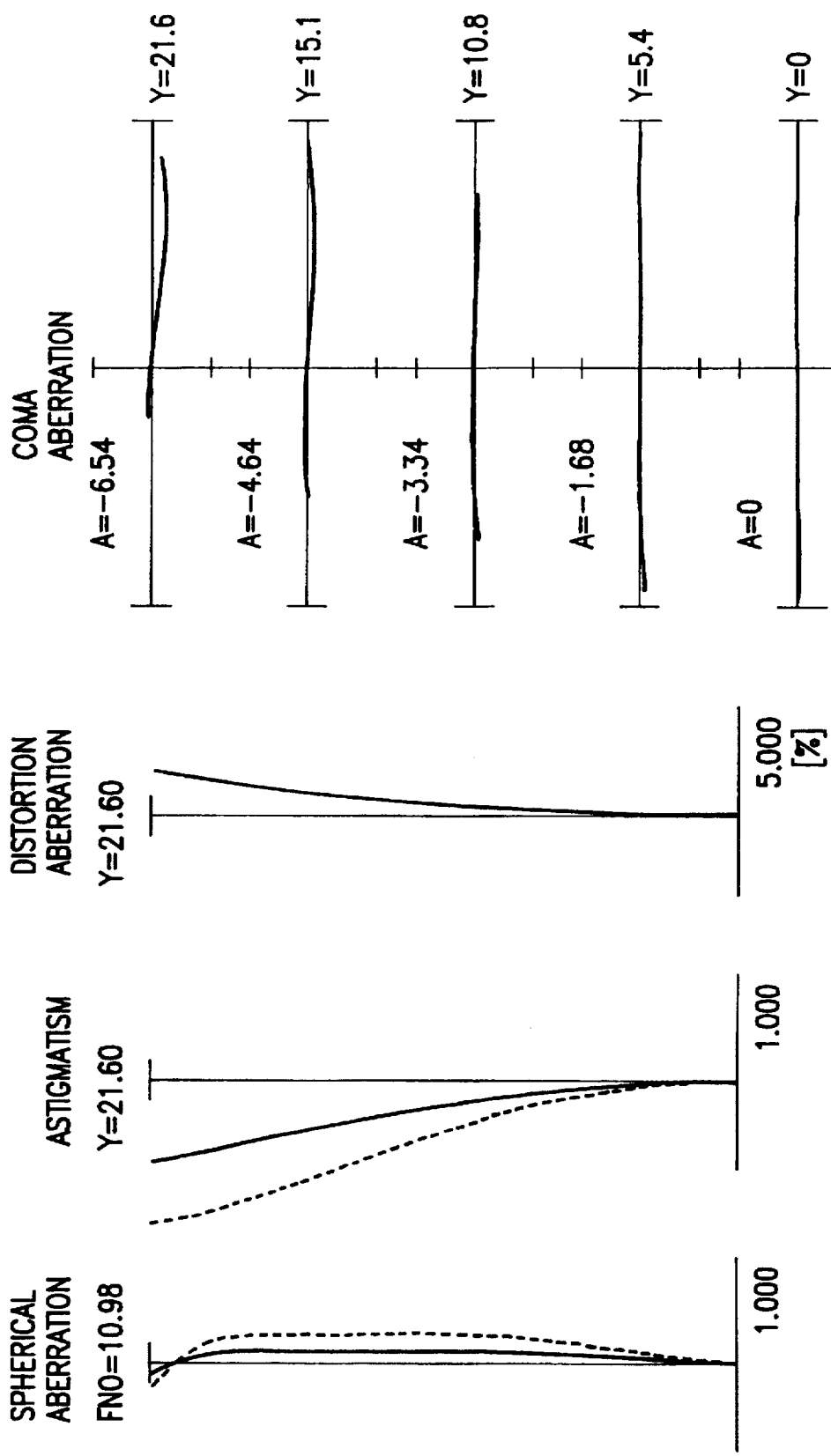

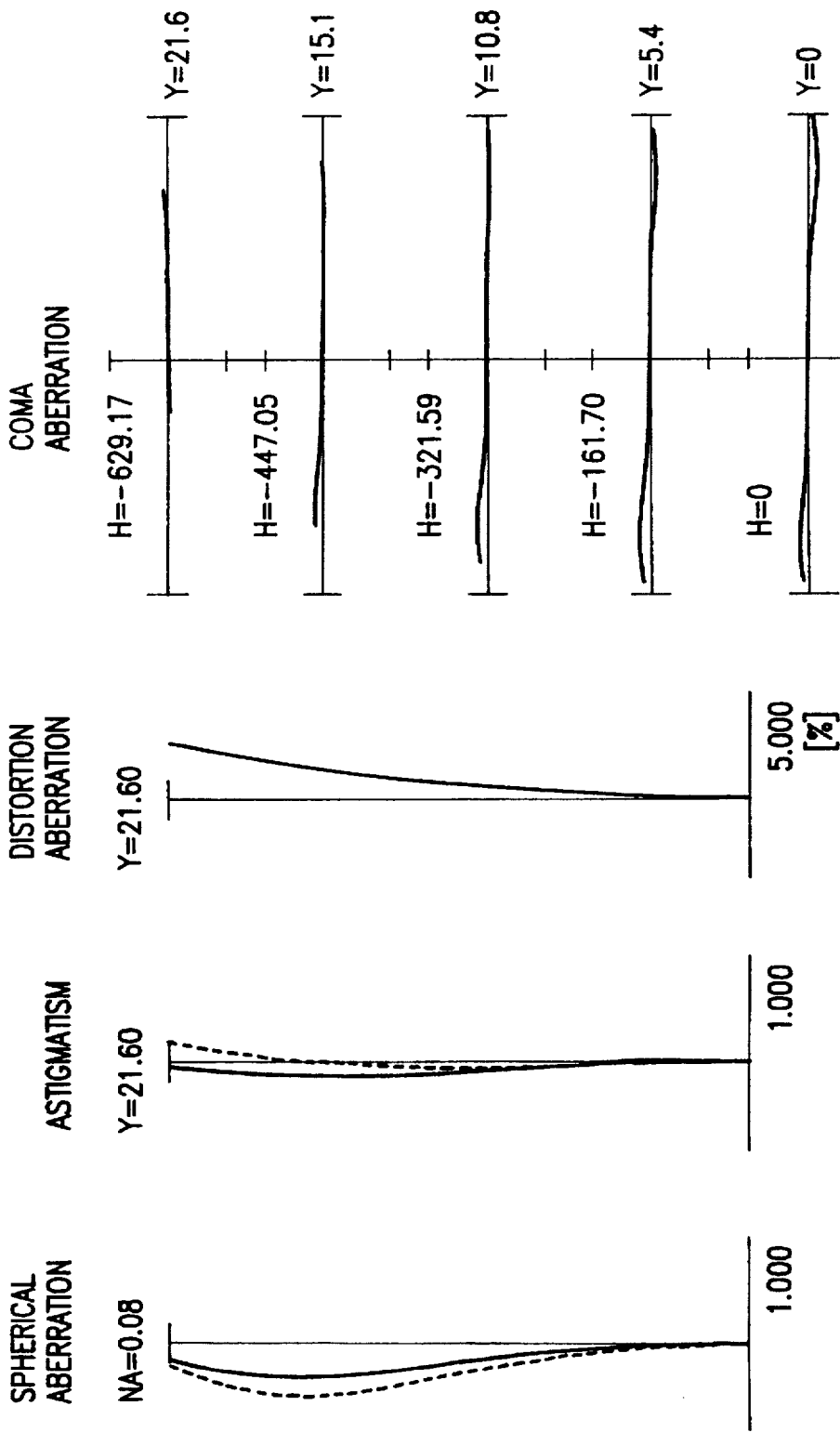

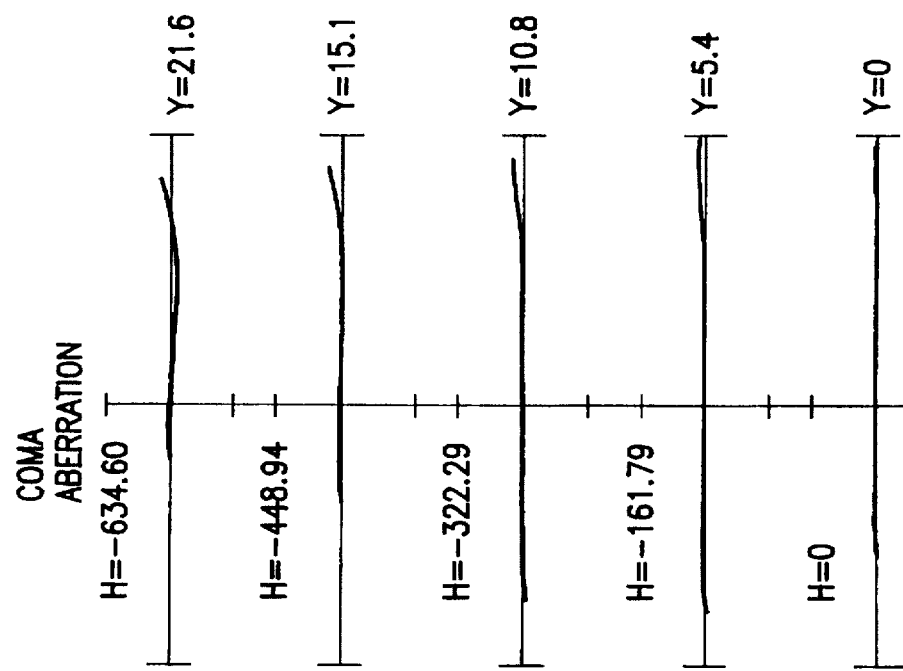
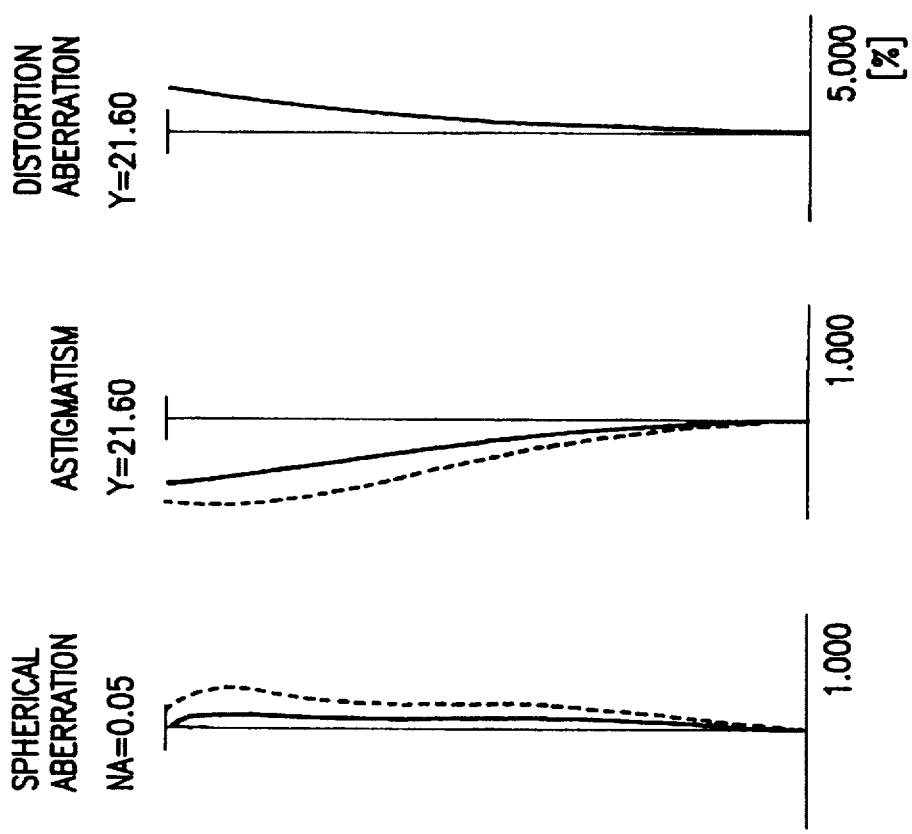
FIG.46a FIG.46b FIG.46c FIG.46d

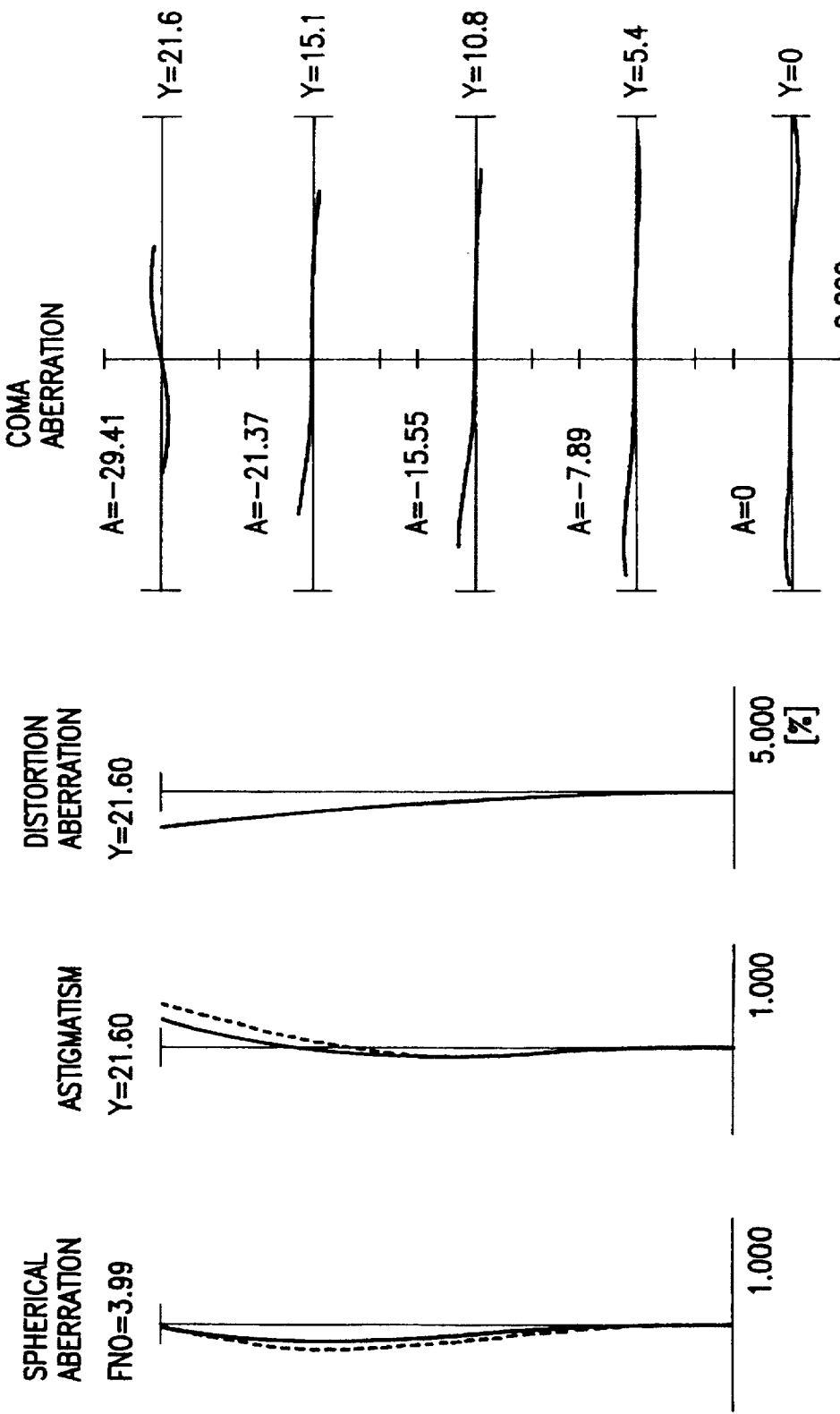

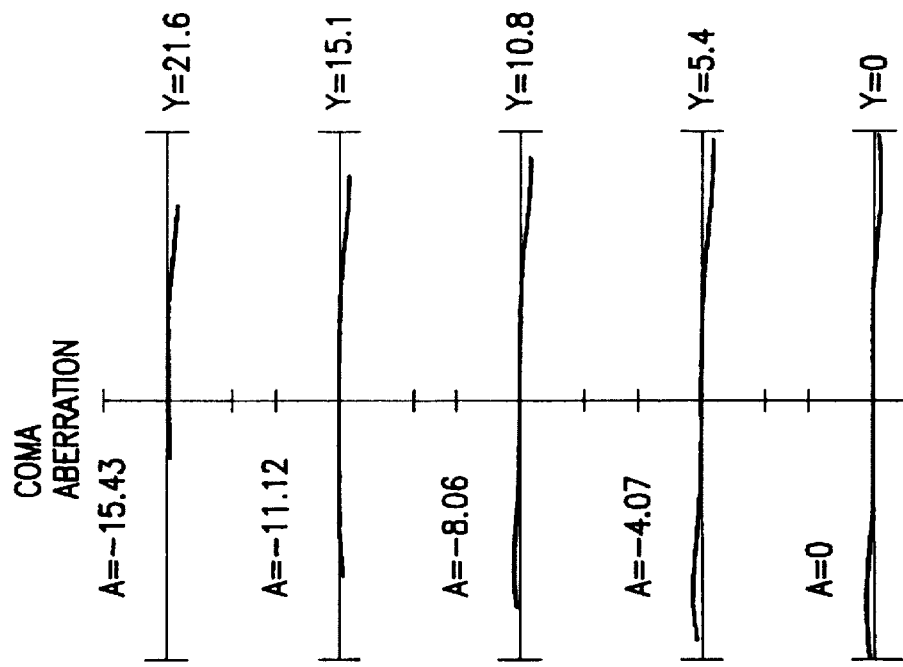
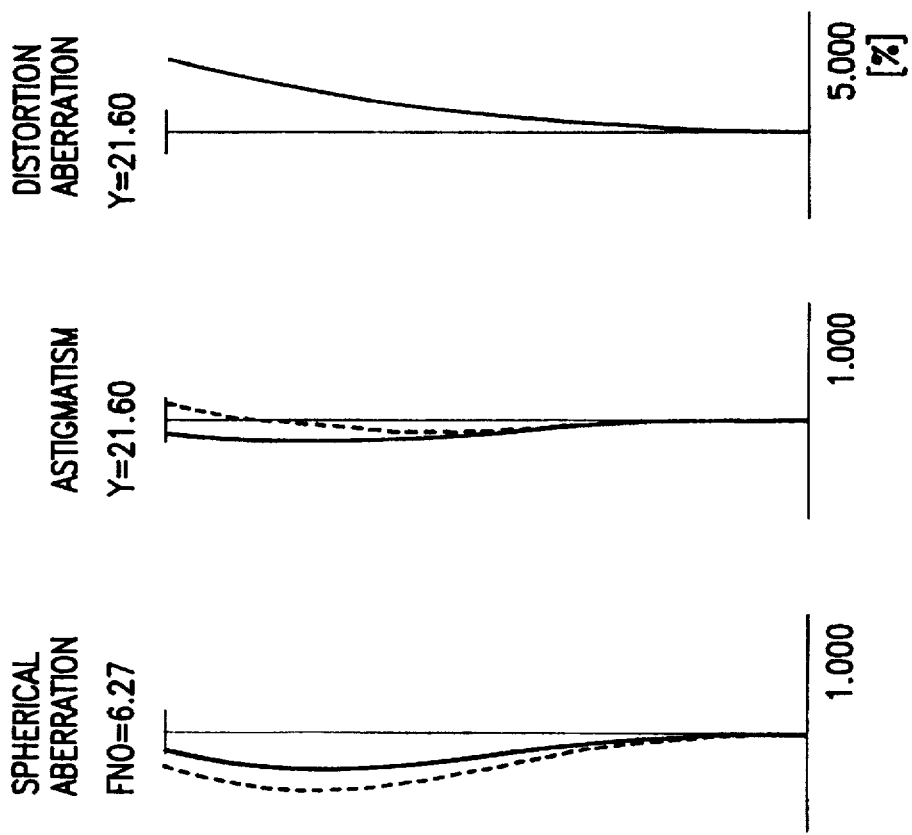

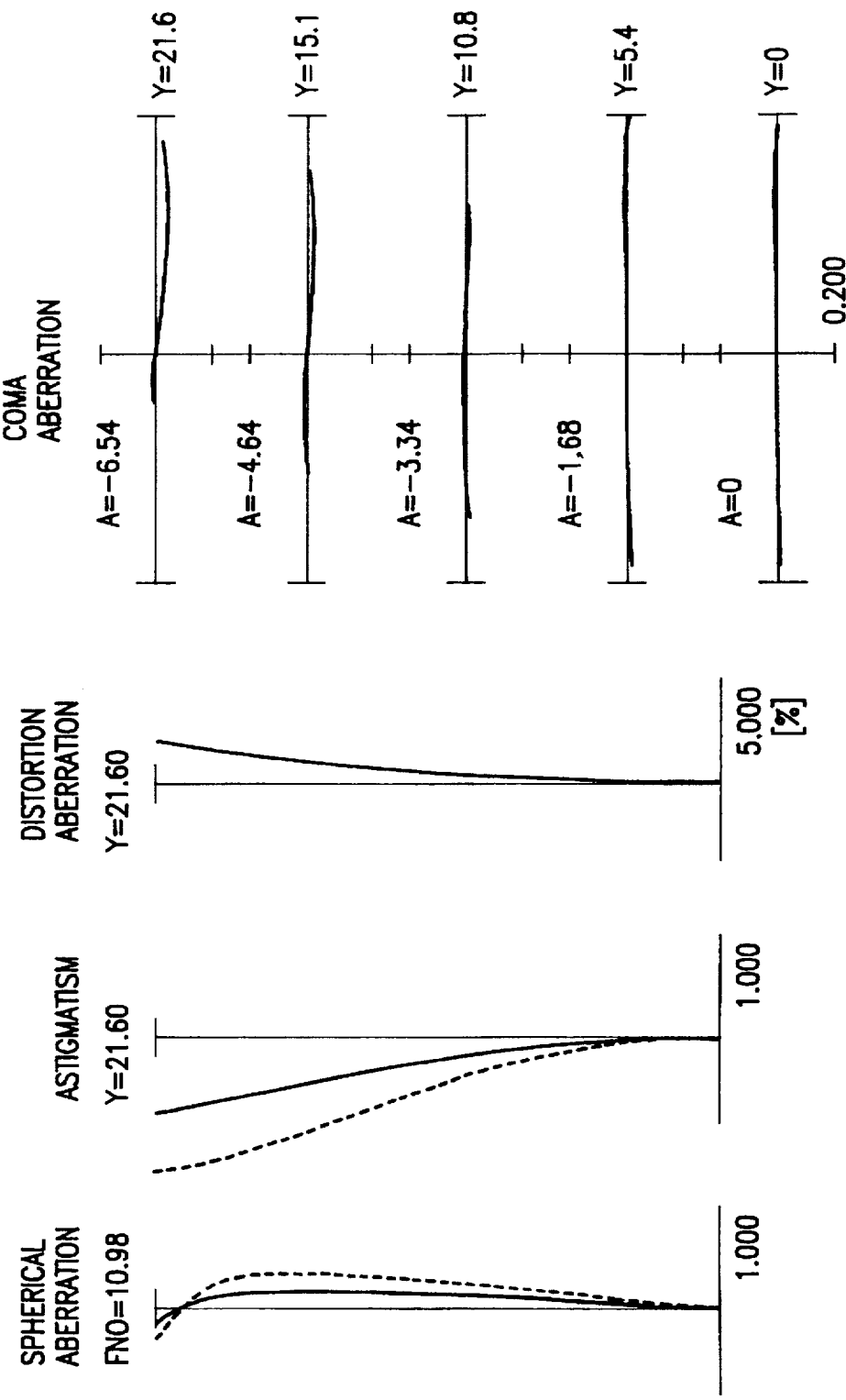

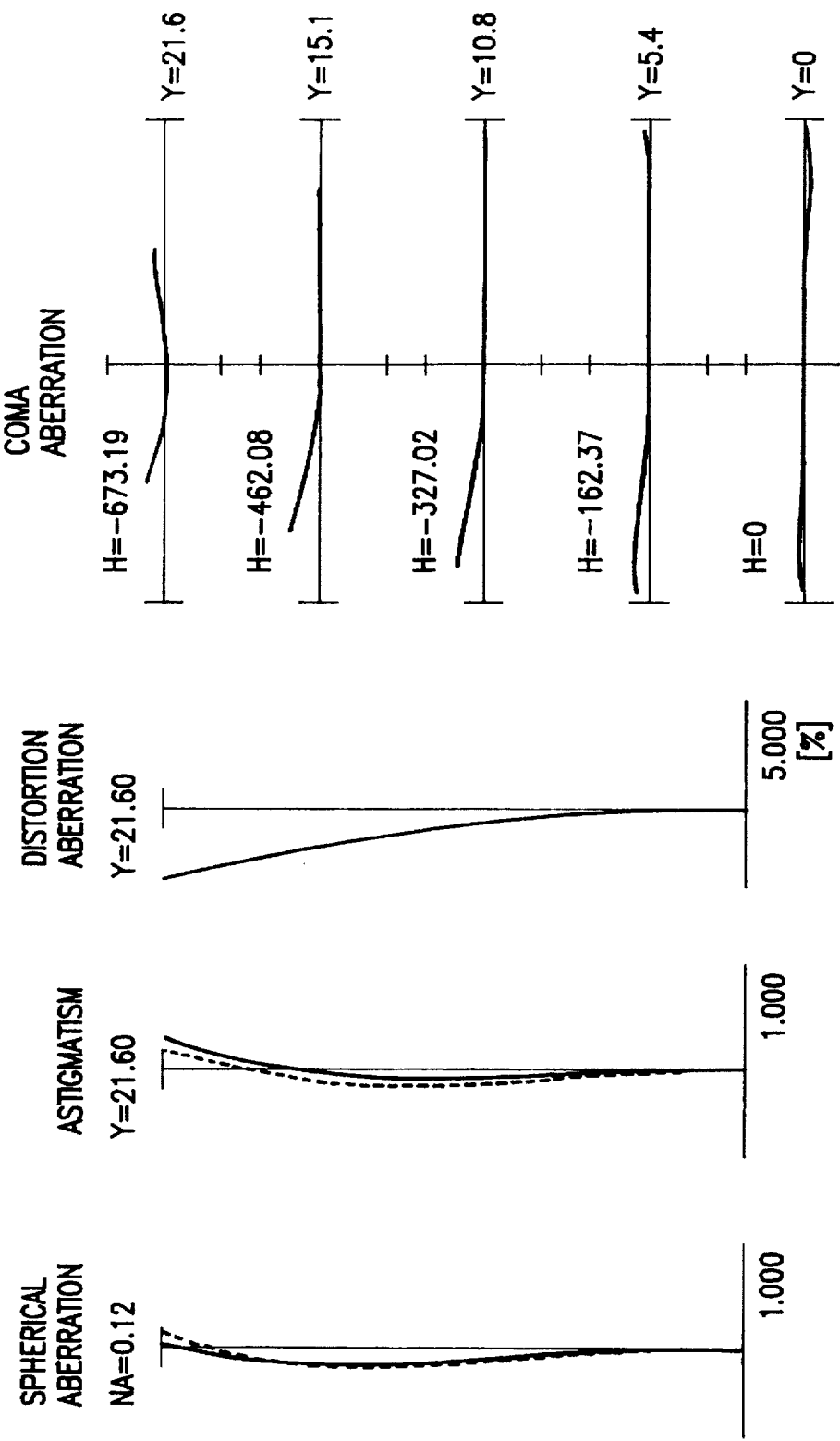

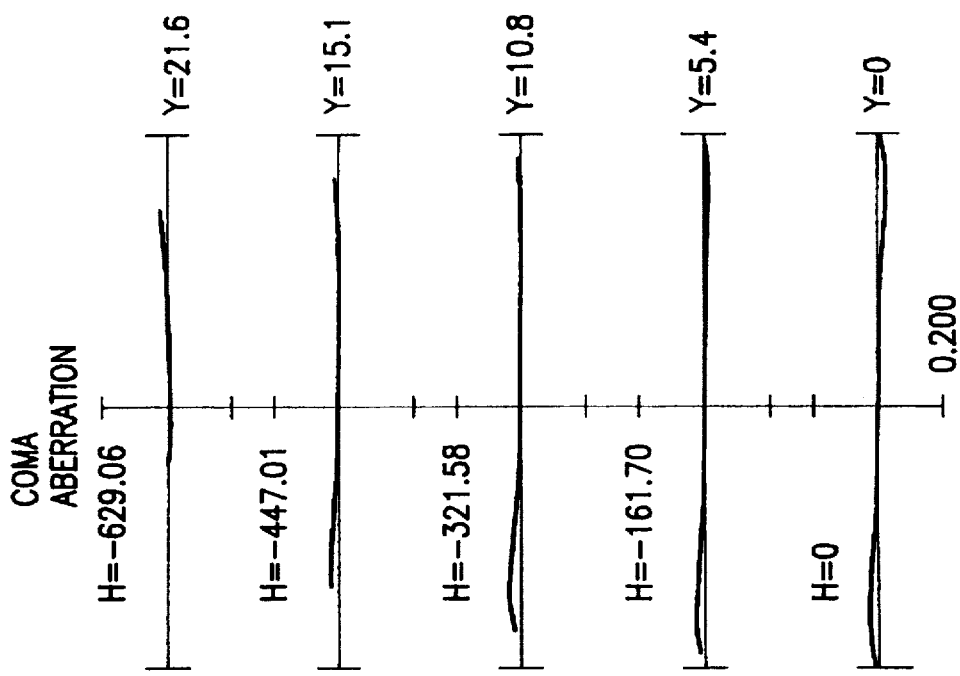
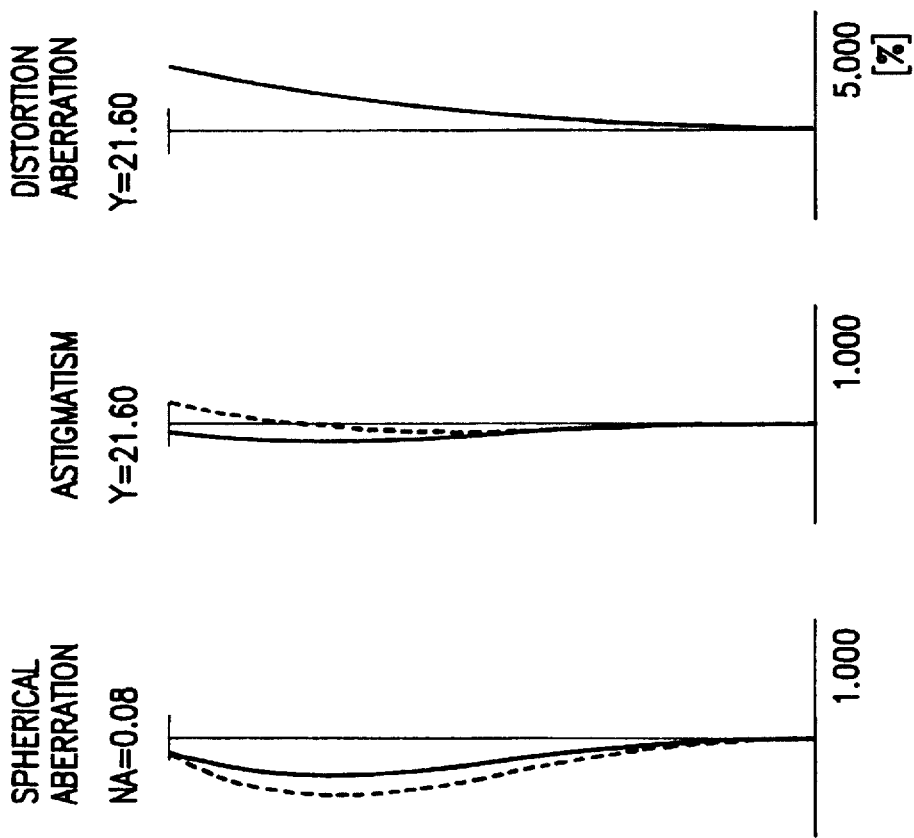
FIG.55d
FIG.55c
FIG.55b
FIG.55a

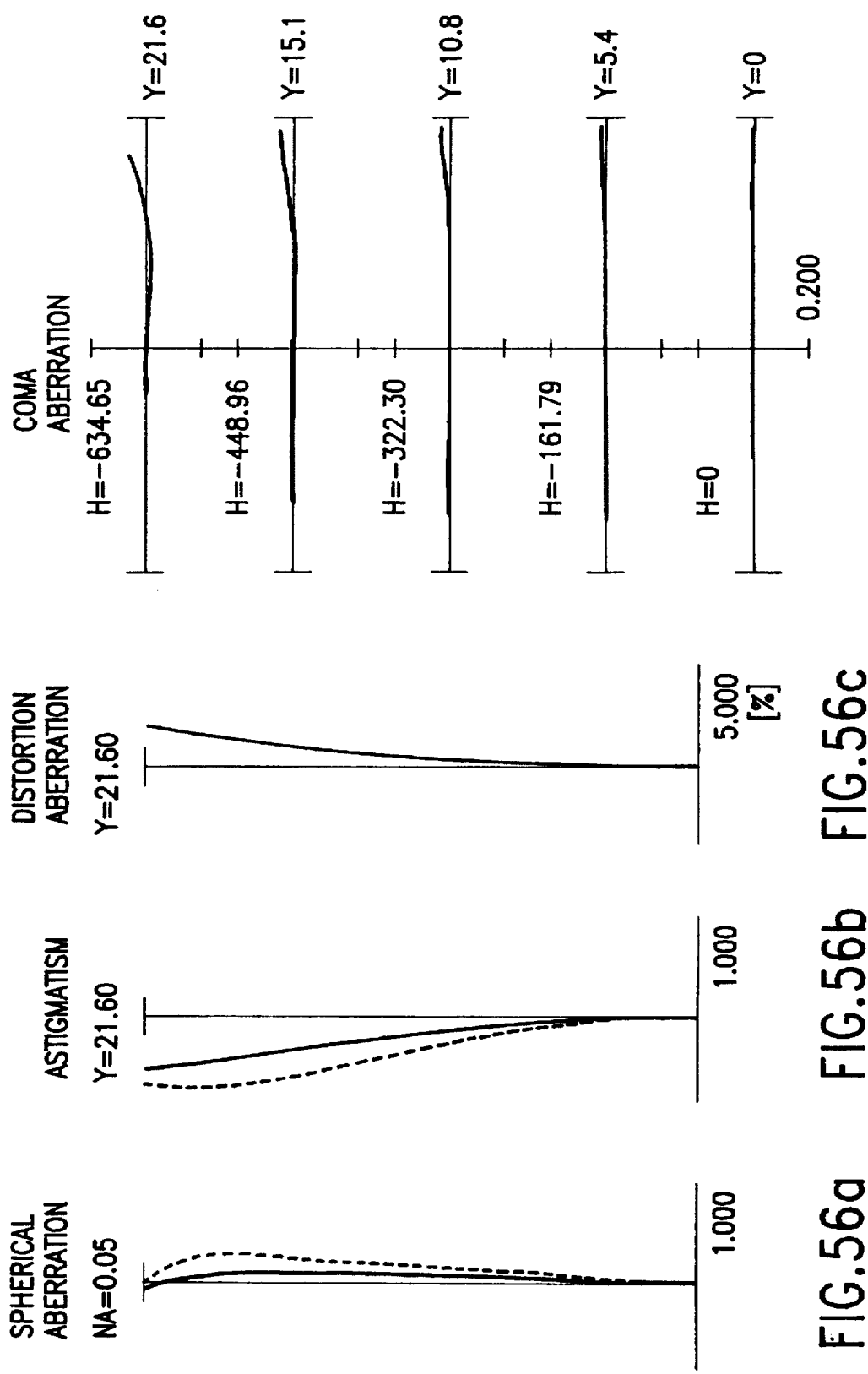

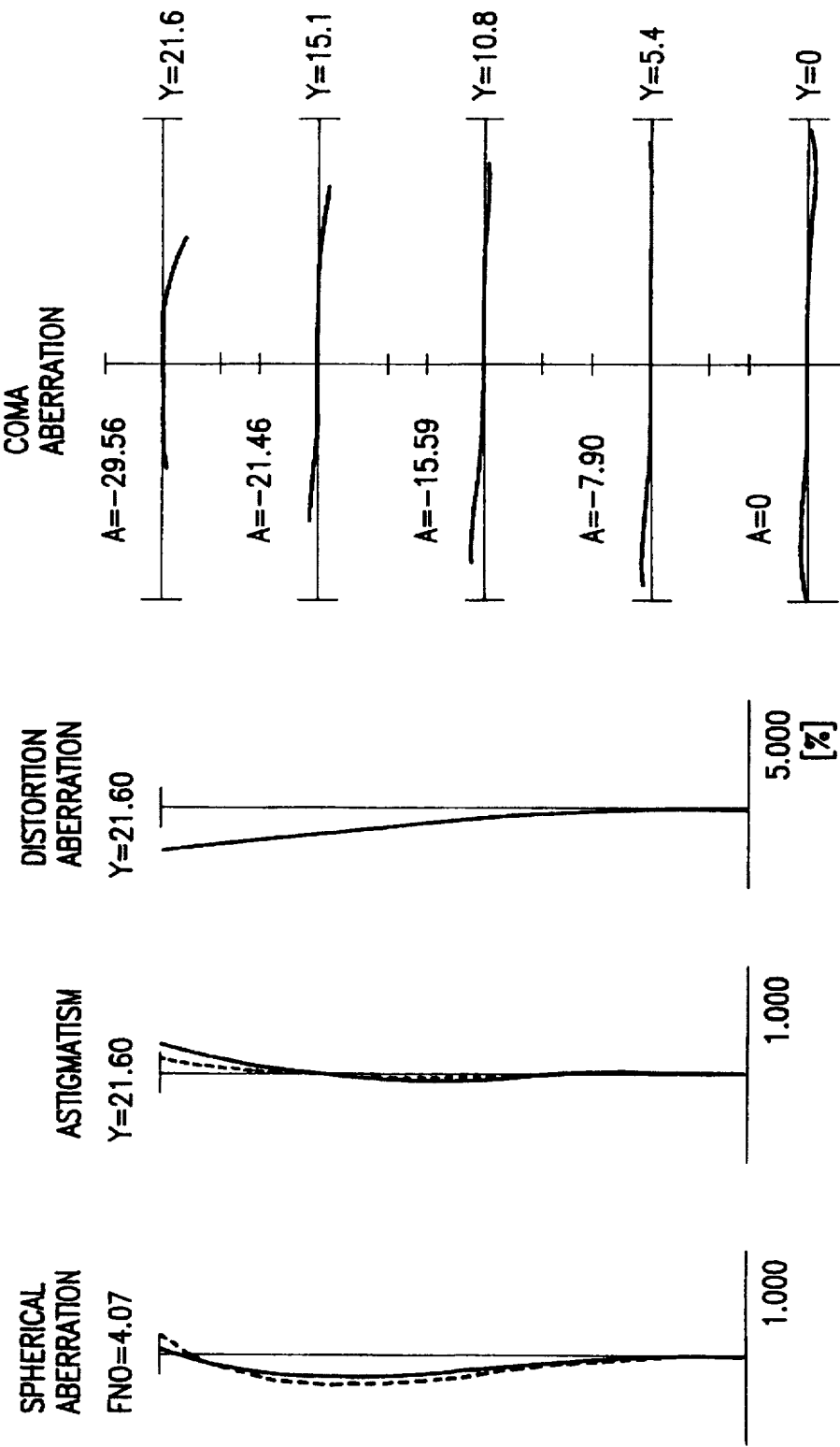

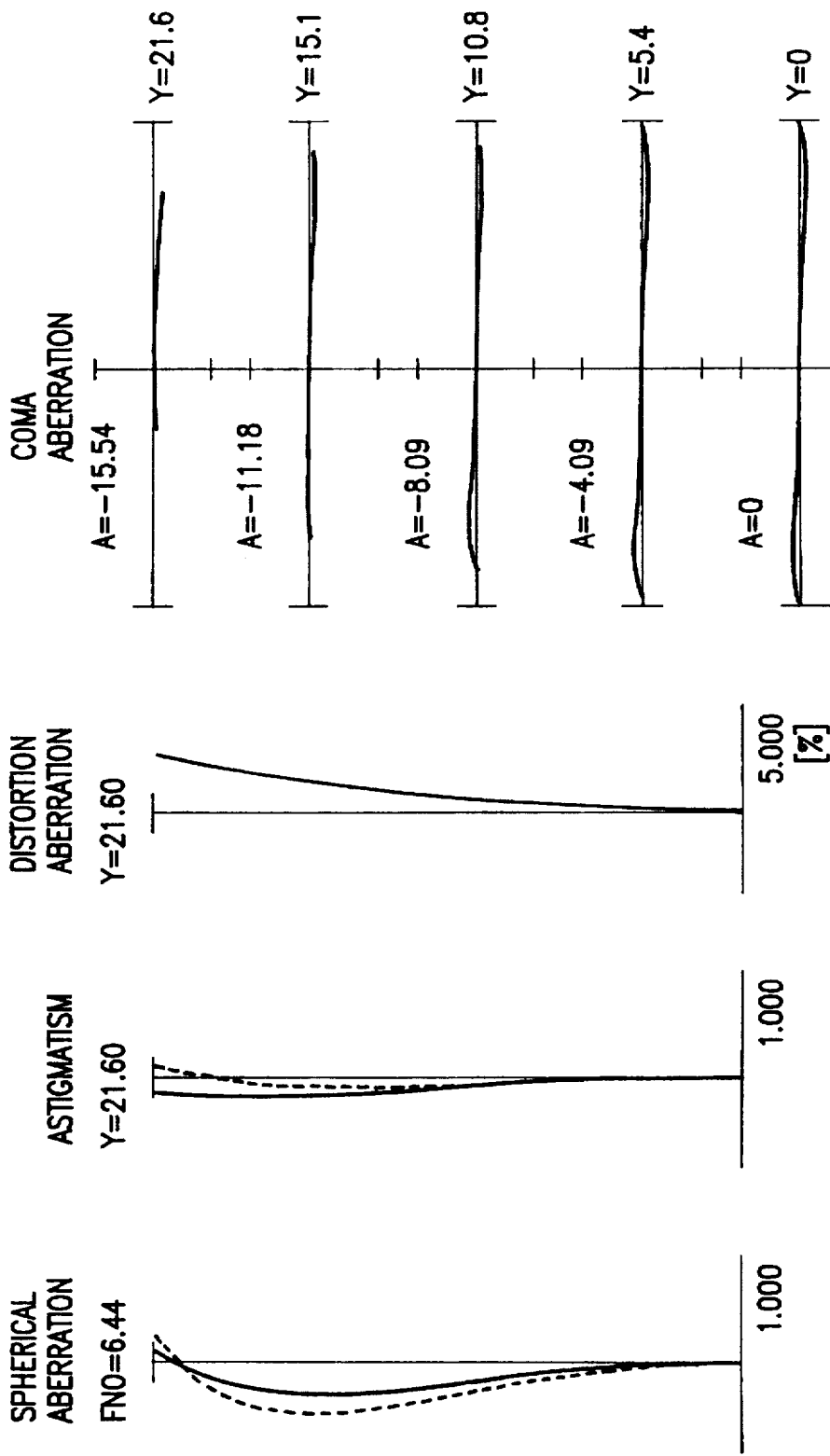

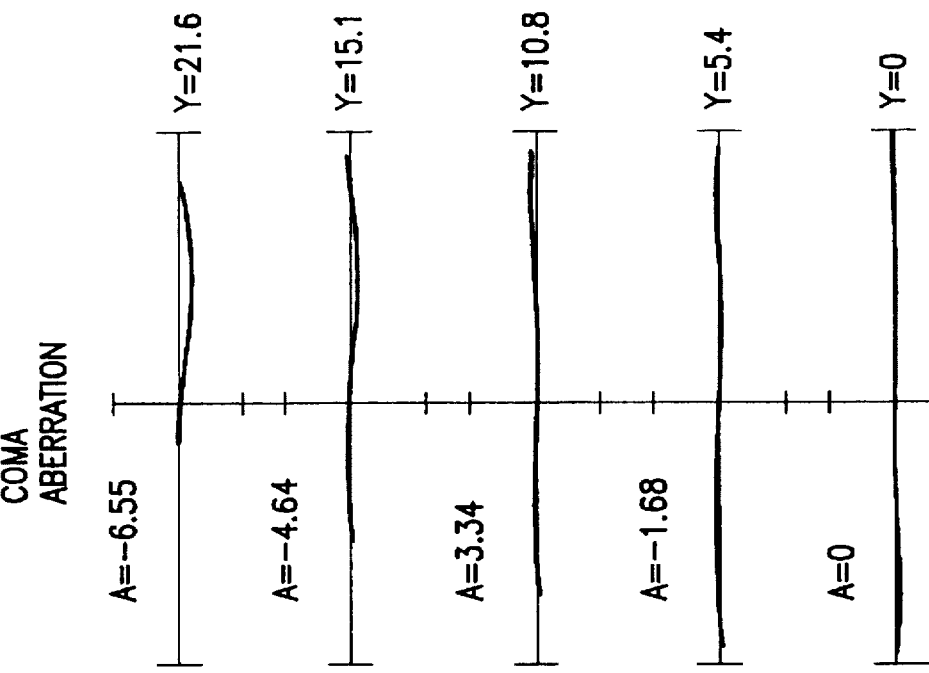
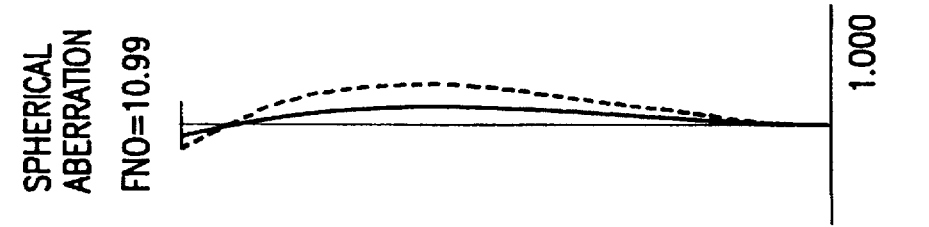
FIG.63a  FIG.63b  FIG.63c  FIG.63d

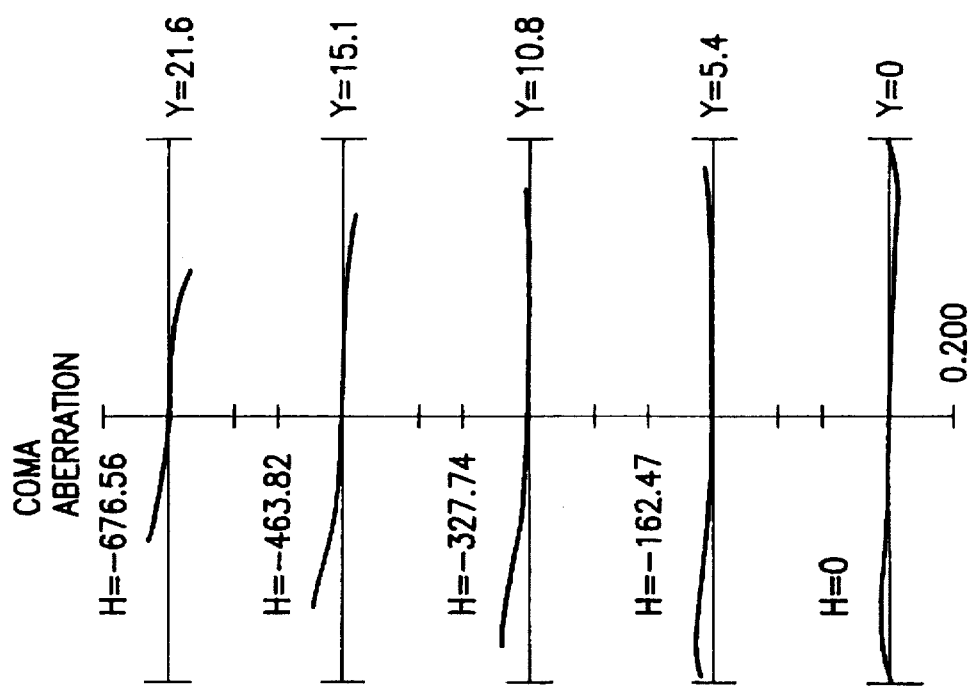
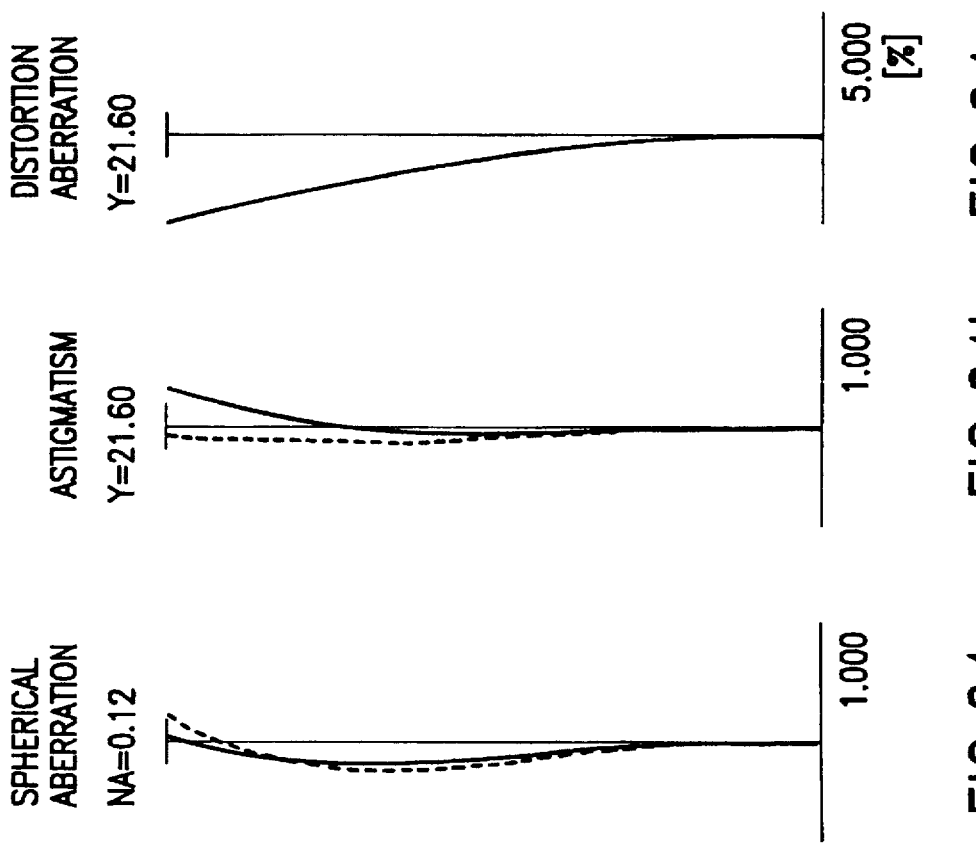

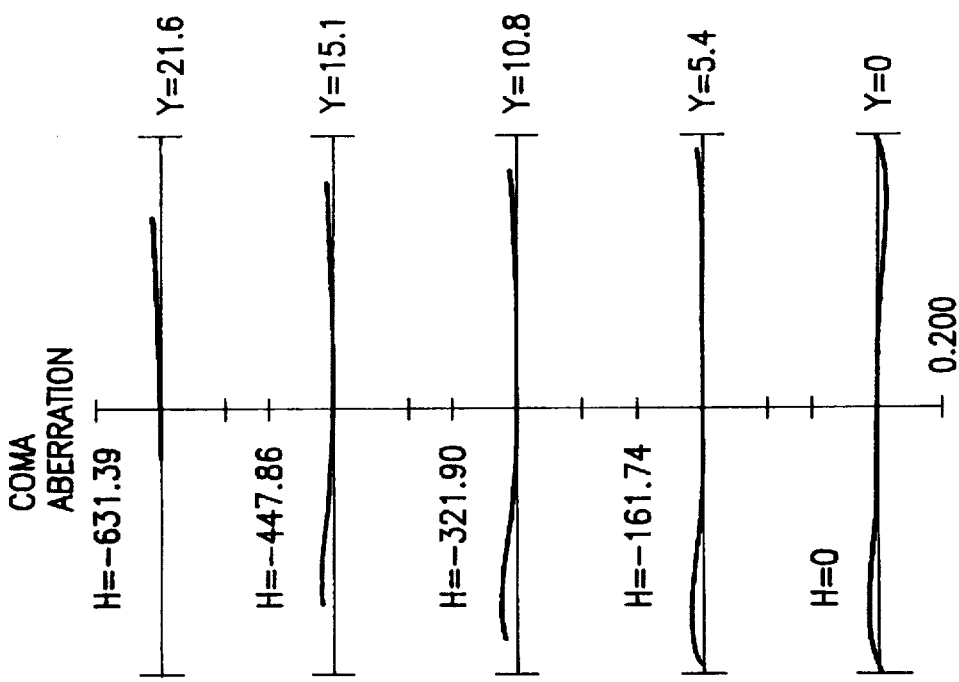
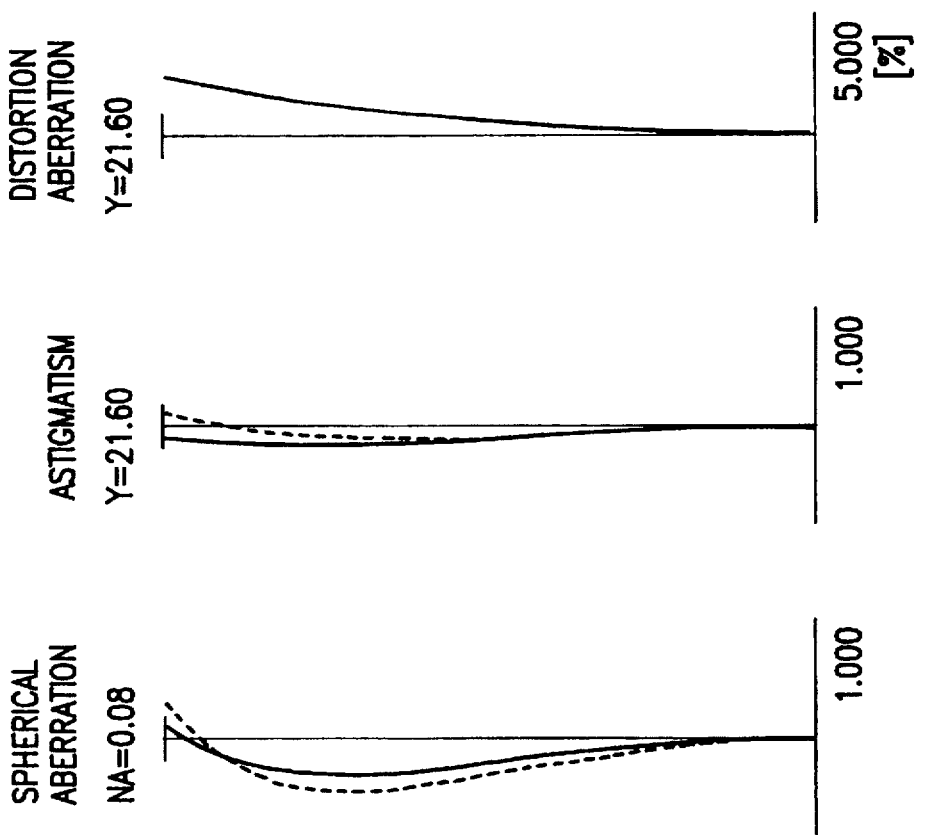

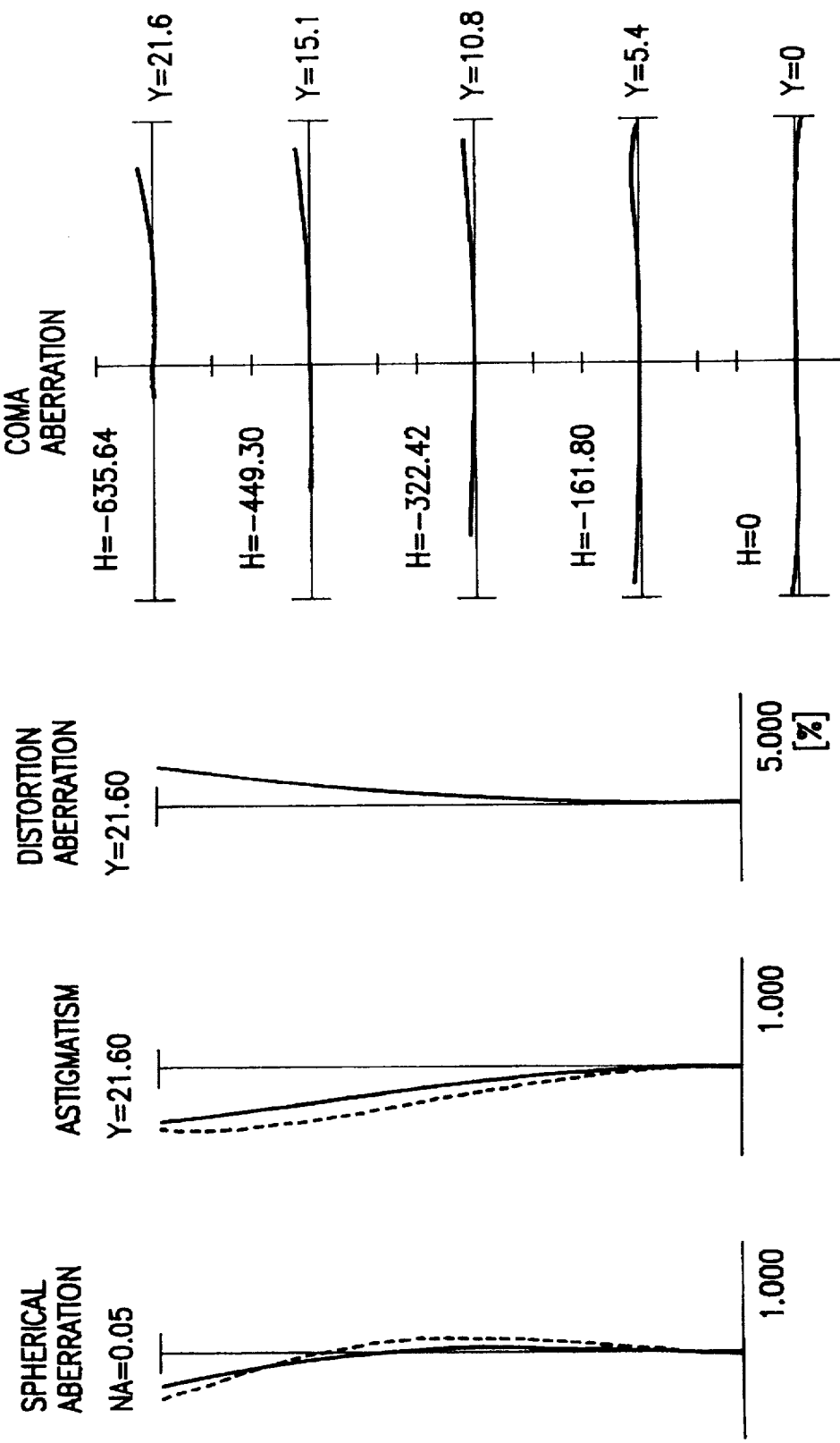

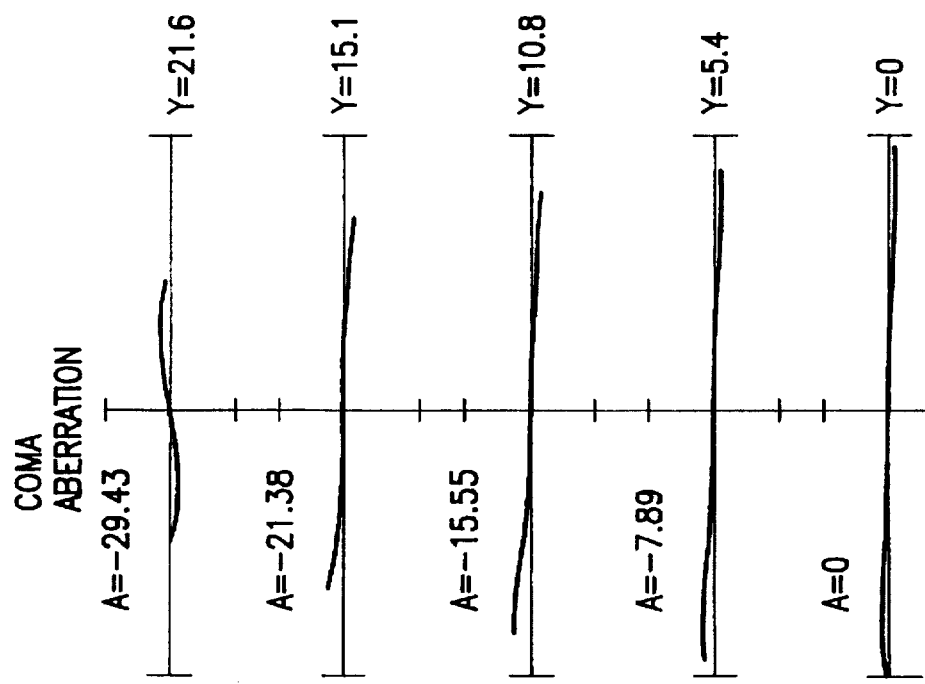
FIG.71d
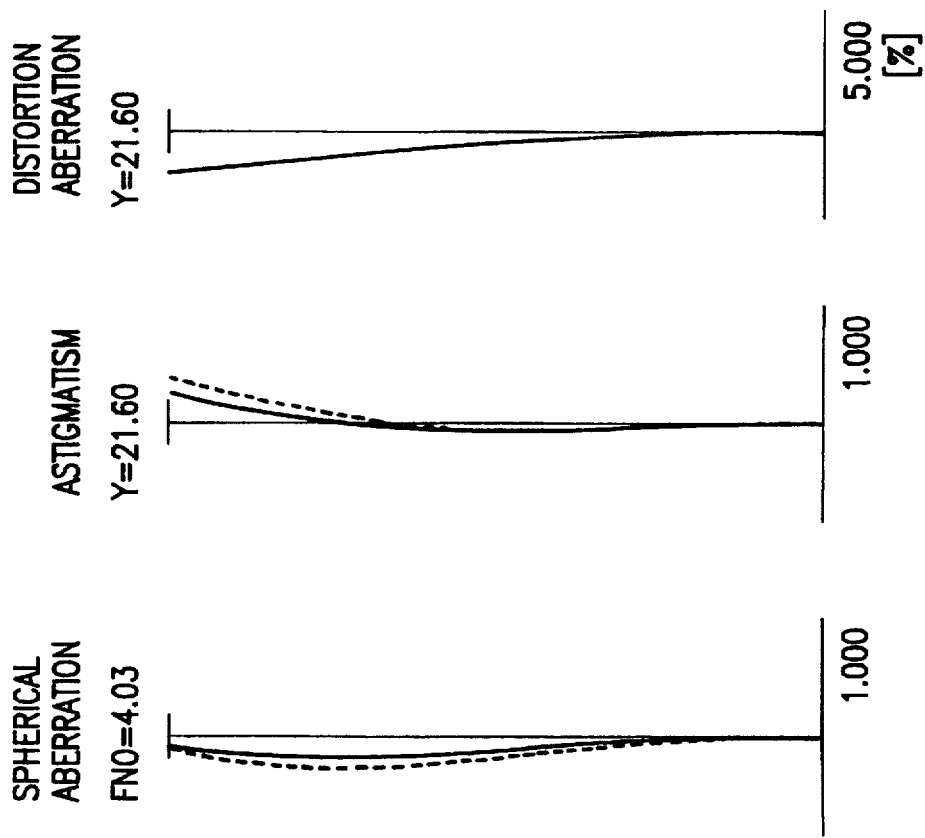
FIG.71c
FIG.71b
FIG.71a

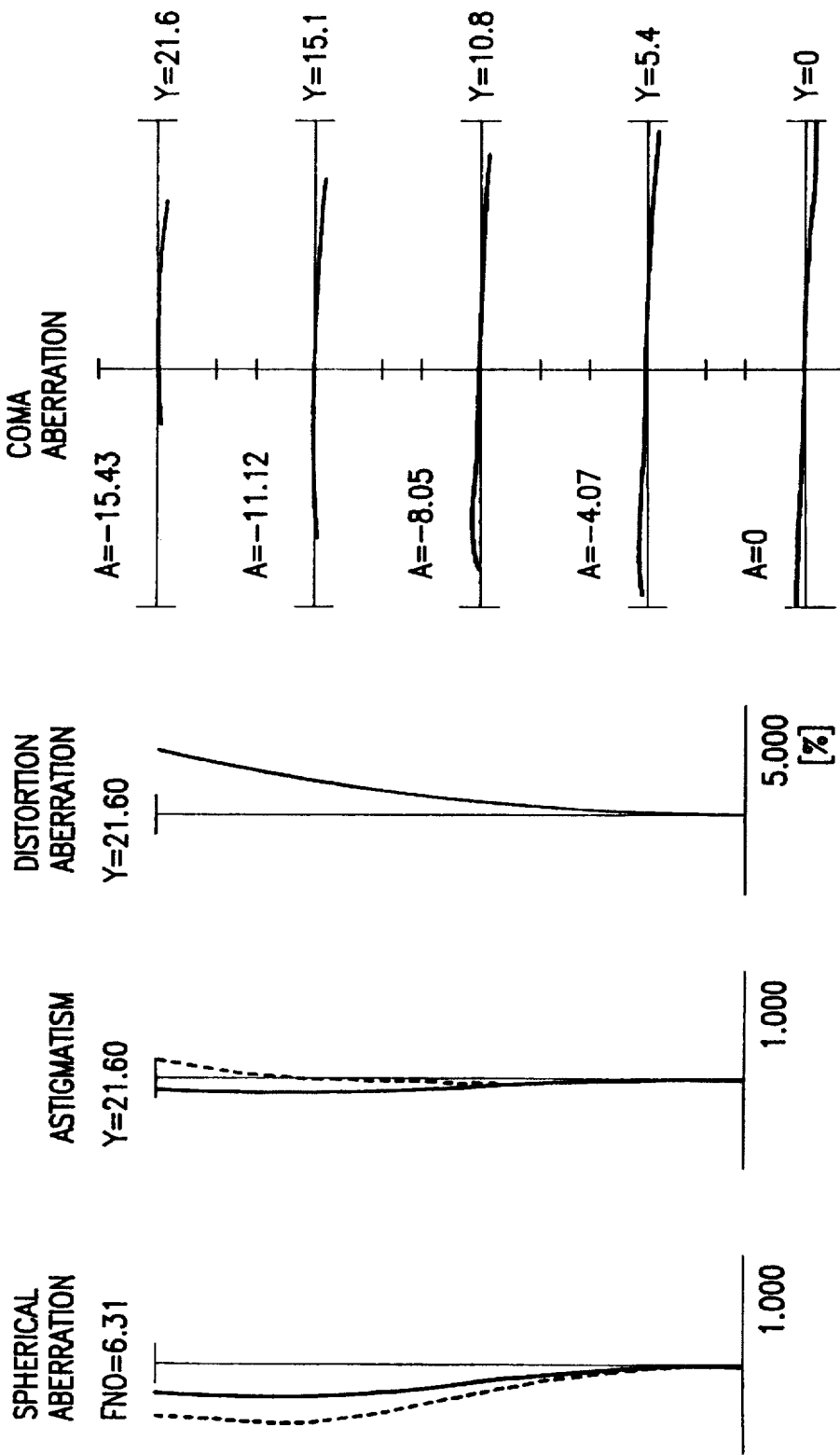

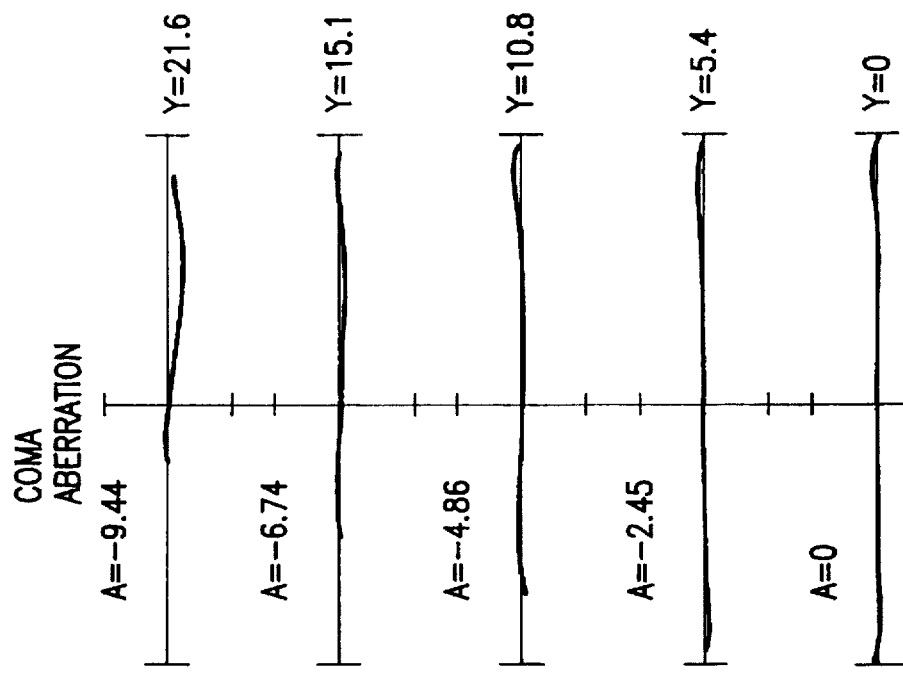
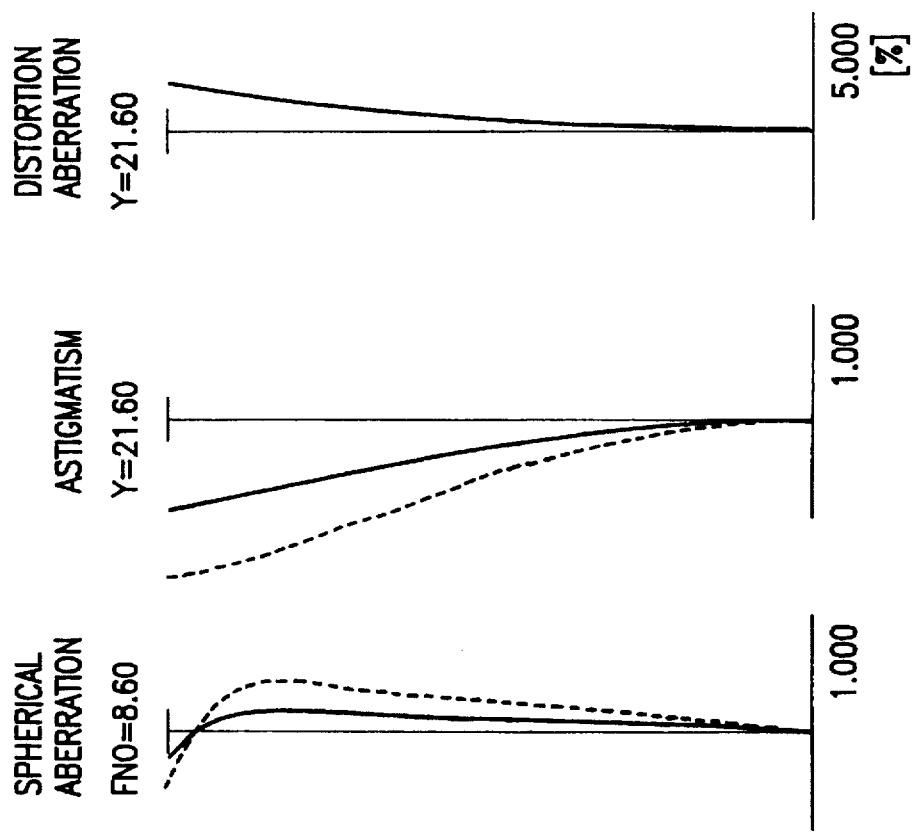
FIG.73a FIG.73b FIG.73c FIG.73d

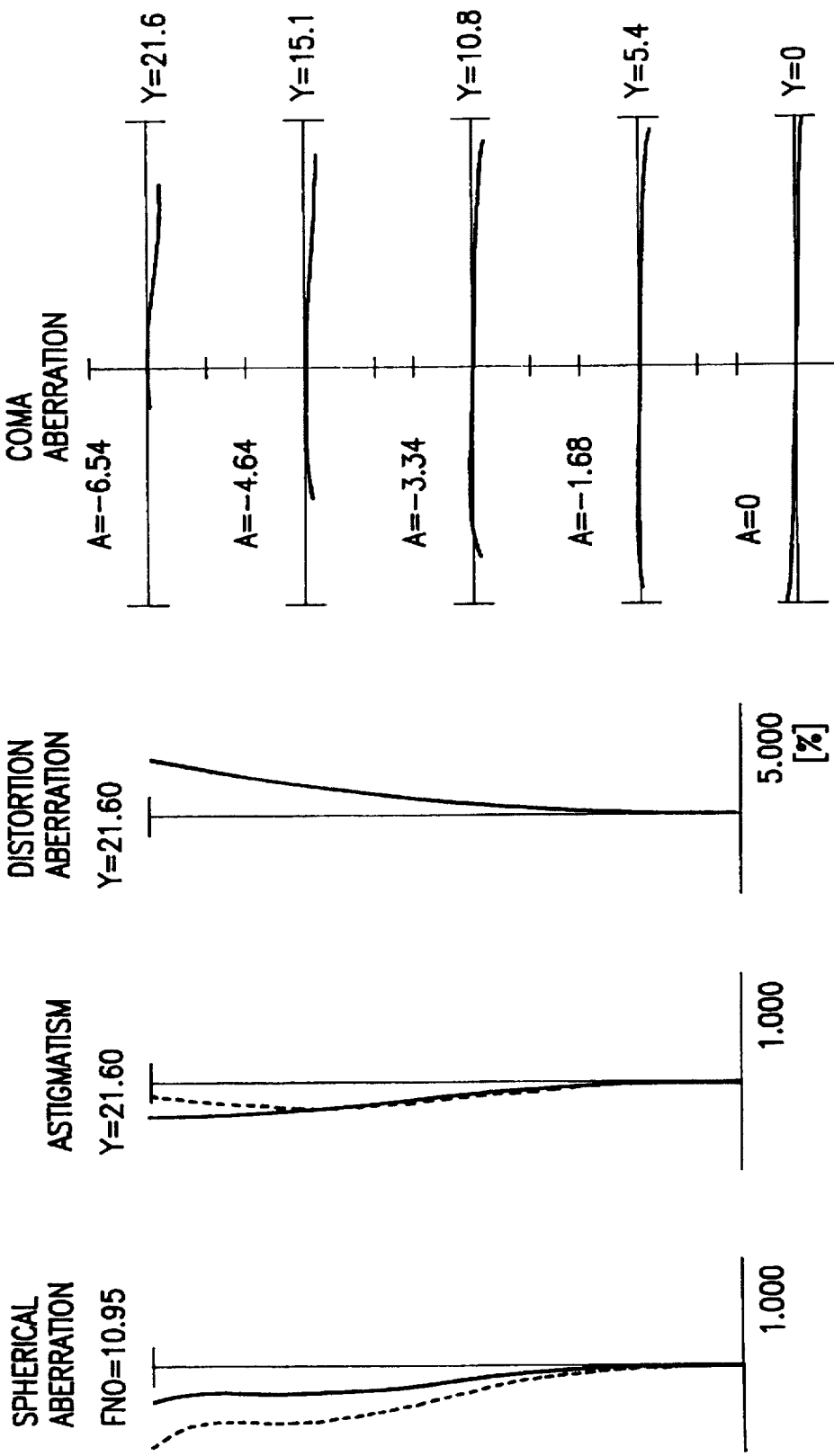

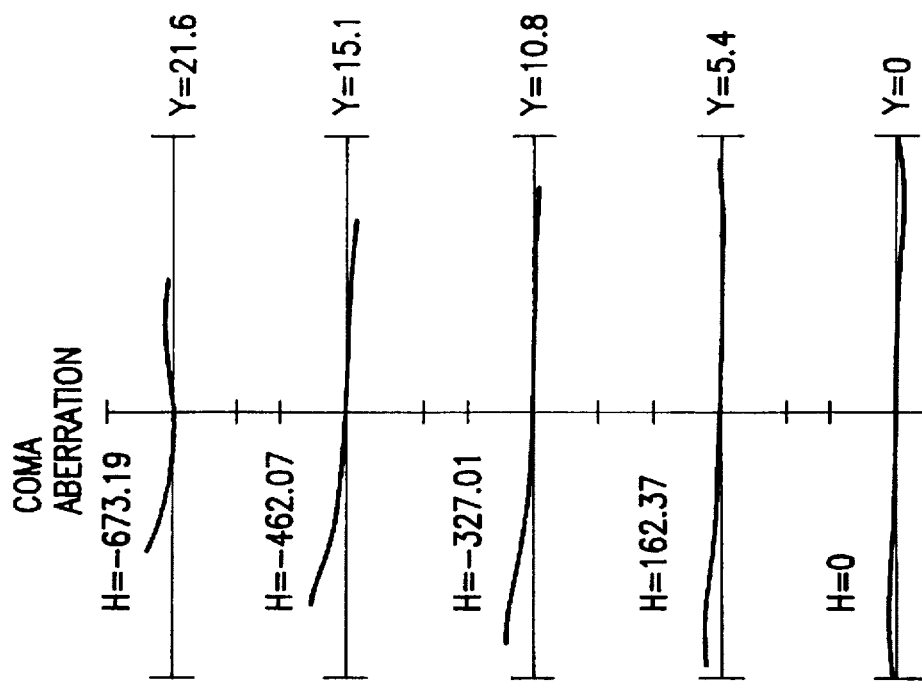
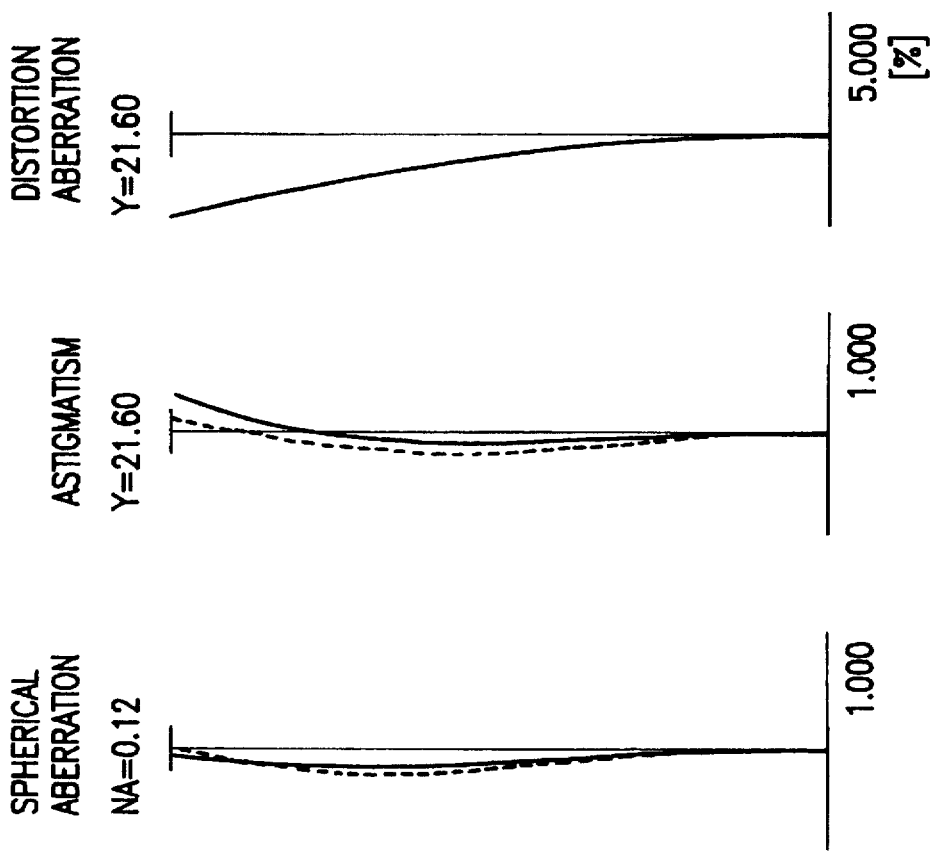

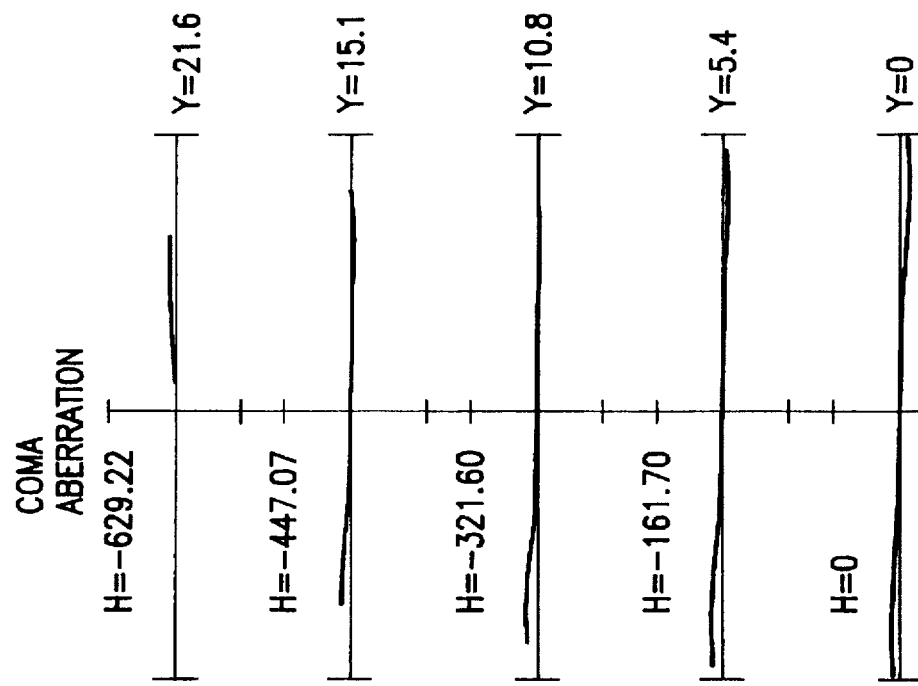
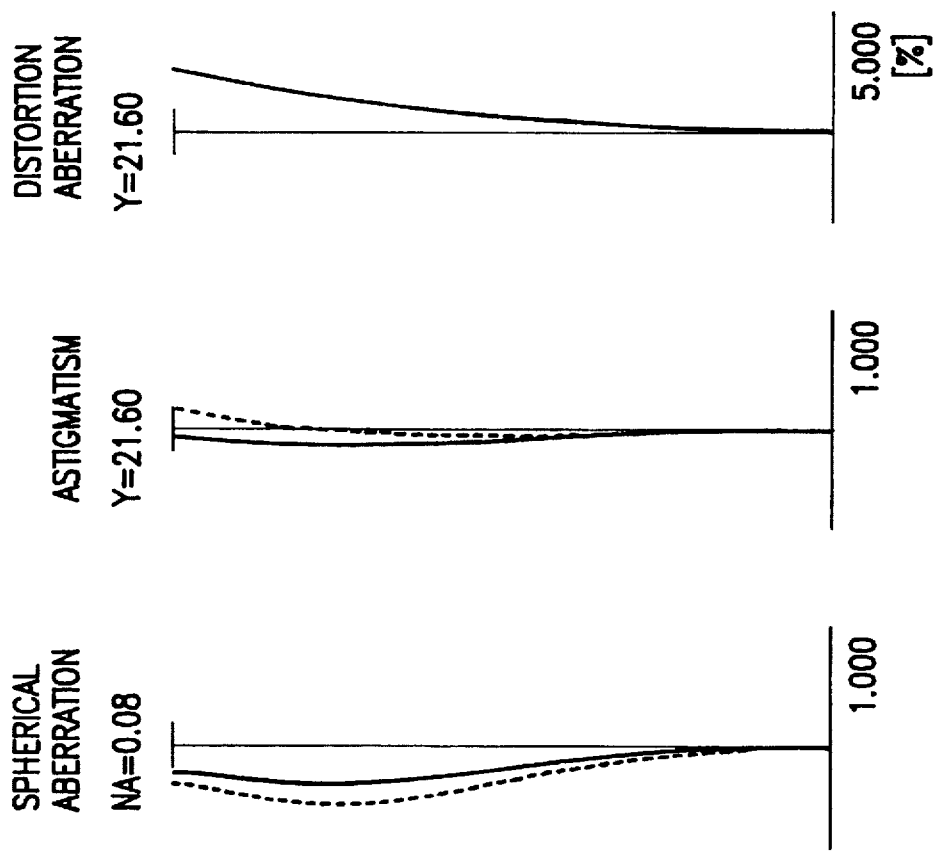

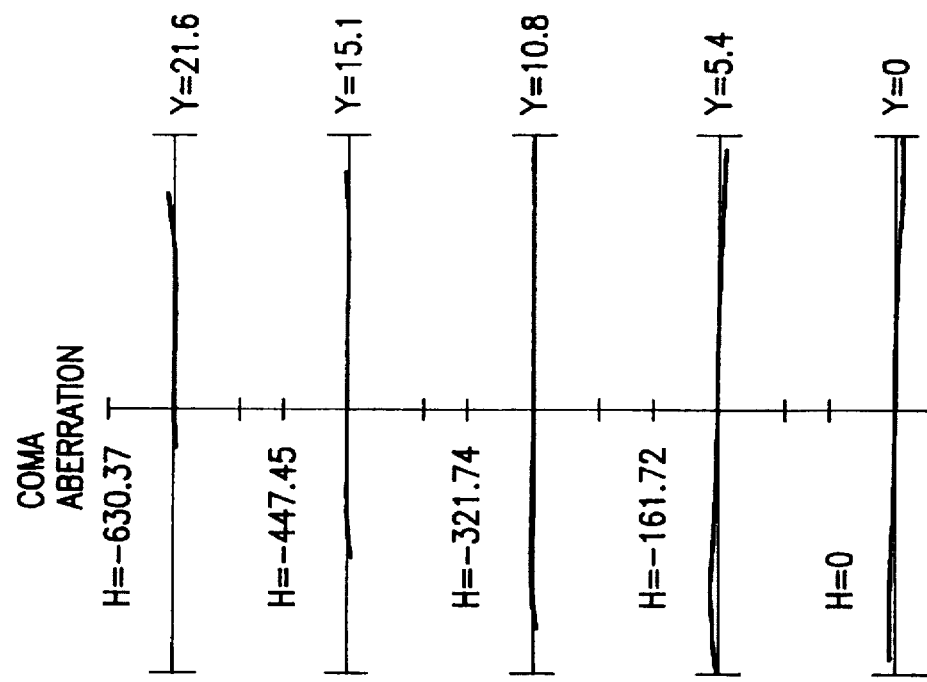
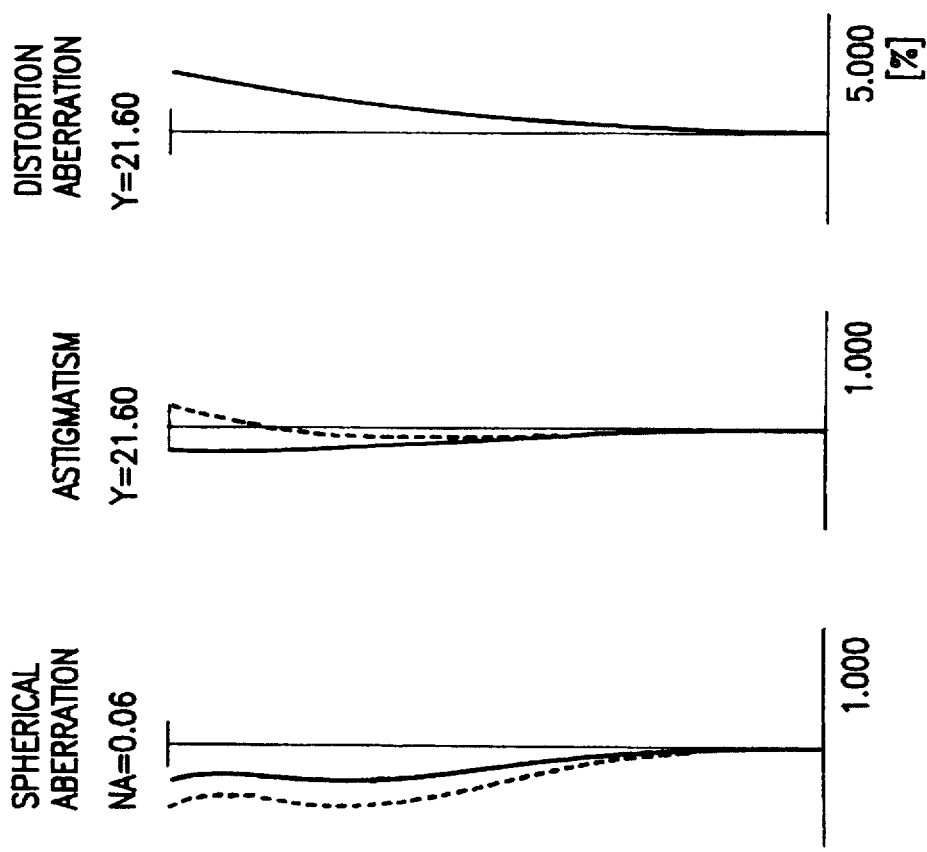
FIG.77d
FIG.77c
FIG.77b
FIG.77a

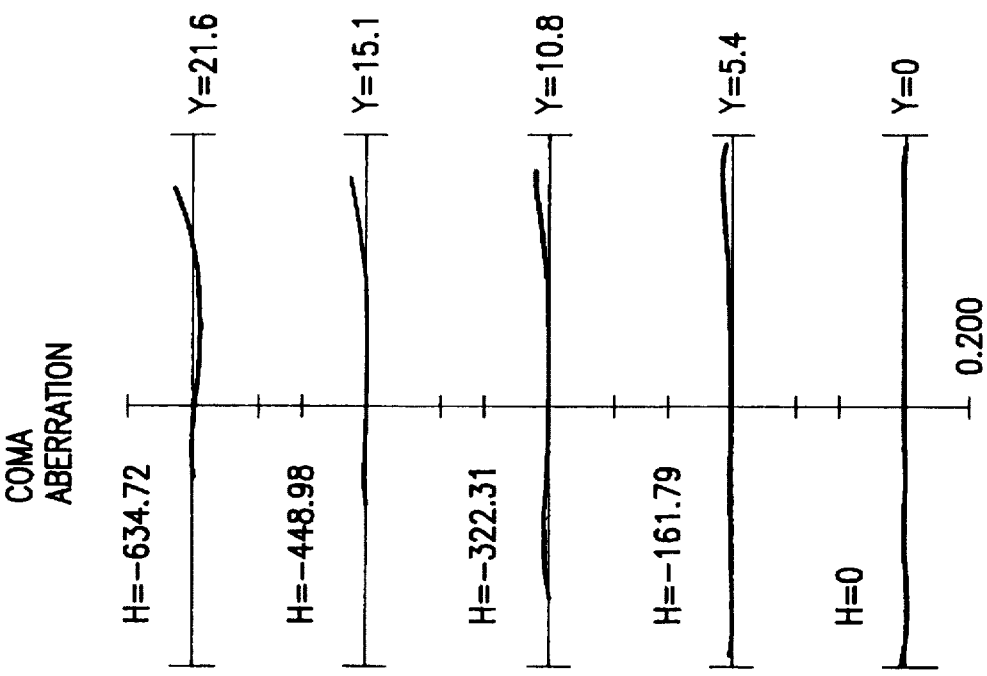
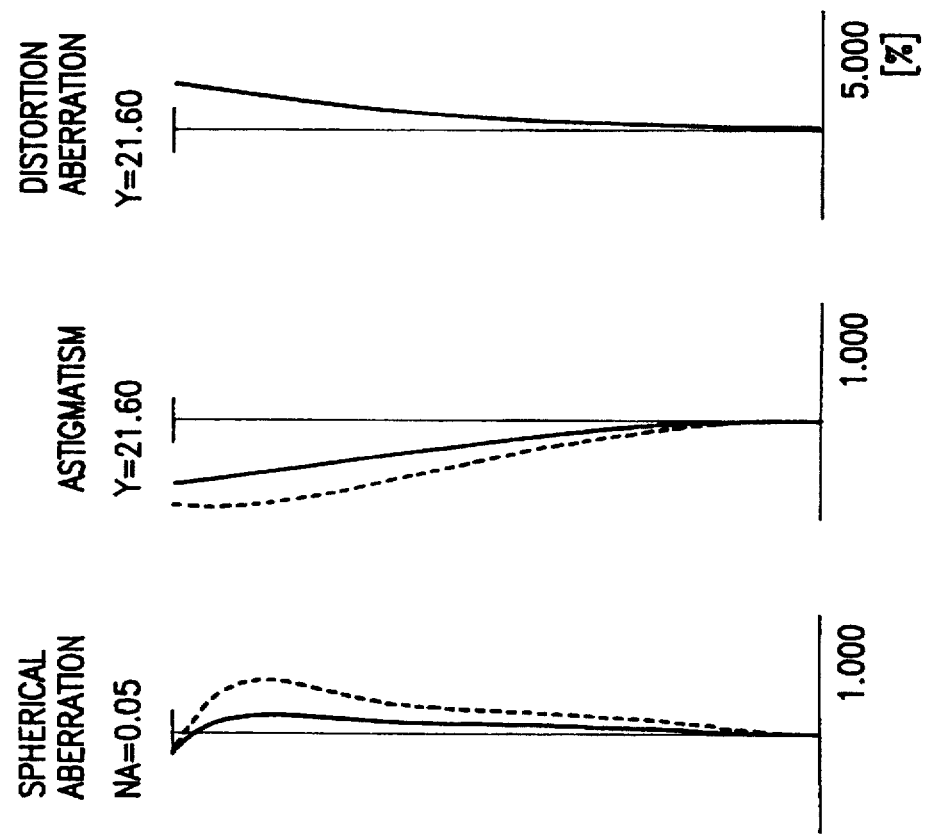

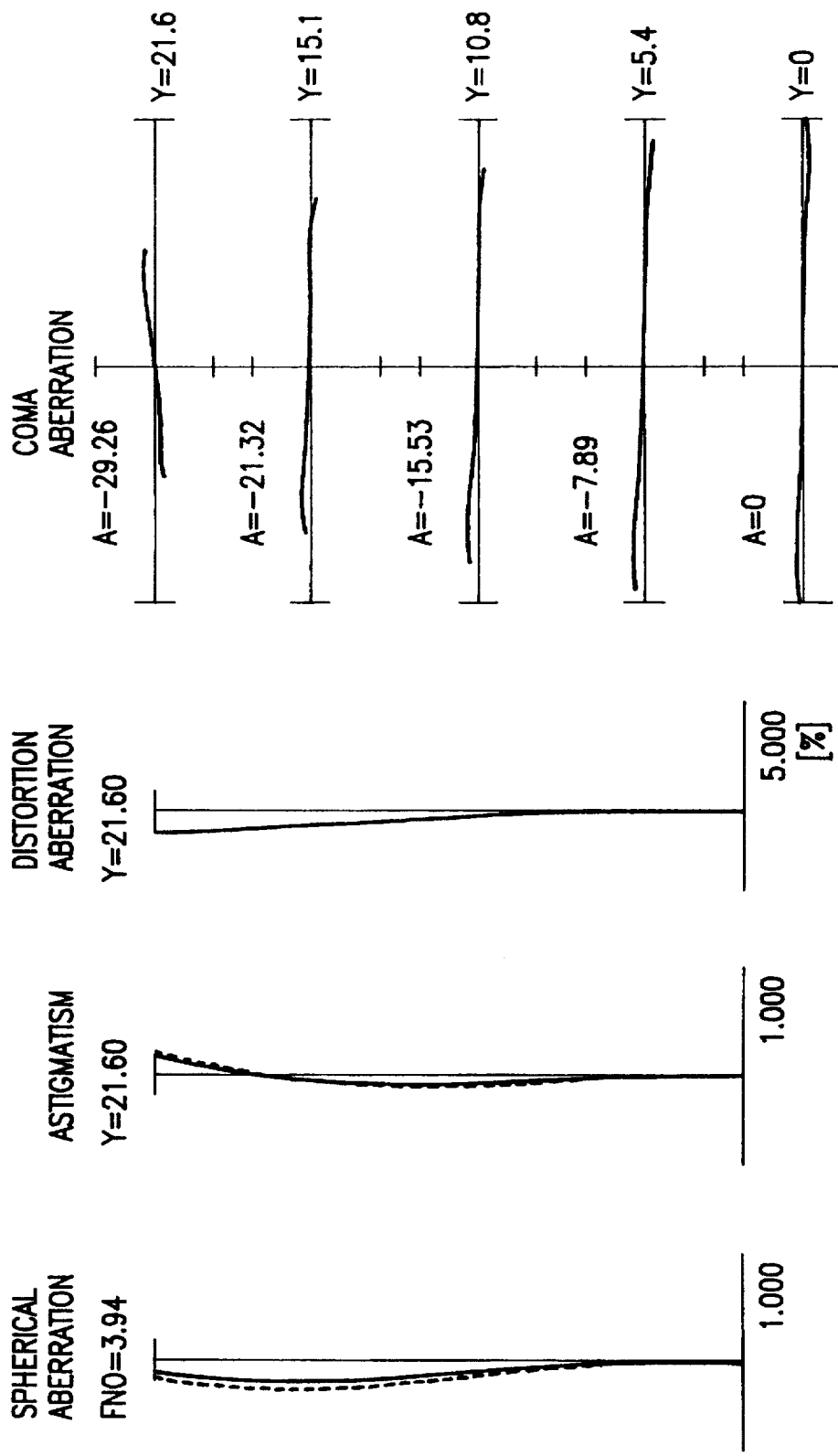

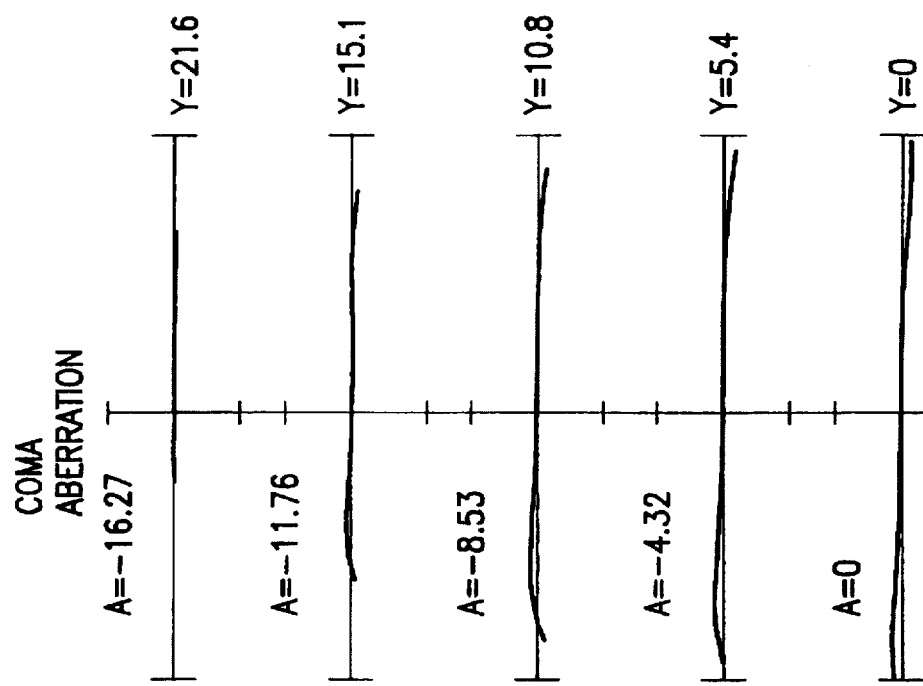
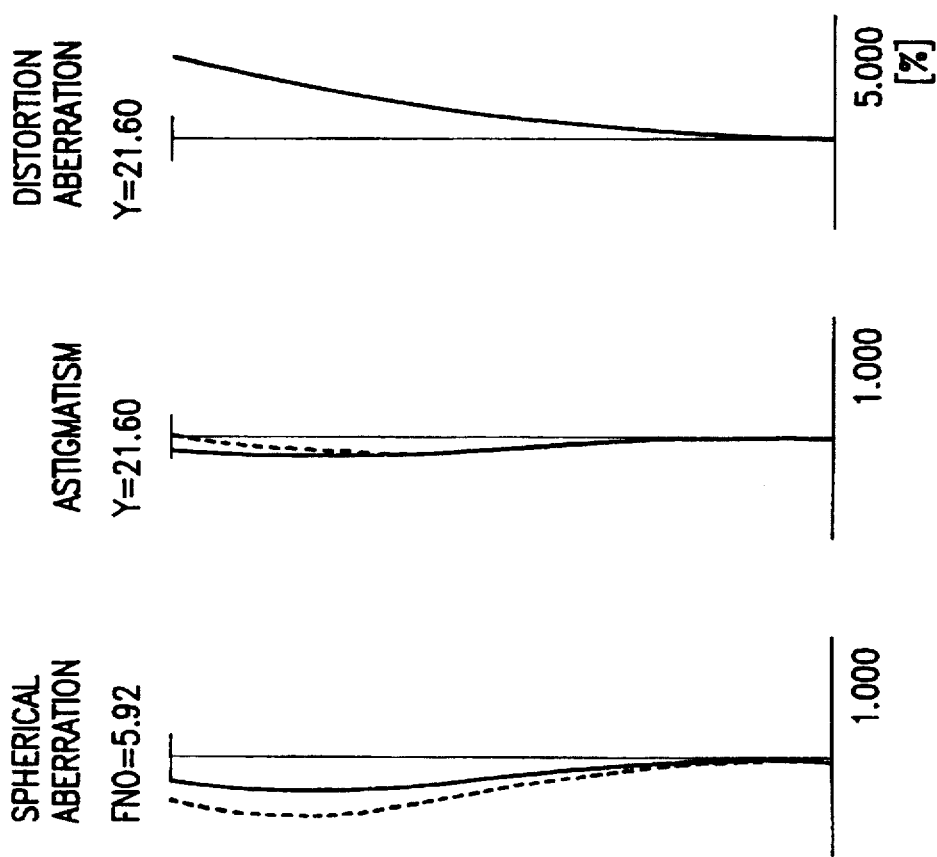

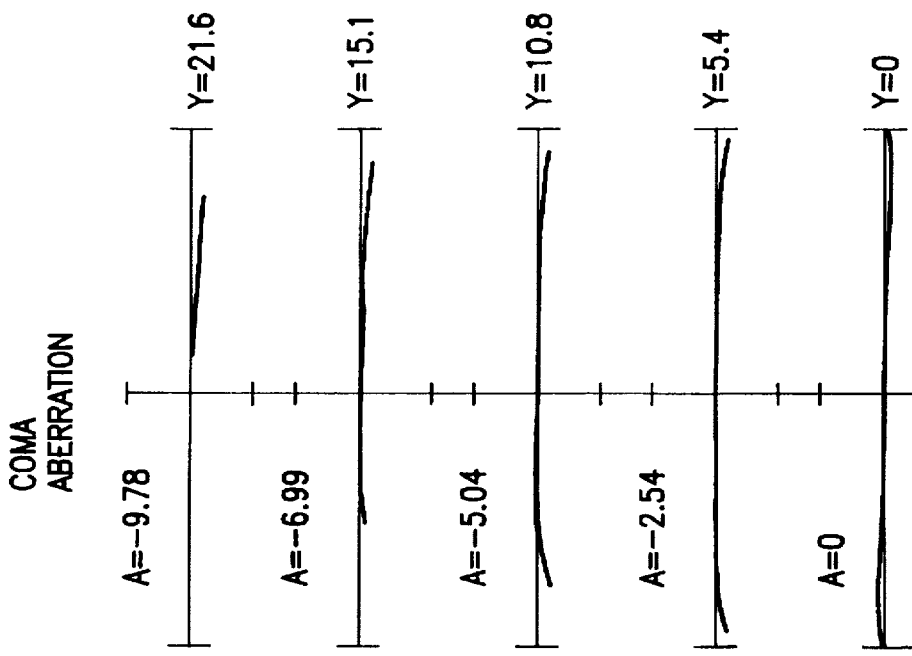
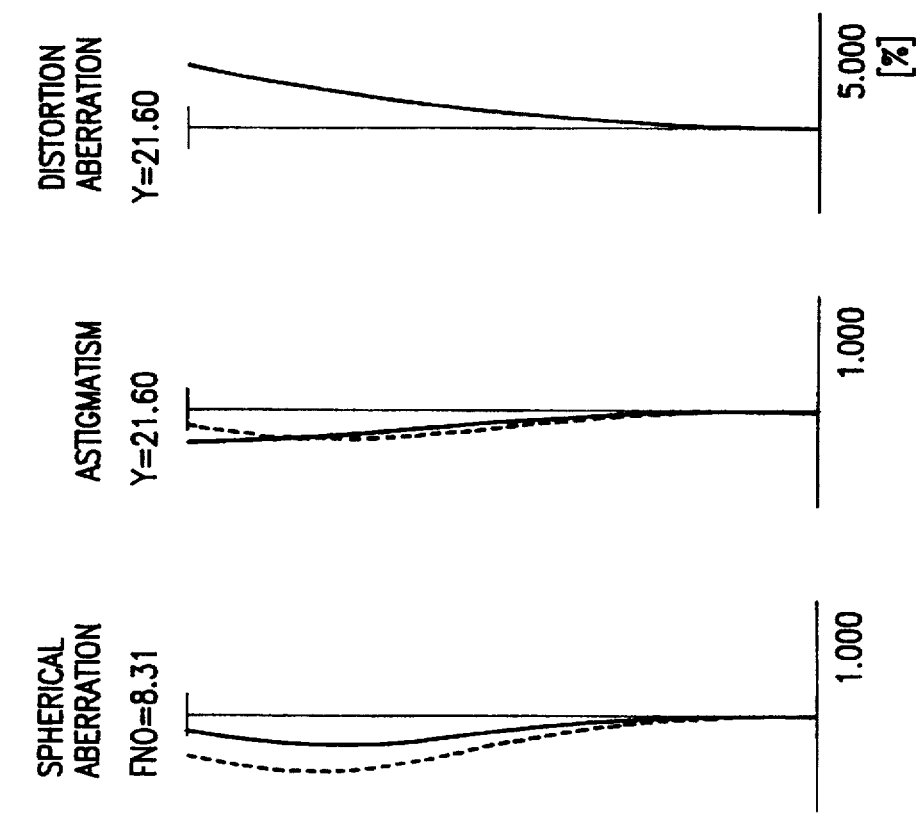

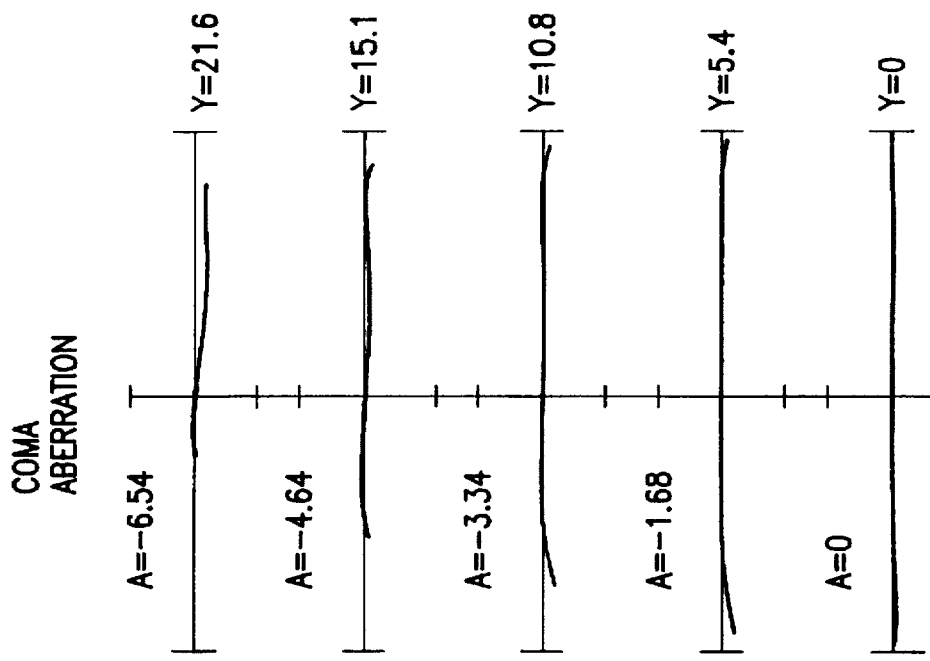
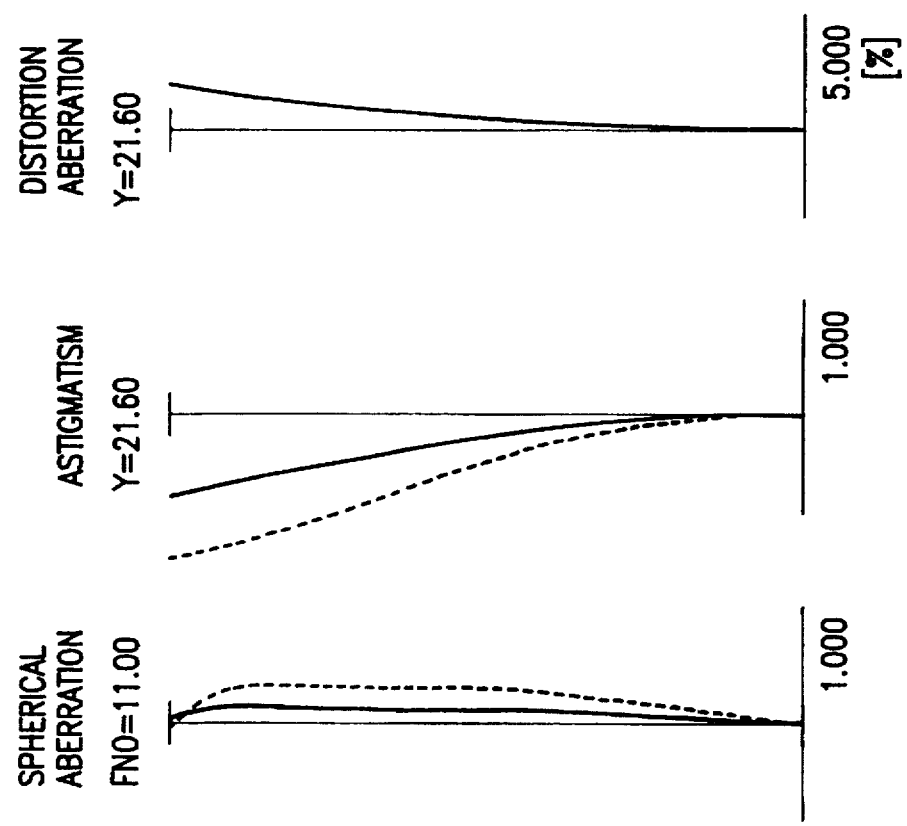

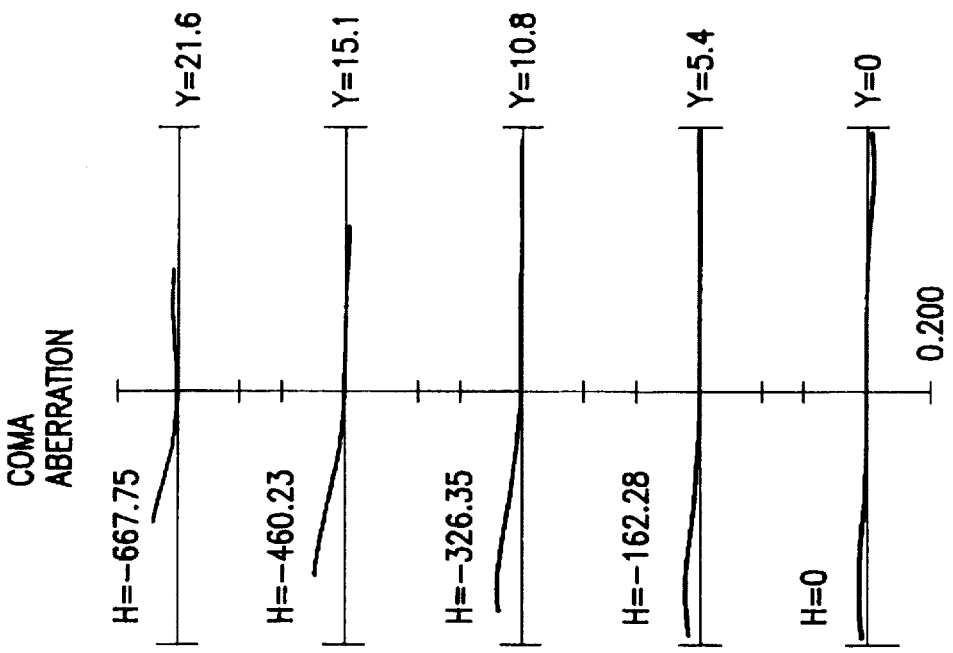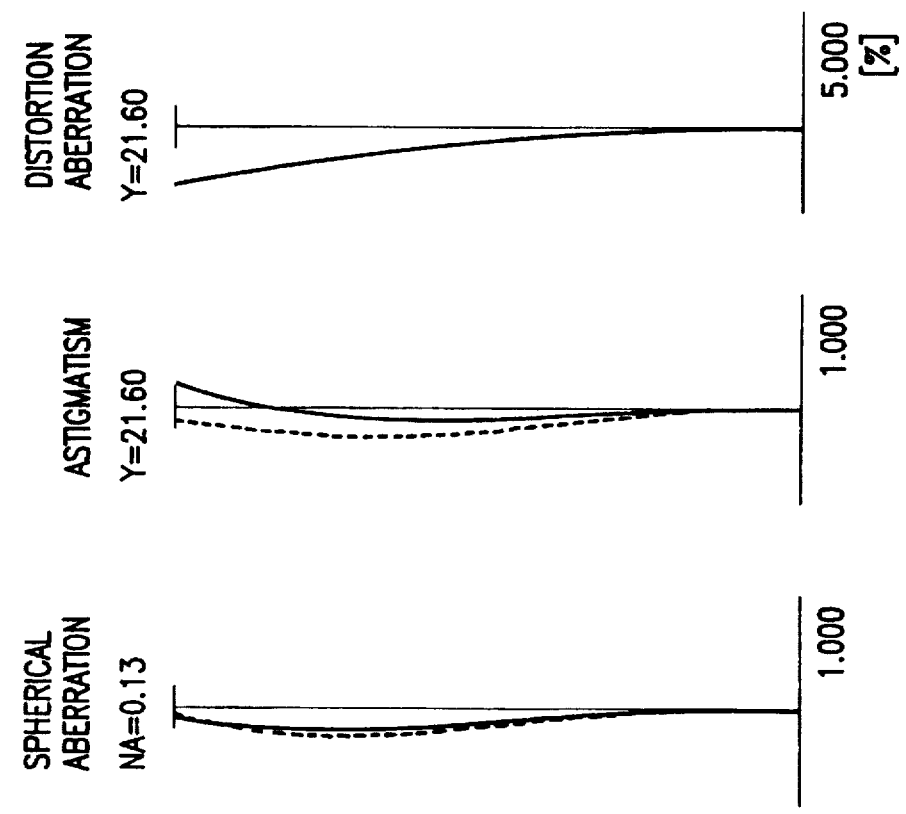

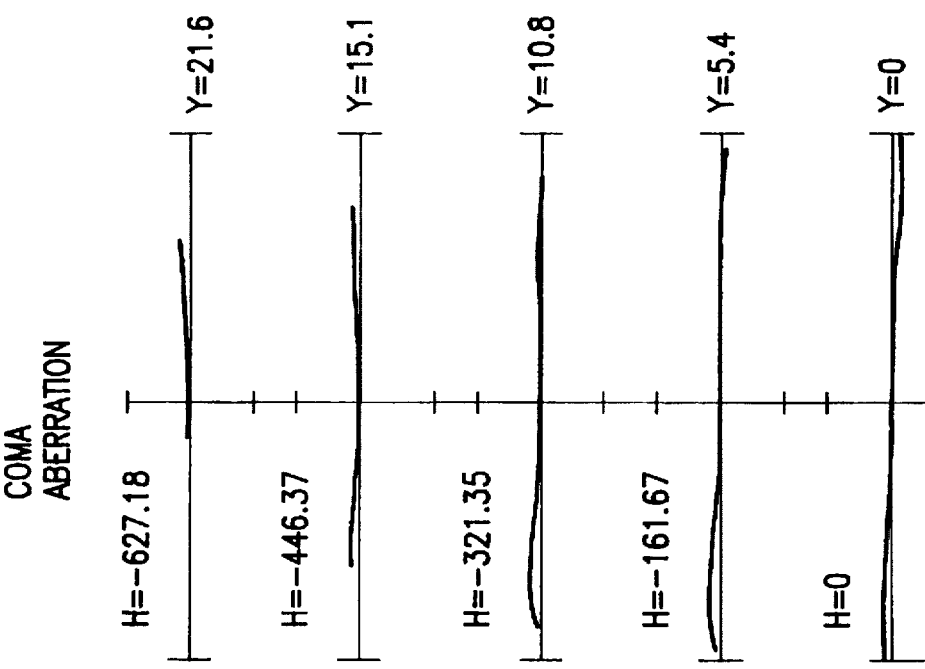
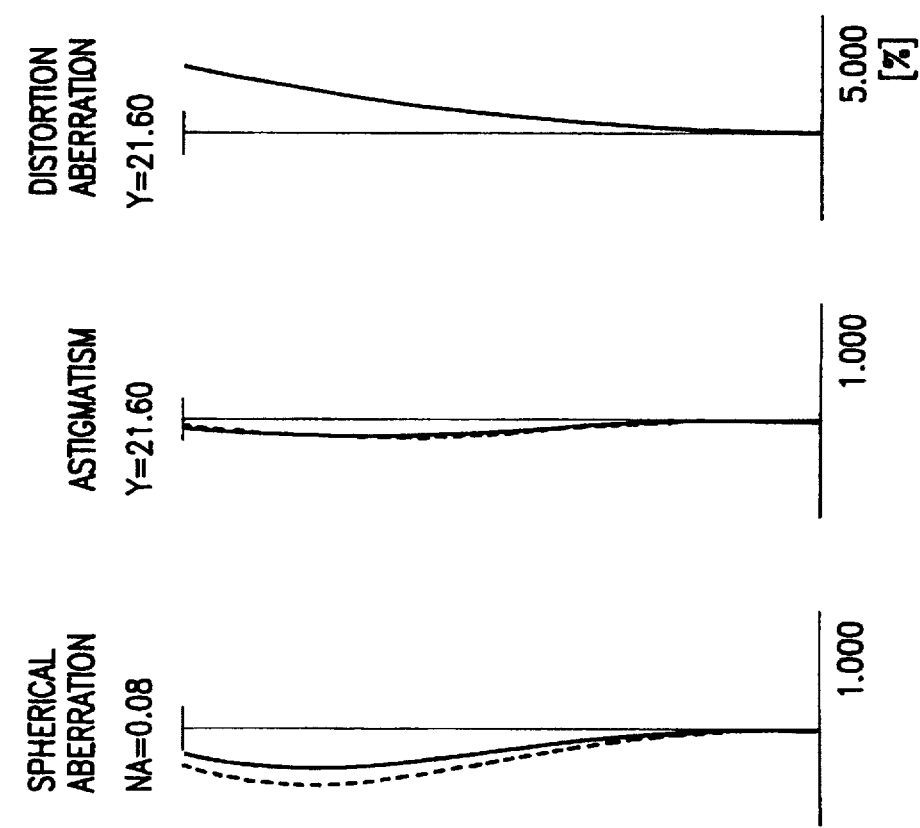

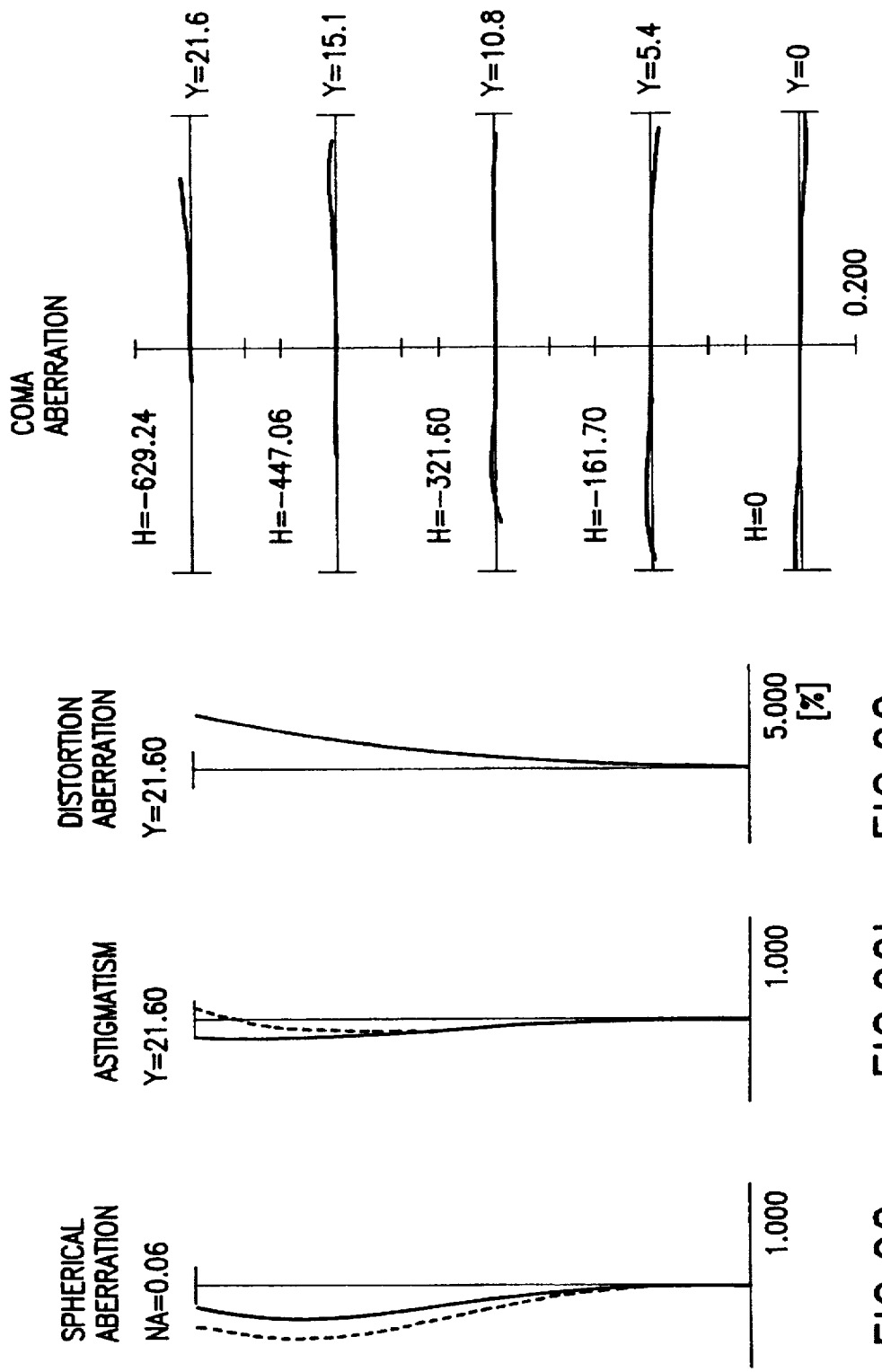

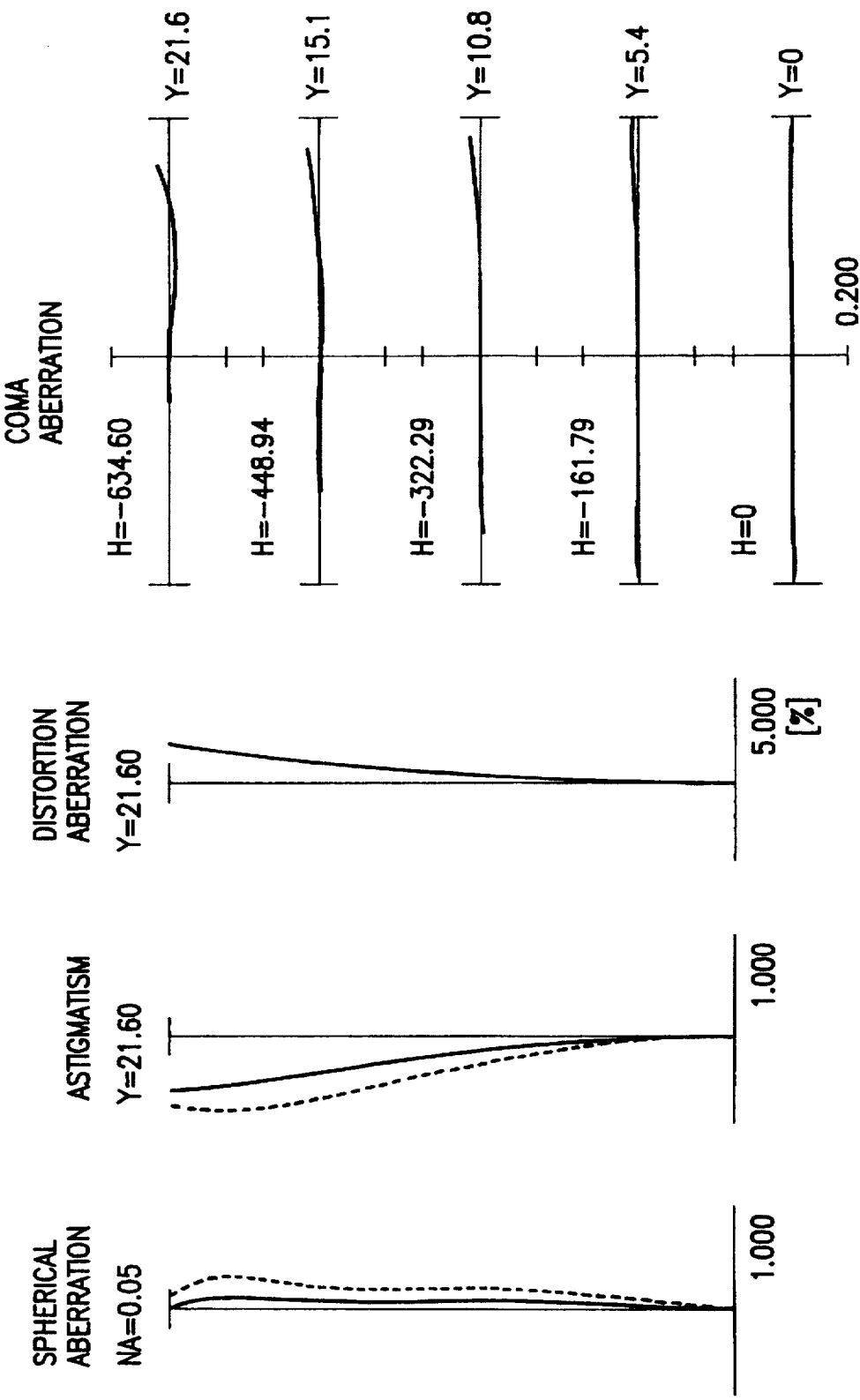

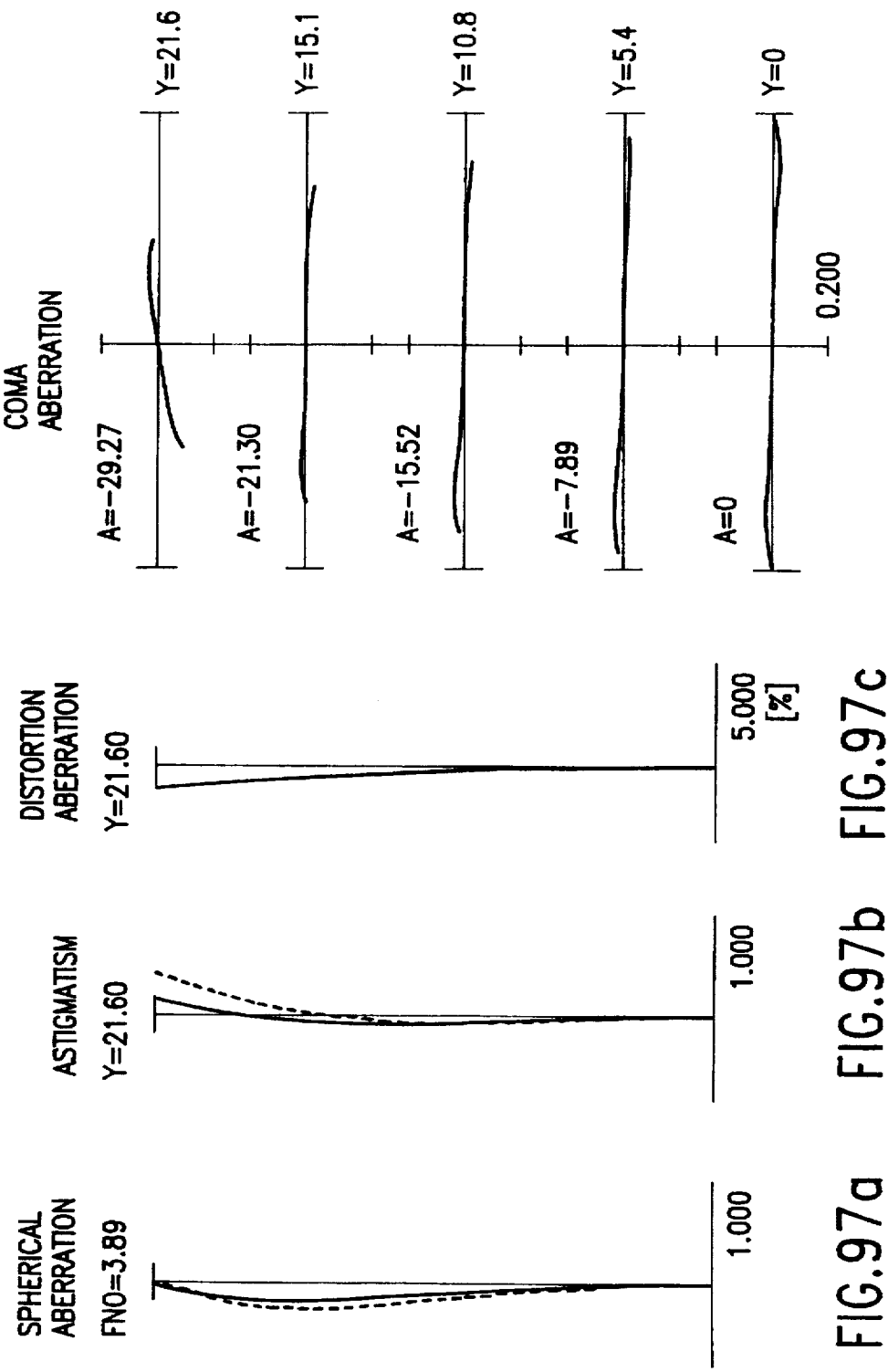

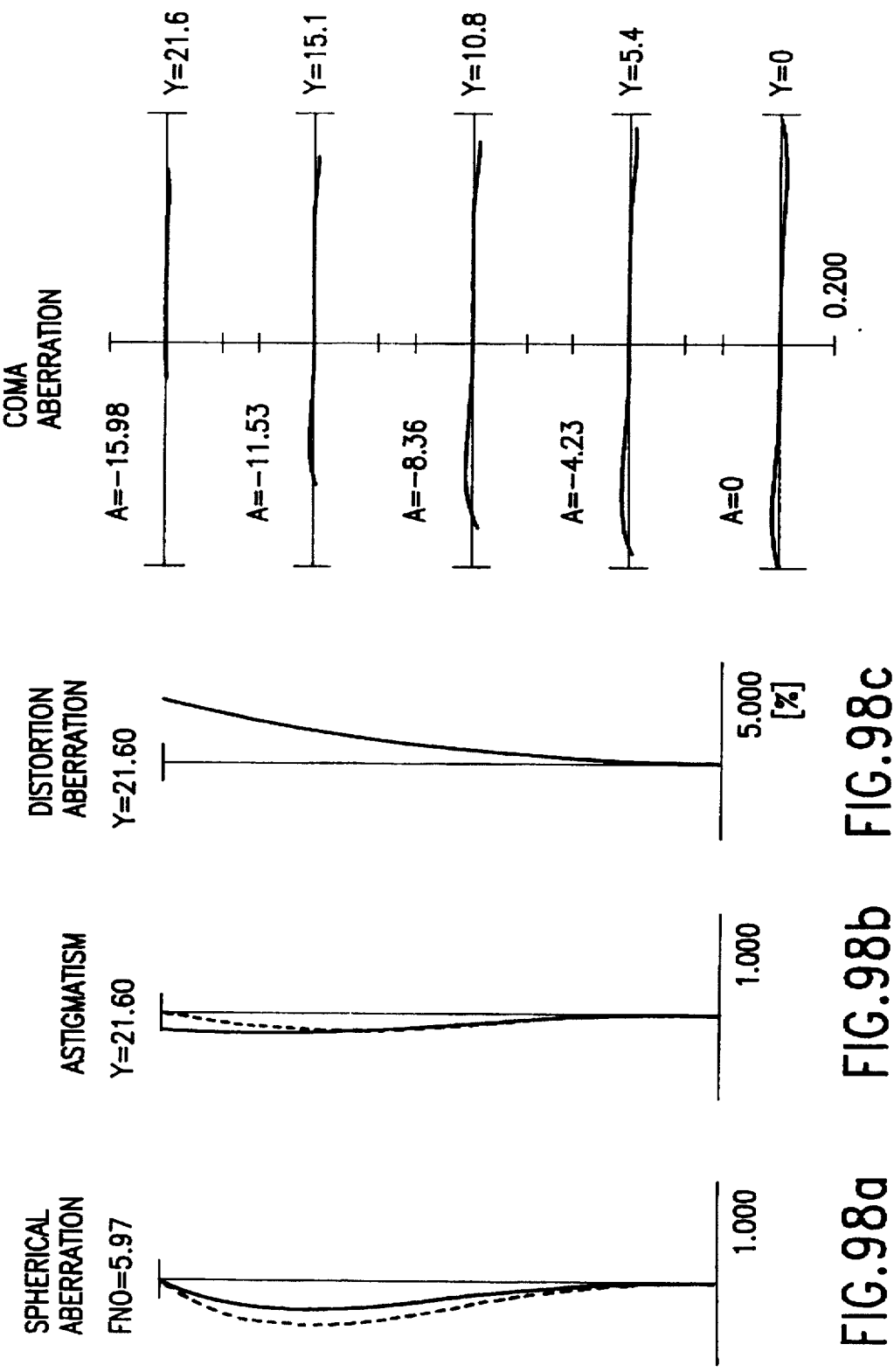

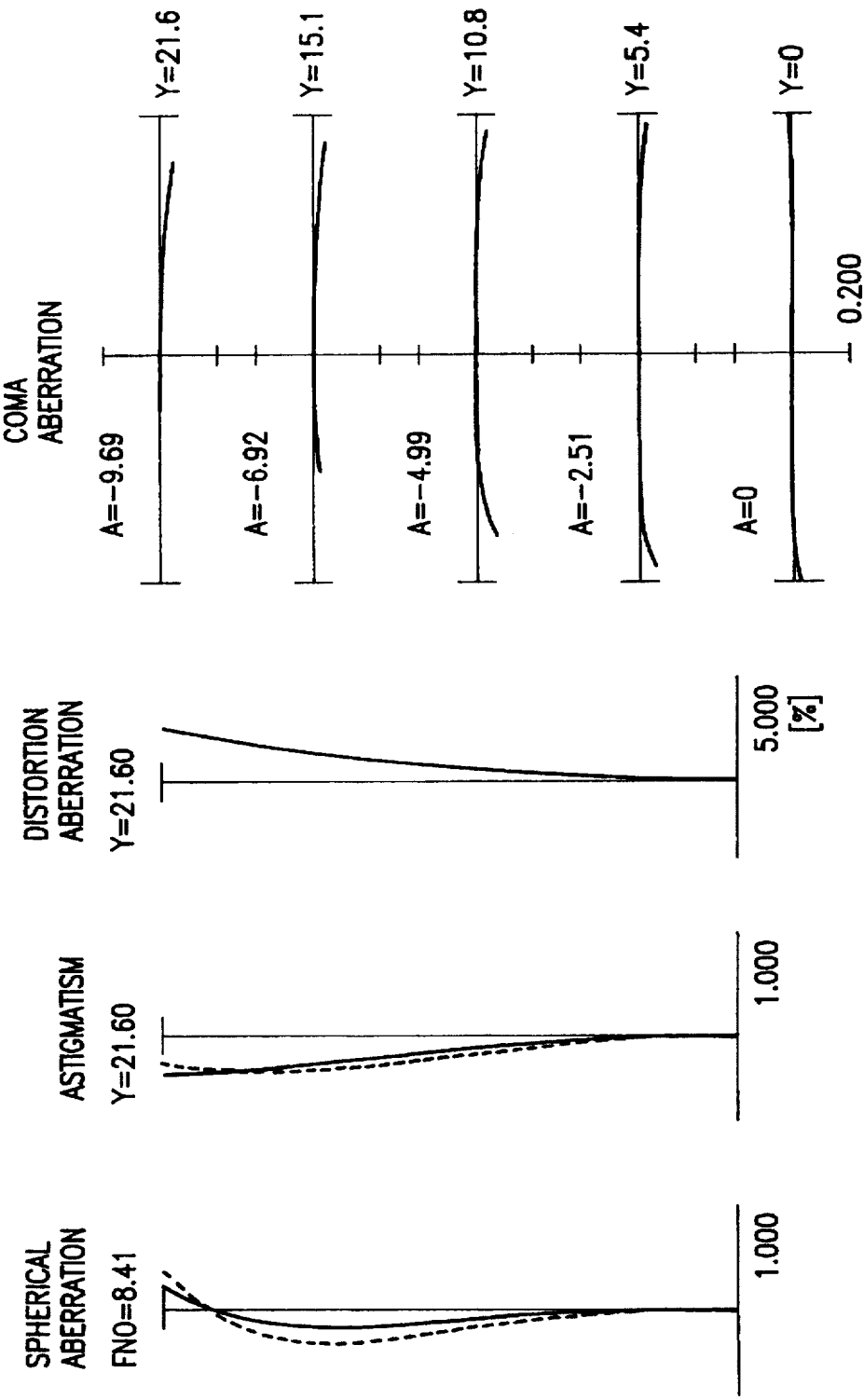

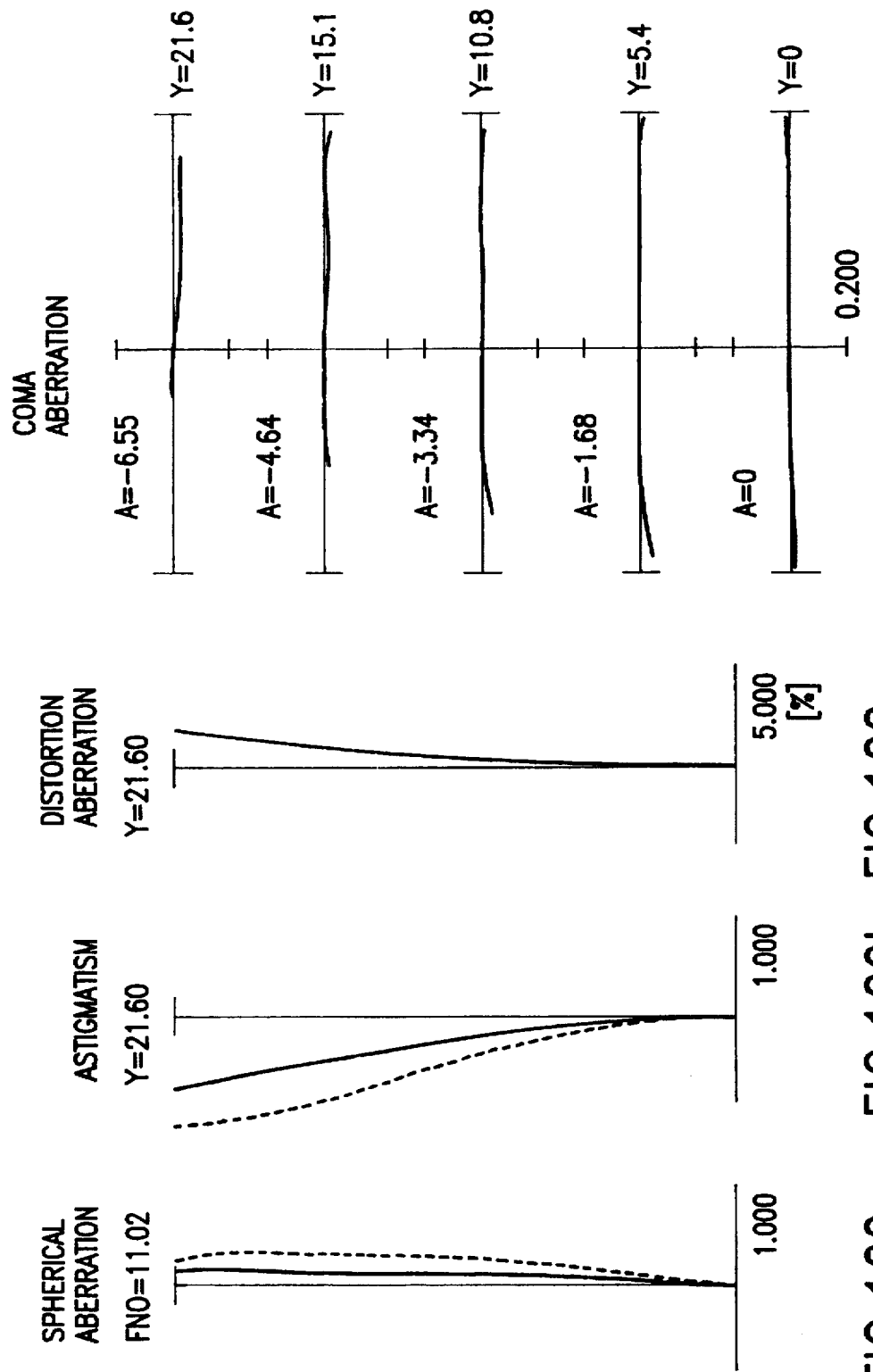

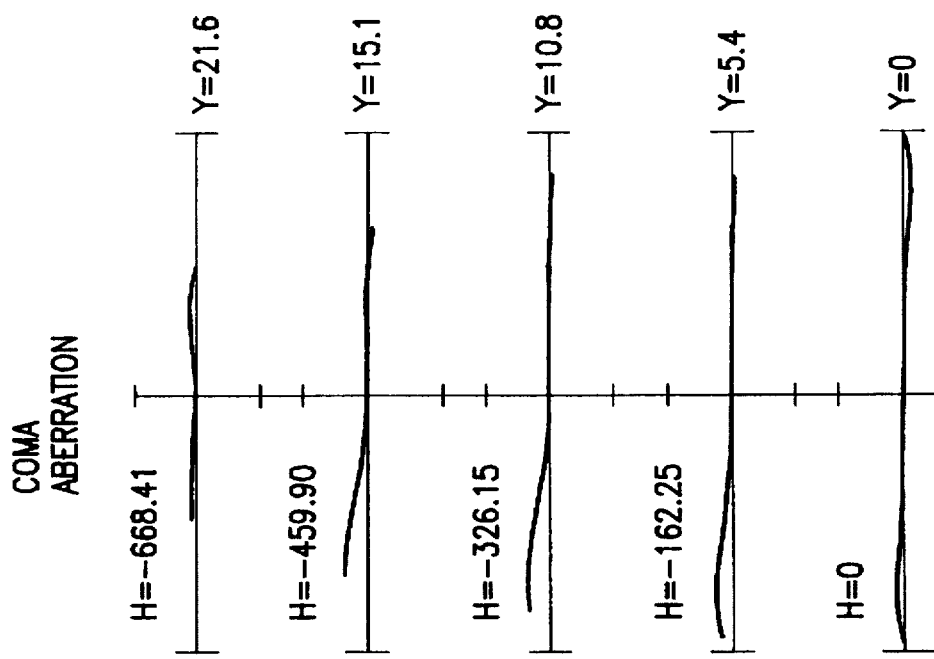
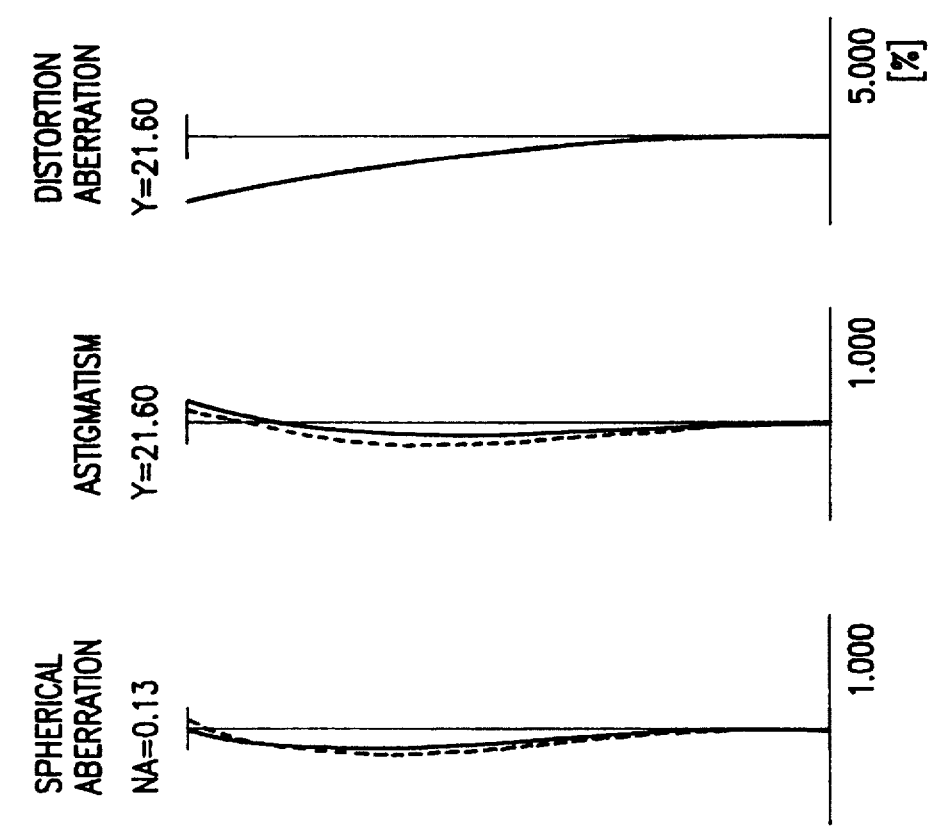
FIG.101a  FIG.101b  FIG.101c  FIG.101d

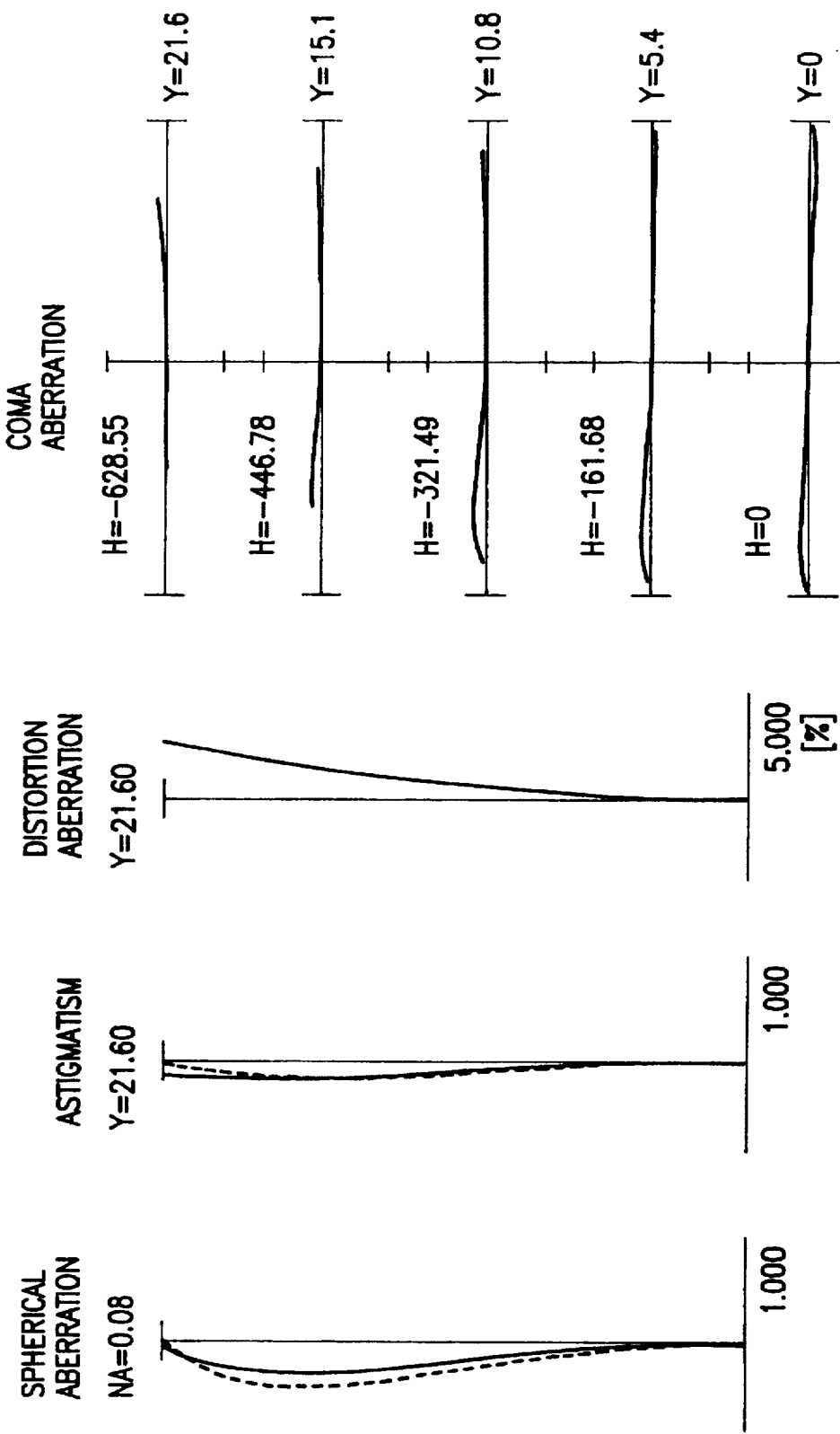

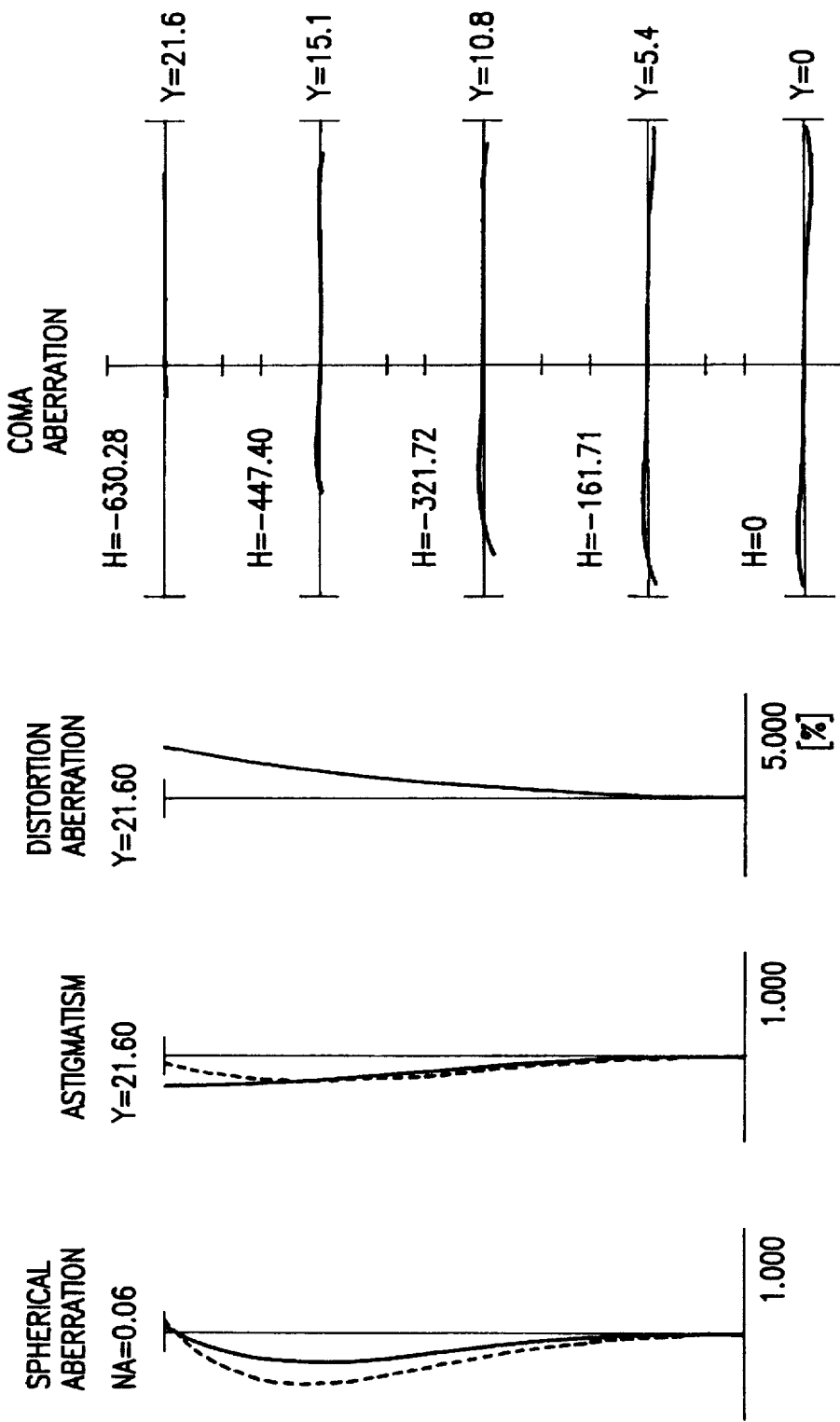

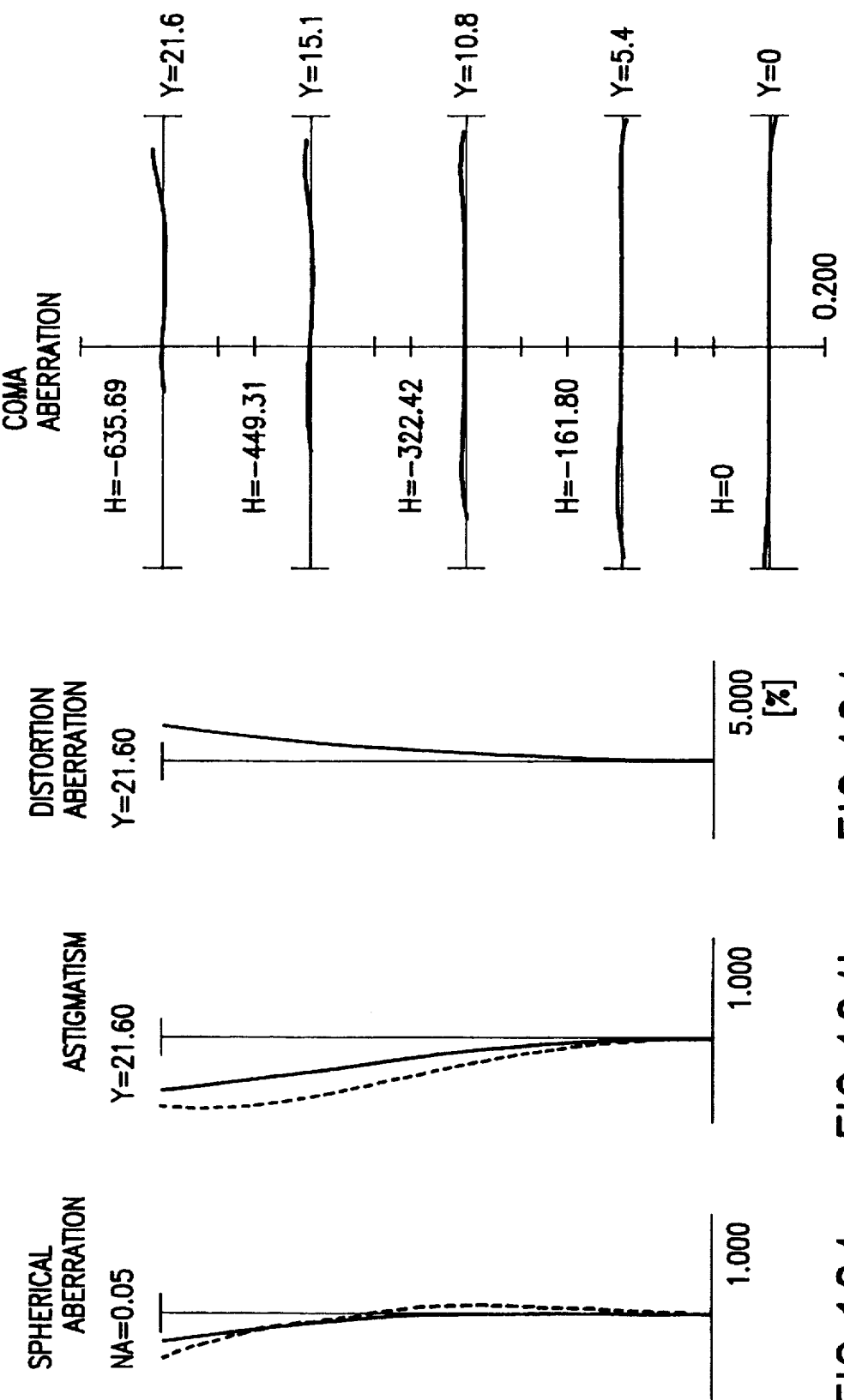

ZOOM LENS SYSTEM

BACKGROUND OF THE INVENTION

1. Field of the Invention

The invention relates to a zoom lens system that can maintain a good optical performance while a shift lens unit is moved in a direction substantially perpendicular to the zoom lens system. The zoom lens system can also function as a vibration reduction optical system by causing a shift lens group to move in a direction substantially perpendicular to an optical axis defined by the zoom lens system. Further, the invention relates to a zoom lens system that has a total length at a maximum telephoto state that is relatively short.

2. Description of Related Art

In recent years, cameras equipped with zoom lenses have become well-known among lens shutter-type cameras. In particular, the number of cameras equipped with high zoom ratio zoom lenses, that have zoom ratios exceeding three, has increased. Further, a camera's focal length at the maximum telephoto state has become longer.

With a high zoom ratio zoom lens, the change in the aperture ratio between a maximum wide-angle state and a maximum telephoto state increases as the zoom ratio increases. Thus, the aperture ratio becomes large at the maximum telephoto state. Further, with a high zoom ratio zoom lens, an exposure time is long and/or the focal length is long, because the aperture ratio is large at the maximum telephoto state. Consequently, at a maximum telephoto state, fluctuations in the image position, i.e., image blur, caused by camera shaking are created. Thus, errors in photography can easily occur.

However, it has been known to shift an image by decentering a portion of lens groups of a lens system. For example, in Japanese Published Patent No. 41-8558, an optical system capable of image shifting is formed to obtain good imaging properties, even with a portion of the lens groups being decentered and the image being shifted.

In order to resolve the problems caused by camera shaking, vibration reduction optical systems have been developed. In these systems, a detection system detects camera shaking, and a drive unit causes a portion of the lens groups to be decentered. Such systems can be used in combination in an optical system capable of image shifting.

In a vibration reduction optical system, camera shaking is detected by the detection system and image shifting is accomplished by decentering the lens groups through the drive unit to offset fluctuations in image position caused by detected camera shaking. Therefore, with a vibration reduction optical system, it is possible to correct fluctuations in an image position caused by camera shaking.

In Japanese Laid-Open Patent Publication No. 1-116619, a zoom lens is disclosed and comprises, in order from an object side: a first lens group with a negative refractive power; a second lens group with a positive refractive power; and a third lens group with a negative refractive power. Further, an image can be shifted, and image position fluctuations caused by camera shaking can be corrected by the second lens group moving in a direction perpendicular to an optical axis of the zoom lens.

In Japanese Laid-Open Patent Publication No. 6-95039, a zoom lens is disclosed and comprises, in order from an object side: a first lens group with a positive refractive power; a second lens group with a positive refractive power; and a third lens group with a negative refractive power. Further, an image can be shifted, and image blur caused by camera shaking can be corrected by moving a component(s) of lens groups, which comprise the second lens group, in a direction perpendicular to an optical axis of the zoom lens.

When a shift lens group shifts the image by moving in a direction substantially perpendicular to an optical axis, image displacement $\Delta$ relative to displacement $\delta$ of the shift lens group can be expressed by equation (a):

$$\Delta = \delta \times (1-\beta a)\beta b \qquad (a)$$

Where $\beta a$ is a lateral magnification of a shift lens group and $\beta b$ is a lateral magnification of a lens groups positioned on an image side of the shift lens group.

However, in Japanese Laid-Open Patent Publication No. 1-116619, a zoom lens has a lens group, which is positioned on an object side of a shift lens group and has a negative refractive power. Accordingly, it is difficult to shorten a total length of the lens system at a maximum telephoto state.

When $|(1-\beta a)\beta b|$ is large in equation (a), the image shifts by a large amount, even if the shift lens group moves a very small amount. Consequently, control of the zoom lens is difficult. Conversely, when $(1-\beta a)\beta b$ is small, displacement of the shift lens group for shifting an image by a predetermined amount becomes excessively large. Thus, a drive unit structure becomes complex and bulky. Accordingly, it is desirable to set $|(1-\beta a)\beta b|$ to an appropriate value.

In Japanese Laid-Open Patent Publication No. 6-95039, a second lens group of a zoom lens is formed of a component lens group having a negative refractive power, with a shift lens group having a positive refractive power. Accordingly, a lateral magnification $\beta a$ of the component lens group, which is the shift lens group, is such that $0<\beta a<1$ during zooming. Thus, the value of $(1-\beta a)\beta b$ is small. Accordingly, at a maximum telephoto state, the image position varies by a large amount with respect to a small amount of camera shake. In particular, the necessary displacement of the shift lens group is large.

In lens shutter type cameras, the camera should be small and light, even if a zoom ratio of the shooting lens is high. In a zoom lens with a zoom ratio of around 2, a positive-negative two lens group can comprise, in order from an object side of the zoom lens, a positive lens group and a negative lens group. Each lens group moves, so that a distance between the positive lens group and the negative lens group varies during zooming. In this type of zoom lens, the zoom ratio is equal to the ratio between the lateral magnification of the second lens group at a maximum wide-angle state and the lateral magnification of the second lens group at a maximum telephoto state.

Thus, to achieve a zoom ratio larger than 2, a lateral magnification of the second lens group at a maximum telephoto state becomes too positive. This is difficult to cause manufacture. Moreover, the change in a lens system's total length during zooming is large, making it difficult to shorten the lens system's total length in a maximum telephoto state.

Thus, to achieve a compact high zoom ratio zoom lens, it has been suggested to increase the number of movable lens groups by dividing the positive lens group in a positive-negative two group zoom lens into a plurality of lens groups. Such suggestions are disclosed, for example, in Japanese Laid-Open Patent Publication No. 6-265788 and Japanese Laid-Open Patent Publication No. 7-27979.

For example, a zoom lens disclosed in Japanese Laid-Open Patent No. 6-265788 comprises, in order from an object side, a first lens group with a positive refractive power, a second lens group with a negative refractive power, a third lens group with a positive refractive power, and a fourth lens group with a negative refractive power. Further, the zoom lens disclosed in Japanese Laid-Open Patent Publication No. 7-27979 comprises, in order from the object side, a first lens group with a positive refractive power, a second lens group with a negative refractive power, a third lens group with a positive refractive power, a fourth lens group with a positive refractive power, and a fifth lens group with a negative refractive power.

Both of these zoom lenses have negative lens groups arranged on an image side, and the lens groups move to an object side during zooming from a maximum wide-angle state to a maximum telephoto state. Because these lens systems have no restriction in back focus, reduction of the lens diameter size in the lens groups requires shortening of the lens system's total length. The arrangement of a negative lens group closest to the image side is effective for reducing the size.

Further, the shortening of back focus makes the off-axis light rays that pass through a negative lens group move away from the optical axis at a maximum wide-angle state, and thereby on-axis and off-axis aberrations are independently corrected. By increasing back focus during zooming from a maximum wide-angle state to a maximum telephoto state, a height of the off-axis light rays that pass through the negative lens group can be changed during zooming. This enables a control of off-axis aberrations during zooming, and superior imaging performance.

By shortening the total length of the lens system at a maximum wide-angle state, an off-axis light ray that passes through the first lens group can approach the optical axis. This enables a reduction of a lens diameter in the first lens group.

In a zoom lens disclosed in Japanese Laid-Open Patent Publication No. 6-265788, a change in the lateral magnification of the fourth lens group during zooming is small, however a contribution rate of the second lens group is large. Therefore, the incident angle of off-axis light rays that pass through the second lens group changes by a large amount, but its height does not change much during zooming. Accordingly, it is difficult to control fluctuation of off-axis aberrations during zooming.

Correction of aberrations can be accomplished by providing aspherical surfaces within a limited focal length state, such as at a maximum wide-angle state, an intermediate focal length state, and a maximum telephoto state. However, control of fluctuation in off-axis aberrations over an entire focal length from a maximum wide-angle state to a maximum telephoto state is difficult.

Although manufacturing technology of aspherical surface lens is improving, a high quality image can be lost due to errors in the surface precision during manufacturing. Thus, in a optical system with an abundance of aspherical surfaces, the picture quality tends to have a poor contrast. With an aspherical surface lens, deterioration in performance occurs easily, even with a slight amount of errors, such as decentering. Thus, the manufacturing process is more difficult.

In the zoom lens in Japanese Laid-Open Patent Publication No. 7-27979, the focal length of the second lens group is small in a negative manner to a focal length of the total zoom lens at a maximum telephoto state. The divergence effect is strong. Accordingly, the zoom lens is not suitable for shortening the length of the lens system at a maximum telephoto state.

SUMMARY OF THE INVENTION

It is an object of the invention to provide a zoom lens system that is compact yet capable of image shifting.

The description of the embodiments of the invention herein uses characters G1, G2, G3, G4 and G5 to generally represent the lens groups, also known as lens units, meaning an optical unit that functions as a group. The term "lens group" is intended to include a plurality of lens elements or a single lens element. Further, the term "lens elements" can also include known optical components, such as a prism. This is for ease and simplification of explanation purposes. The use of G1, G2, G3, G4 and G5 is in no way meant to limit the invention. The term zoom lens system and lens system are used interchangeably.

In order to resolve the above and other problems, embodiments of the invention provide a zoom lens system that is provided for image shifting. The zoom lens system includes, in order from an object side of the zoom lens system: a first lens group with a positive refractive power; a second lens group with a negative refractive power; a third lens group with a positive refractive power; a fourth lens group with a positive refractive power; and a fifth lens group with a negative refractive power. During zooming from a maximum wide-angle state to the maximum telephoto state, at least the first lens group and the fifth lens group move toward an object side so that the distance between the first lens group and the second lens group increases; a distance between the second lens group and the third lens group decreases; a distance between the third lens group and the fourth lens group increases; and a distance between the fourth lens group and the fifth lens group decreases. At least one of the lens elements in the fourth lens group functions as a shift lens group by moving in a direction substantially perpendicular to the optical axis so as to shift the image. Further, the zoom lens system satisfies the conditions:

$$2.5<(1-\beta at)\times \beta bt<5 \quad -0.1<fi/fct<-0.005$$

where $\beta at$ is a lateral magnification of the shift lens group at a maximum telephoto state; $\beta bt$ is a lateral magnification of the lens group that is positioned at an image side of the shift lens group at a maximum telephoto state; ft is a focal length of the entire lens system at a maximum telephoto state; and fct is a combined focal length at a maximum telephoto state for lens groups that are positioned at the object side of the shift lens group.

Further, the zoom lens system, preferably also satisfies the condition:

$$-0.3<fw/fcw<-0.02$$

where fw is a focal length of the zoom lens system at a maximum wide-angle state and fcw is a combined focal length at a maximum wide-angle state for lens groups that are positioned at the object side of the shift lens group.

According to another object of the invention, a zoom lens system is provided that can shift the image by causing a shift lens group to move in a direction substantially perpendicular to an optical axis defined by the zoom lens system. The zoom lens system comprises a lens group, which includes the shift lens group, and at least one other lens group positioned to the image side of the shift lens group. In the zoom lens system, at least one out of zooming from a maximum wide-angle state to a maximum telephoto state and focussing on close-range objects is conducted by changing a distance between the lens groups. Further, the zoom lens system preferably satisfies the condition:

$$2.5<(1-\beta at)\times \beta bt<5$$

where $\beta at$ is a lateral magnification at a maximum telephoto state of the shift lens group and $\beta bt$ is a lateral magnification at a maximum telephoto state of the lens group positioned at the image side of the shift lens group.

Further, it is preferable that at least one further lens group be positioned to an object side of the shift lens group. The zoom lens system preferably satisfies the condition:

$$0.3<||(1-\beta_{at})\beta_{bt}|/|(1-\beta_{aw})\beta_{bw}||/(ft/fw)<0.75$$

where βat is a lateral magnification at a maximum telephoto state of the shift lens group, βbt is a lateral magnification at a maximum telephoto state of the lens group positioned to the image side of the shift lens group. βaw is a lateral magnification at a maximum wide-angle state of the shift lens group. βbw is a lateral magnification at a maximum wide-angle state of the lens group positioned on the image side of the shift lens group, ft is a focal length of the zoom lens system at a maximum telephoto state, and fw is a focal length of the zoom lens system at a maximum wide-angle state.

Considering the problems described above, the invention provides a small sized zoom lens system with a short total lens system length at a maximum telephoto state.

According to another aspect of the invention, a distance D1W between the first lens group and the second lens group at a maximum wide-angle state, a distance D1T between the first lens group and the second lens group at a maximum telephoto state, a distance D4W between the fourth lens group and the fifth lens group at a maximum wide-angle state, a distance D4T between the fourth lens group and the fifth lens group at a maximum telephoto state, a focal length f1 of the first lens group, a focal length f2 of the second lens group, a focal length f3 of the third lens group, a focal length ft of the total zoom lens system at a maximum telephoto state, and a focal length fw of the total zoom lens system at a maximum wide-angle state satisfy the following conditions:

$$1.5<(D1T-D1W)/(D4W-D4T)<2.1 \quad 0.39<f3/f1<0.55 \quad 0.25<f2/(fw \times ft)^{1/2}<0.32.$$

Further, the lateral magnification β2t of the second lens group at a maximum telephoto state, a lateral magnification β2w of the second lens group at the maximum wide-angle state, a lateral magnification β5t of the fifth lens group at a maximum telephoto state, and a lateral magnification β5w of the fifth lens group at a maximum wide-angle state, satisfy the conditions:

$$0.32<(\beta_{2t}/\beta_{2w})/(ft/fw)<0.45 \quad 0.5<(\beta_{5t}/\beta_{5w})/(ft/fw)<0.7.$$

Other objects, advantages and salient features of the invention will become apparent from the following detailed description, which, taken in conjunction with the annexed drawing, discloses preferred embodiments of the invention.

BRIEF DESCRIPTION OF THE DRAWINGS

The invention will be described in detail with reference to the following drawings in which like reference numerals refer to like elements and wherein:

FIGS. 3a–3d are various aberration graphs for an infinite focus state at a maximum wide-angle state according to a first preferred embodiment;

FIGS. 4a–4d are various aberration graphs for an infinite focus state at an intermediate focal length state according to a first preferred embodiment;

FIGS. 5a–5d are various aberration graphs for an infinite focus state at a maximum telephoto state according to a first preferred embodiment;

FIGS. 6a–6d are various aberration graphs at a photographic magnification of −1/30 at a maximum wide-angle state according to a first preferred embodiment;

FIGS. 7a–7d are various aberration graphs at a photographic magnification of −1/30 at an intermediate focal length state according to a first preferred embodiment;

FIGS. 8a–8d are various aberration graphs at a photographic magnification of −1/30 at a maximum telephoto state according to a first preferred embodiment;

FIGS. 13a–13d are various aberration graphs for an infinite focus state at a maximum wide-angle state according to a second preferred embodiment;

FIGS. 14a–14d are various aberration graphs for an infinite focus state at a first intermediate focal length state according to a second preferred embodiment;

FIGS. 15a–15d are various aberration graphs for an infinite focus state at a second intermediate focal length state according to a second preferred embodiment;

FIGS. 16a–16d are various aberration graphs for an infinite focus state at a maximum telephoto state according to a second preferred embodiment;

FIGS. 17a–17d are various aberration graphs at a photographic magnification of −1/30 at a maximum wide-angle state according to a second preferred embodiment;

FIGS. 18a–18d are various aberration graphs at a photographic magnification of −1/30 at a first intermediate focal length state according to a second preferred embodiment;

FIGS. 19a–19d are various aberration graphs at a photographic magnification of −1/30 at a second intermediate focal length state according to a second preferred embodiment;

FIGS. 26a–26d are various aberration graphs for an infinite focus state at a maximum wide-angle state according to a third preferred embodiment;

FIGS. 27a–27d are various aberration graphs for an infinite focus state at a first intermediate focal length state according to a third preferred embodiment;

FIGS. 29a–29d are various aberration graphs for an infinite focus state at a maximum telephoto state according to a third preferred embodiment;

FIGS. 30a–30d are various aberration graphs at a photographic magnification of $-1/30$ at a maximum wide-angle state according to a third preferred embodiment;

FIGS. 31a–31d are various aberration graphs at a photographic magnification of $-1/30$ at a first intermediate focal length state according to a third preferred embodiment;

FIGS. 32a–32d are various aberration graphs at a photographic magnification of $-1/30$ at a second intermediate focal length state according to a third preferred embodiment;

FIGS. 33a–33d are various aberration graphs at a photographic magnification of $-1/30$ at a maximum telephoto state according to a third preferred embodiment;

FIG. 38 is a schematic drawing showing a relationship between a lateral magnification βa of a shift lens group and a lateral magnification βb of a lens group that is positioned to an image side of the shift lens group;

FIGS. 41a–41d are various aberration graphs for an infinite focus state at a maximum wide-angle state for the fourth preferred embodiment;

FIGS. 42a–42d are various aberration graphs for an infinite focus state at an intermediate focal length state for the fourth preferred embodiment;

FIGS. 43a–43d are various aberration graphs at an infinite focus state at a maximum telephoto state for the fourth preferred embodiment;

FIGS. 45a–45d are various aberration graphs for a photographic magnification of $-1/30$ at an intermediate focal length state for the fourth preferred embodiment;

FIGS. 46a–46d are various aberration graphs for a photographic magnification of $-1/30$ at a maximum telephoto state for the fourth preferred embodiment;

FIGS. 51a–51d are various aberration graphs for an infinite focus state at a maximum wide-angle state of a fifth preferred embodiment;

FIGS. 52a–52d are various aberration graphs for an infinite focus state at an intermediate focal length state of a fifth preferred embodiment;

FIGS. 53a–53d are various aberration graphs for an infinite focus state at a maximum telephoto state of a fifth preferred embodiment;

FIGS. 54a–54d various aberration graphs for a photographic magnification of $-1/30$ at a maximum wide-angle state of a fifth preferred embodiment;

FIGS. 55a–55d are various aberration graphs for a photographic magnification of $-1/30$ at a intermediate focal length state of a fifth preferred embodiment;

FIGS. 56a–56d are various aberration graphs for a photographic magnification of $-1/30$ at a maximum telephoto state of a fifth preferred embodiment;

FIGS. 61a–61d are various aberration graphs for an infinite focus state at a maximum wide-angle state according to a sixth preferred embodiment;

FIGS. 62a–62d are various aberration graphs for an infinite focus state at an intermediate focal length state according to a sixth preferred embodiment;

FIGS. 63a–63d are various aberration graphs for an infinite focus state at a maximum telephoto state according to a sixth preferred embodiment;

FIGS. 64a–64d are various aberration graphs for a photographic magnification of $-1/30$ at a maximum wide-angle state according to a sixth preferred embodiment;

FIGS. 65a–65d are various aberration graphs for a photographic magnification of $-1/30$ at an intermediate focal length state according to a sixth preferred embodiment;

FIGS. 66a–66d are various aberration graphs for a photographic magnification of –1/30 at a maximum telephoto state according to a sixth preferred embodiment;

FIGS. 71a–71d are various aberration graphs for an infinite focus state at a maximum wide-angle state according to a seventh preferred embodiment;

FIGS. 72a–72d are various aberration graphs for an infinite focus state at a first intermediate focal length state according to a seventh preferred embodiment;

FIGS. 73a–73d are various aberration graphs for an infinite focus state at a second intermediate focal length state according to a seventh preferred embodiment;

FIGS. 74a–74d are various aberration graphs for an infinite focus state at a maximum telephoto state according to a seventh preferred embodiment;

FIGS. 75a–75d are various aberration graphs for a photographic magnification of –1/30 at a maximum wide-angle state according to a seventh preferred embodiment;

FIGS. 76a–76d are various aberration graph for a photographic magnification of –1/30 at a first intermediate focal length state according to a seventh preferred embodiment;

FIGS. 77a–77d are various aberration graphs for a photographic magnification of –1/30 at a second intermediate focal length state according to a seventh preferred embodiment;

FIGS. 78a–78d are various aberration graphs for a photographic magnification of –1/30 at a maximum telephoto state according to a seventh preferred embodiment;

FIGS. 84a–84d are various aberration graphs for an infinite focus state at a maximum wide-angle state according to an eighth preferred embodiment;

FIGS. 85a–85d are various aberration graphs for an infinite focus state at a first intermediate focal length state according to an eighth preferred embodiment;

FIGS. 86a–86d are various aberration graphs for an infinite focus state at a second intermediate focal length state according to an eighth preferred embodiment;

FIGS. 87a–87d are various aberration graphs for an infinite focus state at a maximum telephoto state according to an eighth preferred embodiment;

FIGS. 88a–88d are various aberration graphs for a photographic magnification of –1/30 at the maximum wide-angle state according to an eighth preferred embodiment.

FIGS. 89a–89d are various aberration graphs for a photographic magnification of –1/30 at a first intermediate focal length state according to an eighth preferred embodiment;

FIGS. 90a–90d are various aberration graphs for a photographic magnification of –1/30 at a second intermediate focal length state according to an eighth preferred embodiment;

FIGS. 91a–91d are various aberration graphs for a photographic magnification of –1/30 at a maximum telephoto state according to an eighth preferred embodiment;

FIGS. 97a–97d are various aberration graphs for an infinite focus state at a maximum wide-angle state according to a ninth preferred embodiment;

FIGS. 98a–98d are various aberration graphs for an infinite focus state at a first intermediate focal length state according to a ninth preferred embodiment;

FIGS. 99a–99d are various aberration graphs for an infinite focus state at a second intermediate focal length state according to a ninth preferred embodiment;

FIGS. 100a–100d are various aberration graphs for an infinite focus state at a maximum telephoto state according to a ninth preferred embodiment;

FIGS. 101a–101d are various aberration graphs for a photographic magnification of –1/30 at a maximum wide-angle state according to a ninth preferred embodiment;

FIGS. 102a–102d are various aberration graphs for a photographic magnification of –1/30 at a first intermediate focal length state according to a ninth preferred embodiment;

FIGS. 103a–103d are various aberration graphs for a photographic magnification of –1/30 at a second intermediate focal length state according to a ninth preferred embodiment;

FIGS. 104a–104d are various aberration graphs for a photographic magnification of –1/30 at a maximum telephoto state according to a ninth preferred embodiment;

FIG. 10B is a drawing of coma aberrations during image shift for an infinite focus state at the maximum telephoto state according to a ninth preferred embodiment.

DETAILED DESCRIPTION OF PREFERRED EMBODIMENTS

Figure 1:
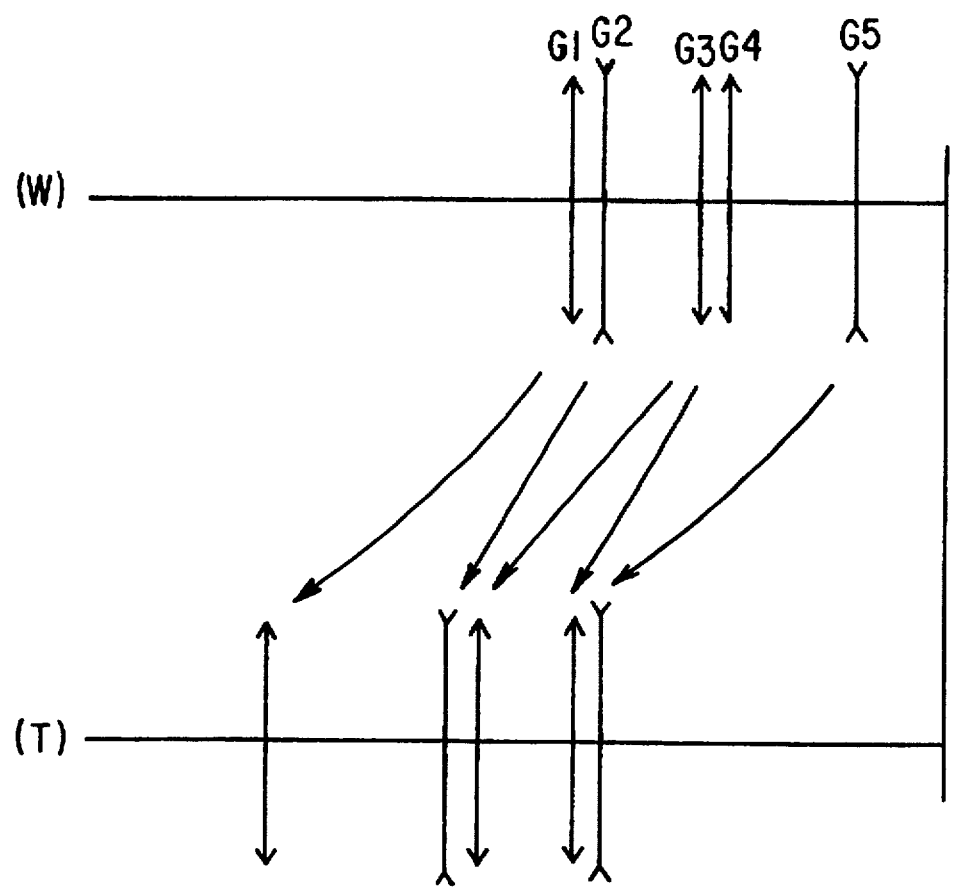
FIG. 1 is a schematic drawing showing the refractive power distribution in a zoom lens system for the first-third preferred embodiments of the invention, which also shows the movement of each lens group during zooming from a maximum wide-angle state (W) to a maximum telephoto state (T)

The lens system or zoom lens system according to disclosed embodiments of the invention is compact so that control of the shift lens group is relatively easy. The lens system meets conditions (A) and (B):

(A) A lateral magnification $\beta a$ of a shift lens group at a maximum telephoto state and a lateral magnification $\beta b$ of a lens group positioned to an image side of the shift lens group are set to appropriate values; and (B) A combined focal length of lens groups positioned to an object side of the shift lens group is set to an appropriate value.

When considering the lens system rotating about its principal point position, an image shake amount $\Delta'$ with respect to a lens system shake angle $\epsilon$ is given by equation (b):

$$\Delta' = f \cdot \tan \epsilon \qquad (b)$$

where, f is a focal length of the entire lens system.

When the shake angle $\epsilon$ is relatively small, it is possible to make an approximation $\tan \epsilon \approx \epsilon$. Consequently, the image shake amount $\Delta'$ can be expressed by equation (c):

$$\Delta' = f \cdot \epsilon \qquad (c)$$

When the image shake amount $\Delta'$ is relatively small, it is not possible to distinguish image blur on a photograph. However, when the image shake amount $\Delta'$ becomes relatively large, it is possible to distinguish image blur in the resulting photograph.

It is relatively easy for a shaking to be detectible in the photograph, even at a small deviation angle, because a focal length f of the entire lens system becomes large at a maximum telephoto state. Accordingly, the lens system shake angle $\epsilon$, which is created by a camera shake or the like, is constant. Thus, the image shake amount created at a maximum telephoto state is larger than an image shake amount created at a maximum wide-angle state. In other words, it is important to form the system to correct a larger image shake amount at a maximum telephoto state than at a maximum wide-angle state.

The image shift amount $\Delta$ relative to a displacement $\delta$ in a direction perpendicular to an optical axis of a portion of the lens groups comprising the lens system, i.e., a shift lens group, is expressed by equation (a).

$$\Delta = \delta \times (1 - \beta a) \beta b \qquad (a)$$

In order to offset the image shift amount $\Delta'$ caused by a camera shake from an image shift amount $\Delta$ caused by movement of the shift lens group, and to also correct fluctuations in the image position caused by a camera shake, a relationship indicated by equation (d) should be satisfied:

$$\Delta + \Delta' = 0 \qquad (d)$$

Substituting equations (a) and (c) into equation (d), the relationship of equation (e) can be obtained.

$$\delta = -\{f/(1-\beta a)\beta b\} \epsilon \qquad (e)$$

However, when the displacement of the shift lens group becomes large, the amount of work needed to move the shift lens group becomes large. Consequently, a driving mechanism becomes larger and more complex.

Accordingly, it is important to reduce the shift lens group's displacement. When, at a maximum telephoto state, $(1-\beta a)\beta b$, is not relatively large, it is impossible to make the driving mechanism compact and simple. Conversely, when $(1-\beta a)\beta b$ is relatively large, image blur caused by control errors in the shift lens group becomes large. Accordingly, it is desirable to set $(1-\beta a)\beta b$ in equation (e) to an appropriate value (indicated by condition (1)). Conversely, conditions for making the lens system compact, when $(1-\beta a)\beta b$ is at an appropriate value, will now be discussed.

FIG. 38 illustrates a relationship between a lateral magnification $\beta a$ of the shift lens group and a lateral magnification $\beta b$ of lens group positioned to an image side of the shift lens group. In FIG. 38, (A) illustrates where $-1 < 1/\beta b < 1$ with $-1 < 1/\beta a < 1$; (B) illustrates where $-1 < 1/\beta b < 1$ with $-1 < \beta a < 1$; and (C) illustrates where $-1 < \beta b < 1$ with $-1 < \beta a < 1$. In (C) where $-1 < \beta b < 1$ with $-1 < \beta a < 1$, it is impossible to make $(1-\beta a)\beta b$ large. In (A) where $-1 < 1/\beta b < 1$ with $-1 < 1/\beta a < 1$, an image caused by the shift lens group is reduced when a refractive power of a lens group on an image side of the shift lens group has a negative refractive power. Consequently, it is impossible to make the lens system compact. Even when the refractive power of the lens group to the image side of the shift lens group has a positive refractive power, it is difficult to shorten the total length of the lens system at a maximum telephoto state.

However, in a telephoto type lens system shortening of the lens system's total length is possible by placing a negative lens group closest to an image plane and providing a positive refractive power to the lens group positioned to the object side of the negative lens group. Also, it is possible to shorten the total length of the lens system by placing a negative lens group closest to the image side.

Accordingly, a negative lens group is placed to an image side of the shift lens group, a shift lens group has a positive refractive power, and a lens group to the image side of the shift lens group has a negative refractive power. Therefore, it is possible to shorten the lens system total length by enlarging the image by the shift lens group. A relationship between a lateral magnification $\beta a$ of the shift lens group and lateral magnification $\beta b$ of the lens group positioned to the image side of the shift lens group corresponds to condition (B) with $0 < 1/\beta b < 1$.

In the zoom lens system, the shift lens group has a positive refractive power. The refractive powers of lens groups positioned to an object side of the shift lens group provide a lateral magnification $\beta a$ of the shift lens group as $-1 < 1/\beta a < 1$. Further, a focal length of a lens group positioned to the image side of the shift lens group has a negative refractive power so its lateral magnification $\beta b$ is $0 < 1/\beta b < 1$. Thus, it is possible to effectively control the shift lens group.

In particular, by making refractive powers of lens groups positioned to an object side of the shift lens group with weak negative refractive powers, i.e. making a lateral magnification of the shift lens group negative, $(1-\beta a)\beta b$ is enlarged. Thus, the shift lens group displacement needed to shift an image by a predetermined amount is reduced.

When refractive powers of lens groups positioned to an object side of the shift lens group are stronger negative, $(1-\beta a)\beta b$ becomes larger. Consequently, it is possible to further reduce a shift lens group displacement by a predetermined amount. However, because the lens system's total length becomes larger, it is desirable to provide refractive powers of lens groups positioned to an object side of the shift lens group as indicated in condition (B).

Condition equations for the zoom lens system according to the invention will now be described. The zooming lens optical system satisfies conditions (1) and (2):

$$2.5 < (1-\beta at)\beta bt < 5 \quad (1)$$

$$-0.1 < ft/fct < -0.005 \quad (2)$$

where $\beta at$ is a lateral magnification of a shift lens group at a maximum telephoto state, $\beta bt$ is a lateral magnification at a maximum telephoto state of a lens group positioned to an image side of the shift lens group, ft is a focal length of the entire lens system at a maximum telephoto state, and fct is a combined focal length at a maximum telephoto state of lens groups positioned to an object side of the shift lens group. Conditions (1) and (2) set ranges appropriate for conditions (A) and (B).

When an upper limit of condition (1) is exceeded, an image shifts by a large amount, even if a shift lens group moves only a very small amount. Consequently, positional control of the shift lens group becomes difficult. Conversely, when a lower limit of condition (1) is breached, displacement of the shift lens group to shift the image by a predetermined amount becomes extremely large. As a result, a driving mechanism for the lens becomes large. Consequently, it is impossible to make a compact lens system.

When the upper limit in condition (2) is exceeded, refractive powers of lens groups positioned to an object side of the shift lens group become large in a positive direction. The value of $(1-\beta a)\beta b$ becomes small. As a result, displacement of the shift lens group to shift the image by a predetermined amount becomes large. This is undesirable. When the lower limit in condition (2) is breached, refractive powers of lens groups positioned to an object side of the shift lens group become large in a negative direction. Thus, it is difficult to shorten the lens system total length.

Shortening the total length of the lens system at a maximum telephoto state makes the lens system compact. However, when back focus becomes too short at a maximum wide-angle state, off-axis light rays, which pass through a negative lens group positioned closest to an image plane, become separated from an optical axis of the zoom lens system. This causes a lens diameter to become very large. Accordingly, it is desirable for refractive powers of lens groups positioned to an object side of the shift lens group to become larger negatively at a maximum wide-angle state than at a maximum telephoto state.

Thus, it is desirable that the zoom lens system satisfy condition (3):

$$-0.3 < fw/fcw < -0.02 \quad (3)$$

where fw is a focal length of the entire lens system at a maximum wide-angle state and fcw is a combined focal length at a maximum wide-angle state of lens groups positioned to an object side of the shift lens group.

Condition (3) defines focal lengths at a maximum wide-angle state of lens groups positioned to the object side of the shift lens group. When the upper limit in condition (3) is exceeded, back focus at a maximum wide-angle state becomes too short. This causes a lens diameter to become large. Conversely, when a lower limit in condition (3) is breached, back focus at a maximum telephoto state becomes large. This causes the lens system's total length to become large, which is not desirable.

Additionally, a lens group that is fixed with respect to an optical axis during image shifting is positioned on the image side of the shift lens group of a fourth lens group.

Further, the zoom lens system should satisfy condition (4):

$$0.38 < fa/(fw \cdot ft)^{1/2} < 0.7 \quad (4)$$

where fa is a focal length of the shift lens group. Condition (4) defines a focal length of the shift lens group. When the upper limit in condition (4) is exceeded, it is difficult to simultaneously achieve a high zoom ratio while setting both a lateral magnification of the shift lens group and lateral magnification of a lens group positioned to an image side of the shift lens group, at values appropriate for image shifting.

Conversely, when the lower limit in condition (4) is breached, it is difficult to effectively suppress spherical aberrations created if the shift lens group does not comprise a lens that is appropriate for larger aperture ratios. Further, it is difficult to effectively suppress off-axis aberration fluctuations created during image shifting. Additionally, it is difficult to obtain good optical performance during image shifting. Thus, a number of lens elements must be increased.

When a shift lens group is positioned farthest to the object side, a lateral magnification $\beta a$ of the shift lens group is 0. Accordingly, $(1-\beta a)\beta b$ of equation (a) becomes $\beta b$, and a ratio between a coefficient at a maximum wide-angle state and coefficient at a maximum telephoto state will match a zoom ratio.

To make a lens with a high zooming capability, displacement of the shift lens group to shift the image by a predetermined amount is much smaller at a maximum telephoto state than at a maximum wide-angle state. Furthermore, positional preciseness of a shift lens group along a direction perpendicular to the optical axis changes greatly due to zooming, so positional control of the shift lens group becomes difficult.

Accordingly, at least one lens group should be positioned to an object side of the shift lens group. Displacement of the shift lens group needed to shift the image by a predetermined amount and changes due to zooming are reduced by reducing changes in coefficient component $(1-\beta a)\beta b$ on the right hand side of equation (a) at a maximum wide-angle state, and a maximum telephoto state.

In particular, the zoom lens system should satisfy condition (5), to provide an image shift with a small displacement of the shift lens group. Condition (5) also permits easy controlling of a position of the shift lens group.

$$0.3 < |\{(1-\beta at)\beta bt\}/\{(1-\beta aw)\beta bw\}|/(ft/fw) < 0.75 \quad (5)$$

When the upper limit in equation (5) is exceeded, positional control of the shift lens group is difficult. Conversely, when the lower limit in equation (5) is breached, a zooming caused by lens groups that are positioned to an object side of the shift lens group, becomes large. Thus, it is impossible to equalize change in the lateral mangification of each lens group rates for zooming for the lenses that comprise the zoom lens system. It is difficult to boost performance with a small number of lens components.

It is desirable to form a lens group that contains the shift lens group from a plurality of component lens groups. Further, it is desirable to shift the image by moving a component lens group positioned to an object side of the component lens group closest to the image side in a direction substantially perpendicular to the optical axis.

In the shift lens group, normally aberration correction states are needed so satisfactory imaging performance can be obtained during image shifting. Specifically, it is required that: (I) spherical aberrations and a sine condition are corrected; and (II) an appropriate Petzval sum be obtained.

The correction of a spherical aberration and sine condition in (I) is a condition used to suppress eccentric coma aberrations, which are created at a center of a picture plane when a shift lens group is moved and the image is shifted. In addition, obtaining an appropriate Petzval sum (II) is used to suppress image plane warping at the picture plane's periphery when a shift lens group is moved and the image is shifted.

When one entire lens group is the shift lens group, an aberration correction state needed during zooming and an aberration correction state needed to suppress deterioration of performance during image shifting, do not necessarily match. In particular, it is difficult to correct a large shake while maintaining high optical performance.

In embodiments of the invention, one lens group is formed of a plurality of component lens sub groups. A portion of the lens sub group is used as a shift lens group. Thus, it is possible to correct larger blurs while maintaining a high optical performance.

In particular, a component lens group positioned at an object side of the component lens group should be positioned closest to the image side. This component lens group is used as a shift lens group. It is possible to set a lateral magnification of the shift lens group and lateral magnification of the lens group positioned to the image side of the shift lens group to appropriate values.

In particular, it is possible to obtain satisfactory imaging performance, even during image shifting, by satisfying condition (6):

$$Db/fw < 0.2 \quad (6)$$

where Db is a distance along an optical axis between an aperture diaphragm and a surface of the shift lens group farthest from the aperture diaphragm.

When an upper limit in condition (6) is exceeded, a height difference between off-axis light rays and on-axis light rays that pass through the shift lens group becomes large. Consequently, it is difficult to adequately suppress fluctuations created by aberrations when the shift lens group is moved if a shift lens group does not have a large aperture ratio.

It is also possible to resolve the above problems by forming the shift lens group with a larger number of lenses. However, this is not desirable because the lens system become larger and a driving mechanism, which drives the shift lens group, becomes more complex.

It is possible to provide a zoom lens system that is capable of the image shifting with a shake detection system for detecting shaking of the zoom lens system and a lens driving mechanism to prevent photography errors caused by image blur resulting from camera blurs. Further, it is possible to make a vibration reduction optical system by correcting the image blurs or fluctuations in image position caused by shaking of the optical system that has been detected by the shake detection system, by causing the image to shift through decentering. A decentered lens group may be all or a portion of one lens group out of the lens groups that comprise the zoom lens system.

It is possible to focus by moving a portion of lens groups that comprise the lens system along an optical axis of the zoom lens system. In particular, focussing can be accomplished by moving a lens group positioned to an object side of the shift lens group and to the image side of a first lens group along the optical axis.

A first lens group tends to have a large lens diameter, as this lens group is positioned on an object side in the lens system of the zoom lens system. Thus, an associated driving mechanism becomes complex. Additionally, when focussing using a lens group positioned on an image side of the shift lens group, a lateral magnification $\beta a$ of the shift lens group changes based on an object's position. Thus, control becomes difficult.

Hereafter, preferred embodiments of the invention will be described with reference to the attached drawings. FIG. 1 is a drawing illustrating refractive power distribution in a zoom lens system of the first three embodiments and movement of each lens group when zooming is from a maximum wide-angle state (W) to a maximum telephoto state (T).

As shown in FIG. 1, a zoom lens system comprises, in order from the object side: a first lens group G1 having a positive refractive power; a second lens group G2 having a negative refractive power; a third lens group G3 having a positive refractive power; a fourth lens group G4 having a positive refractive power and a fifth lens group G5 having a negative refractive power.

Each lens group moves toward an object side during zooming from a maximum wide-angle state to a maximum telephoto state so that a distance between the first lens group G1 and the second lens group G2 increases; the distance between the second lens group G2 and the third lens group G3 decreases; the distance between the third lens group G3 and the fourth lens group G4 increases; and the distance between the fourth lens group G4 and the fifth lens group G5 decreases. During zooming, the second lens group G2 and the fourth lens group G4 move with each other.

In each of the preferred embodiments, aspherical surfaces are expressed by equation (f), where y denotes a height in a direction perpendicular to an optical axis of the zoom lens system, S(y) denotes displacement along optical axis at height y, R denotes a reference radius of curvature, κ denotes a conical coefficient, and Cn denotes the aspherical surface coefficient of nth degree.

$$S(y)=(y^2/R)/[1+(1-\kappa \cdot y^2/R^2)^{1/2}]+C_4 \cdot y^4+C_6 \cdot y^6+C_8 \cdot y^8+C_{10} \cdot y^{10}+ \quad (f)$$

In each preferred embodiment, aspherical surfaces are marked with (*) to the right of the surface number.

Figure 2:
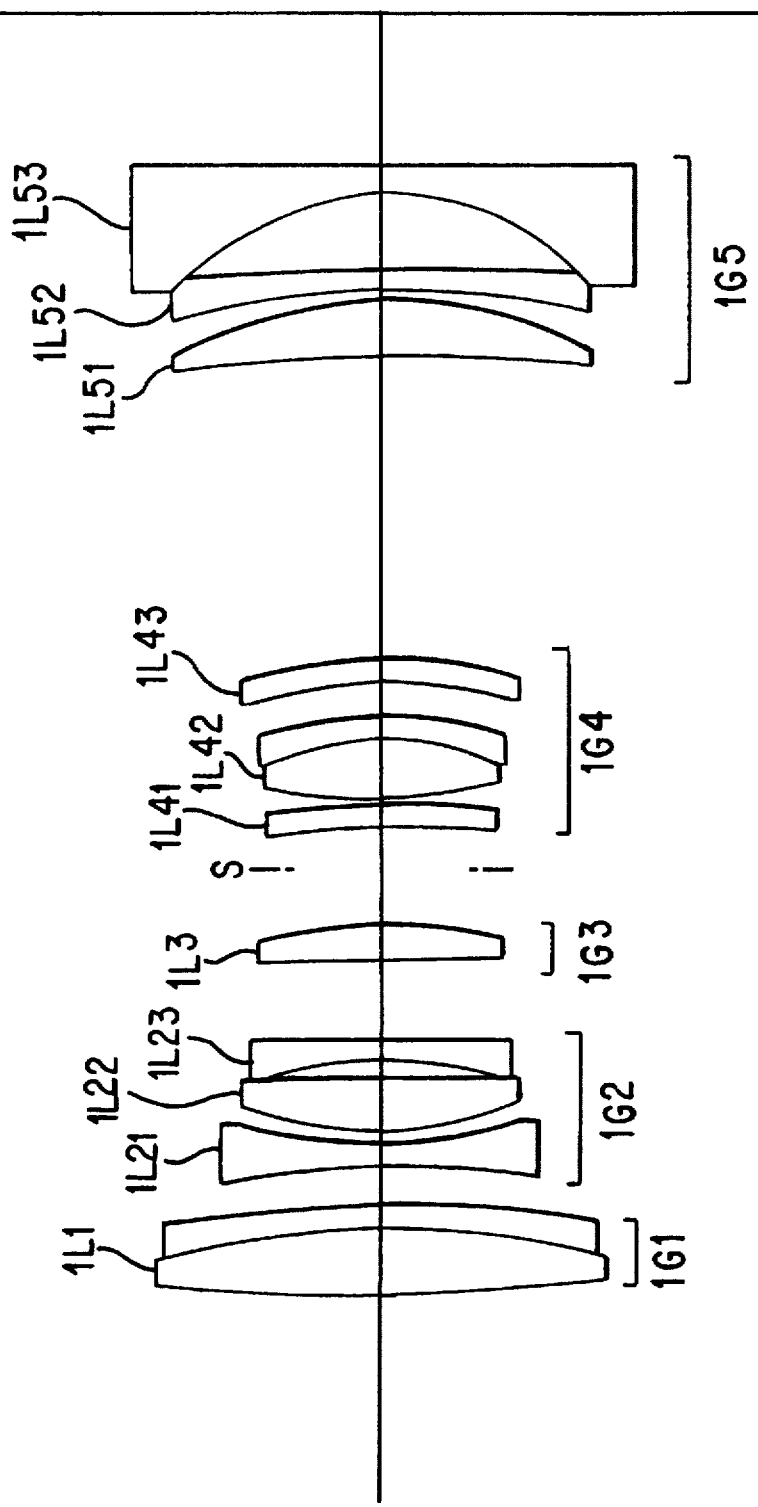
FIG. 2 is a side schematic drawing showing a lens structure for the zoom lens system according to a first preferred embodiment of the invention.

FIG. 2 is a side schematic drawing illustrating the lens structure for a zoom lens system according to a first preferred embodiment of the invention. The zoom lens system of FIG. 2 comprises, in order from the object side, a first lens group 1G1, comprising a positive cemented lens 1L1 comprising a biconvex lens and a negative meniscus lens with a concave surface facing the object side; a second lens group 1G2 formed with a biconcave lens 1L21, a biconvex lens 1L22 and a negative meniscus lens 1L23 with a concave surface facing the object side; a third lens group 1G3 comprising a biconvex lens 1L3; a fourth lens group 1G4 comprising a negative meniscus lens 1L41 with a concave surface facing the object side, a positive cemented lens 1L42 comprising a biconvex lens and a negative meniscus lens with a concave surface facing the object side, and a positive meniscus lens 1L43 with a concave surface facing the object side; and a fifth lens group 1G5 comprising a positive meniscus lens 1L51 with a concave surface facing the object side, a negative meniscus lens 1L52 with a concave surface facing the object side, and a negative meniscus lens 1L53 with a concave surface facing the object side.

Additionally, an aperture diaphragm S is positioned between the third lens group 1G3 and fourth lens group 1G4. The aperture diaphragm S moves integrally with the fourth lens group 1G4 during zooming from a maximum wide-angle state to a maximum telephoto state.

FIG. 2 illustrates a positional relationship for lens groups at a maximum wide-angle state. These lens groups move during zooming to a maximum telephoto state on the optical axis along the zoom loci indicated by arrows in FIG. 1. Focussing is accomplished by moving the third lens group 1G3 along the optical axis.

Further, fluctuations in the image position caused by camera shaking are corrected by shifting the image by moving the positive cemented lens 1L42 of the fourth lens group 1G4 in a direction substantially perpendicular to the optical axis.

The values of various dimensions of the first preferred embodiment are listed in Table 1. In Table 1, f denotes a focal length, FNO denotes F-number, $\bar{\omega}$ denotes a half field angle, Bf denotes a back focus and D0 denotes distance along the optical axis between an object and a surface on the object side. Moreover, the surface number indicates an order of the lens surfaces from an object side on the direction that light rays travel. Refractive indices and Abbe numbers are the values corresponding to a d-line ($\lambda$=587.6 nm).

TABLE 1 f = 39.02~75.70~184.29
FNO = 4.05~6.38~11.00
ω = 29.43~15.43~6.54°

| Surface Number | Radius of Curvature | Intersurface Distance | Refractive Index | Abbe Number |
|---|---|---|---|---|
| 1 | 73.7417 | 4.039 | 1.48749 | 70.45 |
| 2 | −41.5811 | 1.388 | 1.86074 | 23.01 |
| 3 | −63.8257 | (D3 = variable) | | |
| 4 | −41.0313 | 1.136 | 1.79968 | 45.37 |
| 5 | 21.9975 | 0.884 | | |
| 6 | 18.8960 | 3.155 | 1.78472 | 25.80 |
| 7 | −125.8654 | 1.010 | | |
| 8 | −21.0597 | 1.136 | 1.79668 | 45.37 |
| 9 | −222.7733 | (D9 = variable) | | |
| 10 | 440.0524 | 2.146 | 1.51680 | 64.10 |
| 11 | −20.2051 | (D11 = variable) | | |
| 12 | ∞ | 2.272 | (aperture diaphragm S) | |
| 13* | −44.7010 | 1.262 | 1.58518 | 30.24 |
| 14 | −65.6383 | 0.379 | | |
| 15 | 27.9565 | 3.408 | 1.48749 | 70.45 |
| 16 | −15.0304 | 1.262 | 1.86074 | 23.01 |
| 17 | −24.8801 | 2.019 | | |
| 18 | −26.1571 | 1.641 | 1.49108 | 57.57 |
| 19 | −21.9891 | (D19 = variable) | | |
| 20 | −63.2306 | 3.155 | 1.80458 | 25.50 |
| 21 | −22.5326 | 0.252 | | |
| 22 | −53.6801 | 1.262 | 1.79668 | 45.37 |
| 23 | −215.3584 | 4.291 | | |
| 24 | −15.1445 | 1.515 | 1.77279 | 49.45 |
| 25 | −832.1512 | (Bf) | | |

Aspherical Surface Data
(surface 13)

| | |
|---|---|
| R = | −44.7010 |
| κ = | 1.000 |
| $C_4$ = | −2.11756 × 10$^{-5}$ |
| $C_6$ = | −5.38090 × 10$^{-8}$ |
| $C_8$ = | −1.35276 × 10$^{-9}$ |
| $C_{10}$ = | 9.45620 × 10$^{-12}$ |

Variable Space for Zooming

| f | 38.9904 | 75.3947 | 154.0058 |
|---|---|---|---|
| D3 | 2.1456 | 12.6142 | 25.1214 |
| D9 | 4.4282 | 2.4447 | 1.2621 |
| D11 | 3.1446 | 5.1281 | 6.3107 |
| D19 | 16.8858 | 8.9850 | 1.8869 |
| Bf | 9.1062 | 30.8789 | 70.4949 |

TABLE 1-continued

Focussing Displacement of Third Lens Group 1G3 at Photographic Magnification of − 1/30

| focal length f | 38.9904 | 75.3947 | 154.0058 |
|---|---|---|---|
| D0 | 1121.5052 | 2184.8579 | 4481.6968 |
| displacement | 1.0470 | 0.7862 | 0.6890 |

Here, the sign of the displacement is positive for movement from the object side toward the image side
Displacement of the Positive Cemented Lens 1L42 During an Image Shift of 0.01 |rad|

| focal length f | 38.9904 | 75.3947 | 154.0058 |
|---|---|---|---|
| lens displacement | 0.3135 | 0.3806 | 0.4861 |
| image shift amount | 0.3899 | 0.7539 | 1.5401 |

Values Corresponding to Conditions

| | |
|---|---|
| βat = | −0.0103 |
| βbt = | 3.1354 |
| fct = | −4755.573 |
| fcw = | −526.648 |
| fa = | 37.092 |
| βaw = | −0.0633 |
| βbw = | 1.1699 |
| (1) (1 − βat) · βbt = | 3.168 |
| (2) ft/fct = | −0.0324 |
| (3) fw/fcw = | −0.0740 |
| (4) fa/(fw · ft)$^{1/2}$ = | 0.479 |
| (5) {|(1 − βat) βbt|/|(1 − βaw) βbw|}/(ft/fw) = | 0.645 |
| (6) Db/fw = | 0.100 |

FIGS. 3a–8d are various aberration graphs for d-line ($\lambda$=587.6 nm) in the first preferred embodiment FIGS. 3a–3d show various aberration graphs for an infinite focus state at a maximum wide-angle state (shortest focal length state). FIGS. 4a–4d show various aberration graphs for an infinite focus state at an intermediate focal length state. FIGS. 5a–5d show various aberration graphs for an infinite focus state at a maximum telephoto state or longest focal length state. FIGS. 6a–6d are aberration graphs at a photographic magnification of −1/30 at a maximum wide-angle state. FIGS. 7a–7d are aberration graphs at a photographic magnification of −1/30 at an intermediate focal length state. FIGS. 8a–8d are aberration graphs at a photographic magnification of −1/30 at a maximum telephoto state.

Figure 9:
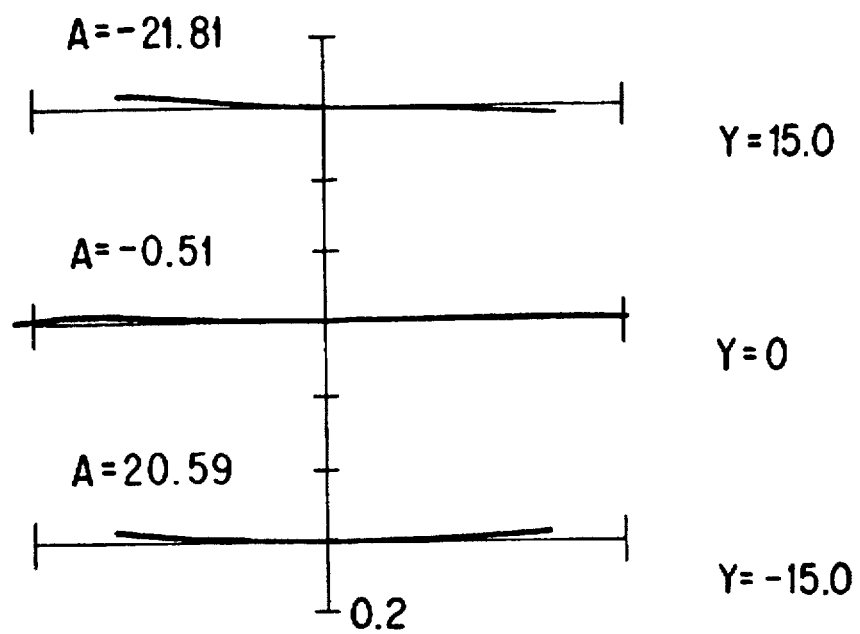
FIG. 9 is a drawing of coma aberrations at an infinite focus state at a maximum wide-angle state according to a first preferred embodiment.
Figure 10:
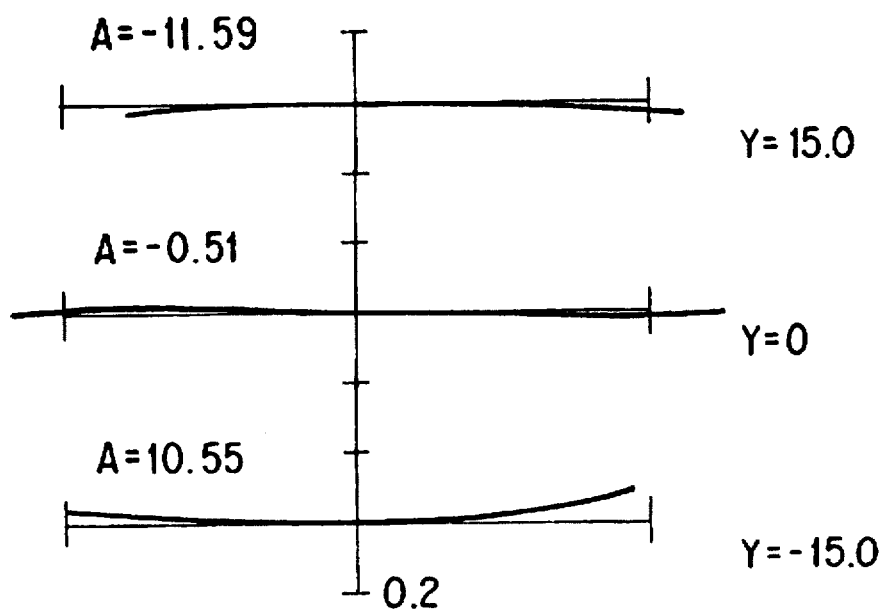
FIG. 10 is a drawing of coma aberrations at an infinite focus state at an intermediate focal length state according to a first preferred embodiment.
Figure 11:
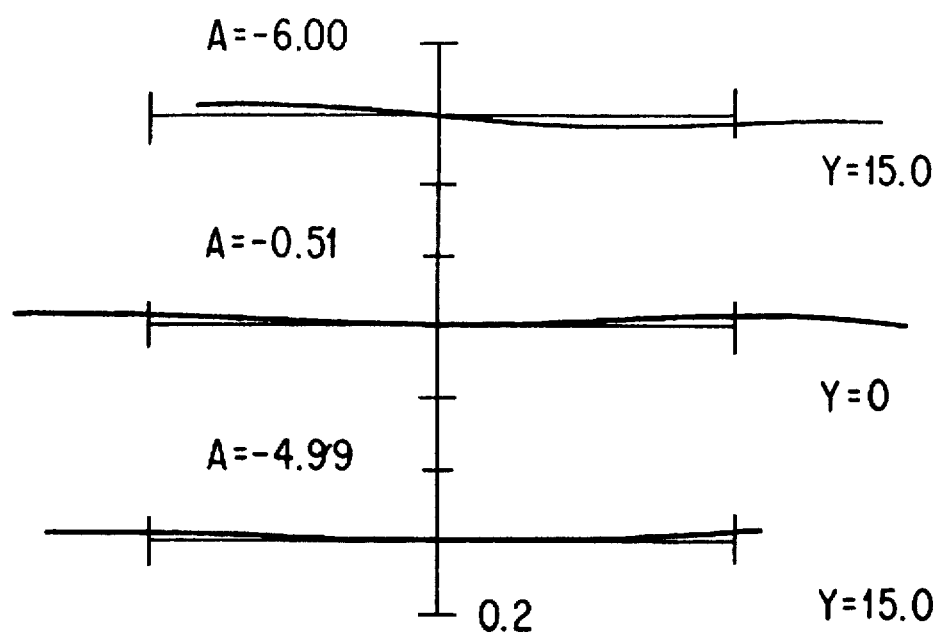
FIG. 11 is a drawing of coma aberrations at an infinite focus state at a maximum telephoto state according to a first preferred embodiment.

Further, FIGS. 9–11 are drawings of coma aberrations in the first preferred embodiment when the image is shifted by 0.01 rad (radian) with respect to the optical axis. FIG. 9 is a drawing of a coma aberration at an infinite focus state at a medium wide-angle state. FIG. 10 is a drawing of a coma aberration at an infinite focus state at an intermediate focal length state. FIG. 11 is a drawing of a coma aberration at an infinite focus state at the maximum telephoto state.

FIGS. 9–11 show coma aberrations at image heights Y=15.0, 0, −15.0 when the positive cemented lens 1L42 is caused to move in the positive direction of the image height Y.

In each aberration diagram for this, and all preferred embodiments, FNO denotes F-number, NA denotes a numerical aperture, Y denotes an image height, A denotes a half field angle with respect to each image height, and H denotes an object height with respect to an image height.

Additionally, in the aberration diagrams showing astigmatism for this, and all other preferred embodiments, the solid line represents a sagittal image plane and the broken line represents a meridional image plane. In the aberration diagram describing spherical aberration, a broken line represents a sine condition. As each aberration diagram clearly shows, the various aberrations are favorably corrected at each object distance state and each focal length state even during image shifting.

Figure 12:
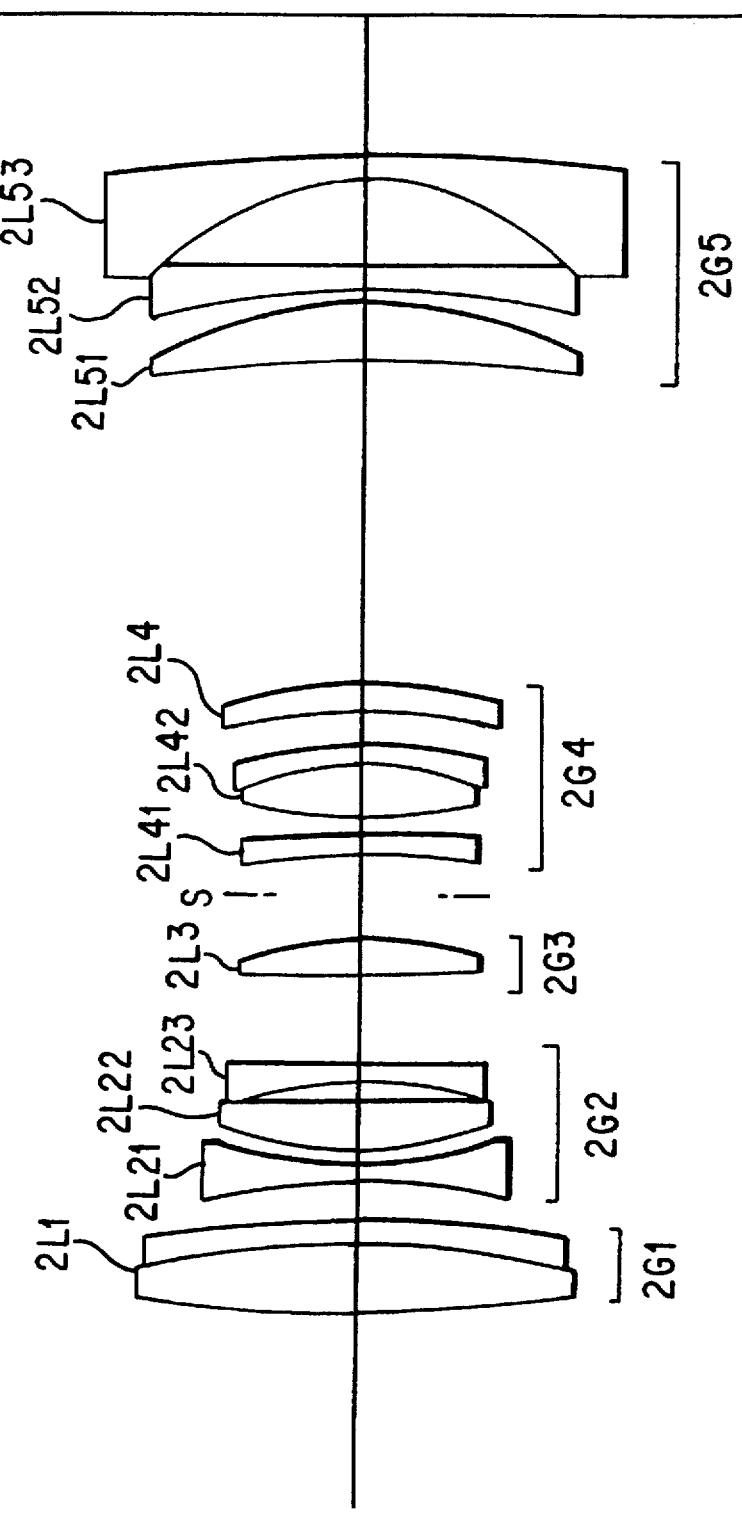
FIG. 12 is a side schematic drawing showing a lens structure for the zoom lens system of a second preferred embodiment of the invention.
Figures 20A, 20B, 20C, 20D:
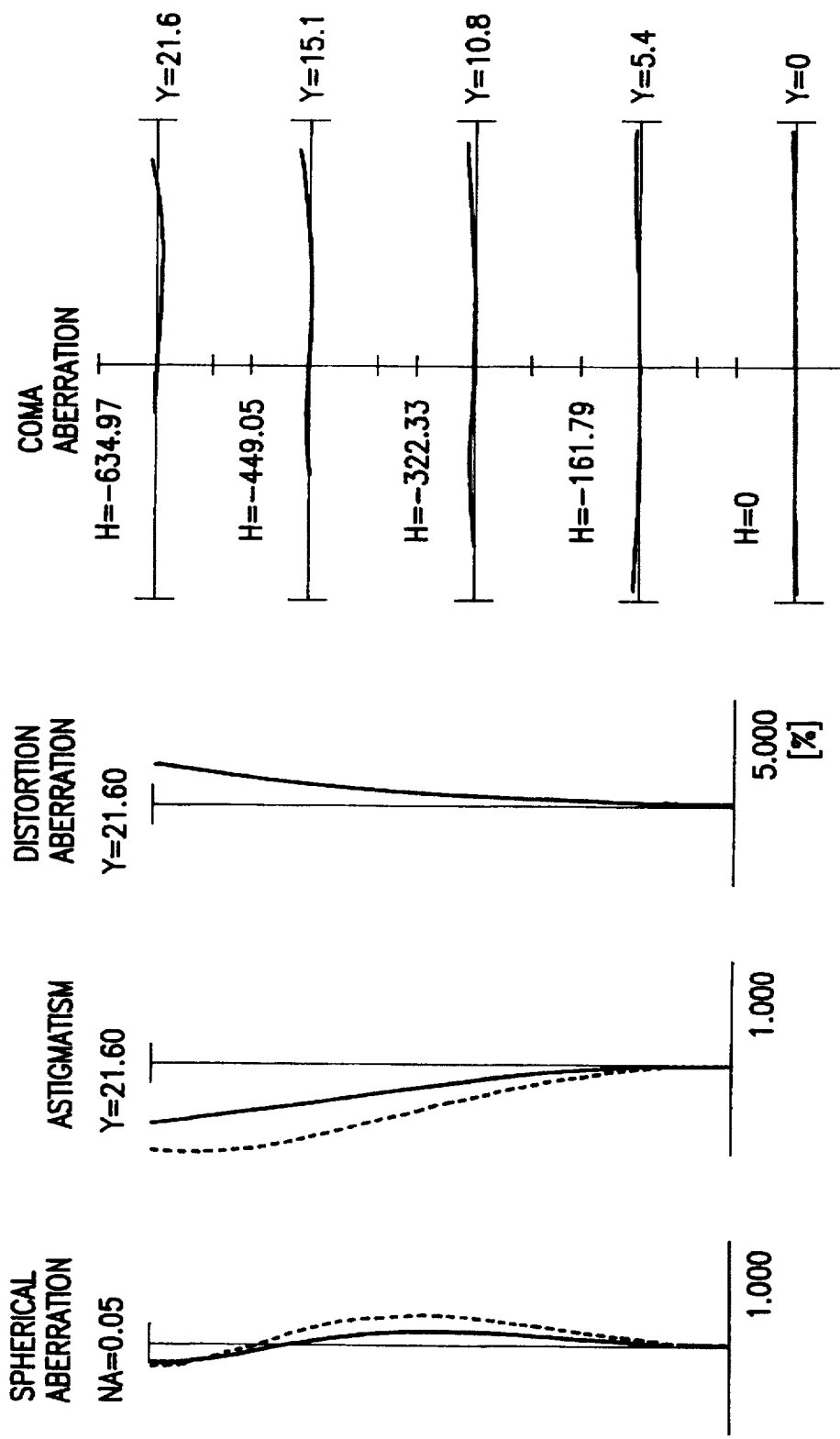
FIGS. 20a–20d are various aberration graphs at a photographic magnification of −1/30 at a maximum telephoto state according to a second preferred embodiment.

FIG. 12 is a side schematic drawing showing a lens structure for a zoom lens system according to a second preferred embodiment of the present invention.

The zoom lens system of FIG. 12 comprises, in the following order from the object side, a first lens group 2G1 comprising a positive cemented lens 2L1 comprising a biconvex lens and a negative meniscus lens with the concave surface facing the object side; a second lens group 2G2 comprising a biconcave lens 2L21, a biconvex lens 2L22 and a biconcave lens 2L23; a third lens group 2G3 comprising a biconvex lens 2L3; a fourth lens group 2G4 comprising a negative meniscus lens 2L41 with the concave surface facing the object side, a positive cemented lens 2L42 comprising a biconvex lens and a negative meniscus lens with the concave surface facing the object side, and a positive meniscus lens 2L43 with the concave surface facing the object side; and a fifth lens group 2G5 comprising a positive meniscus lens 2L51 with the concave surface facing the object side, a biconcave lens 2L52 and a negative meniscus lens 2L53 with the concave surface facing the object side.

In addition, an aperture diaphragm S is positioned between the third lens group 2G3 and fourth lens group 2G4. The aperture diaphragm moves integrally with the fourth lens group 2G4 during zooming from a maximum wide-angle state to the maximum telephoto state.

FIG. 12 shows a positional relationship of each lens group at a maximum wide-angle state. The lens groups move during zooming to a maximum telephoto state on the optical axis along the zoom loci as indicated by arrows in FIG. 1. Focussing is accomplished by moving the third lens group 2G3 along the optical axis.

Further, fluctuations in the image position caused by camera shaking are corrected by shifting the image by moving the positive cemented lens 2L42 of the fourth lens group 2G4 in a direction substantially perpendicular to the optical axis.

The values of various dimensions of the second preferred embodiment are listed in Table 2 below. In Table 2, f denotes a focal length, FNO denotes an F-number, ω denotes the half field angle, Bf denotes a back focus and D0 denotes a distance along the optical axis between the object and the surface on the object side. Moreover, the surface number indicates the order of the lens surfaces from the object side along the direction in which the light rays move, and the refractive indices and Abbe numbers are the values corresponding to a d-line (λ=587.6 nm).

TABLE 2 f = 39.00~75.72~126.21~184.70
FNO = 4.00~6.30~8.71~11.00
ω = 29.37~15.42~9.45~6.53°

| Surface Number | Radius of Curvature | Intersurface Distance | Refractive Index | Abbe Number |
|---|---|---|---|---|
| 1 | 65.2395 | 4.039 | 1.48749 | 70.41 |
| 2 | −43.6661 | 1.389 | 1.84666 | 23.83 |
| 3 | −71.1881 | (D3 = variable) | | |
| 4 | −39.3377 | 1.010 | 1.83500 | 42.97 |
| 5 | 21.9280 | 0.884 | | |
| 6 | 18.9681 | 3.029 | 1.78472 | 25.70 |
| 7 | −59.8735 | 0.757 | | |
| 8 | −21.9898 | 1.010 | 1.83500 | 42.97 |
| 9 | 2328.2941 | (D9 = variable) | | |

TABLE 2-continued

| 10 | 351.9850 | 2.146 | 1.51680 | 64.20 |
|---|---|---|---|---|
| 11 | −20.2634 | (D11 = variable) | | |
| 12 | ∞ | 2.727 | (aperture diaphragm S) | |
| 13* | −40.8344 | 1.262 | 1.58518 | 30.24 |
| 14 | −63.1068 | 0.884 | | |
| 15 | 29.7540 | 3.155 | 1.48749 | 70.41 |
| 16 | −15.2696 | 1.010 | 1.84666 | 23.83 |
| 17 | −25.6097 | 1.767 | | |
| 18 | −34.1715 | 1.641 | 1.49108 | 57.57 |
| 19 | −25.8162 | (D19 = variable) | | |
| 20 | −91.9033 | 3.282 | 1.84666 | 23.83 |
| 21 | −25.0732 | 0.757 | | |
| 22 | −47.1652 | 1.262 | 1.83500 | 42.97 |
| 23 | 1154.6027 | 4.922 | | |
| 24 | −15.2572 | 1.515 | 1.83500 | 42.97 |
| 25 | −104.7092 | (Bf) | | |

Aspherical Surface Data
(surface 13)

$R = -40.8344$
$\kappa = 0.0032$
$C_4 = -2.09374 \times 10^{-5}$
$C_6 = -5.62266 \times 10^{-8}$
$C_8 = -3.18563 \times 10^{-10}$
$C_{10} = -7.24641 \times 10^{-12}$ Variable Space for Zooming

| f | 38.9990 | 57.2487 | 126.2058 | 184.7072 |
|---|---|---|---|---|
| D3 | 2.1456 | 13.9265 | 23.6373 | 30.4002 |
| D9 | 5.1283 | 3.3381 | 2.4329 | 1.8932 |
| D11 | 2.4445 | 4.2347 | 5.1399 | 5.6796 |
| D19 | 18.2183 | 10.5213 | 5.4203 | 1.8932 |
| Bf | 7.9381 | 27.8415 | 50.9669 | 74.9010 |

Focussing Displacement of Third Lens Group 2G3 at Photographic Magnification of − 1/30

| focal length f | 38.9990 | 57.2487 | 126.2058 | 184.7072 |
|---|---|---|---|---|
| D0 | 1123.3552 | 2192.0352 | 3660.9259 | 5363.3944 |
| displacement | 0.9881 | 0.7777 | 0.7279 | 0.7349 |

Here, the sign of the displacement is positive for movement from the object side toward the image side.
Displacement of the Positive Cemented Lens 2L42 During an Image Shift of 0.01 |rad|

| focal length f | 38.9990 | 57.2487 | 126.2058 | 184.7072 |
|---|---|---|---|---|
| lens displacement | 0.3203 | 0.3958 | 0.4781 | 0.5555 |
| image shift amount | 0.3900 | 0.7572 | 1.2620 | 1.8470 |

Values Corresponding to Conditions

| | |
|---|---|
| βat = | −0.0055 |
| βbt = | 3.3063 |
| fct = | −10222.42 |
| fcw = | −337.221 |
| fa = | 38.903 |
| βaw = | −0.1050 |
| βbw = | 1.1018 |
| (1) (1 − βat) · βbt = | 3.324 |
| (2) ft/fct = | −0.0181 |
| (3) fw/fcw = | −0.1156 |
| (4) fa/(fw · ft)$^{1/2}$ = | 0.458 |
| (5) {|(1 − βat) βbt|/|(1 − βaw) βbw|}/(ft/fw) = | 0.577 |
| (6) Db/fw = | 0.113 |

FIGS. 13a–20d show various aberration diagrams for d-line (λ=587.6 nm) in the second preferred embodiment. FIGS. 13a–13d show various aberration graphs for an infinite focus state at a maximum wide-angle state. FIGS. 14a–14d show various aberration graphs for an infinite focus state at a first intermediate focal length state. FIGS. 15a–15d show various aberration graphs for an infinite focus state at a second intermediate focal length state. FIGS. 16a–16d show various aberration graphs for an infinite focus state at a maximum telephoto state.

FIGS. 17a–17d show various aperture graphs at a photographic magnification of $-1/30$ at a maximum wide-angle state. FIGS. 18a–18d show various aperture graphs at a photographic magnification of $-1/30$ at a first intermediate focal length state. FIG. 19 show various aperture graphs at a photographic magnification of $-1/30$ at a second intermediate focal length state. FIG. 20 show various aperture graphs at a photographic magnification of $-1/30$ at a maximum telephoto state.

Figure 21:
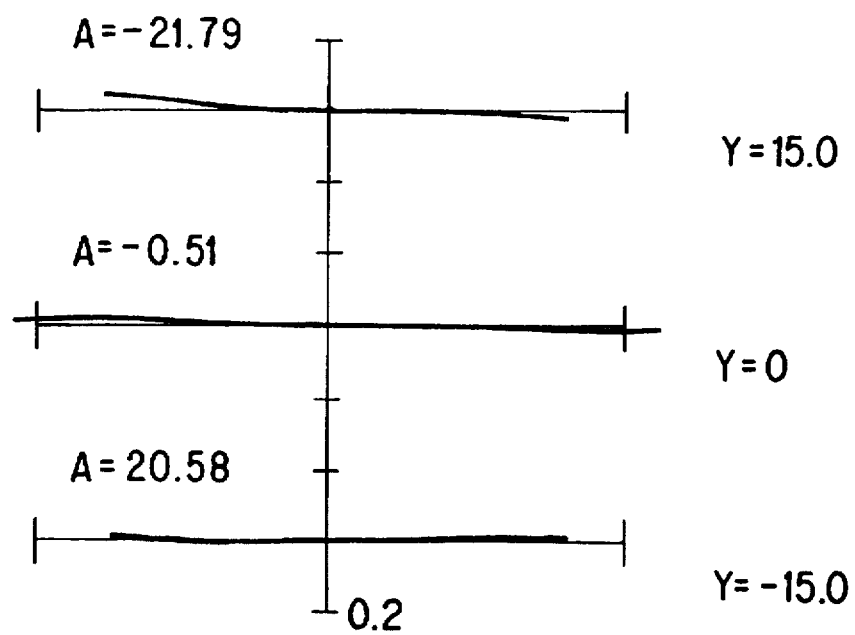
FIG. 21 is a drawing of coma aberrations at an infinite focus state at a maximum wide-angle state according to a second preferred embodiment.
Figure 22:
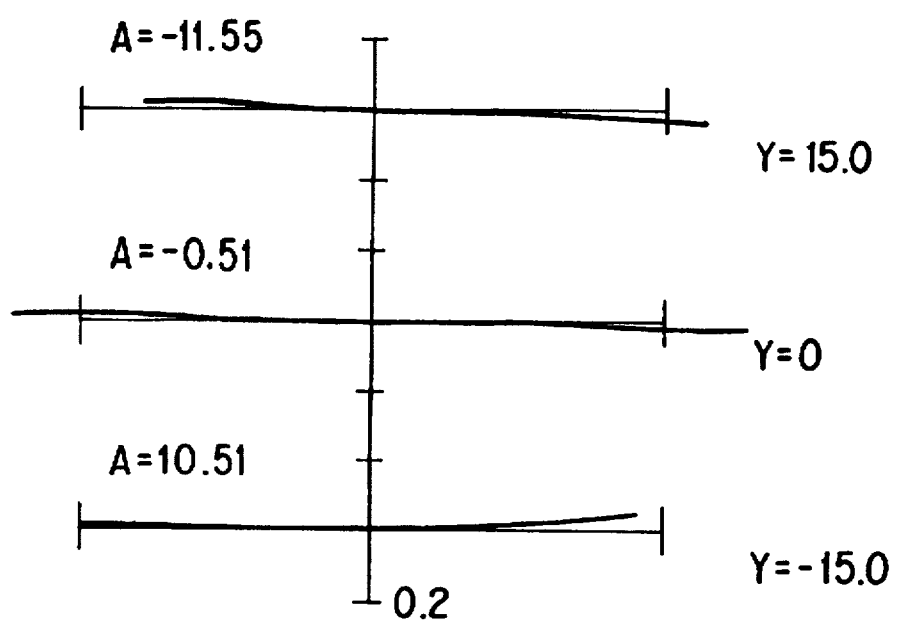
FIG. 22 is a drawing of coma aberrations at an infinite focus state at a first intermediate focal length state according to a second preferred embodiment.
Figure 23:
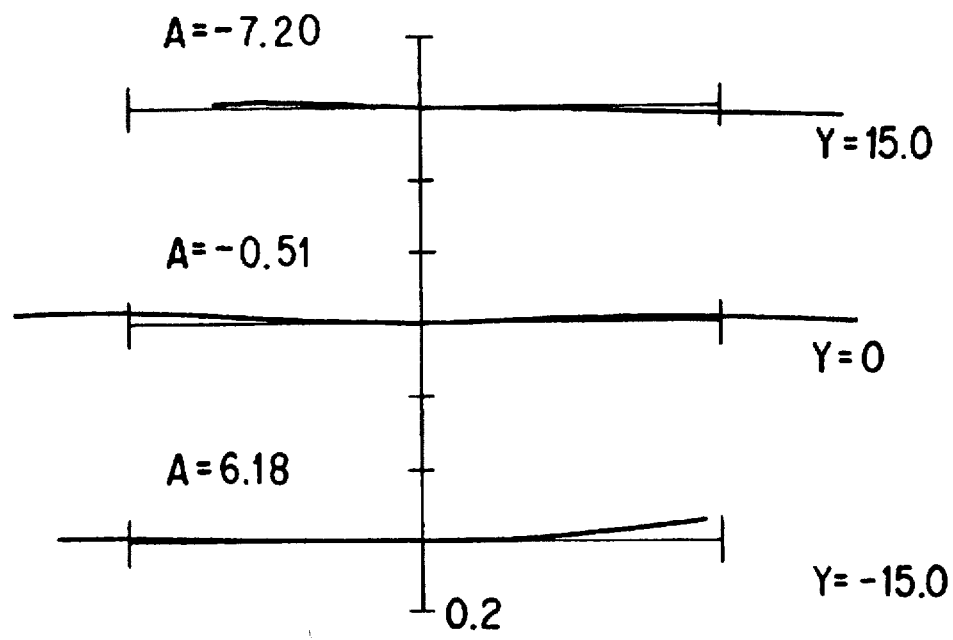
FIG. 23 is a drawing of coma aberrations at an infinite focus state at a second intermediate focal length state according to a second preferred embodiment.
Figure 24:
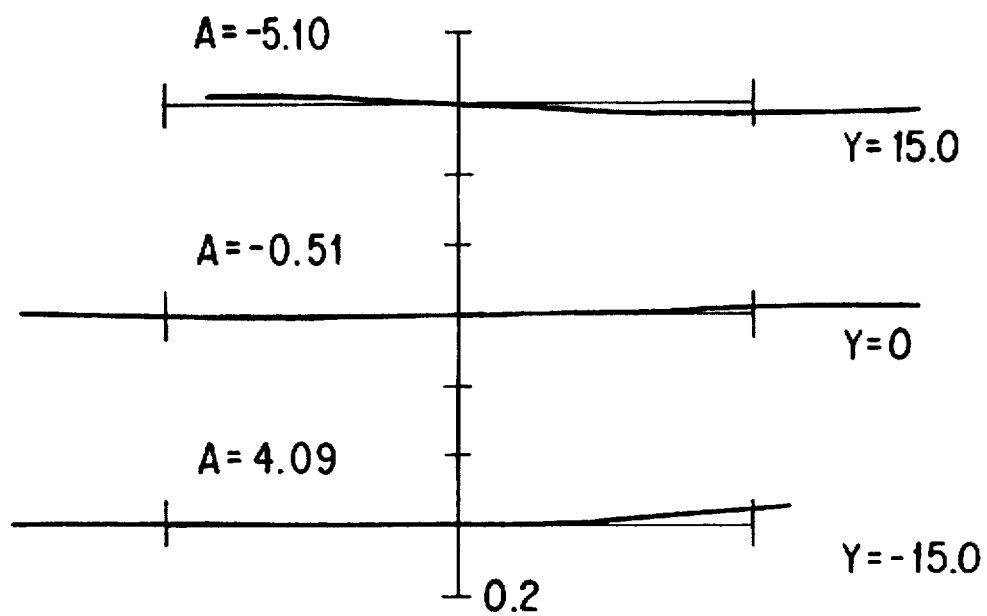
FIG. 24 is a drawing of coma aberrations at an infinite focus state at a maximum telephoto state according to a second preferred embodiment.

FIGS. 21–24 are drawings of coma aberrations in the second preferred embodiment when the image is shifted by 0.01 rad (radian) with respect to the optical axis. FIG. 21 is a drawing of coma aberrations at an infinite focus state at a maximum wide-angle state. FIG. 22 is a drawing of coma aberrations at an infinite focus state at a first intermediate focal length state. FIG. 23 is a drawing of coma aberrations at an infinite focus state at a second intermediate focal length state. FIG. 24 is a drawing of coma aberrations at an infinite focus state at a maximum telephoto state.

FIGS. 21–24 show coma aberrations at image heights Y=15.0, 0, −15.0, when the positive cemented lens 2L42 is caused to move in the positive direction of the image height Y.

Figure 25:
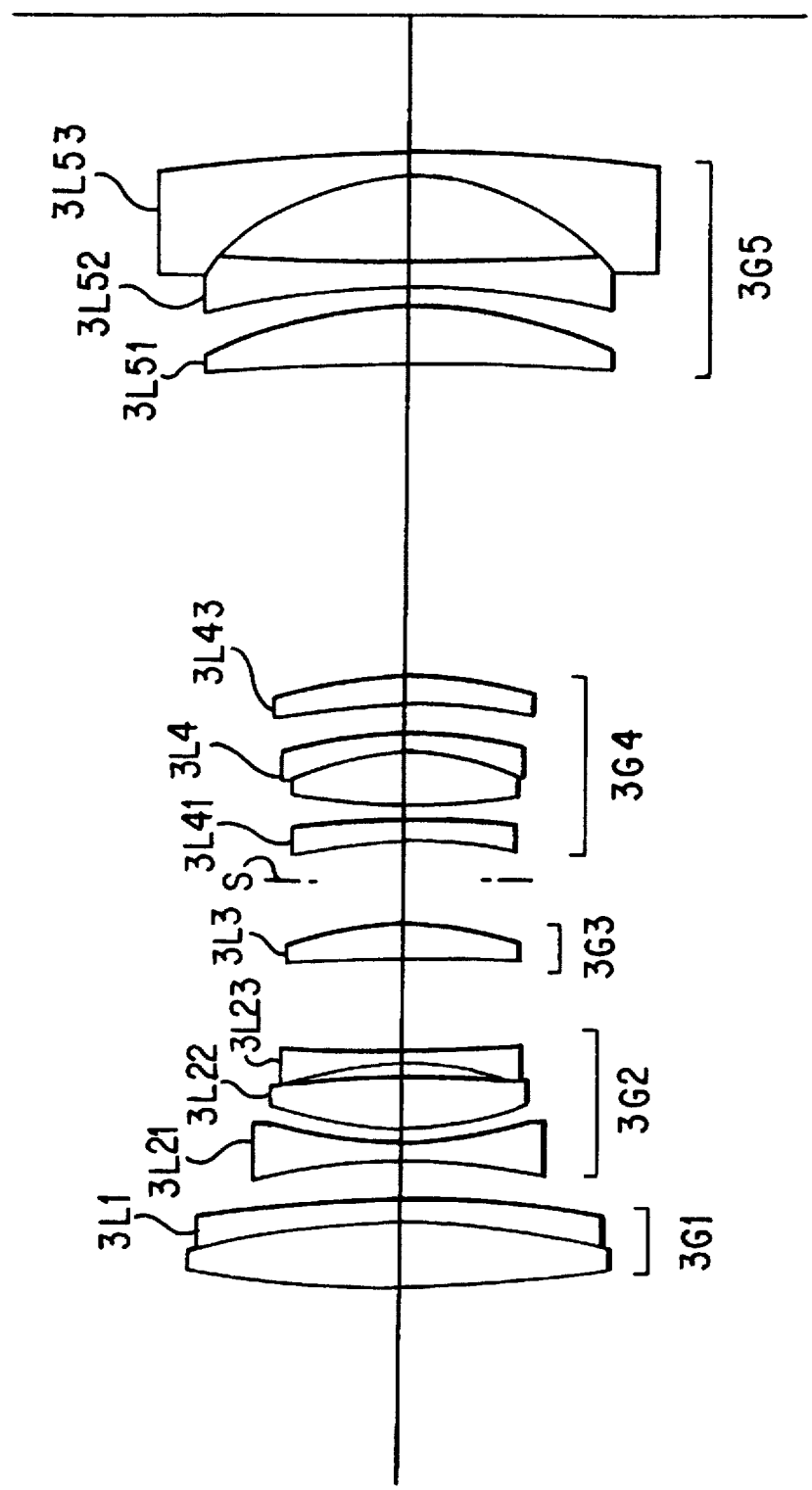
FIG. 25 is a side schematic drawing showing a lens structure for the zoom lens system according to a third preferred embodiment of the invention.

FIG. 25 is a side schematic drawing showing a lens structure for a zoom lens system according to a third preferred embodiment.

The zoom lens system of FIG. 25 comprises, in order from the object side, a first lens group 3G1 formed with a positive cemented lens 3L1 comprising a biconvex lens and a negative meniscus lens with the concave surface facing the object side; a second lens group 3G2 comprising a biconcave lens 3L21, a biconvex lens 3L22 and a biconcave lens 3L23; a third lens group 3G3 comprising a biconvex lens 3L3; a fourth lens group 3G4 comprising a negative meniscus lens 3L41 with the concave surface facing the object side, a positive cemented lens 3L42 comprising a biconvex lens and a negative meniscus lens with the concave surface facing the object side, and a positive meniscus lens 3L43 with a concave surface facing the object side; and a fifth lens group 3G5 comprising a positive meniscus lens 3L51 with the concave surface facing the object side, a biconcave lens 3L52, and a negative meniscus lens 3L53 with the concave surface facing the object side.

Additionally, an aperture diaphragm S is positioned between the third lens group 3G3 and the fourth lens group 3G4. The aperture diaphragm S moves integrally with the fourth lens group 3G4 during zooming from a maximum wide-angle state to a maximum telephoto state.

FIG. 25 shows a positional relationship of each of the lens groups at a maximum wide-angle state. The lens groups move during zooming to a maximum telephoto state on the optical axis along the zoom loci as indicated by the arrows in FIG. 1. Focussing is accomplished by moving the third lens group 3G3 along the optical axis.

Fluctuations in the image position caused by camera shaking are corrected by shifting the image through moving the positive cemented lens 3L42 in the fourth lens group 3G4 in a direction substantially perpendicular to the optical axis.

The values of various dimensions of the third preferred embodiment are listed in Table 3 below. In Table 3, f denotes a focal length, FNO denotes an F-number, $\overline{\omega}$ denotes the half field angle, Bf denotes back focus and D0 denotes the distance along the optical axis between the object and a surface on the object side. Moreover, the surface number indicates the order of the lens surfaces from the object side along the direction in which the light rays move, and the refractive indices and Abbe numbers are the values corresponding to a d-line ($\lambda$=587.6 nm).

TABLE 3 f = 39.00~75.72~126.21~184.70
FNO = 3.99~6.29~8.76~11.00
ω = 29.42~15.43~9.45~6.55°

| Surface Number | Radius of Curvature | Intersurface Distance | Refractive Index | Abbe Number |
|---|---|---|---|---|
| 1 | 65.7370 | 4.039 | 1.48749 | 70.41 |
| 2 | −42.8784 | 1.389 | 1.84666 | 23.83 |
| 3 | −70.2484 | (D3 = variable) | | |
| 4 | −41.5732 | 1.010 | 1.83500 | 42.97 |
| 5 | 21.6117 | 0.884 | | |
| 6 | 18.8002 | 3.029 | 1.78472 | 25.70 |
| 7 | −59.6951 | 0.757 | | |
| 8 | −21.9524 | 1.010 | 1.83500 | 42.97 |
| 9 | 706.2746 | (D9 = variable) | | |
| 10 | 362.5145 | 2.146 | 1.51680 | 64.20 |
| 11 | −19.9175 | (D11 = variable) | | |
| 12 | ∞ | 2.272 | (aperture diaphragm S) | |
| 13* | −38.2648 | 1.262 | 1.69666 | 35.07 |
| 14 | −63.1068 | 0.884 | | |
| 15 | 30.7040 | 3.155 | 1.48749 | 70.41 |
| 16 | −15.4556 | 1.010 | 1.84666 | 23.83 |
| 17 | −26.2986 | 1.767 | | |
| 18 | −35.6782 | 1.641 | 1.50960 | 68.00 |
| 19 | −23.4281 | (D19 = variable) | | |
| 20 | −134.0509 | 3.282 | 1.84666 | 23.83 |
| 21 | −27.2217 | 1.080 | | |
| 22 | −49.4004 | 1.262 | 1.38500 | 42.97 |
| 23 | 240.5891 | 4.951 | | |
| 24 | −15.5276 | 1.515 | 1.83500 | 42.97 |
| 25 | −105.0734 | (Bf) | | |

| Aspherical Surface Data (surface 13) | |
|---|---|
| R = | −38.2648 |
| κ = | 0.2132 |
| $C_4$ = | $-2.12247 \times 10^{-5}$ |
| $C_6$ = | $-1.34104 \times 10^{-7}$ |
| $C_8$ = | $1.82166 \times 10^{-9}$ |
| $C_{10}$ = | $-2.87798 \times 10^{-11}$ |

| Variable Space for Zooming | | | | |
|---|---|---|---|---|
| f | 38.9990 | 57.7249 | 126.2058 | 184.2574 |
| D3 | 2.1456 | 13.9070 | 22.9667 | 30.2305 |
| D9 | 5.1188 | 3.4217 | 2.2193 | 1.8932 |
| D11 | 2.4540 | 4.1512 | 5.3535 | 5.7696 |
| D19 | 17.9511 | 10.2425 | 5.6195 | 1.8932 |
| Bf | 7.9381 | 27.8415 | 50.9669 | 74.9010 |

Focussing Displacement of Third Lens Group 3G3 at Photographic Magnification of − 1/30

| | | | | |
|---|---|---|---|---|
| focal length f | 38.9990 | 57.7249 | 126.2058 | 184.2574 |
| D0 | 1122.5995 | 2190.9721 | 3664.0949 | 5349.6204 |
| displacement | 0.9965 | 0.7828 | 0.7054 | 0.7324 |

Here, the sign of the displacement is positive for movement from the object side toward the image side.

Displacement of the Positive Cemented Lens 3L42 During an Image Shift of 0.01 |rad|

| | | | | |
|---|---|---|---|---|
| focal length f | 38.9990 | 57.7249 | 126.2058 | 184.2574 |
| lens displacement | 0.3338 | 0.4114 | 0.4937 | 0.5758 |

TABLE 3-continued

| image shift amount | 0.3900 | 0.7573 | 1.2620 | 1.8426 |
|---|---|---|---|---|
| Values Corresponding to Conditions ||||||

| | |
|---|---|
| βat = | −0.0081 |
| βbt = | 2.9609 |
| fct = | −771.956 |
| fcw = | −201.971 |
| fa = | 40.574 |
| βaw = | −0.1980 |
| βbw = | 0.9752 |
| (1) (1 − βat) · βbt = | 2.985 |
| (2) ft/fct = | −0.239 |
| (3) fw/fcw = | −0.153 |
| (4) fa/(fw · ft)$^{1/2}$ = | 0.538 |
| (5) {|(1 − βat) (βbt)|/|(1 − βaw) βbw|}/(ft/fw) = | 0.428 |
| (6) Db/fw = | 0.113 |

Figures 28A, 28B, 28C, 28D:
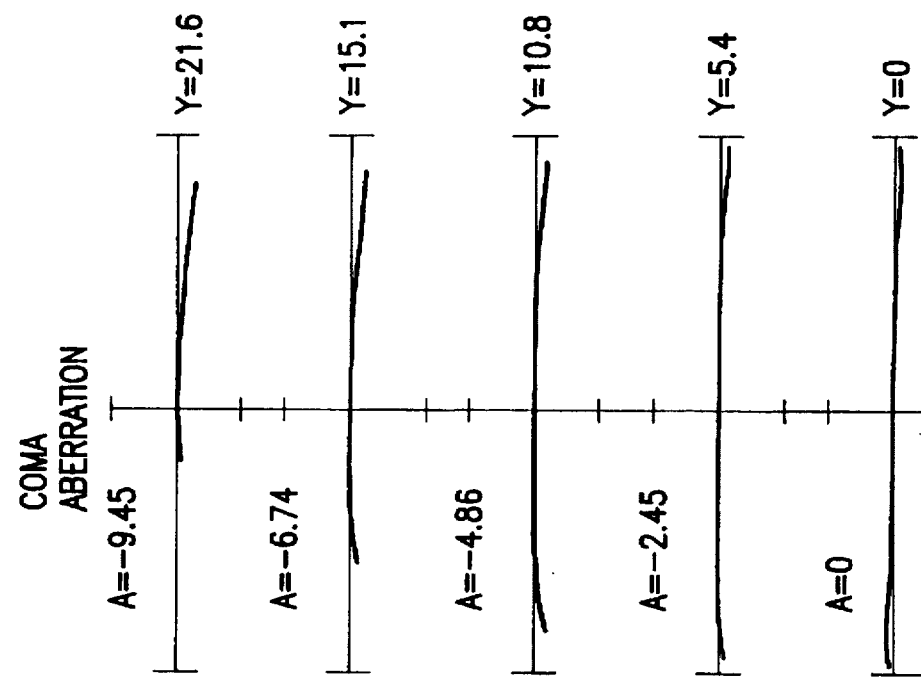
FIGS. 28a–28d are various aberration graphs for the infinite focus state at a second intermediate focal length state according to a third preferred embodiment.

FIGS. 26a–33d show various aberration graphs for d-line (λ=587.6 nm) according to the third preferred embodiment. FIGS. 26a–26d shows various aberration graphs for an infinite focus state at a maximum wide-angle state. FIGS. 27a–27d shows various aberration graphs for an infinite focus state at a first intermediate focal length state. FIG. 28 shows various aberration graphs for an infinite focus state at a second intermediate focal length state. FIG. 29 shows various aberration graphs for an infinite focus state at a maximum telephoto state.

FIGS. 30a–30d are aberration graphs at a photographic magnification of −1/30 at a maximum wide-angle state. FIGS. 31a–31d are aberration graphs at a photographic magnification of −1/30 at a first intermediate focal length state. FIGS. 32a–32d are aberration graphs at a photographic magnification of −1/30 at a second intermediate focal length state. FIGS. 33a–33d are aberration graphs at a photographic magnification of −1/30 at a maximum telephoto state.

Figure 34:
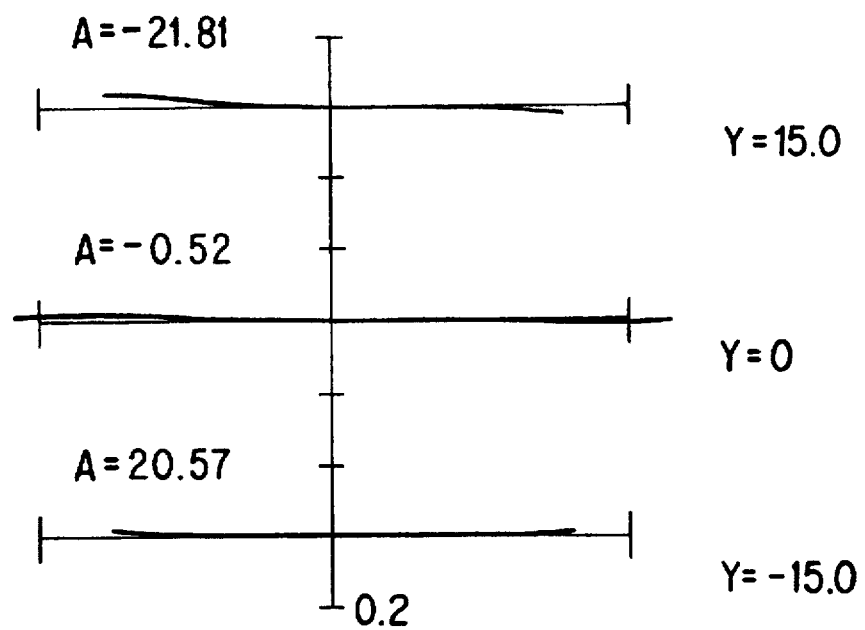
FIG. 34 is a drawing of coma aberrations at an infinite focus state at a maximum wide-angle state according to a third preferred embodiment.
Figure 35:
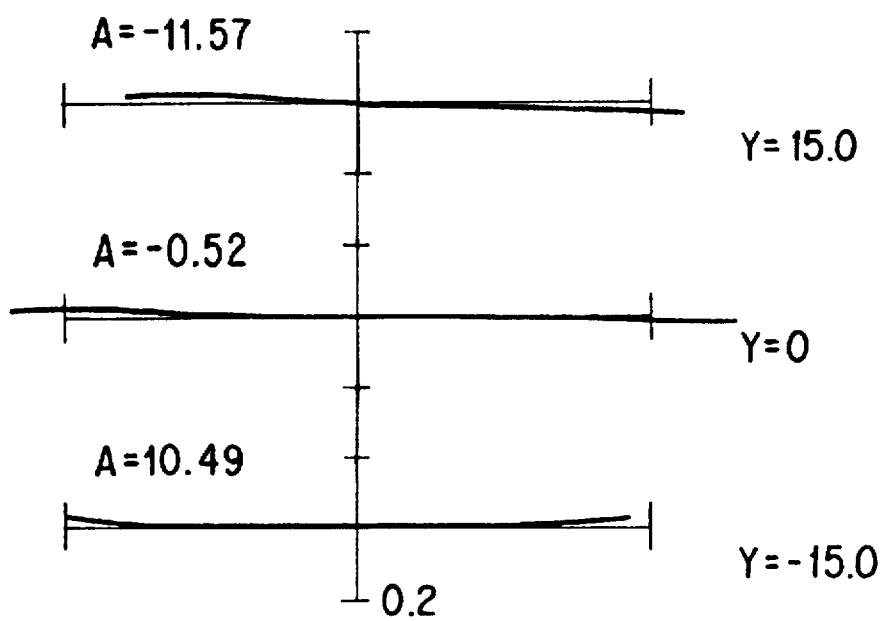
FIG. 35 is a drawing of coma aberrations at an infinite focus state at a first intermediate focal length state according to a third preferred embodiment.
Figure 36:
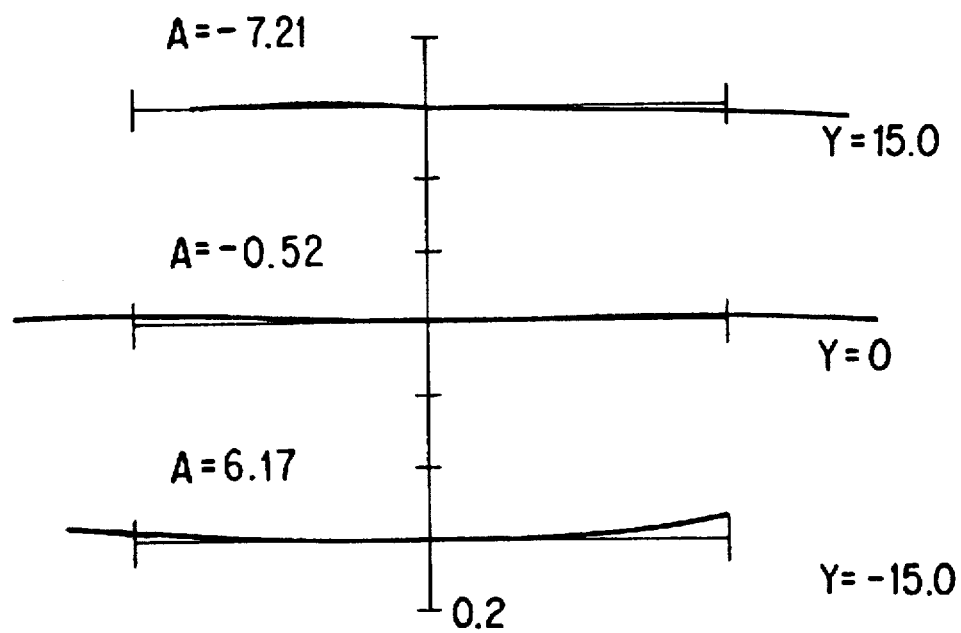
FIG. 36 is a drawing of coma aberrations at an infinite focus state at a second intermediate focal length state according to a third preferred embodiment.
Figure 37:
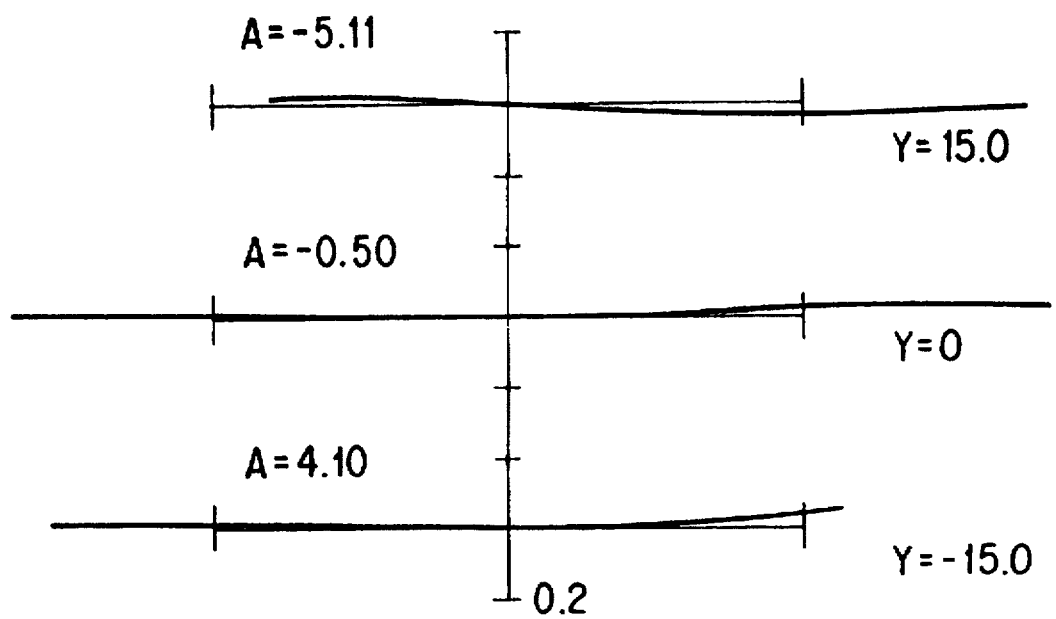
FIG. 37 is a drawing of coma aberrations at an infinite focus state at a maximum telephoto state according to a third preferred embodiment.

FIGS. 34 through 37 are drawings of coma aberrations for the third preferred embodiment when the image is shifted by 0.01 rad (radian) with respect to the optical axis. FIG. 34 is a drawing of coma aberrations at an infinite focus state at a maximum wide-angle state. FIG. 35 is a drawing of coma aberrations at an infinite focus state at a first intermediate focal length state. FIG. 36 is a drawing of coma aberrations at an infinite focus state at a second intermediate focal length state. FIG. 37 is a drawing of coma aberrations at an infinite focus state at the maximum telephoto state.

FIGS. 34–37 show coma aberrations at image heights Y=15.0, 0, −15.0 when the positive cemented lens L42 is caused to move in the positive direction of the image height Y.

As explained above, with the present invention, high zooming is possible, and it is also possible to realize a compact optical system that can accomplish effective image shifting.

The zoom lens system according to the fourth through ninth preferred embodiments, comprises, in order from the object side, a first lens group G1 with a positive refractive power, a second lens group G2 with a negative refractive power, a third lens group G3 with a positive refractive power, a fourth lens group G4 with a positive refractive power, and a fifth lens group G5 with a negative refractive power. During zooming from a maximum wide-angle state to a maximum telephoto state, at least the first lens group G1 and the fifth lens group G5 move towards the object side, so that a distance between the first lens group G1 and the second lens group G2 increases; a distance between the second lens group G2 and the third lens group G3 decreases; a distance between the third lens group G3 and the fourth lens group G4 increases; and a distance between the fourth lens group G4 and the fifth lens group G5 decreases. Moreover, the zoom lens system has a high zoom ratio with a short total length at a maximum telephoto state. The zoom lens system also satisfies conditions (7) through (9):

$$1.5 < (D1T - D1W)/(D4W - D4T) < 2.1 \tag{7}$$

$$0.39 < f3/f1 < 0.55 \tag{8}$$

$$0.25 < f2/(fw \cdot ft)^{1/2} < 0.32. \tag{9}$$

where D1W is a distance between the first lens group G1 and the second lens group G2 at a maximum wide-angle state; D1T is a distance between the first lens group G1 and the second lens group G2 at a maximum telephoto state; D4W is a distance between the fourth lens group G4 and the fifth lens group G5 at a maximum wide-angle state; D4T is a distance between the fourth lens group G4 and the fifth lens group G5 at a maximum telephoto state; f1 is a focal length of the first lens group G1; f2 is a focal length of the second lens group G2; f3 is a focal length of the third lens group G3; ft is a focal length of the total zoom lens system at a maximum telephoto state; and fw is a focal length fw of the total zoom lens system at a maximum wide-angle state.

First, the function of each lens in the zoom lens system will be described with respect to the fourth through ninth preferred embodiments. The fifth lens group G5 is closest to the image side and has a negative refractive power. At a maximum wide-angle state, on-axis and off-axis aberrations are independently corrected by changing a height of an off-axis light ray passing through the fifth lens group G5, by changing a field angle to make a back focus shorter.

However, if back focus is made extremely short, off-axis light rays that pass through the fifth lens group G5 move too far from the optical axis. Thus, it is impossible to reduce the lens diameter. Also, dust may often attach to a surface of the lens that is closest to the image side. When the back focus becomes very short, any such dust will appear on a photograph. Thus, it is important to establish an appropriate back focus at a maximum wide-angle state.

At a maximum wide-angle state, the first lens group G1, which has a positive refractive power, and the second lens group G2, which has a negative refractive power, are arranged close to each other and result in a strong negative combined refractive power. This achieves a sufficient back focus. Moreover, as off-axis light rays passing through the first lens group G1 approach the optical axis, a reduction on the lens diameter is possible. At a maximum telephoto state, the total length of the lens system is shortened by widening a distance between first lens group G1 and second lens group G2, which increases a convergence effect of the first lens group G1.

A high zoom ratio results in an increasing contribution rate fluctuation of off-axis aberrations of the second lens group G2, which occur in the second lens group G2 during zooming. These may be corrected by forming the second lens group G2, in order from the object side, with a biconcave lens having a strong negative refractive power, a biconvex lens, and a negative lens with its concave surface facing the object side.

It is preferable to use glass with a high refractive index for a biconcave lens arranged closest to an object side of lenses forming the second lens group G2. Thus, off-axis aberrations that occur when off-axis light rays pass through at a maximum wide-angle state are controlled. Further, a sufficient back focus can be obtained. However, any suitable material can be used for any of the lenses. Moreover, by making a surface curvature of image side lenses stronger than object side lenses, off-axis aberrations can be favorably corrected in a space between the biconcave lens and negative lens.

Both the third lens group G3 and the fourth lens group G4 have a positive refractive power. However, by having the third lens group G3 and fourth lens group G4 approach each other at a maximum wide-angle state, the combined refractive power becomes strongly positive. At a maximum telephoto state, the total length of the system is shortened by widening a distance between the third lens group G3 and fourth lens group G4, thus weakening the combined refractive power. Additionally, by narrowing a distance between the second lens group G2 and third lens group G3, the convergence effect is strengthened.

Condition (7) defines a ratio of displacement amount Δ D1 (D1W–D1T) of the first variable distance between the first lens group G1 and the second lens group G2 during zooming. Displacement amount ΔD4(D4W–D4T) is a fourth variable distance between the fourth lens group G4 and the fifth lens group G5 during zooming. Condition (7) maintains a balance between shortening a total length of the zoom lens system and high power zooming at a maximum telephoto state.

If (D1T–D1W)/(D4W–D4T) exceeds the upper limit value of condition (7), the displacement amount ΔD1 of the first variable distance becomes large. Thus, the convergence effect of the first lens group G1 becomes strong at a maximum telephoto state. This enables shortening of the total length of the lens system. However, a lateral magnification change for the second lens group G2 during zooming becomes too large. Thus, it is difficult to suitably control fluctuations of off-axis aberrations during zooming in the second lens group G2. Accordingly, a high power zooming does not result.

On the other hand, if (D1T–D1W)/(D4W–D4T) reaches the lower limit value of condition (7), the displacement amount ΔD4 of the fourth variable distance becomes large. Therefore, a contribution rate of the fifth lens group G5 during zooming is unreasonably large, and it is not possible to equalize contribution rates of each lens group during zooming. Accordingly, high power zooming cannot be achieved.

Condition (8) defines a range for the ratio of the focal length f3 of the third lens group G3 and focal length f1 of the first lens group G1. If f3/f1 is larger than the upper limit value of condition (8), the focal length of the first lens group G1 becomes small with a positive value. In particular, off-axis light rays passing through the first lens group G1 move too far from the optical axis at a maximum telephoto state. In order to secure a specific amount of light in a marginal zone, the lens diameter of the first lens group G1 is then too large to make the system small. Further, if the focal length of the third lens group G3 becomes large, it is difficult to achieve acceptable contribution rates for the third lens group G3 and fourth lens group G4. As a result, equalizing of the contribution rates for each lens to zooming is difficult. A high power zooming cannot be achieved.

On the other hand, if f3/f1 is smaller than the lower limit value of condition (8), the focal length of the third lens group G3 becomes too small with a positive value. Off-axis light rays passing through the third lens group G3 move away from the optical axis. Thus, off-axis aberrations, which occur in the third lens group G3, cannot be satisfactorily corrected unless an aperture of the third lens group G3 is large. However, this ultimately causes the total zoom lens system to become large. If the focal length of the first lens group G1 is large, shortening of the total length of the zoom lens system at a maximum telephoto state is difficult.

Condition (9) defines a refractive power for the second lens group G2 and achieves a balance between a size reduction of the system and shortening of the total length of the zoom lens system.

If $f2/(fw \cdot ft)^{1/2}$ is larger than the upper limit value of condition (9), a divergence effect of the second lens group G2 is weakened. Accordingly, it is difficult to obtain a sufficient back focus amount at a maximum wide-angle state.

At a maximum wide-angle state, it is important to correct off-axis aberrations. The Petzval sum thus becomes a criteria by which the correction condition of image plane distortion is determined. If $f2/(fw \cdot ft)^{1/2}$ is larger than the upper limit value of conditional formula (3), the Petzval sum becomes too positively large to correct negative image plane distortion. Alternatively, a refractive power of the fifth lens group G5 becomes too large negatively to control off-axis aberration fluctuations, which occur during zooming in the fifth lens group G5.

On the other hand if $f2/(fw \cdot ft)^{1/2}$ is smaller than the lower limit value of condition (9), off-axis aberration fluctuations, which occur during zooming in the second lens group G2, cannot be controlled.

The zoom lens system also may satisfy conditions (10) and (11) to equalize a contribution rate of each lens group during zooming, to obtain higher optical performance, to simultaneously achieve high power zooming, and a simple structure.

$$0.32 < (\beta 2t/\beta 2w)/(ft/fw) < 0.45 \qquad (10)$$

$$0.5 < (\beta 5t/\beta 5w)/(ft/fw) < 0.7 \qquad (11)$$

where β2t is a lateral magnification of the second lens group G2 at a maximum telephoto state; β2w is a lateral magnification of the second lens group G2 at a maximum wide-angle state; β5t is a lateral magnification of the fifth lens group G5 at a maximum telephoto state; β5w is a lateral magnification of the fifth lens group G5 at the maximum wide-angle state.

Condition (10) defines the ratio of a lateral magnification of the second lens group G2 at a maximum wide-angle state and a lateral magnification of the second lens group G2 at a maximum telephoto state. Condition (10) also defines a contribution rate of the second lens group G2 during a zooming operation.

If (β2t/β2w)/(ft/fw) is larger than the upper limit value of condition (10), the contribution rate of the second lens group G2 increases. Thus, it is difficult to control all the off-axis aberration fluctuations that occur during zooming in the second lens group G2.

On the other hand, if (β2t/β2w)/(ft/fw) is smaller than the lower limit value of condition (10), a contribution rate of the second lens group G2 decreases. As a result, to obtain a specific zoom ratio, changes caused by zooming of the combined focal length of the third lens group G3 and the fourth lens group G4 become large. Unless aberrations generated by the third lens group G3 and fourth lens group G4 are independently corrected, various aberration fluctuations that occur during zooming cannot be controlled. It is thus difficult to create a simple structure and reduce the size of the total zoom lens system.

Condition (11) defines a ratio of a lateral magnification for the fifth lens group G5 at a maximum wide-angle state and a lateral magnification of the fifth lens group G5 at a maximum telephoto state. Condition (11) also defines a contribution rate of the fifth lens group G5 during a zooming operation.

If $(\beta5t/\beta5w)/(ft/fw)$ is larger than the upper limit value of condition (11), the contribution rate of the fifth lens group G5 during zooming increases. It is then difficult to favorably control off-axis aberration fluctuations that occur during zooming in the fifth lens group G5.

On the other hand, if $(\beta5t/\beta5w)/(ft/fw)$ is smaller than the lower limit value of condition (11), the contribution rate of the fifth lens group G5 during zooming decreases. As a result, the off-axis aberrations during zooming for each lens group in the second through the fourth lens groups G2–G4 cannot be favorably corrected. It is then difficult to improve the performance of the system.

In order to create a simple structure and to reduce the size of the zoom lens system, contribution rates of the second lens group G2 and fifth lens group G5 during zooming operation shall be large. Therefore, to improve the performance of the zoom lens system, conditions (10) and (11) should be simultaneously satisfied, i.e., condition (12) should be satisfied.

$$0.4 < (\beta2t/\beta2w)/(\beta5t/\beta5w) < 0.8 \quad (12)$$

Condition (12) maintains a balance between contribution rates of the second lens group G2 and the fifth lens group G5 during zooming. If $(\beta2t/\beta2w)/(\beta5t/\beta5w)$ is larger than the upper limit value of condition (12), the contribution rate of the second lens group G2 increases. It is difficult to favorably correct the off-axis aberration fluctuations occurring during zooming.

On the other hand, if $(\beta2t/\beta2w)/(\beta5t/\beta5w)$ is smaller than the lower limit value of condition (12), the contribution rate of the fifth lens group G5 increases. It is then difficult to favorably correct the off-axis aberration fluctuations which occur during zooming.

Further, to control image blur while achieving high power zooming, condition (13) should be satisfied.

$$0.35 < (Bft-Bfw)/(ft-fw) < 0.5 \quad (13)$$

where Bft is a back focus at a telephoto lens side; and Bfw is a back focus at a wide angle lens side.

Condition (13) defines a rate of back focus change relative to a change in focal length. In general, the longer a focal length at a maximum telephoto state, the longer the total length of the lens system.

In a lens shutter type camera, reduction in size and weight of the camera body is desirable. Hence, if a total length of the lens system at a maximum telephoto state is too long, movement of a center of gravity when the camera is at a normal position becomes large. This can cause hand shake and vibration.

The occurrence of hand shake is prevented herein by controlling movement of the center of gravity, i.e., by shortening back focus at a maximum telephoto state. This reduces a movement amount of the second lens group G2 through fifth lens group G5 towards the object side during zooming.

If $(Bft-Bfw)/(ft-fw)$ is larger than the upper limit value of condition (13), hand shaking occurs easily at a maximum telephoto state. Conversely, if $(Bft-Bfw)/(ft-fw)$ is smaller than the lower limit value of condition (13), a contribution rate of the fifth lens group G5 decreases, causing a lateral magnification of the second lens group G2 to vary during zooming. As a result, off-axis aberration fluctuations, which occur during zooming, cannot be favorably corrected. It is then difficult to obtain a specific zoom ratio.

The contribution rate of the fifth lens group G5 during zooming is large. In order to improve performance, it may be necessary to reduce the aberration amount occurring in the fifth lens group G5. The fifth lens group G5 is preferably formed of at least one positive lens and at least one negative lens to control spherical aberrations. To reduce a diameter of a lens closest to the image side of the zoom lens system, it is preferable that the positive lens be closest to an object side and the negative lens be closest to the image side in the fifth lens group G5.

The contribution rate of the second lens group G2 during zooming is large. However, to control aberrations, which occur in the second lens group G2 yet forming the second lens group G2 with the least possible number of lenses, the second lens group G2 is preferably comprised in order from the object side, a biconcave lens, a biconvex lens and a negative lens with its concave surface facing the object side. Further, the condition (14) should be satisfied below.

$$2 < r21/Da < 3.5 \quad (14)$$

Where, r21 is a radius of curvature of a surface of the lens in the second lens group G2 that is closest to the object side; and Da is a distance along the optical axis between an aperture diaphragm in the zooming system and the lens of the second lens group G2 that is closest to the object side.

To favorably correct a positive distortion aberration, which may occur at a maximum wide-angle state, it is preferable to place a principal point of the second lens group G2 as close to the object as possible, and also to form the second lens group G2 with a negative-positive lens structure.

In particular, the radius of curvature of the surface of a lens in the second lens group G2 closest to the object side should be set at an appropriate range as described in condition (14).

If r21/Da is larger than the upper limit value of condition (14), it is difficult to obtain a sufficient back focus at a maximum wide-angle state. On the other hand, if r21/Da is smaller than the lower limit value of condition (14), it is impossible to control fluctuations of coma aberrations due to a field angle at the maximum wide-angle state.

To prevent shooting errors resulting in blur images caused by shaking, which frequently occur with a high zoom ratio zoom lens, a blur detection system that detects blur in the zoom lens system and a driving mechanism may be combined in the lens system of the present invention. Further, the zoom lens system may form an anti-blur optical system by decentering a part or all of one of the lens groups in the optical system, as a decentering lens group, so as to shift the image. Correction of blurred images, i.e., changes in image position, is detected by the blur detection system.

The fourth lens group G4 is one of three lens group that, by moving substantially perpendicular to the optical axis, may shift the image. Thus, fluctuation of various aberrations, which occur due to an image shift, may be favorably corrected. Normally, the shift lens groups are lens groups that move substantially perpendicular to the optical axis. These satisfy an aberration correction condition to produce superior images during an image shift. More specifically, (i) correction of a spherical aberration and sine conditions, and (ii) an appropriate Petzval sum, are required for the shift lens groups.

Correction of spherical aberration and sine condition control decentering of comas, which occurs at the central section of the field when shift lens groups are moved to shift the image. Moreover, an appropriate Petzval sum controls image plane distortion, which occurs at a perimeter section of a field when shift lens groups are moved to shift the image.

In the shift lens group of the zoom lens an aberration correction condition for zooming may not be the same or an aberration correction condition for controlling performance deterioration during image shifting. Correction of blur while maintaining a high level of optical performance is difficult. Thus, one lens group of the three movable lens groups has a central lens group as the shift lens group. Therefore, a larger blur may be corrected, while maintaining a high level of optical performance.

Superior imaging performance may be obtained in the zoom lens system, even during an image shift, when the zoom lens system satisfies condition (15):

$$0.04 < Db/fw < 0.2 \qquad (15)$$

where, Db is a distance along the optical axis between an aperture diaphragm and a surface in the shift lens group closest to the aperture diaphragm.

If Db/fw is larger than the upper limit value of condition (15), a difference in height of on-axis and off-axis light rays that pass through the shift lens group becomes large. It is then difficult to control fluctuations of various aberrations, which occur during a lens shift, unless a diameter of the shift lens group is large.

The problem described above may be resolved by forming the shift lens group with more lens elements. However, this causes a driving mechanism that drives the shift lens group to be very complicated, in addition to making the lens system large.

Focusing is accomplished by moving a lens group in the lens system along the optical axis. In particular, focusing can be accomplished by moving a lens group, which is closer to the object side than the shift lens group and closer to the image side than the first lens group.

Figure 39:
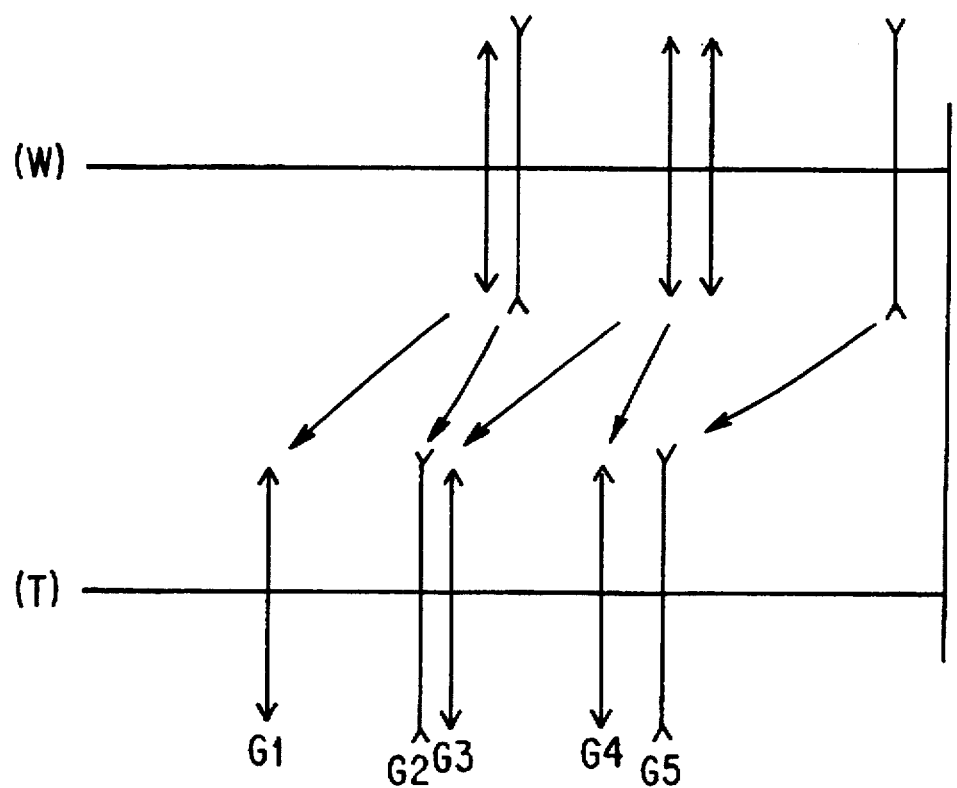
FIG. 39 is a schematic drawing showing the refractive power distribution and a movement of each lens during zooming from a maximum wide-angle state (W) to the maximum telephoto state (T) in the zoom lens system according to the fourth through ninth preferred embodiments of the invention.

Each of the fourth-ninth preferred embodiments of the invention is now described, with reference to the attached drawings. FIG. 39 illustrates distribution of refractive powers and the movement of each lens group during zooming from a maximum wide-angle state (W) to a maximum telephoto state (T) in the zoom lens system.

In FIG. 39, a zoom lens system of each of the fourth-ninth preferred embodiments comprises, in order from the object side, a first lens group G1 that has a positive refractive power, a second lens group G2 that has a negative refractive power, a third lens group G3 that has a positive refractive power, a fourth lens group G4 that has a positive refractive power, and a fifth lens group G5 that has a negative refractive power. Moreover, during zooming from a maximum wide-angle state to a maximum telephoto state, each lens group moves towards an object side of the zoom lens system, a distance between the first lens group G2 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 decreases. The second lens group G2 and the fourth lens group G4 move as one unit during zooming.

Aspherical surfaces in each of the fourth-ninth preferred embodiments, as in the first-third preferred embodiments, are expressed by the following equation (g) where the aspherical surfaces have a height y in the direction perpendicular to the optical axis; S(y) is a displacement along the optical axis at height y; R is a reference radius of curvature; κ is a conical coefficient; and Cn is a nth degree aspherical surface coefficient.

$$S(y)=(y^2/R)/[1+(1-\kappa \cdot y^2/R^2)^{1/2}]+C_4 \cdot y^4+C_6 \cdot y^6+C_8 \cdot y^8+C_{10} \cdot y^{10}+ \qquad (g)$$

The aspherical surfaces for each embodiment are marked with the symbol * to the right of the surface number.

Figure 40:
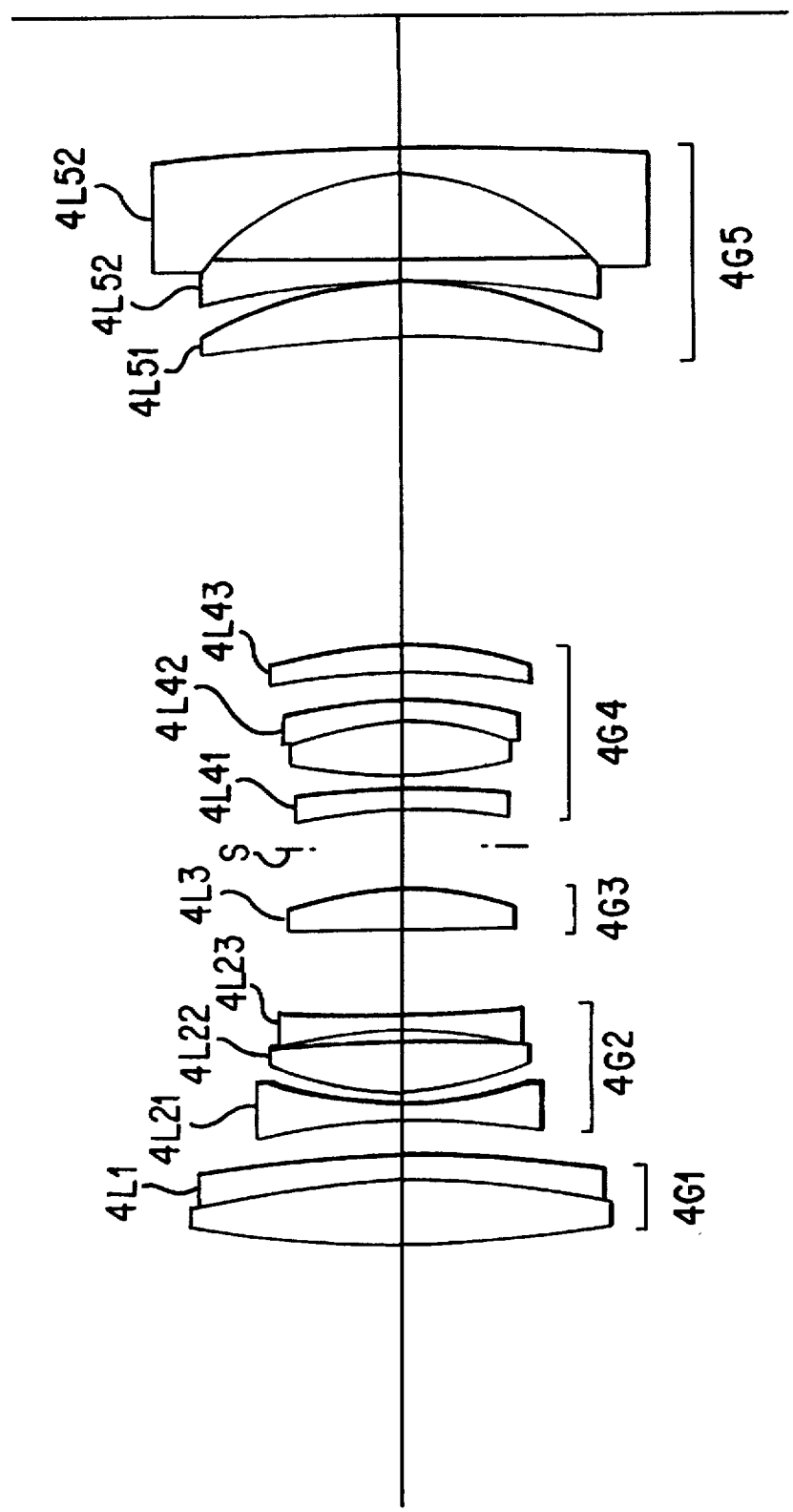
FIG. 40 is a side schematic drawing showing a lens structure according to a fourth preferred embodiment.
Figures 44A, 44B, 44C, 44D:
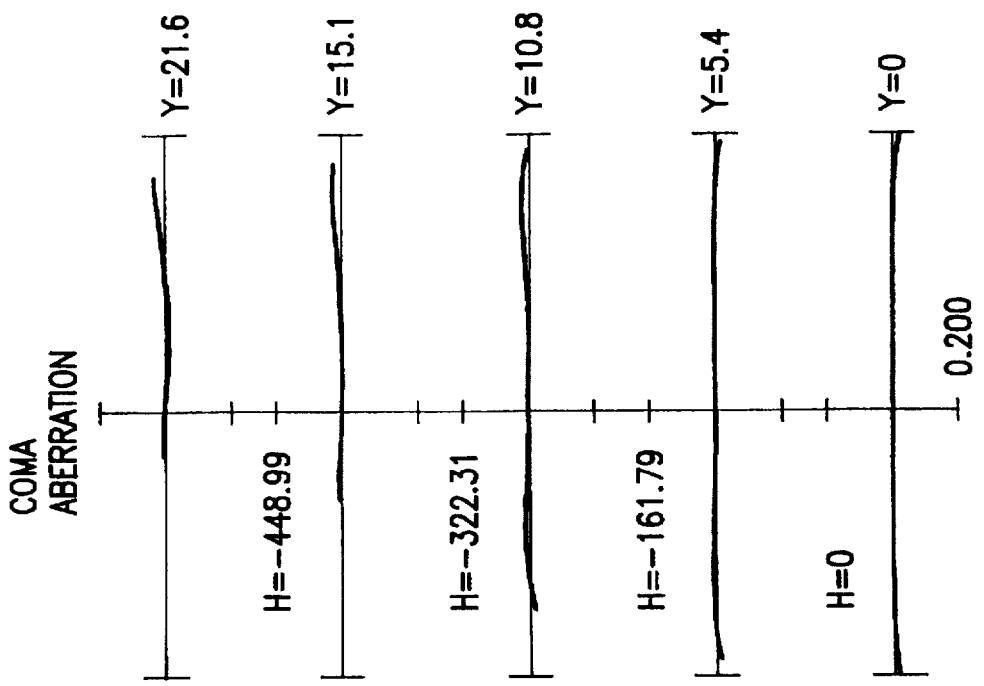
FIGS. 44a–44d are various aberration graphs for a photographic magnification of $-1/30$ at a maximum wide-angle state for the fourth preferred embodiment.

FIG. 40 illustrates the lens structure for the zoom lens system according to a fourth preferred embodiment of the invention.

The zoom lens system of FIG. 40 comprises, in order from the object side, a first lens group 4G1 comprising a positive cemented lens 4L1 with a biconvex lens and a negative meniscus lens with the concave surface facing the object side; a second lens group 4G2 comprising a biconvex lens 4L21, a biconvex lens 4L22, and a biconcave lens 4L23; a third lens group 4G3 comprising a biconvex lens 4L3; a fourth lens group 4G4 comprising a negative meniscus lens 4L41 with the concave surface facing the object side, a positive cemented lens 4L42 which has a biconvex lens and a negative meniscus lens with the concave surface facing the object side, and a positive meniscus lens 4L43 with the concave side facing the object side; and the fifth lens group 4G5 comprising a positive meniscus lens 4L51 with the concave surface facing the object side, a negative meniscus lens 4L52 with the concave surface facing the object side, and a negative meniscus lens 4L53 with the concave surface facing the object side.

An aperture diaphragm S is arranged between the third lens group 4G3 and fourth lens group 4G4. It moves as one unit with the fourth lens group 4G4 during zooming from a maximum wide-angle state to the maximum telephoto state.

FIG. 40 also illustrates a positional relationship of each lens group at a maximum wide-angle state, and movement occurs along the optical axis in the direction of arrows in FIG. 39 during zooming to a maximum telephoto state. Focusing is accomplished by moving the third lens group 4G3 along the optical axis.

Furthermore, shift in image position caused by hand shaking and the like is corrected by moving the positive cemented lens 4L42 in the fourth lens group 4G4 in the direction substantially perpendicular to the optical axis to shift the image.

Next, values of various dimensions in the fourth preferred embodiment are listed in Table 4. In Table 4, f denotes a half field angle, Bf denotes the back focus and D0 denotes the distance between the object and the surface closest to the object side along the optical axis. Moreover, the surface number is the lens surface order from the object side along the direction of a light ray. The values of refraction index and the Abbe's number are relative to the d-line (Δ=587.6 nm).

TABLE 4 f = 39.02–75.70–184.29
FNO = 4.05–6.38–11.00
ω = 29.43–15.43–6.54°

| Surface Number | Radius of Curvature | Intersurface Distance | Refractive Index | Abbe Number |
|---|---|---|---|---|
| 1 | 62.14311 | 4.039 | 1.48749 | 70.45 |
| 2 | –43.66775 | 1.388 | 1.84666 | 23.83 |
| 3 | –70.88569 | (D3 = variable) | | |
| 4 | –39.39279 | 1.010 | 1.83500 | 42.97 |
| 5 | 21.45187 | 0.884 | | |
| 6 | 18.37810 | 2.902 | 1.80518 | 25.46 |
| 7 | –65.20540 | 0.757 | | |
| 8 | –21.95246 | 1.010 | 1.83500 | 43.97 |
| 9 | 906.50213 | (D9 = variable) | | |
| 10 | 604.15858 | 2.272 | 1.48749 | 70.45 |
| 11 | –19.10775 | (D11 = variable) | | |
| 12 | ∞ | 2.272 | (aperture diaphragm S) | |
| 13* | –40.83436 | 1.262 | 1.58518 | 30.24 |

TABLE 4-continued

| | | | | |
|---|---|---|---|---|
| 14 | -63.10680 | 0.884 | | |
| 15 | 28.11534 | 3.155 | 1.48749 | 70.45 |
| 16 | -15.30773 | 1.010 | 1.84666 | 23.83 |
| 17 | -25.88995 | 1.767 | | |
| 18 | -34.72285 | 1.641 | 1.49108 | 57.57 |
| 19 | -26.11828 | (D19 = variable) | | |
| 21 | -22.96526 | 0.126 | | |
| 22 | -49.52550 | 1.262 | 1.80420 | 46.51 |
| 23 | -476.62746 | 4.922 | | |
| 24 | -15.11835 | 1.515 | 1.80420 | 46.51 |
| 25 | -152.99121 | (Bf) | | |

Aspherical Surface Data
(surface 13)

| | |
|---|---|
| R = | -40.83436 |
| κ = | 0.9156 |
| $C_4$ = | $-2.05320 \times 10^{-5}$ |
| $C_6$ = | $-1.69360 \times 10^{-8}$ |
| $C_8$ = | $-3.12880 \times 10^{-9}$ |
| $C_{10}$ = | $3.09490 \times 10^{-11}$ |

Variable Interval During Zooming

| | | | |
|---|---|---|---|
| f | 39.0158 | 75.6995 | 184.2870 |
| D3 | 2.1456 | 13.0157 | 29.6288 |
| D9 | 5.0581 | 3.0306 | 1.8932 |
| D11 | 2.5147 | 4.5423 | 5.6796 |
| D19 | 18.5191 | 11.0107 | 1.8932 |
| Bf | 7.9275 | 27.9672 | 75.7687 |

Focusing Displacement of Third Lens Group 4G3 at
Photographic Magnification of − 1/30

| | | | |
|---|---|---|---|
| focal length f | 39.0158 | 75.6995 | 184.2870 |
| D0 | 1122.5175 | 2191.3814 | 5338.9142 |
| Shift amount | 1.0514 | 0.8192 | 0.8389 |

Here, the sign of the shift amount is defined to be
positive when the movement is from the object side to the
image side.

Shift amount of the positive cemented lens 4L42 for image
shift of 0.01 |rad|

| | | | |
|---|---|---|---|
| focal length f | 39.0158 | 75.6995 | 184.2870 |
| Shift amount of the lens | 0.3155 | 0.3891 | 0.5523 |
| Shift amount of the image | 0.3901 | 0.7570 | 1.8430 |

Condition Corresponding Values

| | |
|---|---|
| f1 = | 87.061 |
| f2 = | -23.320 |
| f3 = | 38.040 |
| β2t = | -0.7583 |
| β2w = | -0.4004 |
| β5t = | 3.8706 |
| β5w = | 1.3093 |
| (1) (D1T − D1W)/(D4W − D4T) = | 1.653 |
| (2) f3/f1 = | 0.437 |
| (3) f2/(fw × ft)$^{1/2}$ = | 0.275 |
| (4) (β2t/β2w)/(ft/fw) = | 0.401 |
| (5) (β5t/β5w)/(ft/fw) = | 0.626 |
| (6) (βft/βfw)/(ft/fw) = | 0.467 |
| (7) r21/Da = | 2.401 |
| (8) (β2t/(β2w)/(β5t/β5w) = | 0.641 |
| (9) Db/fw = | 0.113 |

FIGS. 41a–46d are various aberration graphs for the fourth preferred embodiment relative to the d-line (Δ=587.6nm). FIGS. 41a–41d are various aberration graphs for an infinite focus state at a maximum wide-angle state (the closest-distance focusing state). FIGS. 42a–42d are various aberration graphs for the infinite focus state at an intermediate focal length state. FIGS. 43a–43d are various aberration graphs for an infinite focus state at a maximum telephoto state, i.e., the farthest-distance focusing state. FIGS. 44a–44d are various aberration graphs for a photographic magnification of −1/30 at maximum wide-angle state. FIGS. 45a–45d are various aberration graphs for a photographic magnification of −1/30 at intermediate focal length state. FIGS. 46a–46d are various aberration graphs for a photographic magnification of −1/30 at a maximum telephoto state.

Figure 47:
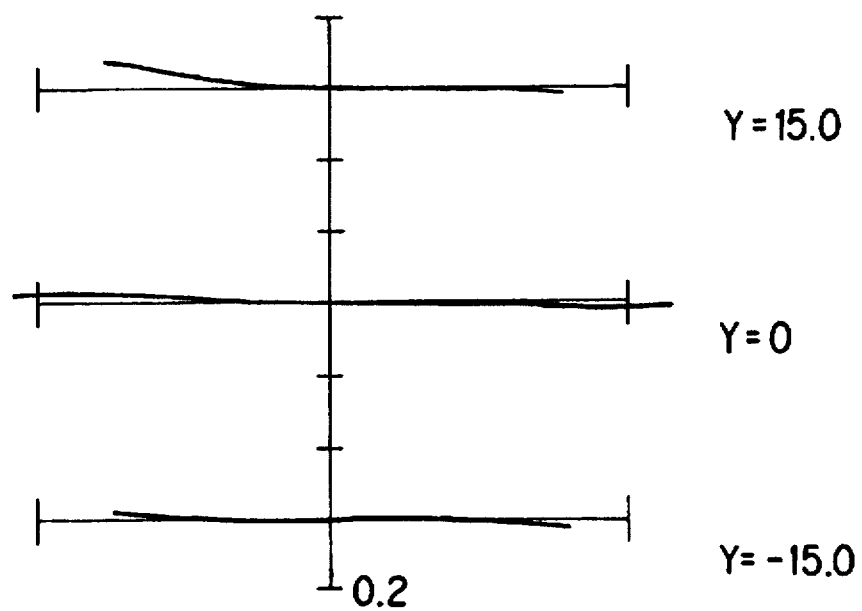
FIG. 47 is a drawing of coma aberrations during image shift for an infinite focus state at a maximum wide-angle state for the fourth preferred embodiment.
Figure 48:
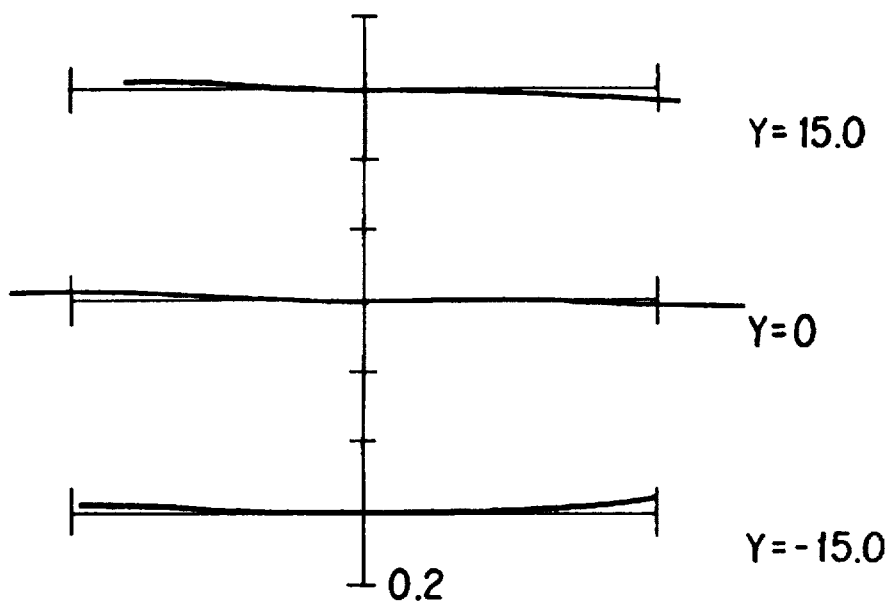
FIG. 48 is a drawing of coma aberrations during image shift for an infinite focus state at an intermediate focal length state for the fourth preferred embodiment.
Figure 49:
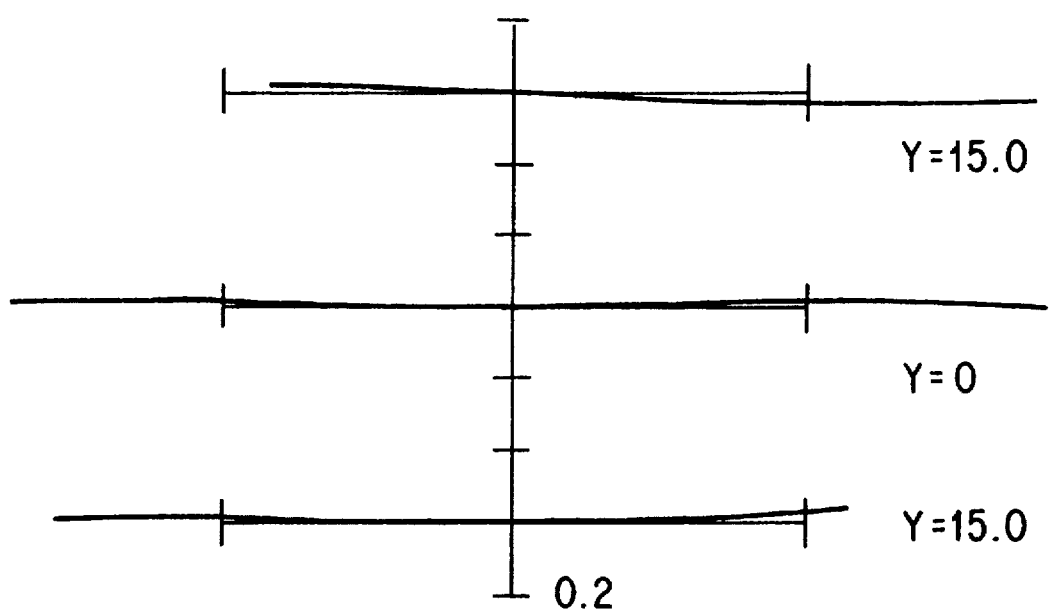
FIG. 49 is a drawing of coma aberrations during image shift for an infinite focus state at the maximum telephoto state for the fourth preferred embodiment.

FIGS. 47–49 illustrate comas when image is shifted 0.01 rad relative to the optical axis in the fourth embodiment. FIG. 47 illustrates comas for the infinite focus state at the maximum wide-angle state. FIG. 48 illustrates comas for an infinite focus state at the intermediate focal length state. FIG. 49 illustrates comas for an infinite focus state at the maximum telephoto state.

Each aberration described in FIGS. 47–49 is a coma corresponding to Y=15.0, 0, −15.0 when the positive cemented lens 4L42 is moved a positive direction with respect of the image height Y.

Figure 50:
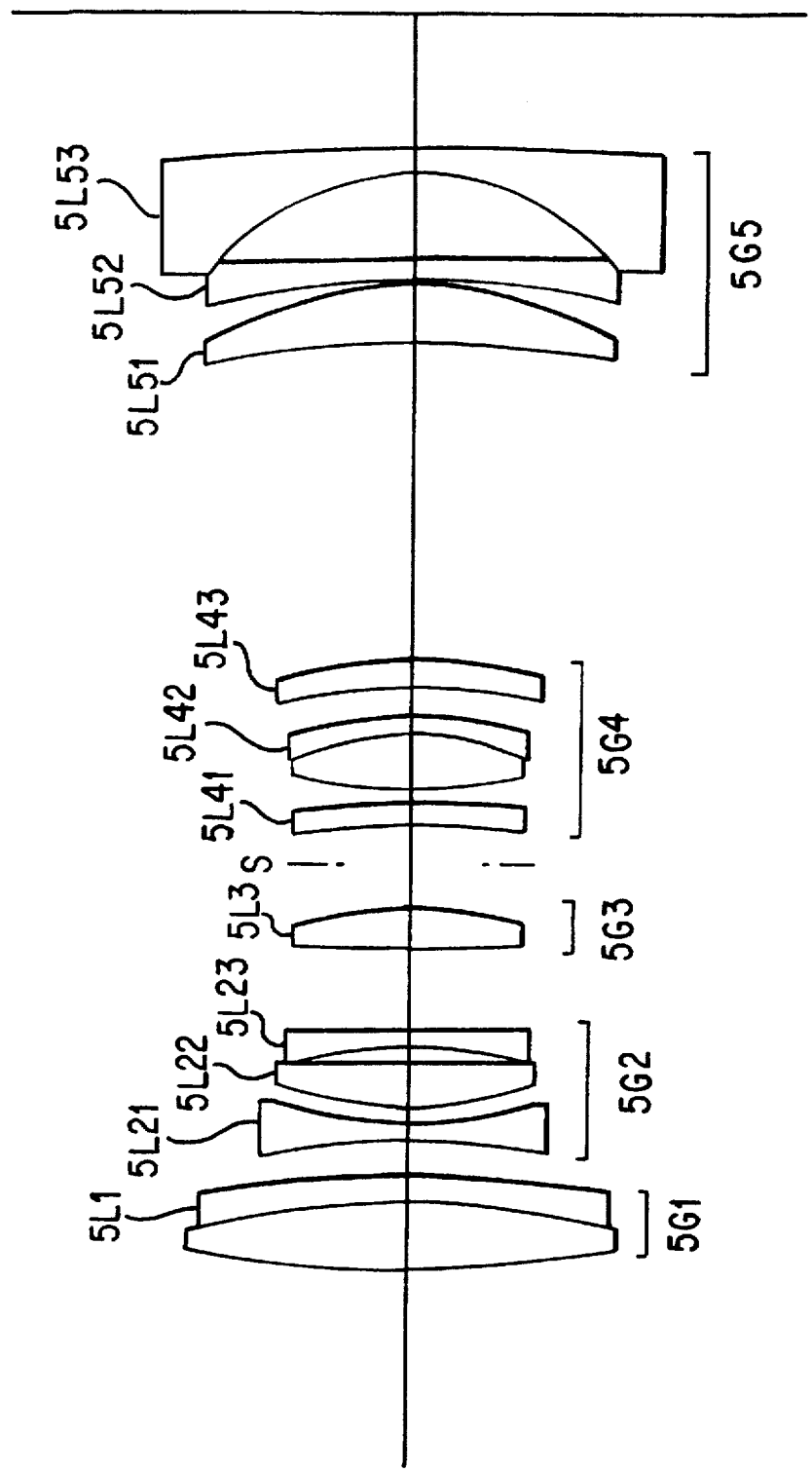
FIG. 50 is a side schematic drawing illustrating a lens structure according to a fifth preferred embodiment of the invention.

FIG. 50 illustrates a lens structure for the zoom lens system according to a fifth preferred embodiment of the invention.

The zoom lens system of FIG. 50 comprises, in order from the object side of the zoom lens system, a first lens group 5G1 comprising a positive cemented lens 5L1 which has a biconvex lens and a negative meniscus lens with a concave surface facing the object side; a second lens group 5G2 comprising a biconcave lens 5L21, a biconvex lens 5L22, and a biconcave lens 5L23; a third lens group 5G3 comprising a biconvex lens 5L3; a fourth lens group 5G4 comprising a negative meniscus lens with the concave surface facing the object side, a positive cemented lens 5L42 which has a biconvex lens and a negative meniscus lens with the concave surface facing the object side, and a positive meniscus lens 5L43 with the concave side facing the object side; and a fifth lens group 5G5 comprising a positive meniscus lens 5L51 with the concave surface facing the object side, a negative meniscus lens 5L52 with the concave surface facing the object side, and a negative meniscus lens 5L53 with the concave surface facing the object side.

An aperture diaphragm S is positioned between the third lens group 5G3 and fourth lens group 5G4 to move during zooming as one unit with the fourth lens group 5G4 from a maximum wide-angle state to the maximum telephoto state. Focusing is conducted by moving the third lens group 5G3 along the optical axis.

Shift in an image position caused by shaking hand is corrected by moving the positive cemented lens 5L42 of the fourth lens group 5G4 in a direction substantially perpendicular to the optical axis so as to shift the image.

Next, values of various dimensions in the fifth preferred embodiment are listed in Table 5. In Table 5, f denotes a focal length, FNO denotes a F-number, ω̄ denotes a half field angle, Bf denotes the back focus and D0 denotes the distance between the object and the surface closest to the object side along the optical axis. Moreover, the surface number is the lens surface order from the object side in the direction of a light ray. The values of refraction index and the Abbe number are relative to the d-line (Δ=587.6 nm).

TABLE 5 f = 39.01~75.66~184.27
FNO = 3.99~6.30~11.00
ω = 29.41~15.43~6.54°

| Surface Number | Radius of Curvature | Intersurface Distance | Refractive Index | Abbe Number |
|---|---|---|---|---|
| 1 | 62.31549 | 4.039 | 1.48749 | 70.45 |
| 2 | −43.65634 | 1.388 | 1.84666 | 23.83 |
| 3 | −70.88569 | (D3 = variable) | | |
| 4 | −39.91555 | 1.010 | 1.83500 | 42.97 |
| 5 | 21.49049 | 0.884 | | |
| 6 | 18.37810 | 2.903 | 1.80518 | 25.46 |
| 7 | −64.20963 | 0.757 | | |
| 8 | −21.85140 | 1.010 | 1.83500 | 42.97 |
| 9 | 654.53592 | (D9 = variable) | | |
| 10 | 800.51790 | 2.272 | 1.48749 | 70.45 |
| 11 | −18.96622 | (D11 = variable) | | |
| 12 | ∞ | 2.272 | (aperture diaphragm S) | |
| 13* | −40.83436 | 1.262 | 1.58518 | 30.24 |
| 14 | −63.10680 | 0.884 | | |
| 15 | 28.17317 | 3.155 | 1.48749 | 70.45 |
| 16 | −15.30773 | 1.010 | 1.84666 | 23.83 |
| 17 | −25.65505 | 1.767 | | |
| 18 | −34.72285 | 1.641 | 1.49108 | 57.57 |
| 19 | −26.11828 | (D19 = variable) | | |
| 20 | −59.59739 | 3.218 | 1.84666 | 23.83 |
| 21 | −22.86360 | 0.126 | | |
| 22 | −49.70550 | 1.262 | 1.80420 | 46.51 |
| 23 | −487.70330 | 4.922 | | |
| 24 | −15.07171 | 1.515 | 1.80420 | 46.51 |
| 25 | −152.99119 | (Bf) | | |

Aspherical Surface Data
(surface 13)

| | |
|---|---|
| R = | −40.83436 |
| κ = | 0.9156 |
| $C_4$ = | $-1.98700 \times 10^{-5}$ |
| $C_6$ = | $-5.60230 \times 10^{-8}$ |
| $C_8$ = | $-1.71840 \times 10^{-9}$ |
| $C_{10}$ = | $1.60910 \times 10^{-11}$ |

Variable Interval During Zooming

| f | 39.0126 | 75.6632 | 184.2741 |
|---|---|---|---|
| D3 | 2.1456 | 13.0157 | 29.6288 |
| D9 | 5.0581 | 3.0306 | 1.8932 |
| D11 | 2.5147 | 4.5423 | 5.6796 |
| D19 | 18.5191 | 11.0107 | 1.8932 |
| Bf | 7.9293 | 27.9573 | 75.8402 |

Focussing Displacement of Third Lens Group 5G3 at Photographic Magnification of −1/30

| focal length f | 39.0126 | 75.6632 | 184.2741 |
|---|---|---|---|
| D0 | 1122.4348 | 2190.3944 | 5339.4056 |
| Shift amount | 1.0503 | 0.8177 | 0.8332 |

Here, the shift amount sign is positive when movement is from the object side to the image side of the zoom lens system.

Shift amount of the positive cemented lens 5L42 for image shift of 0.01 |rad|

| focal length f | 39.0126 | 73.6632 | 184.2741 |
|---|---|---|---|
| Shift amount of the lens | 0.3156 | 0.3887 | 0.5513 |
| Shift amount of the image | 0.3903 | 0.7565 | 1.8427 |

Condition Corresponding Values

| | |
|---|---|
| f1 = | 87.238 |
| f2 = | −23.320 |
| f3 = | 38.040 |
| β2t = | −0.7548 |
| β2w = | −0.3995 |
| β5t = | 3.8702 |

TABLE 5-continued

| | |
|---|---|
| β5w = | 1.3082 |
| (1) (D1T − D1W)/(D4W − D4T) = | 1.653 |
| (2) f3/f1 = | 0.436 |
| (3) (f2/fw × ft)$^{1/2}$ = | 0.275 |
| (4) (β2t/β2w)/(ft/fw) = | 0.400 |
| (5) (β5t/β5w)/(ft/fw) = | 0.626 |
| (6) (βft/βfw)/(ft/fw) = | 0.468 |
| (7) r21/Da = | 2.433 |
| (8) (β2t/β2w)/(β5t/β5w) = | 0.639 |
| (9) Db/fw = | 0.113 |

FIGS. 51a–56d illustrate various aberration graphs of the fifth preferred embodiment relative to the d-line (Δ=587.6 nm). FIGS. 51a–51d are various aberration graphs for an infinite focus state at a maximum wide-angle state. FIGS. 52a–52d are various aberration graphs for an infinite focus state at an intermediate focal length state. FIGS. 53a–53d are various aberration graphs for an infinite focus state at a maximum telephoto state. FIGS. 54a–54d are various aberration graphs for a photographic magnification of −1/30 at a maximum wide-angle state. FIGS. 55a–55d are various aberration graphs for a photographic magnification of −1/30 at the intermediate focal length state. FIGS. 56a–56d are various aberration graphs for a photographic magnification of −1/30 at a maximum telephoto state.

Figure 57:
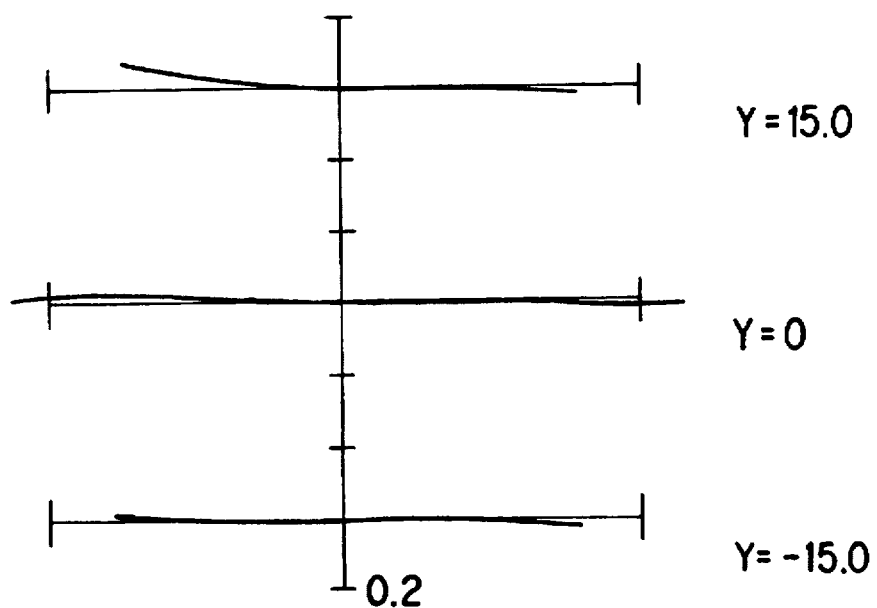
FIG. 57 is a drawing of coma aberrations during image shift for an infinite focus state at the maximum wide-angle state of the fifth preferred embodiment.
Figure 58:
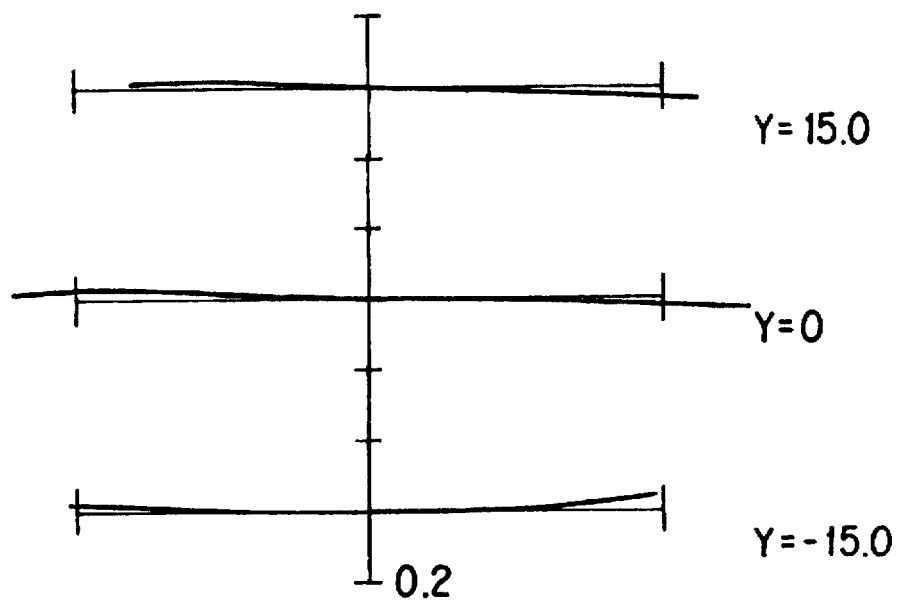
FIG. 58 is a drawing of coma aberrations during image shift for an infinite focus state at an intermediate focal length state in the fifth embodiment.
Figure 59:
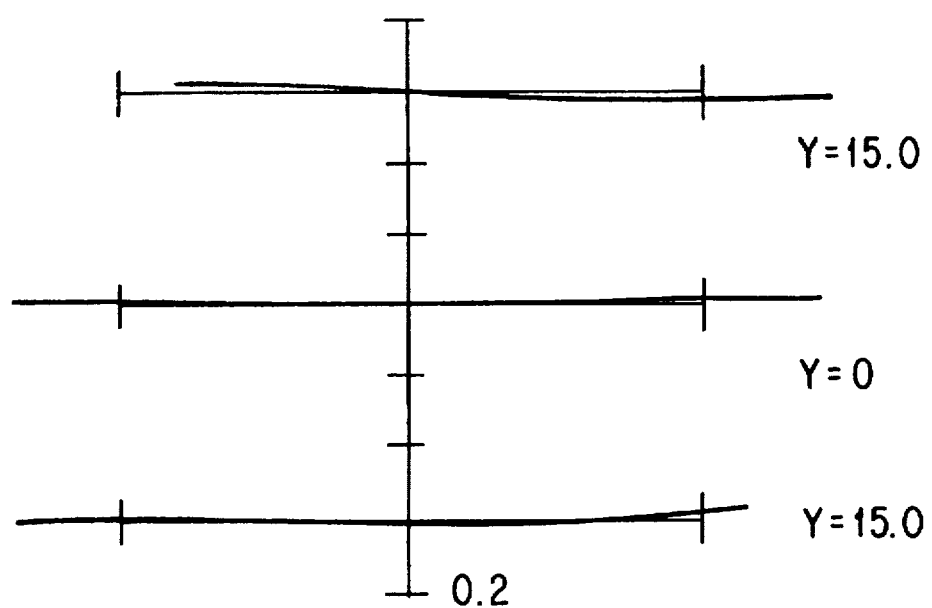
FIG. 59 is a drawing of coma aberrations during image shift for the infinite focus state at a maximum telephoto state in the fifth embodiment.

FIGS. 57–59 illustrates comas when image is shifted 0.01 rad relative to the optical axis in the second embodiment. FIG. 57 illustrates comas for the infinite focus state at the maximum wide-angle state. FIG. 58 illustrates comas for an infinite focus state at an intermediate focal length state. FIG. 59 illustrates comas for an infinite focus state at a maximum telephoto state.

Each aberration described in FIGS. 57–59 is a coma corresponding to Y=15.0, 0, −15.0 when the positive cemented lens 5L42 is moved the positive direction of the image height Y.

Figure 60:
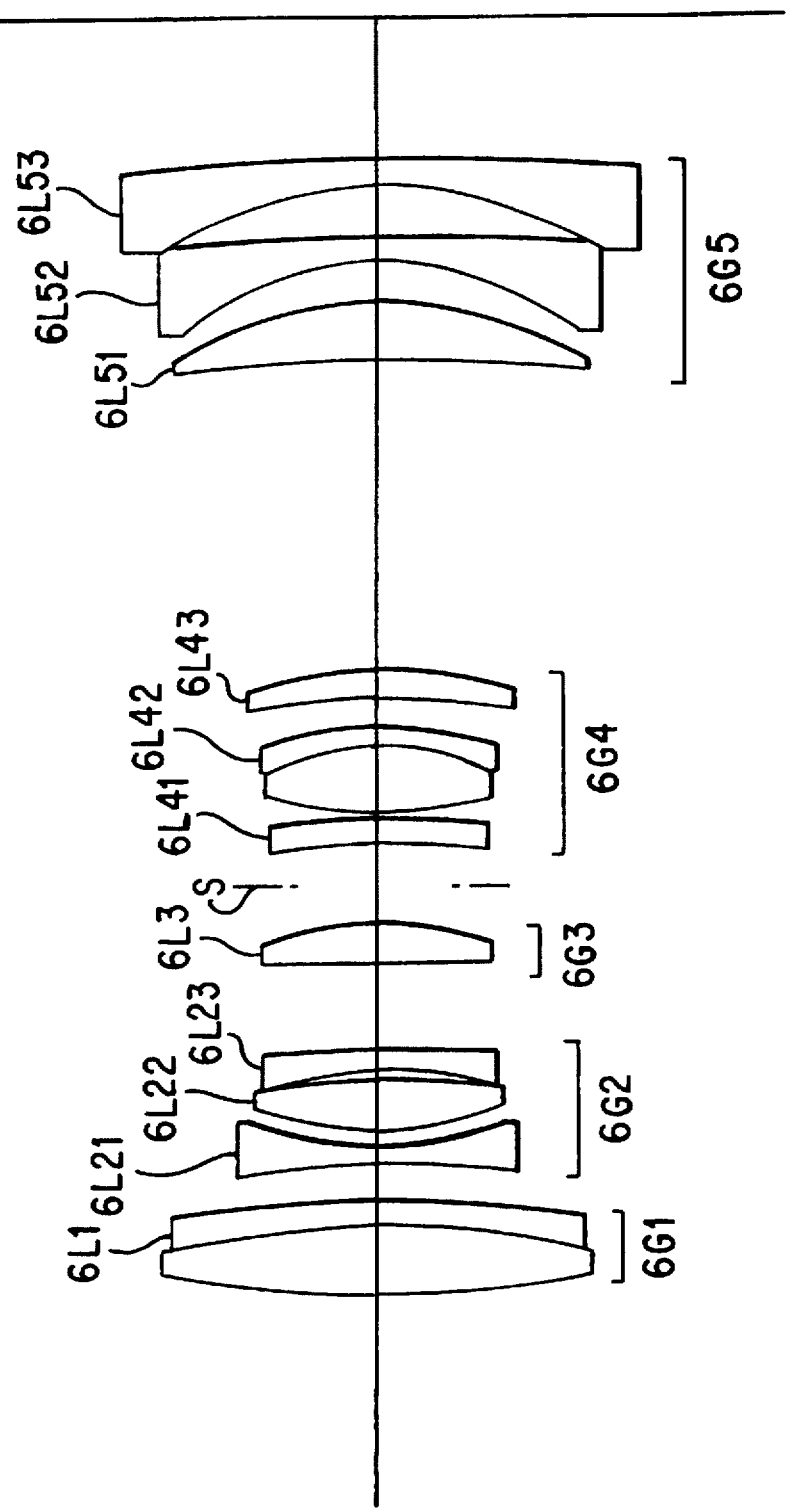
FIG. 60 is a side schematic drawing illustrating a lens structure according to a sixth preferred embodiment of the invention.

FIG. 60 illustrates a side schematic drawing of a lens structure of the zoom lens system according to a sixth preferred embodiment.

The zoom lens system of FIG. 60 comprises, in order from the object side, a first lens group 6G1 comprising a positive cemented lens 6L1 that has a biconvex lens and a negative meniscus lens with the concave surface facing the object side; a second lens group 6G2 comprising a biconcave lens 6L21, a biconvex lens 6L22, and a negative meniscus lens 6L23 with the concave surface facing the object side; a third lens group 6G3 comprising a positive meniscus lens 6L3 with the concave surface facing the object side; a fourth lens group 6G4 comprising a negative meniscus lens 6L41 with the concave surface facing the object side, a positive cemented lens 6L42 which has a biconvex lens and a negative meniscus lens with the concave surface facing the object side, and a positive meniscus lens 6L43 with the concave side facing the object side; and a fifth lens group 6G5 comprising a positive meniscus lens 6L51 with the concave surface facing the object side, a negative meniscus lens 6L52 with the concave surface facing the object side, and a negative meniscus lens 6L53 with the concave surface facing the object side.

An aperture diaphragm S is arranged between the third lens group 6G3 and fourth lens group 6G4 to move during zooming as one unit with the fourth lens group 6G4 from a maximum wide-angle state to the maximum telephoto state.

FIG. 60 also illustrates a positional relationship of each lens group at a maximum wide-angle state, which moves along the zoom path on the optical axis in the direction of the arrow in FIG. 39 during zooming to a maximum telephoto state.

Focusing is conducted by moving the third lens group 6G3 along the optical axis. Shift in image position caused by hand shaking can be corrected by moving the positive cemented lens 6L42 of the fourth lens group 6G4 in a direction substantially perpendicular to the optical axis so as to shift the image.

Next, values of various dimensions in the sixth preferred embodiment are listed in Table 6. In Table 6, f closest to the object side along the optical axis. The surface number is the lens surface order from the object side in the direction of a light ray. Values of refraction index and the Abbe's number are relative to the d-line ($\Delta$=587.6 nm).

TABLE 6 f = 38.99~75.40~184.27
FNO = 4.05~6.41~11.01
ω = 29.56~15.54~6.55°

| Surface Number | Radius of Curvature | Intersurface Distance | Refractive Index | Abbe Number |
|---|---|---|---|---|
| 1 | 60.01206 | 4.039 | 1.48749 | 70.41 |
| 2 | −52.29252 | 1.389 | 1.86074 | 23.01 |
| 3 | −86.55245 | (D3 = variable) | | |
| 4 | −44.58813 | 1.010 | 1.84042 | 43.35 |
| 5 | 21.23473 | 0.884 | | |
| 6 | 18.10575 | 2.903 | 1.76182 | 26.55 |
| 7 | −58.17945 | 0.757 | | |
| 8 | −20.44479 | 1.010 | 1.84042 | 43.35 |
| 9 | −497.50686 | (D9 = variable) | | |
| 10 | −578.28121 | 2.272 | 1.51680 | 64.20 |
| 11 | −19.02114 | (D11 = variable) | | |
| 12 | ∞ | 2.272 | (aperture diaphragm S) | |
| 13* | −42.07360 | 1.262 | 1.58518 | 30.24 |
| 14 | −63.10680 | 0.379 | | |
| 15 | 27.57729 | 3.660 | 1.48749 | 70.41 |
| 16 | −15.48975 | 1.010 | 1.86074 | 23.01 |
| 17 | −26.09981 | 1.767 | | |
| 18 | −37.31372 | 1.641 | 1.49108 | 57.57 |
| 19 | −27.41089 | (D19 = variable) | | |
| 20 | −93.48459 | 3.282 | 1.80458 | 25.50 |
| 21 | −20.84985 | 2.272 | | |
| 22 | −17.45299 | 1.262 | 1.83500 | 42.97 |
| 23 | −142.31147 | 2.903 | | |
| 24 | −22.20848 | 1.515 | 1.78800 | 47.50 |
| 25 | −133.79268 | (Bf) | | |

Aspherical Surface Data (surface 13)

R = −42.07360
κ = 0.3313
$C_4$ = −1.88420 × 10$^{-5}$
$C_6$ = −9.34560 × 10$^{-8}$
$C_8$ = −3.73950 × 10$^{-10}$
$C_{10}$ = 1.02900 × 10$^{-11}$

Variable Space for Zooming

| f | 38.9900 | 75.4021 | 184.2660 |
|---|---|---|---|
| D3 | 2.1569 | 13.4164 | 31.3238 |
| D9 | 5.0452 | 3.0718 | 1.5181 |
| D11 | 2.4697 | 4.4431 | 5.9968 |
| D19 | 17.6099 | 10.3507 | 1.8987 |
| Bf | 7.9510 | 28.0463 | 74.1264 |

Focusing Shift Amount of the Third Lens Group 6G3 at Photographic Magnification of − 1/30

| focal length f | 38.9900 | 75.4021 | 184.2660 |
|---|---|---|---|
| D0 | 1122.5739 | 2184.1911 | 5344.5913 |
| Shift amount | 1.0182 | 0.7805 | 0.7748 |

Here, the sign of the shift amount is defined to be positive when the movement is from the object side to the image side.

TABLE 6-continued

Shift amount of the positive cemented lens 6L42 for image shift of 0.01 |rad|

| focal length f | 38.9900 | 75.4021 | 184.2660 |
|---|---|---|---|
| Shift amount of the lens | 0.3158 | 0.3869 | 0.5542 |
| Shift amount of the image | 0.3899 | 0.7541 | 1.8427 |

Condition Corresponding Values

| | |
|---|---|
| f1 = | 92.134 |
| f2 = | −23.425 |
| f3 = | 37.864 |
| β2t = | −0.6949 |
| β2w = | −0.3725 |
| β5t = | 3.8312 |
| β5w = | 1.3214 |
| (1) (D1T − D1W)/(D4W − D4T) = | 1.856 |
| (2) f3/f1 = | 0.411 |
| (3) f2/(fw × ft)$^{1/2}$ = | 0.276 |
| (4) (β2t/β2w)/(ft/fw) = | 0.395 |
| (5) (β5t/β5w)/(ft/fw) = | 0.614 |
| (6) (βft/βfw)/(ft/fw) = | 0.456 |
| (7) r21/Da = | 2.727 |
| (8) (β2t/β2w)/(β5t/β5w) = | 0.643 |
| (9) Db/fw = | 0.111 |

FIGS. 61a–66d illustrate various aberration graphs of the sixth preferred embodiment relative to the d-line ($\Delta$=587.6 nm). FIGS. 61a–61d are various aberration graphs for an infinite focus state at a maximum wide-angle state. FIGS. 62a–62d are various aberration graphs for an infinite focus state at an intermediate focal length state. FIGS. 63a–63d are various aberration graphs for an infinite focus state at a maximum telephoto state. FIGS. 64a–64d are various aberration graphs for a photographic magnification of −1/30 at maximum wide-angle state. FIGS. 65a–65d are various aberration graphs for a photographic magnification of −1/30 at intermediate focal length state. FIGS. 66a–66d are various aberration graphs for a photographic magnification of −1/30 at a maximum telephoto state.

Figure 67:
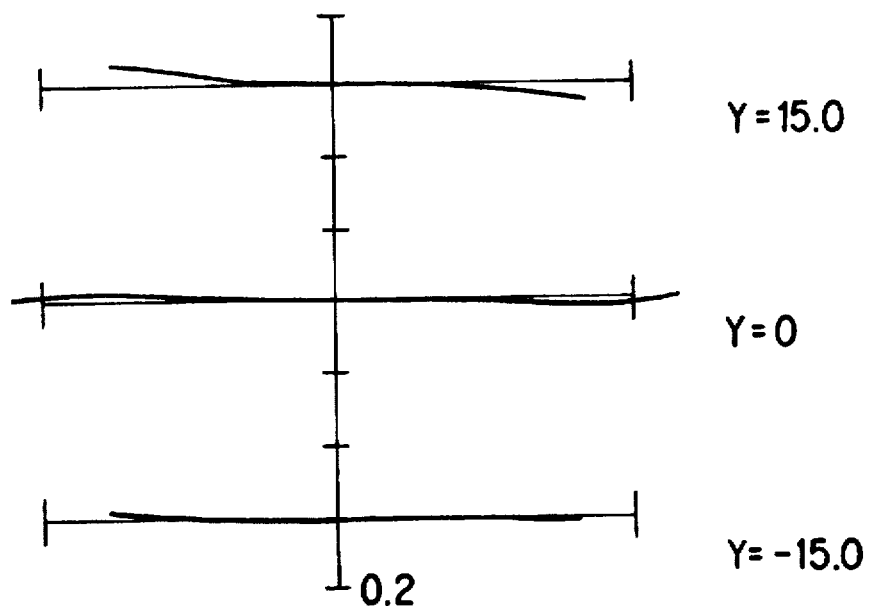
FIG. 67 is a drawing of coma aberrations during image shift for an infinite focus state at a maximum wide-angle state according to a sixth preferred embodiment.
Figure 68:
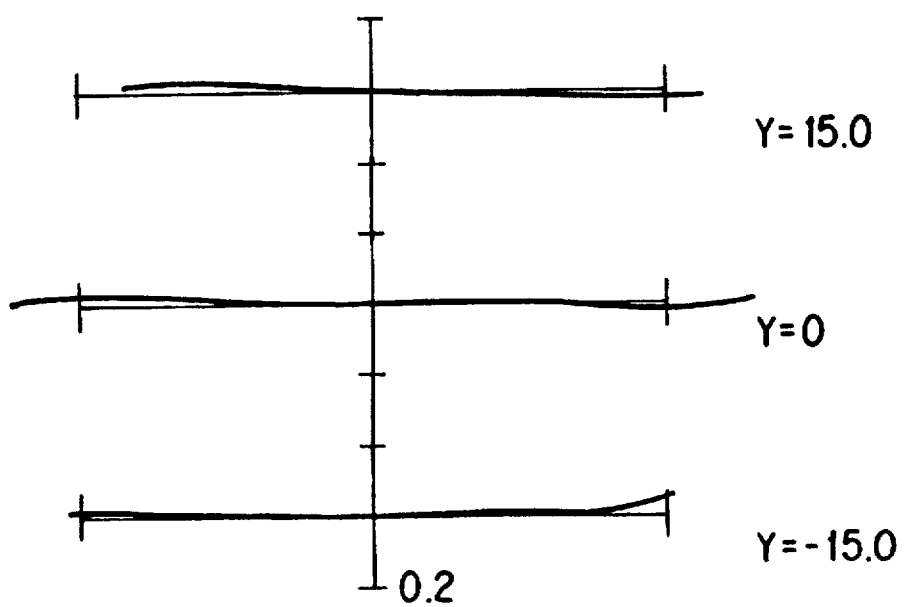
FIG. 68 is a drawing of coma aberrations during image shift for an infinite focus state at an intermediate focal length state according to a sixth preferred embodiment.
Figure 69:
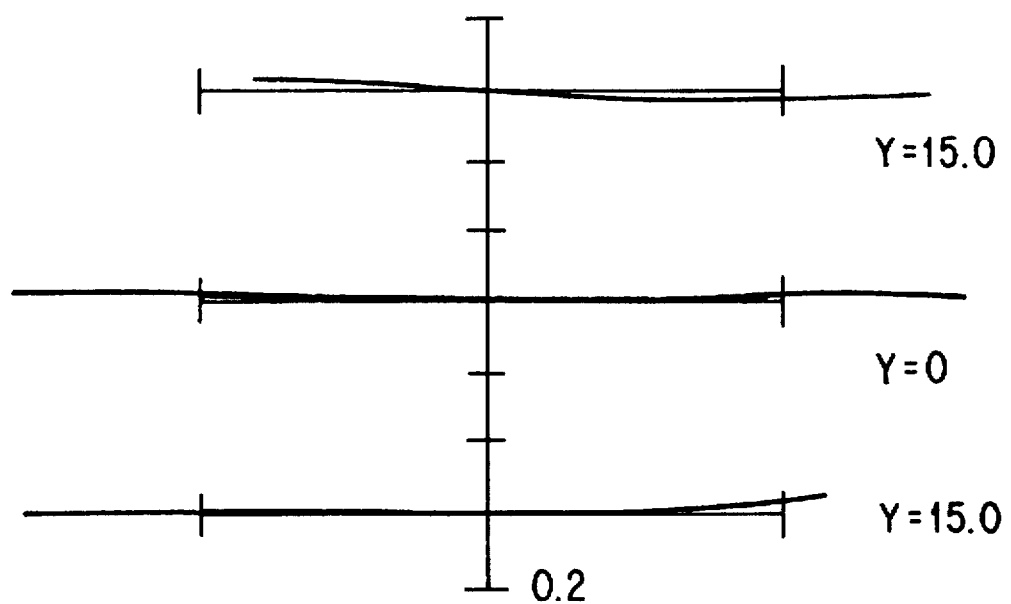
FIG. 69 is a drawing of coma aberrations during image shift for an infinite focus state at a maximum telephoto state according to a sixth preferred embodiment.

Furthermore, FIGS. 67–69 illustrate comas when the image is shifted 0.01 rad relative to the optical axis in the sixth preferred embodiment. FIG. 67 illustrates comas for an infinite focus state at the maximum wide-angle state. FIG. 68 illustrates comas for the infinite focus state at the intermediate focal length state. FIG. 69 illustrates comas for the infinite focus state at the maximum telephoto state.

Each aberration described in FIGS. 67–69 is a coma corresponding to Y=15.0, 0, −15.0 when the positive cemented lens 6L42 is moved a positive direction of the image height Y.

Figure 70:
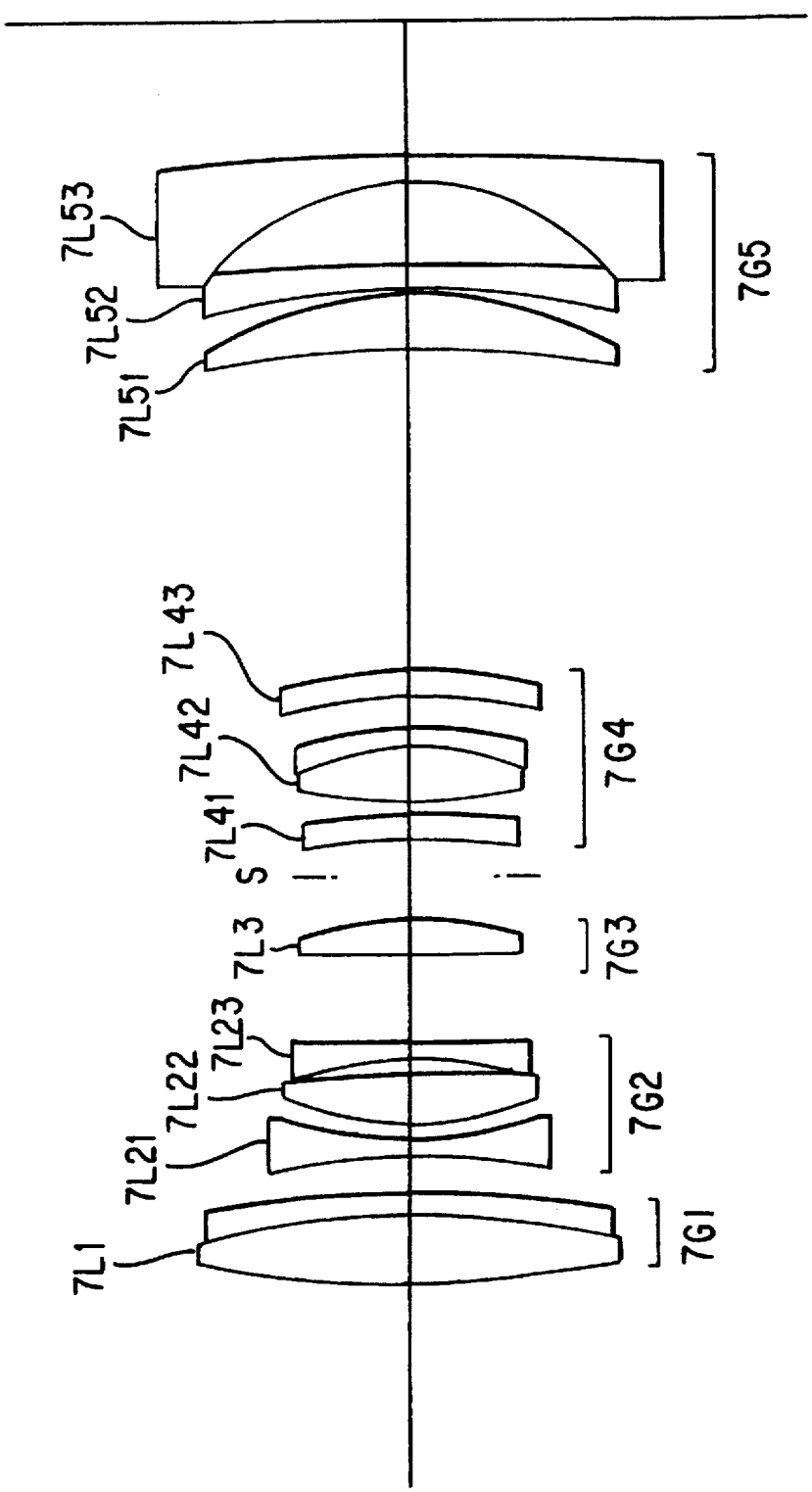
FIG. 70 is a side schematic drawing illustrating a lens structure according to a seventh preferred embodiment of the invention.

FIG. 70 illustrates a side schematic drawing of a lens structure of the zoom lens system according to a seventh preferred embodiment of the invention.

The zoom lens system of FIG. 70 comprises, in order from the object side, a first lens group 7G1 comprising a positive cemented lens 7L1 which has a biconvex lens and a negative meniscus lens with the concave surface facing the object side; a second lens group 7G2 comprising a biconcave lens 7L21, a biconvex lens 7L22, and a biconcave lens 7L23; a third lens group 7G3 comprising a biconvex lens 7L3; a fourth lens group 7G4 comprising a negative meniscus lens 7L41 with the concave surface facing the object side, a positive cemented lens 7L42 which has a biconvex lens and a negative meniscus lens with the concave surface facing the object side and a positive meniscus lens 7L43 with the concave side facing the object side; and a fifth lens group 7G5 comprising a positive meniscus lens 7L51 with the concave surface facing the object side, a negative meniscus lens 7L52 with the concave surface facing the object side, and a negative meniscus lens 7L53 with the concave surface facing the object side.

An aperture diaphragm S is positioned between the third lens group 7G3 and fourth lens group 7G4 to move during zooming as one unit with the fourth lens group 7G4 from maximum wide-angle state to the maximum telephoto state.

FIG. 70 shows a positional relationship of each lens group at the maximum wide-angle state that moves during zooming along the zoom path on the optical axis in the direction of the arrow in FIG. 39 to a maximum telephoto state.

Focusing is conducted by moving the third lens group 7G3 along the optical axis. Shift in image position caused by hand shaking is corrected by moving the positive cemented lens 7L42 in the fourth lens group 7G4 in a direction substantially perpendicular to the optical axis.

Next, values of various dimensions in the seventh preferred embodiment are listed in Table 7. In Table 7, f denotes the focal length, FNO denotes a F-number, ω denotes a half field angle, Bf denotes the back focus and D0 denotes the distance between the object and the surface closest to the object side along the optical axis. The surface number is the lens surface order from the object side along the direction of the advancement of the light rays. The values of refraction index and the Abbe number are relative to the d-line (Δ=587.6 nm).

TABLE 7 f = 38.99~75.40~126.15~184.27
FNO = 4.03~6.31~8.60~10.95
ω = 29.43~15.53~9.44~6.54°

| Surface Number | Radius of Curvature | Intersurface Distance | Refractive Index | Abbe Number |
|---|---|---|---|---|
| 1 | 62.3666 | 4.039 | 1.48749 | 70.41 |
| 2 | −44.0029 | 1.389 | 1.84666 | 23.83 |
| 3 | −71.5087 | (D3 = variable) | | |
| 4 | −37.3341 | 1.010 | 1.83500 | 42.97 |
| 5 | 22.4608 | 0.884 | | |
| 6 | 18.7866 | 2.966 | 1.80518 | 25.46 |
| 7 | −59.7420 | 0.694 | | |
| 8 | −22.4443 | 1.010 | 1.83500 | 42.97 |
| 9 | 301.9140 | (D9 = variable) | | |
| 10 | 484.6795 | 2.146 | 1.48749 | 70.45 |
| 11 | −19.1613 | (D11 = variable) | | |
| 12 | ∞ | 2.272 | (aperture diaphragm S) | |
| 13* | −40.8344 | 1.262 | 1.58518 | 30.24 |
| 14 | −63.1068 | 0.884 | | |
| 15 | 27.9496 | 3.155 | 1.48749 | 70.41 |
| 16 | −15.3979 | 1.010 | 1.84666 | 23.83 |
| 17 | −26.1317 | 1.767 | | |
| 18 | −35.2952 | 1.641 | 1.49108 | 57.57 |
| 19 | −26.4292 | (D19 = variable) | | |
| 20 | −68.6289 | 3.282 | 1.84666 | 23.83 |
| 21 | −23.4090 | 0.189 | | |
| 22 | −47.9518 | 1.262 | 1.83500 | 42.97 |
| 23 | −443.8415 | 4.922 | | |
| 24 | −15.1363 | 1.515 | 1.80420 | 46.51 |
| 25 | −155.1574 | (Bf) | | |

Aspherical Surface Data
(surface 13)

| | |
|---|---|
| R = | −40.8344 |
| K = | 0.3035 |
| $C_4$ = | $-2.11448 \times 10^{-5}$ |
| $C_6$ = | $-2.10943 \times 10^{-8}$ |
| $C_8$ = | $-3.40864 \times 10^{-9}$ |
| $C_{10}$ = | $4.21496 \times 10^{-11}$ |

TABLE 7-continued

Variable Interval During Zooming

| f | 39.0148 | 75.6936 | 126.2536 | 184.2538 |
|---|---|---|---|---|
| D3 | 2.1456 | 13.1337 | 23.1364 | 29.8573 |
| D9 | 5.0951 | 3.0629 | 1.9452 | 1.8932 |
| D11 | 2.4777 | 4.5099 | 5.6277 | 5.6796 |
| D19 | 18.6071 | 11.0761 | 5.9943 | 1.8932 |
| Bf | 7.9276 | 27.9017 | 50.1922 | 75.5528 |

Focusing Shift Amount of the Third Lens Group 7G3 at Photographic Magnification of − 1/30

| focal length f | 39.0148 | 75.6936 | 126.1536 | 184.2538 |
|---|---|---|---|---|
| D0 | 1123.4126 | 2192.4691 | 3657.7655 | 5342.4822 |
| Shift amount | 1.0194 | 0.7935 | 0.7694 | 0.8023 |

Here, the sign of the shift amount is defined to be positive when the movement is from the object side to the image side.

Shift amount of the positive cemented lens 7L42 for image shift of 0.01 |rad|

| focal length f | 39.0148 | 75.6936 | 126.15360 | 184.2538 |
|---|---|---|---|---|
| Shift amount of the lens | 0.3152 | 0.3890 | 0.4775 | 0.5523 |
| Shift amount of the image | 0.3900 | 0.7569 | 1.2617 | 1.8428 |

Condition Corresponding Values

| | |
|---|---|
| f1 = | 87.584 |
| f2 = | −23.128 |
| f3 = | 37.864 |
| β2t = | −0.7404 |
| β2w = | −0.3923 |
| β5t = | 3.8356 |
| β5w = | 1.3020 |
| (1) (D1T − D1W)/(D4W − D4T) = | 1.658 |
| (2) f3/f1 = | 0.432 |
| (3) f2/(fw × ft)$^{1/2}$ = | 0.273 |
| (4) (β2t/β2w)/(ft/fw) = | 0.400 |
| (5) (β5t/β5w)/(ft/fw) = | 0.624 |
| (6) (βft/βfw)/(ft/fw) = | 0.466 |
| (7) r21/Da = | 2.293 |
| (8) (β2t/β2w)/(β5t/β5w) = | 0.641 |
| (9) Db/fw = | 0.113 |

FIGS. 71a–78d illustrate various aberrations graphs of the seventh preferred embodiment relative to the d-line (Δ=587.6 nm). FIGS. 71a–71d are various aberration graphs for an infinite focus state at a maximum wide-angle state. FIGS. 72a–72d are various aberration graphs for a infinite focus state at a first intermediate focal length state. FIGS. 73a–73d are various aberration graphs for a infinite focus state at a second intermediate focal length state. FIGS. 74a–74d are various aberration graphs for an infinite focus state at a maximum telephoto state. FIGS. 76a–76d are various aberration graphs for a photographic magnification of −1/30 at a maximum wide-angle state. FIGS. 76a–76d are various aberration graphs for the photographic magnification of −1/30 at the first intermediate focal length state. FIG. 77a–77d are various aberration graphs for a photographic magnification of −1/30 at a second intermediate focal length state. FIGS. 78a–78a are various aberration graphs for a photographic magnification of −1/30 at the maximum telephoto state.

Figure 79:
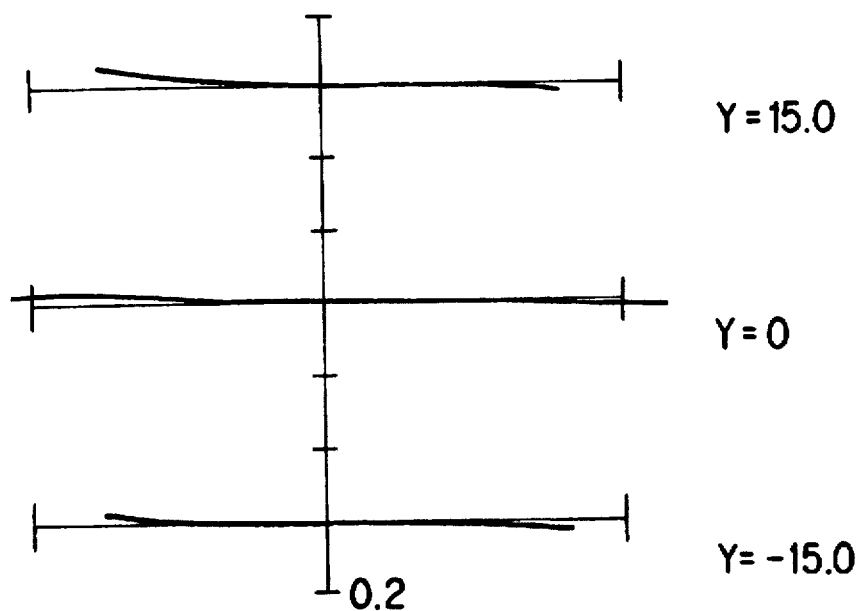
FIG. 79 is a drawing of coma aberrations during image shift for a infinite focus state at a maximum wide-angle state according to a seventh preferred embodiment.
Figure 80:
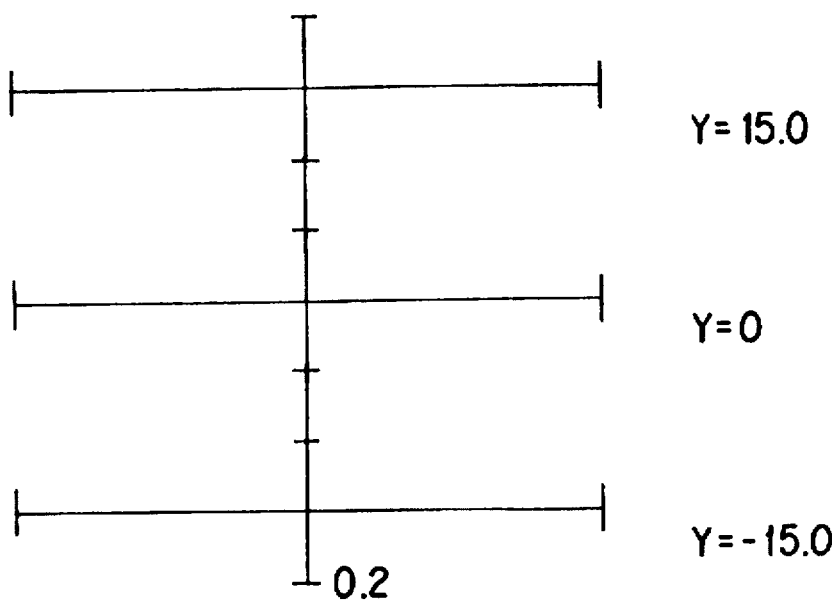
FIG. 80 is a drawing of coma aberrations during image shift for an infinite focus state at a first intermediate focal length state according to a seventh preferred embodiment.
Figure 81:
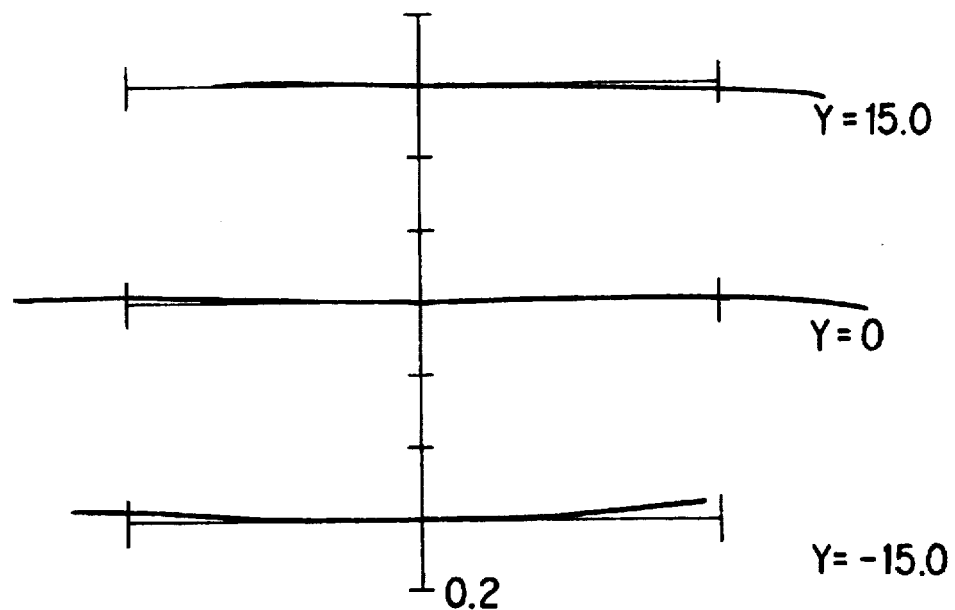
FIG. 81 is a drawing of coma aberrations during image shift for an infinite focus state at a second intermediate focal length state according to a seventh preferred embodiment.
Figure 82:
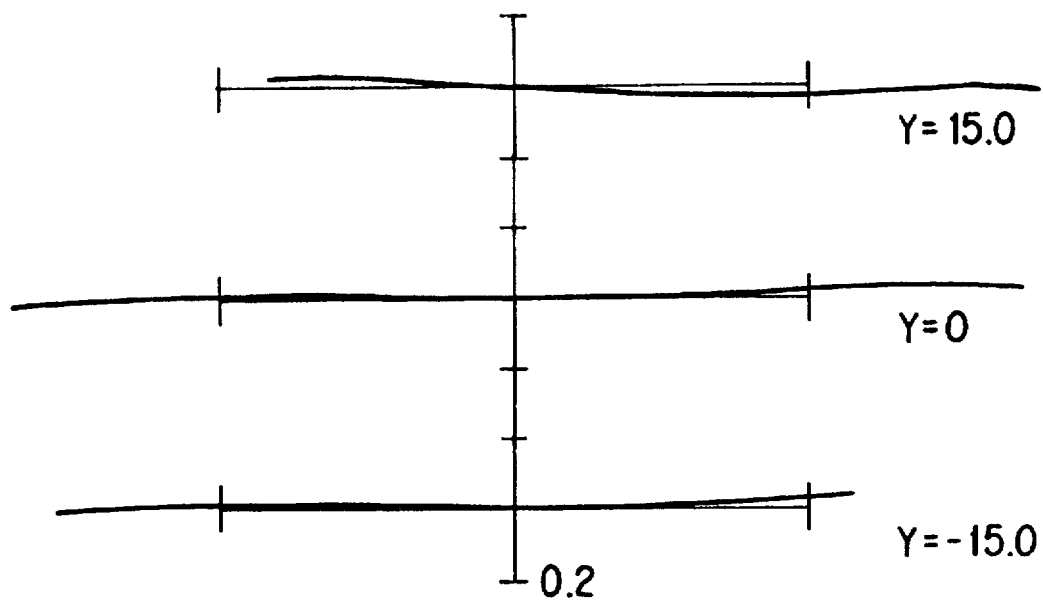
FIG. 82 is a drawing of coma aberrations during image shift for an infinite focus state at a maximum telephoto state according to a seventh preferred embodiment.

FIGS. 79–82 illustrate comas when the image is shifted 0.01 rad relative to the optical axis in the seventh preferred embodiment. FIG. 79 describes comas for a infinite focus state at the maximum wide-angle state. FIG. 80 describes comas for the infinite focus state at the first intermediate focal length state. FIG. 81 describes comas for an infinite focus state at the second intermediate focal length state. FIG. 82 describes comas for the infinite focus state at the maximum telephoto state.

Each aberration described in FIGS. 79–82 is a coma corresponding to Y=15.0, 0, −15 .0 when the positive cemented lens 7L42 is moved in the positive direction of the image height Y.

Figure 83:
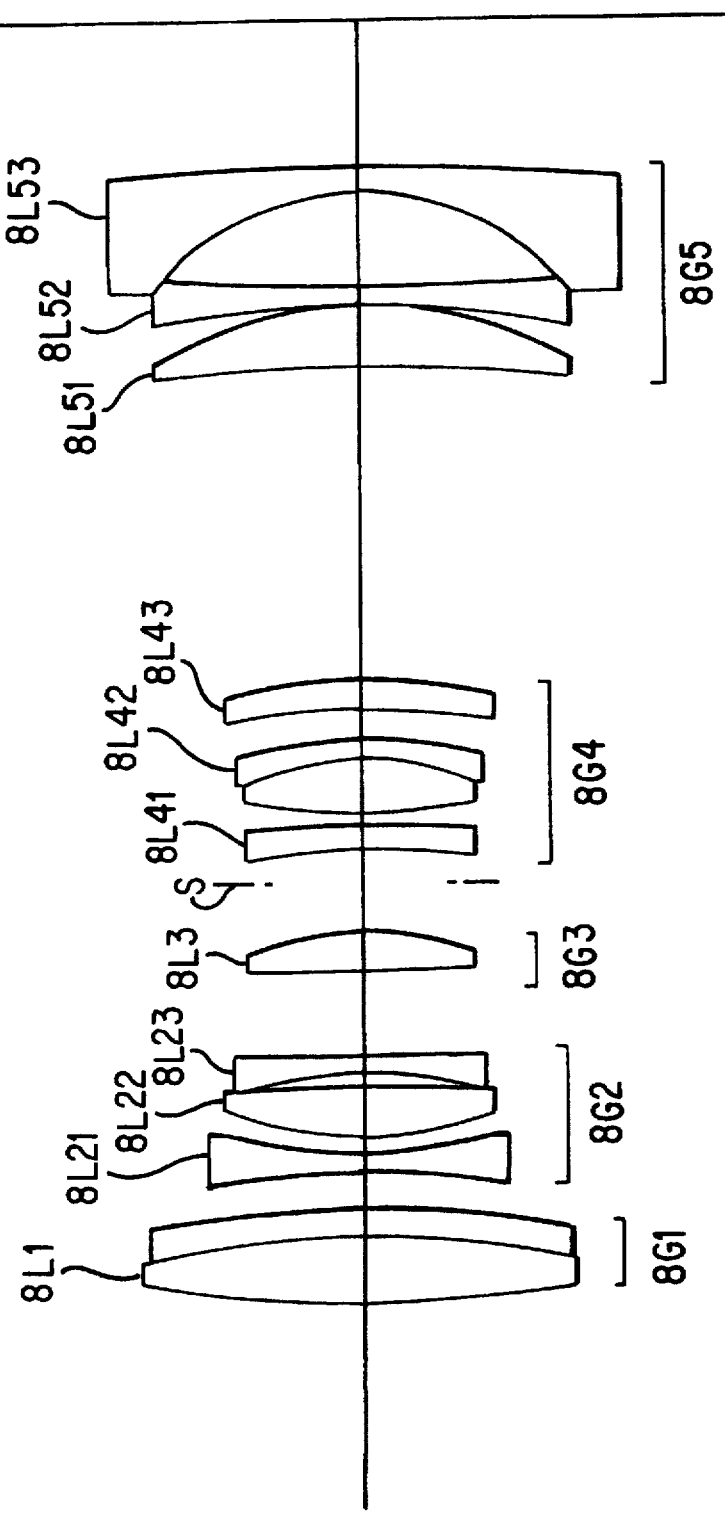
FIG. 83 is side schematic drawing illustrating a lens structure according to an eighth preferred embodiment of the invention.

FIG. 83 is a side schematic drawing of a lens of the zoom lens system according to an eighth preferred embodiment.

The zoom lens system of FIG. 83 comprises, in order from the object side, a first lens group 8G1 comprising a positive cemented lens 8L1 which has a biconvex lens and a negative meniscus lens with the concave surface facing the object side; a second lens group 8G2 comprising a biconcave lens 8L21, a biconvex lens 8L22, and a biconcave lens 8L23; a third lens group 8G3 comprising a biconvex lens 8L3; a fourth lens group 8G4 comprising a negative meniscus lens 8L41 with the concave surface facing the object side, a positive cemented lens 8L42 which has a biconvex lens and a negative meniscus lens with the concave surface facing the object side, and a positive meniscus lens 8L43 with the concave side facing the object side; and a fifth lens group 8G5 comprising a positive meniscus lens 8L51 with the concave surface facing the object side, a biconcave lens 8L52, and a negative meniscus lens 8L53 with the concave surface facing the object side.

An aperture diaphragm S is positioned between the third lens group 8G3 and fourth lens group 8G4 to move during zooming as a unit with the fourth lens groups 8G4 from a maximum wide-angle state to a maximum telephoto state.

FIG. 83 also illustrates a positional relationship of each lens group at a maximum wide-angle state. The lens groups move along the zoom path on the optical axis in the direction of the arrow in FIG. 39 during zooming to the maximum telephoto state.

Focusing is executed by moving the third lens group 8G3 along the optical axis. A shift in image position caused by hand shaking is corrected by moving the positive cemented lens 8L42 in the fourth lens group 8G4 in a direction substantially perpendicular to the optical axis.

Next, values of various dimensions in the eighth preferred embodiment are listed in Table 8. In Table 8, f denotes the focal length, FNO denotes a F-number, $\overline{\omega}$ denotes a half field angle, Bf denotes the back focus and D0 denotes the distance between the object and the surface closest to the object side along the optical axis. The surface number is the lens surface order from the object side in a direction of a light ray. Values of refraction index and the Abbe's number are relative to the d-line (Δ=587.6 nm).

TABLE 8 f = 38.99~71.33~121.51~184.27
FNO = 3.96~5.95~8.34~11.00
ω = 29.26~16.27~9.78~6.54°

| Surface Number | Radius of Curvature | Intersurface Distance | Refractive Index | Abbe Number |
|---|---|---|---|---|
| 1 | 64.8786 | 4.039 | 1.48749 | 70.41 |
| 2 | −44.0268 | 1.389 | 1.84666 | 23.83 |
| 3 | −71.2983 | (D3 = variable) | | |
| 4 | −47.9671 | 1.010 | 1.83500 | 42.97 |
| 5 | 22.3210 | 1.010 | | |
| 6 | 18.5288 | 2.903 | 1.80518 | 25.46 |
| 7 | −82.6139 | 0.694 | | |
| 8 | −22.7213 | 1.010 | 1.83500 | 42.97 |
| 9 | 134.9364 | (D9 = variable) | | |
| 10 | 1262.1360 | 2.146 | 1.51680 | 64.20 |

TABLE 8-continued

| 11 | −20.0833 | (D11 = variable) | | |
|---|---|---|---|---|
| 12 | ∞ | 2.272 | (aperture diaphragm S) | |
| 13* | −40.8344 | 1.262 | 1.58518 | 30.24 |
| 14 | −63.1068 | 0.884 | | |
| 15 | 29.3204 | 3.155 | 1.48749 | 70.41 |
| 16 | −14.5314 | 1.010 | 1.84666 | 23.83 |
| 17 | −23.7048 | 1.767 | | |
| 18 | −34.8120 | 1.641 | 1.49108 | 57.57 |
| 19 | −26.1669 | (D19 = variable) | | |
| 20 | −92.0506 | 3.282 | 1.84666 | 23.83 |
| 21 | −24.0797 | 0.126 | | |
| 22 | −51.8483 | 1.262 | 1.83500 | 42.97 |
| 23 | 527.5741 | 5.049 | | |
| 24 | −14.9064 | 1.515 | 1.83500 | 42.97 |
| 25 | −125.8215 | (Bf) | | |

Aspherical Surface Data
(surface 13)

R = −40.8344
κ = 0.3072
$C_4 = -2.19013 \times 10^{-5}$
$C_6 = -9.86635 \times 10^{-9}$
$C_8 = -2.20304 \times 10^{-9}$
$C_{10} = -2.30576 \times 10^{-11}$ Variable Interval During Zooming

| f | 38.9916 | 71.3347 | 121.5085 | 184.2739 |
|---|---|---|---|---|
| D3 | 2.1456 | 1.1825 | 23.1413 | 29.6264 |
| D9 | 5.0942 | 3.4256 | 2.2828 | 1.8932 |
| D11 | 2.4786 | 4.1472 | 5.2900 | 5.6796 |
| D19 | 17.6699 | 10.7902 | 5.7074 | 1.8932 |
| Bf | 8.2242 | 25.6272 | 48.2883 | 75.6604 |

Focusing Shift Amount of the Third Lens Group 8G3 at Photographic Magnification of −1/30

| focal length f | 38.9916 | 71.3347 | 121.5085 | 184.2739 |
|---|---|---|---|---|
| D0 | 1122.7788 | 2062.0027 | 3521.1028 | 5353.6429 |
| Shift amount | 1.0190 | 0.8342 | 0.7750 | 0.7459 |

Here, the sign of the shift amount is defined to be positive when the movement is from the object side to the image side.

Shift amount of the positive cemented lens 8L42 for image shift of 0.01 |rad|

| focal length f | 38.9916 | 71.3347 | 121.5085 | 184.2739 |
|---|---|---|---|---|
| Shift amount of the lens | 0.3049 | 0.3718 | 0.4535 | 0.5227 |
| Shift amount of the image | 0.3899 | 0.7134 | 1.2151 | 1.8428 |

Condition Corresponding Values f1 = 89.612
f2 = −23.224
f3 = 38.274
β2t = −0.7041
β2w = −0.3841
β5t = 3.9235
β5w = 1.3176
(1) (D1T − D1W)/(D4W − D4T = 1.742
(2) f3/f1 = 0.427
(3) f2/(fw × ft)$^{1/2}$ = 0.274
(4) (β2t/β2w)/(ft/fw) = 0.388
(5) (β5t/β5w)/(ft/fw) = 0.631
(6) (βft/βfw)/(ft/fw) = 0.464
(7) r21/Da = 2.935
(8) (β2t/β2w)/(β5t/β5w) = 0.615
(9) Db/fw = 0.113

FIGS. 84a–91d are various aberration graphs of the eighth preferred embodiment relative to the d-line (Δ=587.6 nm). FIGS. 84a–84d are various aberration graphs for an infinite focus state at a maximum wide-angle state. FIGS. 85a–85d are various aberration graphs for an infinite focus state at a first intermediate focal length state. FIGS. 86a–86d are various aberration graphs for an infinite focus state at a second intermediate focal length state. FIGS. 87a–87d are various aberration graphs for an infinite focus state at the maximum telephoto state. FIGS. 88a–88d are various aberration graphs for a photographic magnification of $-\frac{1}{30}$ at the maximum wide-angle state and FIGS. 89a–89d are various aberration graphs for a photographic magnification of $-\frac{1}{30}$ at the first intermediate focal length state. FIGS. 90a–90d are various aberration graphs for a photographic magnification of $-\frac{1}{30}$ at the second intermediate focal length state. FIG. 91a–91d are various aberration graphs for a photographic magnification of $-\frac{1}{30}$ at a maximum telephoto state.

Figure 92:
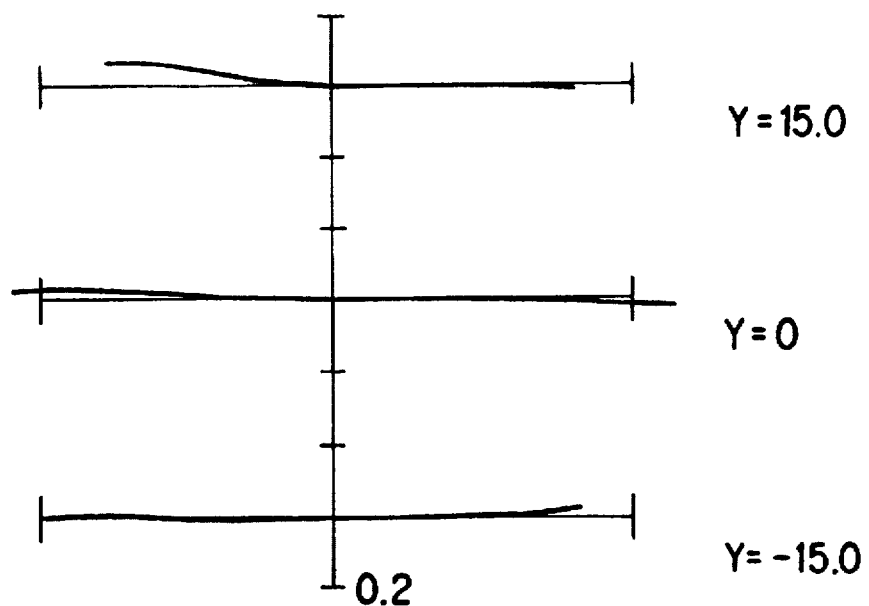
FIG. 92 is a drawing of coma aberrations during image shift for an infinite focus state at a maximum wide-angle state according to an eighth preferred embodiment.
Figure 93:
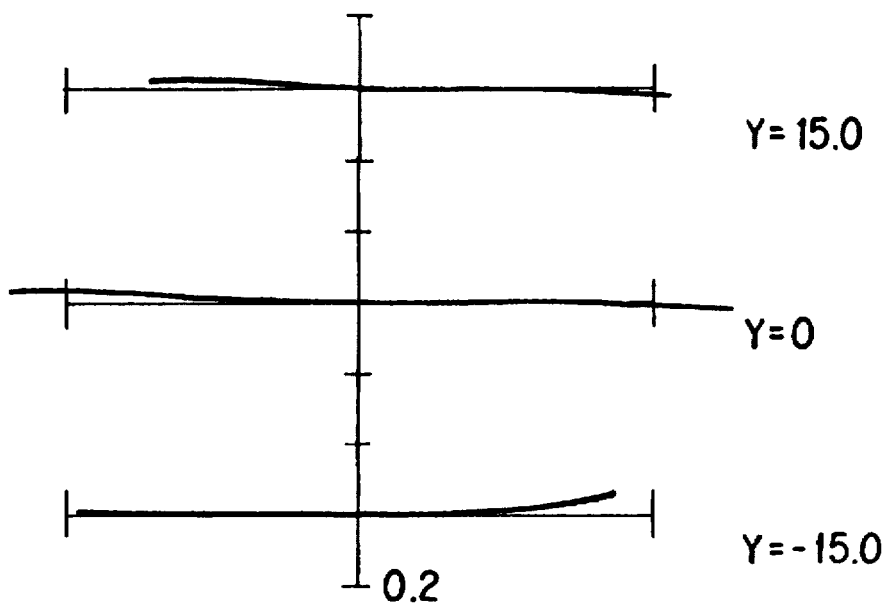
FIG. 93 is a drawing of coma aberrations during image shift for an infinite focus state at a first intermediate focal length state according to an eighth preferred embodiment.
Figure 94:
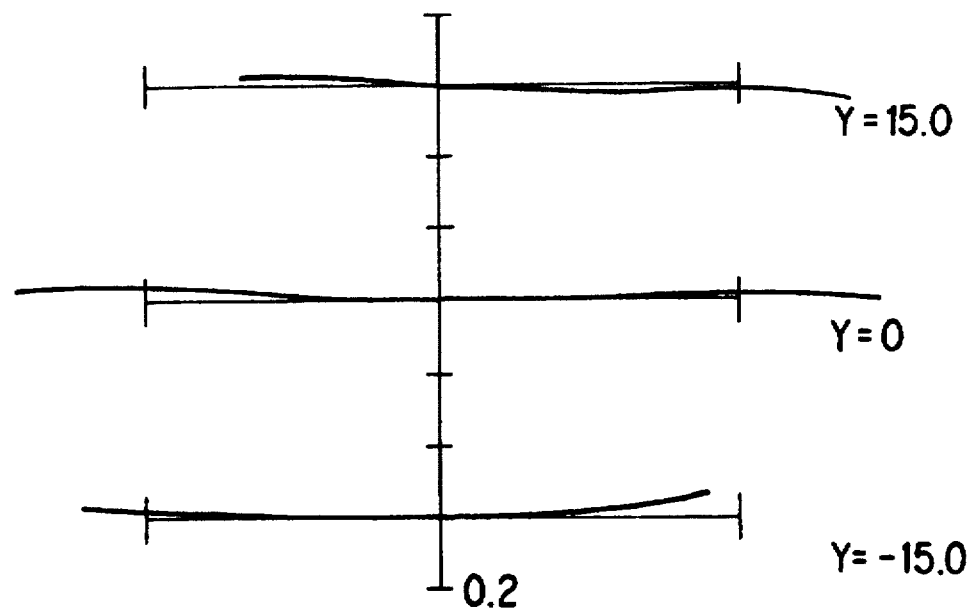
FIG. 94 is a drawing of coma aberrations during image shift for an infinite focus state at a second intermediate focal length state according to an eighth preferred embodiment.
Figure 95:
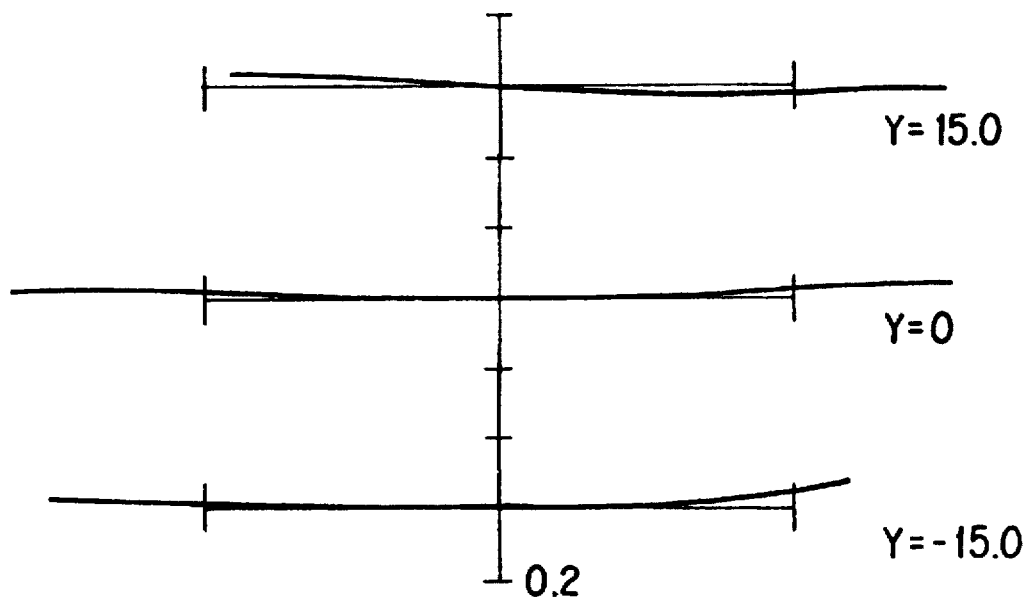
FIG. 95 is a coma graph during image shift for an infinite focus state at a maximum telephoto state according to an eighth preferred embodiment.

FIGS. 92–95 describe comas when the image is shifted 0.01 rad relative to the optical axis in the eighth embodiment. FIG. 92 describes comas for an infinite focus state at the maximum wide-angle state. FIG. 93 describes comas for an infinite focus state at a first intermediate focal length state. FIG. 94 describes comas for an infinite focus state at the second intermediate focal length state. FIG. 95 describes comas for the infinite focus state at the maximum telephoto state.

Each aberration in FIGS. 92–95 is a coma corresponding to Y=15.0, 0, −15 .0 when the positive cemented lens 8L42 is moved in the positive direction of the image height Y.

Figure 96:
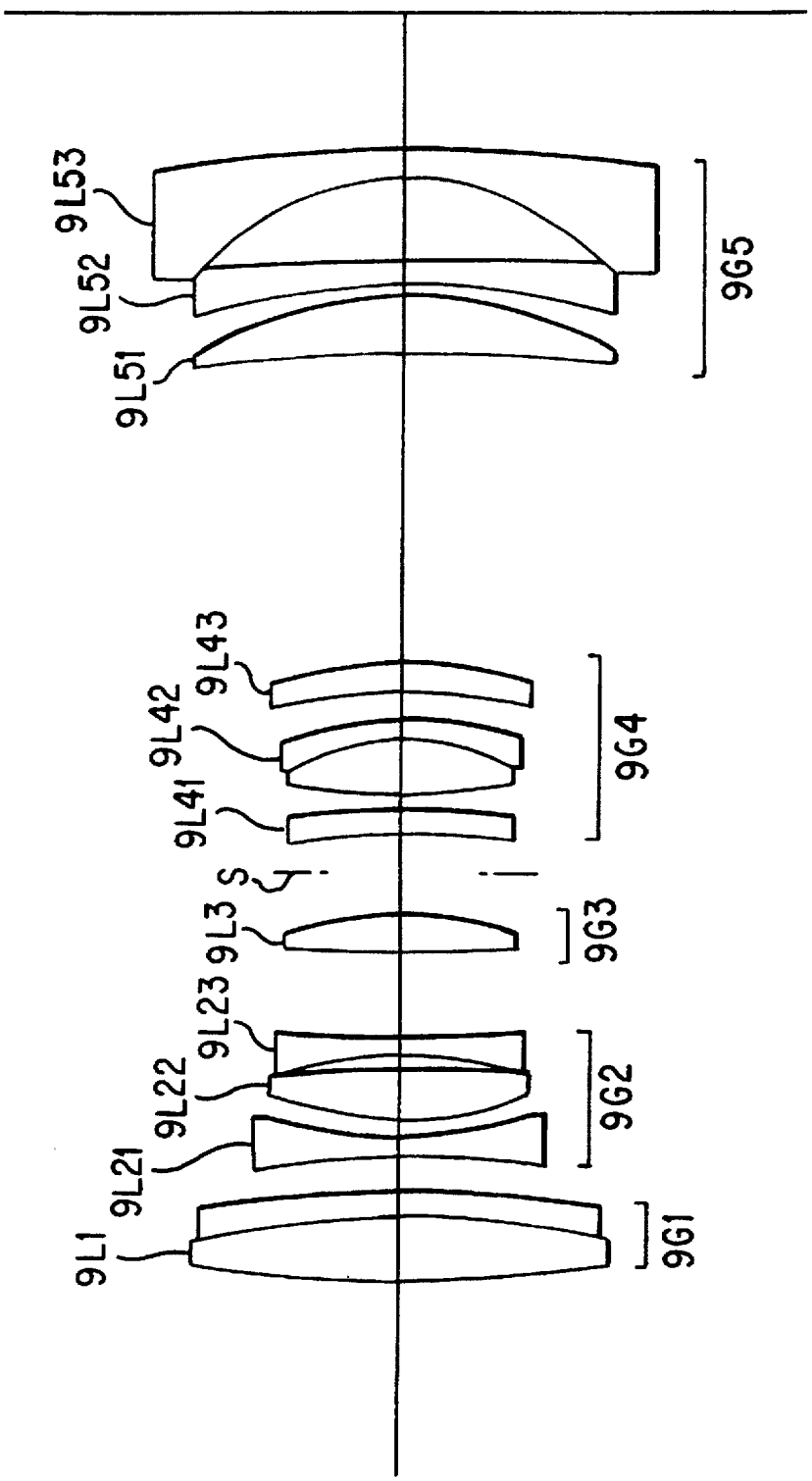
FIG. 96 is a side schematic drawing illustrating a lens structure according to a ninth preferred embodiment of the invention.

FIG. 96 is a side schematic drawing of a lens structure of a zoom lens system according to a ninth preferred embodiment of the invention.

The zoom lens system of FIG. 96 comprises, in order from the object side, a first lens group 9G1 comprising a positive cemented lens 9L1 which has a biconvex lens and a negative meniscus lens with the concave surface facing the object side; a second lens group 9G2 comprising a biconcave lens 9L21, a biconvex lens 9L22, and a biconcave lens 9L23; a third lens group 9G3 comprising a biconvex lens 9L3; a fourth lens group 9G4 comprising a negative meniscus lens 9L41 with the concave surface facing the object side, a positive cemented lens 9L42 which has a biconvex lens and a negative meniscus lens with the concave surface facing the object side, and a positive meniscus lens 9L43 with the concave side facing the object side; and a fifth lens group 9G5 comprising a positive meniscus lens 9L51 with the concave surface facing the object side, a negative meniscus lens 9L52 with the concave surface facing the object side, and a negative meniscus lens 9L53 with the concave surface facing the object side.

An aperture diaphragm S is positioned between the third lens group 9G3 and fourth lens group 9G4 to move during zooming as one unit with the fourth lens group 9G4 from the maximum wide-angle state to the maximum telephoto state.

FIG. 96 also describes a positional relationship of each lens group at a maximum wide-angle state. The lens groups move along the zoom path on the optical axis in the direction of the arrow in FIG. 39 during zooming to a maximum telephoto state.

Focusing is conducted by moving the third lens group 9G3 along the optical axis.

A shift in an image position caused by hand shaking is corrected by moving the positive cemented lens 9L42 in the fourth lens group 9G4 in a direction substantially perpendicular to the optical axis.

Next, values of various dimensions in the ninth preferred embodiment of the present invention are listed in Table 9. In Table 9, f denotes the focal length, FNO denotes a F-number, $\overline{\omega}$ denotes a half field angle, Bf denotes the back focus and D0 denotes the distance between the object and the surface closest to the object side along the optical axis. The surface number is the lens surface order from the object side in a direction of a light ray. Values of refraction index and the Abbe's number are relative to the d-line ($\Delta$=587.6 nm).

TABLE 9 f = 38.99~71.33~121.51~184.27
FNO = 3.96~5.95~8.34~11.00
ω = 29.26~16.27~9.78~6.54°

| Surface Number | Radius of Curvature | Intersurface Distance | Refractive Index | Abbe Number |
|---|---|---|---|---|
| 1 | 70.9089 | 4.039 | 1.48749 | 70.41 |
| 2 | −43.6667 | 1.389 | 1.84666 | 23.83 |
| 3 | −70.7874 | (D3 = variable) | | |
| 4 | −46.3038 | 1.010 | 1.83500 | 42.97 |
| 5 | 24.5894 | 1.010 | | |
| 6 | 19.4033 | 2.903 | 1.80518 | 25.46 |
| 7 | −67.5285 | 0.757 | | |
| 8 | −22.5641 | 1.010 | 1.83500 | 42.97 |
| 9 | 128.7035 | (D9 = variable) | | |
| 10 | 416.6934 | 2.146 | 1.51680 | 64.20 |
| 11 | −20.0627 | (D11 = variable) | | |
| 12 | ∞ | 2.272 | (aperture diaphragm S) | |
| 13* | −40.8347 | 1.262 | 1.58518 | 30.24 |
| 14 | −63.1068 | 0.884 | | |
| 15 | 30.1461 | 3.155 | 1.48749 | 70.41 |
| 16 | −14.2517 | 1.010 | 1.84666 | 23.83 |
| 17 | −23.8071 | 1.767 | | |
| 18 | −32.0616 | 1.641 | 1.49108 | 57.57 |
| 19 | −2.6369 | (D19 = variable) | | |
| 20 | −85.5884 | 3.282 | 1.84666 | 23.83 |
| 21 | −23.4859 | 0.618 | | |
| 22 | −40.4859 | 1.262 | 1.83500 | 42.97 |
| 23 | −992.8714 | 4.903 | | |
| 24 | −14.8901 | 1.515 | 1.83500 | 42.97 |
| 25 | −97.4552 | (Bf) | | |

Aspherical Surface Data
(surface 13)

R = −40.8344
κ = 0.3072
$C_4 = -2.19013 \times 10^{-5}$
$C_6 = -9.86635 \times 10^{-9}$
$C_8 = -2.20304 \times 10^{-9}$
$C_{10} = -2.30576 \times 10^{-11}$ Variable Interval During Zooming

| f | 38.9855 | 72.8565 | 122.8549 | 184.2862 |
|---|---|---|---|---|
| D3 | 2.1456 | 13.7953 | 23.3414 | 30.4992 |
| D9 | 5.0821 | 3.4037 | 1.9255 | 1.8932 |
| D11 | 2.4907 | 4.1692 | 5.6474 | 5.6797 |
| D19 | 17.6700 | 10.4440 | 5.9656 | 1.8932 |
| Bf | 7.9517 | 26.4274 | 48.6728 | 76.3285 |

Focusing Shift Amount of the Third Lens Group 9G3 at
Photographic Magnification of $-\frac{1}{30}$

| focal length f | 38.9855 | 72.8565 | 122.8549 | 184.2862 |
|---|---|---|---|---|
| D0 | 1121.3881 | 2105.6720 | 3565.1357 | 5357.2181 |
| Shift amount | 1.0190 | 0.8343 | 0.7750 | 0.7459 |

Here, the sign of the shift amount is defined to be
positive when the movement is from the object side to the
image side.

Shift amount of the positive cemented lens 9L42 for image
shift of 0.01 |rad|

| focal length f | 39.9855 | 72.8565 | 122.8549 | 184.2862 |
|---|---|---|---|---|
| Shift amount of the lens | 0.3187 | 0.3882 | 0.4678 | 0.5360 |
| Shift amount of the image | 0.3899 | 0.7285 | 1.2285 | 1.8427 |

Condition Corresponding Values f1 = 94.776
f2 = −23.714
f3 = 37.100
β2t = −0.6435
β2w = −0.3637
β5t = 3.9100

TABLE 9-continued

β5w = 1.3030
(1) (D1T − D1W)/(D4W − D4T) = 1.797
(2) f3/f1 = 0.391
(3) f2/(fw × ft)$^{1/2}$ = 0.280
(4) (β2t/β2w)/(ft/fw) = 0.374
(5) (β5t/β5w)/(ft/fw) = 0.635
(6) (βft/βfw)/(ft/fw) = 0.471
(7) r21/Da = 3.109
(8) (β2t/β2w)/(β5t/β5w) = 0.589
(9) Db/fw = 0.113

FIGS. 97a–104d are various aberration graphs of the ninth preferred embodiment relative to the d-line (Δ=587.6 nm). FIGS. 97a–97d are various aberration graphs for an infinite focus state at a maximum wide-angle state. FIGS. 98a–98d are various aberration graphs for an infinite focus state at a first intermediate focal length state. FIGS. 99a–99d are various aberration graphs for an infinite focus state at a second intermediate focal length state. FIGS. 100a–100d are various aberration graphs for a infinite focus state at a maximum telephoto state. FIGS. 101a–101d are various aberration graphs for a photographic magnification of −1/30 at a maximum wide-angle state. FIGS. 102a–102d are various aberration graphs for a photographic magnification of −1/30 at a first intermediate focal length state. FIGS. 103a–103d are various aberration graphs for a photographic magnification of −1/30 at a second intermediate focal length state. FIGS. 104a–104d are various aberration graphs for a photographic magnification of −1/30 at a maximum telephoto state.

Figure 105:
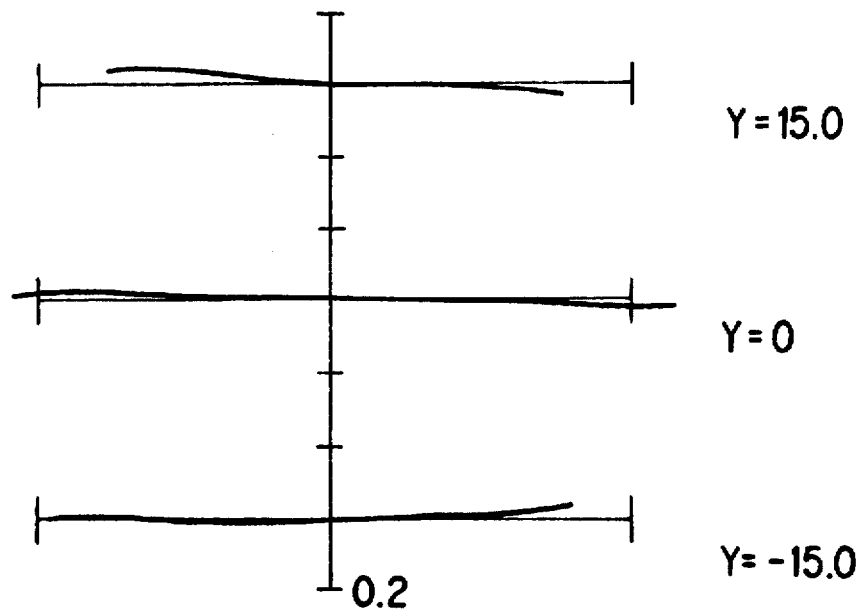
FIG. 105 is a drawing of coma aberrations during image shift for an infinite focus state at a maximum wide-angle state according to a ninth preferred embodiment.
Figure 106:
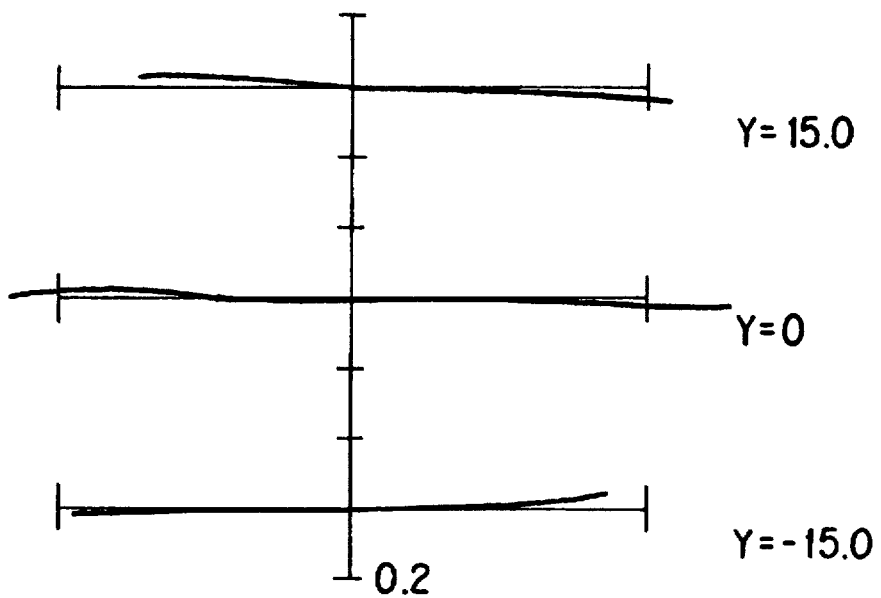
FIG. 106 is a drawing of coma aberrations during image shift for an infinite focus state at a first intermediate focal length state according to a ninth preferred embodiment.
Figure 107:
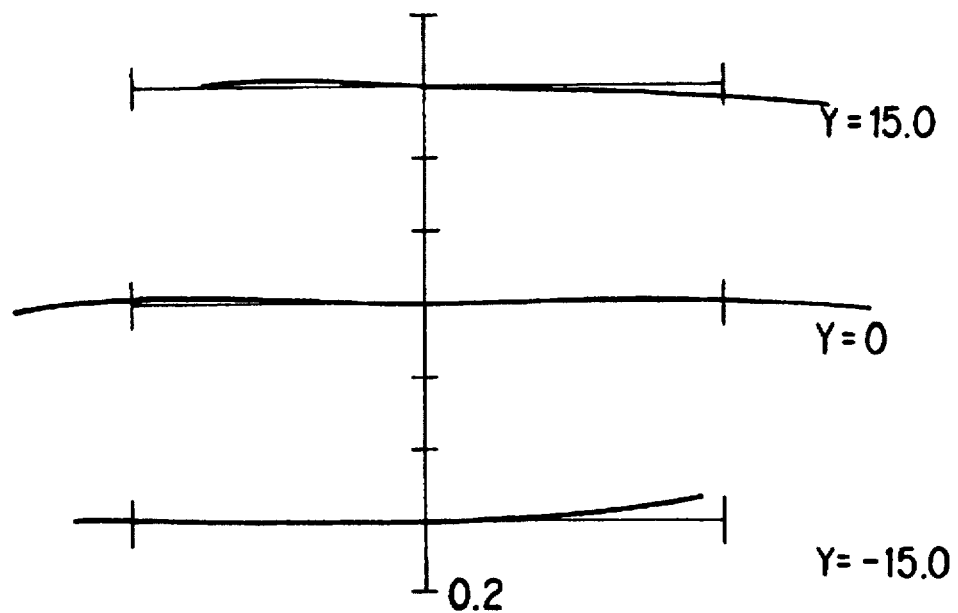
FIG. 107 is a drawing of coma aberrations during image shift for an infinite focus state at the second intermediate focal length state according to a ninth preferred embodiment.
Figure 108:
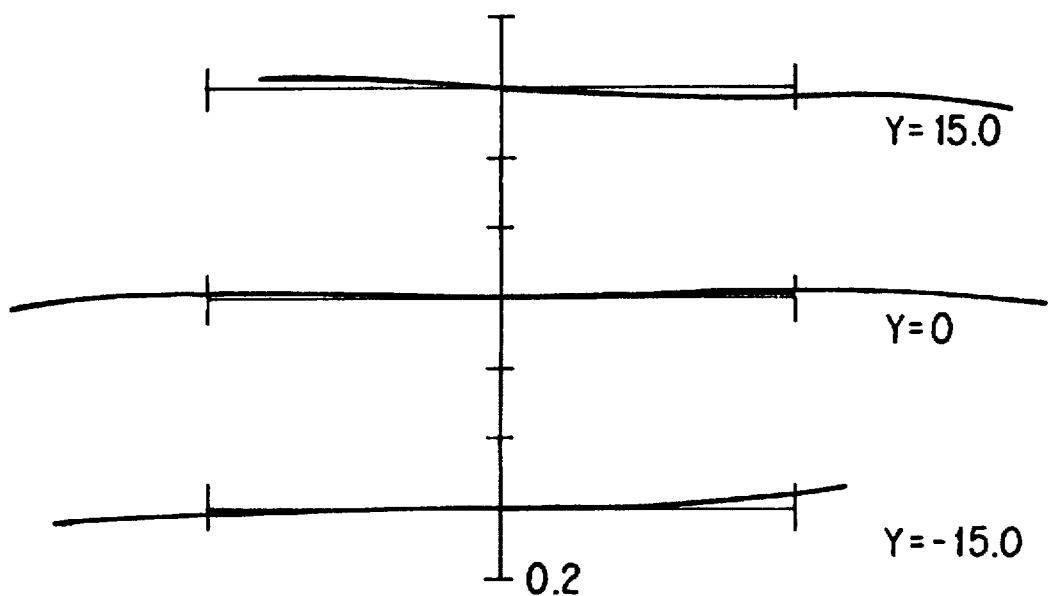

FIGS. 105–108 describe comas when an image is shifted 0.01 rad relative to the optical axis in the ninth preferred embodiment. FIG. 105 describes comas for an infinite focus state at the maximum wide-angle state. FIG. 106 describes comas for an infinite focus state at the first intermediate focal length state. FIG. 107 describes comas for an infinite focus state at a second intermediate focal length state. FIG. 108 describes comas for an infinite focus state at a maximum telephoto state.

Each aberration described in FIGS. 105–108 is for a coma corresponding to Y=15.0, 0, −15.0 when the positive cemented lens 9L42 is moved in the positive direction of the image height Y.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A zoom lens system, in order from an object side of the zoom lens system, comprising:

a first lens group having a positive refractive power;

a second lens group having a negative refractive power;

a third lens group having a positive refractive power;

a fourth lens group having a positive refractive power; and a fifth lens group having a negative refractive power;

during zooming from a maximum wide-angle state to a maximum telephoto state, at least the first lens group and the fifth lens group move toward the object side and a distance between the first lens group and the second lens group increases; a distance between the second lens group and the third lens group decreases; a distance between the third lens group and the fourth lens group increases; and a distance between the fourth lens group and the fifth lens group decreases;

at least one lens element of the fourth lens group is a shift lens subgroup that moves in a direction substantially perpendicular to an optical axis of the zoom lens system to shift an image; and the zoom lens system satisfies conditions:

$$2.5 < (1-\beta at) \cdot \beta bt < 5$$

$$-0.1 < fct/fct < -0.005$$

where βat is a lateral magnification of the shift lens group at a maximum telephoto state, βbt is a lateral magnification at a maximum telephoto state of a lens group on an image side of the shift lens group, ft is a focal length of the zoom lens system at a maximum telephoto state, and fct is a combined focal length at a maximum telephoto state of lens groups positioned on an object side of the shift lens group.

2. The system according to claim 1, wherein the zoom lens system further satisfies condition:

$$-0.3 < fw/fcw < -0.02$$

where fw is a focal length of the zoom lens system at a maximum wide-angle state and fcw is a combined focal length at a maximum wide-angle state of lens groups positioned on an object side of the shift lens subgroup.

3. The system according to claim 2, wherein the fourth lens group comprises a lens subgroup that is fixed with respect to movement along the optical axis during image shifting and is positioned on the image side of the shift lens subgroup; and the zoom lens system further satisfies condition:

$$0.38 < fa/(fw \cdot ft)^{1/2} < 0.7$$

wherein fa is a focal length of the shift lens group.

4. The system according to claim 1, wherein the fourth lens group comprises a lens subgroup that is fixed with respect to movement along the optical axis during image shifting and is positioned on the image side of the shift lens subgroup; and the zoom lens system further satisfies condition:

$$0.38 < fa/(fw \cdot ft)^{1/2} < 0.7$$

wherein fa is a focal length of the shift lens group and fw is a focal length of the zoom lens system at a maximum wide-angle state.

5. The system according to claim 1, further comprising an aperture diaphragm adjacent to the fourth lens group.

6. A zoom lens system comprising a shift lens subgroup and defining an optical axis, the zoom lens system shifting an image by moving the shift lens subgroup in a direction substantially perpendicular to the optical axis of the zoom lens system, the zoom lens system further comprising:

a first lens group comprising said shift lens subgroup;

a second lens group comprising at least one lens subgroup, the second lens group being positioned to an image side of the first lens group; and a third lens group comprising at least one lens subgroup positioned to an object side of the first lens group, wherein during at least one of zooming from a maximum wide-angle state to a maximum telephoto state and focusing on close-range objects, a distance between the first lens group and the second lens group is changed; the zoom lens system satisfying the conditions:

$$2.5 < (1-\beta_{at}) \cdot \beta_{bt} < 5$$

and $$-0.1 < ft/fct < -0.005$$

where $\beta_{at}$ is a lateral magnification at a maximum telephoto state of the shift lens subgroup, $\beta_{bt}$ is a lateral magnification at a maximum telephoto state of the second lens group, ft is a focal length of the zoom lens system at a maximum telephoto state, and fct is a combined focal length at a maximum telephoto state of the third lens group.

7. The system according to claim 6, further comprising a third lens group, the third lens group comprising at least one lens subgroup positioned on the object side of the first lens group; the zoom lens system further satisfying condition:

$$0.3 < |[(1-\beta_{at})\beta_{bt}]/[(1-\beta_{aw})\beta_{bw}]|/(ft/fw) < 0.75$$

where $\beta_{aw}$ is a lateral magnification at a maximum wide angle state of the shift lens subgroup, $\beta_{bw}$ is a lateral magnification at a maximum wide-angle state of the second lens group, ft is a focal length of the zoom lens system at a maximum telephoto state and fw is a focal length of the zoom lens system at the maximum wide-angle state.

8. The system according to claim 6, wherein:
   the first lens group comprises a plurality of component lens subgroups; and
   a component lens subgroup of the plurality of component lens subgroups that is positioned closest to the image side is fixed relative to movements along the optical axis during image shifting.

9. The system according to claim 6, further comprising an aperture diaphragm adjacent to the first lens group.

10. A zoom lens system, in order from an object side, comprising:
    a first lens group with a positive refractive power;
    a second lens group with a negative refractive power;
    a third lens group with a positive refractive power;
    a fourth lens group with a positive refractive power, and
    a fifth lens group with a negative refractive power;
    during zooming from a maximum wide-angle state to a maximum telephoto state, at least the first lens group and the fifth lens group move towards the object side and a distance between the first lens group and the second lens group increases; a distance between the second lens group and the third lens group decreases; a distance between the third lens group and the fourth lens group increases; and a distance between the fourth lens group and the fifth lens group decreases;
    the zoom lens system satisfies conditions:

$$1.5 < (D1T-D1W)/(D4W-D4T) < 2.1$$

$$0.39 < f3/f1 < 0.55$$

$$0.25 < |f2|/(fw \cdot ft)^{1/2} < 0.32$$

wherein D1W is a distance between the first lens group and the second lens group at a maximum wide-angle state, D1T is a distance between the first lens group and the second lens group at a maximum telephoto state, D4W is a distance between the fourth lens group and the fifth lens group at a maximum wide-angle state, D4T is a distance between the fourth lens group and the fifth lens group at a maximum telephoto state, f1 is a focal length of the first lens group, f2 is a focal length of the second lens group, f3 is a focal length of the third lens group, f+ is a focal length of the zoom lens system at a maximum telephoto state, and fw is a focal length of the zoom lens system at the maximum wide-angle state.

11. A zoom lens system of claim 10, wherein the zoom lens system further satisfies conditions:

$$0.32 < (\beta_{2t}/\beta_{2w})/(ft/fw) < 0.45$$

$$0.5 < (\beta_{5t}/\beta_{5w})/(ft/fw) < 0.7$$

where $\beta_{2t}$ is a lateral magnification of the second lens group at a maximum telephoto state, $\beta_{2w}$ is a lateral magnification of the second lens group at a maximum wide-angle state, $\beta_{5t}$ is a lateral magnification of the fifth lens group at the maximum telephoto state, and $\beta_{5w}$ is a lateral magnification of the fifth lens group at the maximum wide-angle state.

12. A zoom lens system of claim 11, wherein the fifth lens group comprises a positive lens positioned closest to an object side of said zoom lens system and a negative lens positioned closest to an image side of said zoom lens system.

13. A zoom lens system of claim 10, wherein the fifth lens group comprises a positive lens positioned closest to an object side of said zoom lens system and a negative lens positioned closest to an image side of the zoom lens system.

14. A zoom lens system of claim 10, wherein the zoom lens system further satisfies a condition:

$$0.35 < (Bft-Bfw)/(ft-fw) < 0.5$$

where Bft is a back focus at the maximum telephoto state and Bfw is a back focus at the maximum wide-angle state.

15. A zoom lens system of claim 10, wherein the second lens group comprises in order from the object side, a biconcave lens, a biconvex lens and a negative lens having a concave surface facing the object side;
    the zoom lens system further comprises an aperture diaphragm and satisfies a condition:

$$2 < r21/Da < 3.5$$

where r21 is a radius of curvature of the surface of the lens in the second lens group closest to the object side, and Da is a distance measured along the optical axis between said aperture diaphragm and the lens in the second lens group closest to the object side.

* * * * *